(12) United States Patent
Ishihara

(10) Patent No.: US 9,104,018 B2
(45) Date of Patent: Aug. 11, 2015

(54) IMAGING APPARATUS HAVING A CURVED IMAGE SURFACE

(71) Applicant: CANON KABUSHIKI KAISHA, Tokyo (JP)

(72) Inventor: Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 13/792,841

(22) Filed: Mar. 11, 2013

(65) Prior Publication Data

US 2013/0258490 A1    Oct. 3, 2013

(30) Foreign Application Priority Data

| Mar. 30, 2012 | (JP) | 2012-081495 |
| Mar. 30, 2012 | (JP) | 2012-081540 |
| Mar. 30, 2012 | (JP) | 2012-081584 |
| Mar. 30, 2012 | (JP) | 2012-081634 |

(51) Int. Cl.
*G02B 3/00* (2006.01)
*G02B 9/04* (2006.01)
(Continued)

(52) U.S. Cl.
CPC ........ *G02B 13/18* (2013.01); *G02B 3/00* (2013.01); *G02B 13/0045* (2013.01); *G02B 9/04* (2013.01); *G02B 9/06* (2013.01); *G02B 9/08* (2013.01)

(58) Field of Classification Search
CPC .............. G02B 13/0005; G02B 13/001; G02B 13/0015; G02B 13/002; G02B 13/003; G02B 13/005; G02B 13/0055; G02B 13/006; G02B 13/06; G02B 13/18; G02B 9/04; G02B 9/06

USPC .......... 359/648–651, 733–736, 740, 793–794
See application file for complete search history.

(56) References Cited

U.S. PATENT DOCUMENTS 3,006,248 A * 10/1961 Linke et al. ................... 396/439
3,455,223 A *  7/1969 Spoelhof ........................ 396/21
(Continued)

FOREIGN PATENT DOCUMENTS

| CN | 2554642 Y | 6/2003 |
| JP | 63-081413 A | 4/1988 |

(Continued)

OTHER PUBLICATIONS

Feb. 4, 2015 Chinese Official Action in Chinese Patent Appln. No. 201310102807.1.

*Primary Examiner* — Thomas K Pham
*Assistant Examiner* — Nicholas Pasko
(74) *Attorney, Agent, or Firm* — Fitzpatrick, Cella, Harper & Scinto

(57) ABSTRACT

Provided is an imaging apparatus, including: an imaging optical system including a plurality of lenses; and an image plane which is disposed on an image side of the imaging optical system and is curved so that a concave surface thereof faces an object side of the imaging optical system. The imaging optical system includes an aperture stop. In the imaging optical system, a lens closer to the object side than the aperture stop and a lens closer to the image side than the aperture stop have different positive powers. A focal length of the imaging optical system is substantially equal to a distance from an exit pupil of the imaging optical system to the image plane. A radius of curvature of the image plane is substantially equal to the focal length of the imaging optical system.

30 Claims, 70 Drawing Sheets

(51) Int. Cl.
*G02B 9/06* (2006.01)
*G02B 13/18* (2006.01)
*G02B 13/00* (2006.01)
*G02B 9/08* (2006.01)

(56) References Cited

U.S. PATENT DOCUMENTS

| | | | | |
|---|---|---|---|---|
| 5,067,803 A | * | 11/1991 | Ohno | 359/708 |
| 5,627,684 A | * | 5/1997 | Lewis | 359/717 |
| 5,666,234 A | * | 9/1997 | Ohno | 359/794 |
| 5,689,376 A | | 11/1997 | Lewis | |
| 5,739,965 A | * | 4/1998 | Ohno | 359/753 |
| 6,181,455 B1 | | 1/2001 | Ishihara | |
| 6,335,835 B1 | * | 1/2002 | Koike | 359/717 |
| 6,985,184 B2 | * | 1/2006 | Sato | 348/340 |
| 7,110,189 B2 | * | 9/2006 | Koike | 359/716 |
| 2014/0253677 A1 | * | 9/2014 | Chen et al. | 348/36 |

FOREIGN PATENT DOCUMENTS

| | | |
|---|---|---|
| JP | 06-308423 A | 11/1994 |
| JP | 8-338944 A | 12/1996 |
| JP | 2006-184783 A | 7/2006 |
| JP | 2007-279284 A | 10/2007 |
| JP | 4628781 B2 | 2/2011 |
| WO | 01/29613 A1 | 4/2001 |
| WO | 01/63915 A1 | 8/2001 |
| WO | WO 2014074202 A2 * | 5/2014 |

* cited by examiner

PHASE DIFFERENCE DISTRIBUTION

ASPHERICAL AMOUNT

ASPHERICAL AMOUNT

ASPHERICAL AMOUNT

ASPHERICAL AMOUNT

ASPHERICAL SHAPE

ASPHERICAL AMOUNT

SECOND ORDER DIFFERENTIAL VALUE OF ASPHERICAL SURFACE AND REFERENCE SPHERICAL SURFACE

SECOND ORDER DIFFERENTIAL VALUE OF ASPHERICAL COMPONENT

ASPHERICAL SHAPE

ASPHERICAL AMOUNT

SECOND ORDER DIFFERENTIAL VALUE OF ASPHERICAL SURFACE AND REFERENCE SPHERICAL SURFACE

SECOND ORDER DIFFERENTIAL VALUE OF ASPHERICAL COMPONENT

SECOND ORDER DIFFERENTIAL VALUE OF ASPHERICAL SURFACE AND REFERENCE SPHERICAL SURFACE

DISTANCE FROM OPTICAL AXIS (mm)

SECOND ORDER DIFFERENTIAL VALUE OF ASPHERICAL COMPONENT

DISTANCE FROM OPTICAL AXIS (mm)

ASPHERICAL SHAPE

ASPHERICAL AMOUNT

SECOND ORDER DIFFERENTIAL VALUE OF ASPHERICAL SURFACE AND REFERENCE SPHERICAL SURFACE

SECOND ORDER DIFFERENTIAL VALUE OF ASPHERICAL COMPONENT

ASPHERICAL SHAPE

ASPHERICAL AMOUNT

SECOND ORDER DIFFERENTIAL VALUE OF ASPHERICAL SURFACE AND REFERENCE SPHERICAL SURFACE

DISTANCE FROM OPTICAL AXIS (mm)

SECOND ORDER DIFFERENTIAL VALUE OF ASPHERICAL COMPONENT

DISTANCE FROM OPTICAL AXIS (mm)

ASPHERICAL SHAPE

ASPHERICAL AMOUNT

SECOND ORDER DIFFERENTIAL VALUE OF ASPHERICAL SURFACE AND REFERENCE SPHERICAL SURFACE

SECOND ORDER DIFFERENTIAL VALUE OF ASPHERICAL COMPONENT

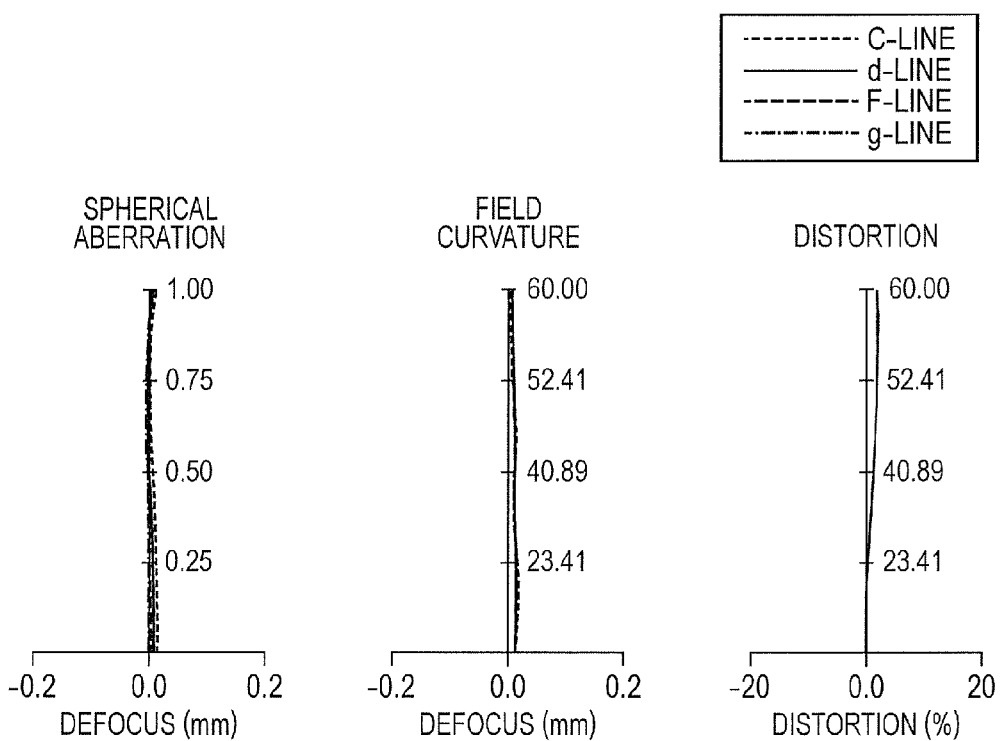

ASPHERICAL SHAPE

ASPHERICAL AMOUNT

SECOND ORDER DIFFERENTIAL VALUE OF ASPHERICAL SURFACE AND REFERENCE SPHERICAL SURFACE

SECOND ORDER DIFFERENTIAL VALUE OF ASPHERICAL COMPONENT

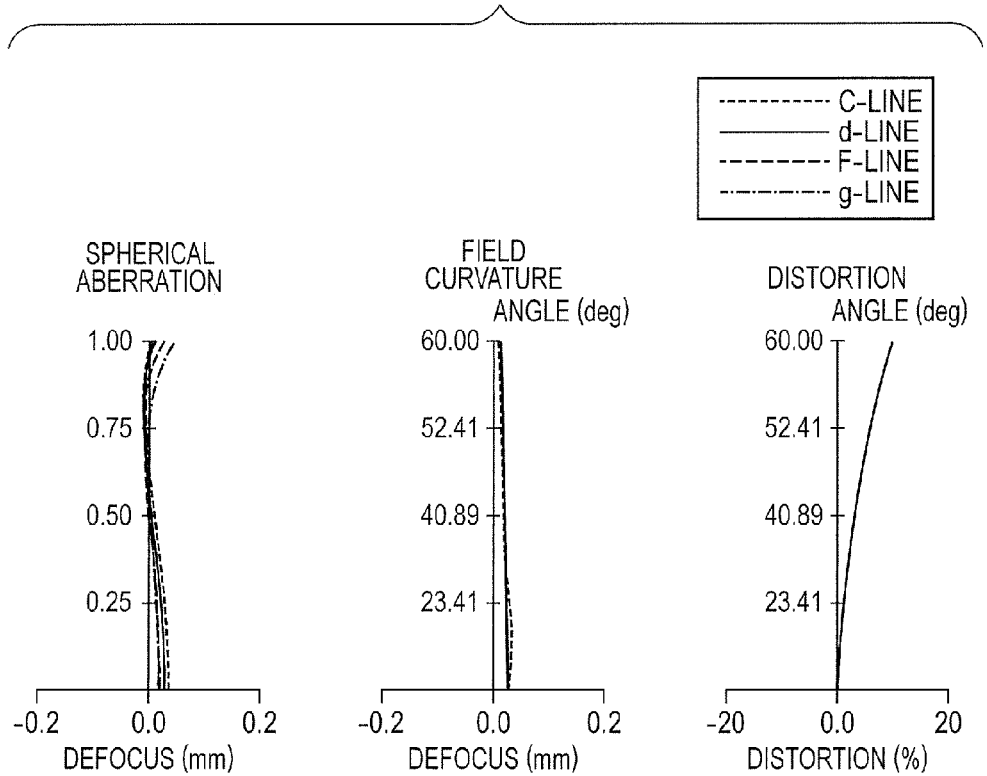

ASPHERICAL SHAPE

ASPHERICAL AMOUNT

SECOND ORDER DIFFERENTIAL VALUE OF ASPHERICAL SURFACE AND REFERENCE SPHERICAL SURFACE

DISTANCE FROM OPTICAL AXIS (mm)

SECOND ORDER DIFFERENTIAL VALUE OF ASPHERICAL COMPONENT

DISTANCE FROM OPTICAL AXIS (mm)

IMAGING APPARATUS HAVING A CURVED IMAGE SURFACE

BACKGROUND OF THE INVENTION

1. Field of the Invention

The present invention relates to an imaging apparatus in which a curved image plane (i.e., curved image surface) is disposed near an image plane of an imaging optical system. In particular, the present invention provides an imaging apparatus suitable for a digital still camera, a digital video camera, a cell phone camera, a monitoring camera, and the like.

2. Description of the Related Art

There are disclosed some examples of the imaging apparatus using such a curved image plane. There is proposed a ball lens in which a spherical shell lens and a spherical lens disposed inside the lens constitute concentric spheres (Japanese Patent Application Laid-Open No. S63-081413).

This ball lens can appropriately correct spherical aberration and chromatic aberration.

In addition, because of the point symmetry structure of the ball lens, it is easy to realize a wider angle of field, and hence the ball lens is suitable for an imaging optical system of an imaging apparatus required to have a wide angle and high resolution.

There is disclosed an example of the ball lens in which an aperture stop is disposed on a plane passing through the spherical center of the ball lens in order to obtain good imaging performance by blocking harmful light such as flare.

In addition, there is proposed an imaging optical system in which an image sensor surface is curved in a two-dimensional manner (Japanese Patent No. 4628781).

Japanese Patent No. 4628781 discloses an example in which, in order to reduce constraint in a case where an image sensor serves as an image recording medium, a light receiving plane of the image sensor is made concave to the object side so that an incident angle of a light beam to the image sensor becomes closer to the normal angle.

There is disclosed an optical system formed of only two single-lens members and an aperture stop therebetween, in which one of the lens members has aspherical surfaces on both sides for the purpose of use in an inexpensive camera having a curved image plane (Japanese Patent Application Laid-Open No. H08-338944). This optical system has a full angle of field of at least 62.5 degrees and is an imaging apparatus for a disposable camera in which an image is formed on a curved film plane.

In an imaging apparatus in recent years, a pixel size of the image sensor has been rapidly reduced, and the imaging optical system is required to have a higher resolution. Therefore, the imaging optical system is required to realize high imaging performance even at a small F value.

Further, in recent years, the imaging apparatus are required to have a wider angle and a smaller size.

Japanese Patent Application Laid-Open No. S63-081413 discloses an example of using a ball lens, and, in a main example, an imaging optical system has F/2.8 and has good imaging performance in which spherical aberration and axial chromatic aberration are appropriately corrected.

On the other hand, there is also disclosed an example in which an F value is smaller than F/2.8. For instance, there is disclosed an imaging optical system having F/2.0 or F/1.4. However, in such a small F value, large spherical aberration is generated, and sufficient imaging performance cannot be obtained.

In other words, in the imaging optical system having an F value smaller than F/2.0, in particular, spherical aberration cannot be corrected sufficiently only by the ball lens, and hence there is a problem in that the imaging performance is deteriorated. In addition, there is also disclosed an imaging optical system having F/1.0, in which aberration is corrected by using a high refractive index material such as N=2.500 or N=2.301.

Such a high refractive index material is expensive, and there may cause a problem in that transmittance thereof is deteriorated.

Japanese Patent No. 4628781 discloses an example using a point asymmetry imaging optical system, in which aberrations such as spherical aberration, axial chromatic aberration, and field curvature are corrected in a relatively small F value of F/2.45 to F/2.91 of the imaging optical system, and hence high imaging performance is realized. However, in the imaging apparatus in recent years, a pixel size of the image sensor is reduced to be very small, and an optical system having a higher resolution is demanded. Therefore, in the imaging optical system having an F value smaller than F/2.0, it is a problem in that aberration such as spherical aberration occurs, resulting in deterioration of the imaging performance.

In the optical system of Japanese Patent Application Laid-Open No. H08-338944, the image plane is curved, and the two single-lens members have aspherical surfaces. Thus, the imaging performance is improved over the wide angle. However, this optical system reduces generation amount of spherical aberration by narrowing focus to F/8.0. In addition, in this optical system, the surface closest to the object side is provided with an aspherical surface that is displaced from the reference spherical surface toward the image side, and the surface closest to the image side is provided with an aspherical surface that is displaced from the reference spherical surface toward the object side. In other words, these aspherical surfaces are displaced from the reference spherical surfaces to the inside of the imaging optical system in peripheries of the lens surfaces disposed on the outermost sides of the imaging optical system. The aspherical surfaces correct coma and astigmatism. Therefore, spherical aberration cannot be corrected appropriately.

SUMMARY OF THE INVENTION

The present invention provides an imaging apparatus that can obtain high imaging performance by appropriately correcting aberration at a small F value.

According to one exemplary embodiment of the present invention, there is provided an imaging apparatus, including: an imaging optical system including a plurality of lenses; and an image plane which is disposed on an image side of the imaging optical system and is curved so that a concave surface thereof faces an object side of the imaging optical system, in which: the imaging optical system includes an aperture stop; a lens disposed in the object side of the aperture stop in the imaging optical system and a lens disposed in the image side of the aperture stop in the imaging optical system have different positive powers; a focal length of the imaging optical system is substantially equal to a distance from an exit pupil of the imaging optical system to the image plane; and a radius of curvature of the image plane is substantially equal to the focal length of the imaging optical system.

Further features of the present invention will become apparent from the following description of exemplary embodiments with reference to the attached drawings.

BRIEF DESCRIPTION OF THE DRAWINGS

FIG. 72 is an axial aberration diagram of an imaging optical system according to Example 15 of the present invention.

FIG. 77 is an axial aberration diagram of an imaging optical system according to Example 16 of the present invention.

DESCRIPTION OF THE EMBODIMENTS

Figure 1:
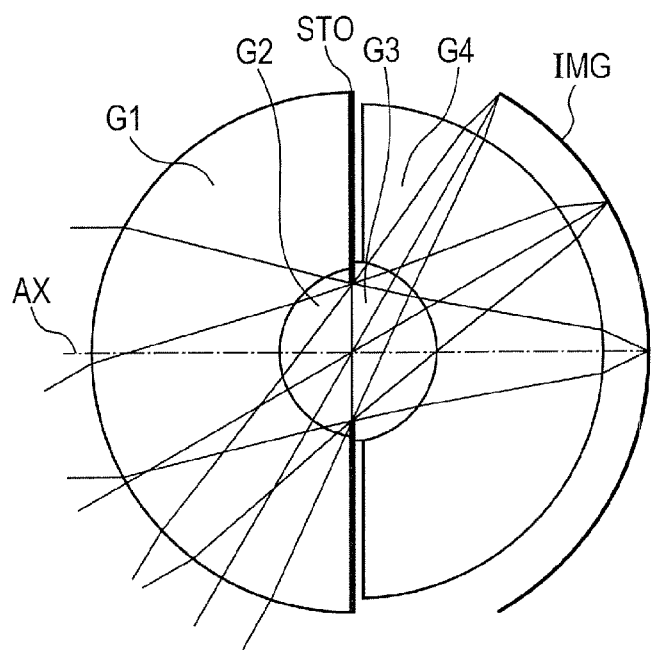
FIG. 1 is a diagram illustrating a structural example of an imaging apparatus according to Example 1 of the present invention.

A structural example of an imaging apparatus according to an embodiment of the present invention is described.

First, an entire structure of the imaging apparatus is described.

The imaging apparatus of this embodiment includes an imaging optical system including a plurality of lenses, and a curved image plane which has a concave surface facing the object side and is disposed in a vicinity of an image plane of the imaging optical system, thus being capable of correcting a petzval image plane component of the field curvature.

Further, by configuring the imaging optical system as a substantially point symmetry optical system, occurrence of off-axial aberration such as coma, astigmatism, distortion, and lateral chromatic aberration is suppressed, and hence aberration to be corrected is limited only to axial aberration such as spherical aberration and axial chromatic aberration.

Making the imaging optical system close to the point symmetry optical system limits a shape of the lens and decreases flexibility in optical design. However, it is more important to obtain an advantage of limiting the aberration to be corrected only to axial aberration.

Thus, it is possible to realize an imaging apparatus having high imaging performance with brightness over a wide angle of field.

Therefore, in the imaging apparatus of this embodiment, a focal length of the imaging optical system is set substantially equal to a distance from an exit pupil to the image plane of the imaging optical system, and a radius of curvature of the image plane is set substantially equal to the focal length of the imaging optical system. Thus, the imaging optical system is made close to a point symmetry optical system.

In particular, it is important to adopt a structure in which an optical system closer to the image side than an aperture stop of the imaging optical system is close to the point symmetry, which is concentric to a field angle light beam.

By setting the focal length of the imaging optical system to be substantially equal to the distance from the exit pupil to the image plane of the imaging optical system, it is possible to dispose the image side principal point and the exit pupil of the imaging optical system at substantially the same position.

Because the incident height of the field angle light beam becomes low, the field angle light beam can be handled similarly to the axial light. Thus, it is possible to adopt a structure in which the optical system closer to the image side than the aperture stop of the imaging optical system is close to the point symmetry. Specifically, it is preferred to satisfy the following Expression (1).

Thus, it is possible to appropriately correct off-axial aberration such as coma, astigmatism, distortion, and lateral chromatic aberration over a wide angle of field.

In addition, by setting the radius of curvature of the image plane substantially equal to the focal length of the imaging optical system, it is possible to appropriately correct the field curvature.

Specifically, it is preferred to satisfy the following Expression (2).

$$0.8 \leq f\_sys/d\_pup \leq 1.5 \quad (1)$$

$$0.8 \leq |R\_img|/f\_sys \leq 1.5 \quad (2)$$

Here, f_sys represents the focal length of the imaging optical system, d_pup represents the distance from the exit pupil to the image plane of the imaging optical system, and R_img represents a radius of curvature of the image plane.

Because the structure of the imaging optical system can appropriately correct astigmatism, the field curvature can be limited only to the petzval image plane. Because the petzval image plane can be corrected by curving the image plane, it is possible to suppress the occurrence of every off-axial aberration to be small. In other words, it is possible to limit the remaining aberrations to axial aberrations.

Note that, the image plane of the imaging apparatus as used herein refers to a curved image sensor or an optical transmission unit having a curved incident surface.

As the curved image sensor, for example, there are considered an image sensor formed on a deformable substrate and an element formed of small planar image sensors arranged in an array so as to form a concave surface shape.

In addition, as an optical transmission unit, for example, there is considered an image plate which includes optical fibers bound in a plate-like shape and has an end formed into a concave shape and another end formed into a flat shape.

Further, it is possible to adopt a structure in which the incident surface of the optical transmission unit is curved to have a concave surface facing the object side to serve as the image plane, and a flat exit plane is connected to the image sensor to serve as the imaging unit.

Next, an action of improving peripheral darkening (darkening at the edge of the image plane) is described.

In a general imaging optical system, it is known that a peripheral light intensity ratio drops in accordance with the cosine fourth law with respect to an angle of field (incident angle) ω. Therefore, the periphery of the photographed image becomes very dark, and a clear image cannot be obtained.

In recent years, some digital cameras and digital video cameras remarkably enhance sensitivity at edges so as to digitally correct the peripheral darkening. However, because noise is increased while a contrast remains low, image quality at edges is considerably deteriorated compared with a center part of the image.

The peripheral darkening causes such a serious problem. This tendency is conspicuous especially in the imaging optical system having a wide angle of field and is one of the factors to be overcome to realize the imaging optical system having a wide angle of field.

The breakdown of the cosine fourth law of the peripheral light intensity ratio is as follows:
(a) the square of cos ω due to an increase of an apparent focal length in accordance with the angle of field;
(b) the first power of cos ω due to a decrease of an apparent aperture diameter in accordance with the angle of field; and
(c) the first power of cos ω due to tightening of the incident angle to the image plane in accordance with the angle of field.

In the imaging optical system of the imaging apparatus of this embodiment, the radius of curvature of the image plane is set substantially equal to the focal length of the imaging optical system, and hence the apparent focal length can be substantially the same over the full angle of field.

Thus, the peripheral light intensity ratio corresponding to the square of cos ω can be improved.

By satisfying Expression (2), it is possible to obtain a reasonable effect.

In other words, the peripheral light intensity ratio can be improved from the fourth power of cos ω to the square of cos ω. Because the peripheral light intensity ratio of the imaging optical system having a wide angle of field can be significantly improved, it is possible to provide the imaging apparatus that can photograph images having a high contrast over a wide angle of field, low noise, and high image quality.

Next, the meaning of the above-mentioned Expressions (1) and (2) is described in more detail.

Expression (1) defines the condition for setting the focal length f_sys of the imaging optical system and the distance d_pup from the exit pupil to the image plane of the imaging optical system to be substantially equal to each other, and it is possible to adopt a structure in which the optical system closer to the image side than the aperture stop of the imaging optical system is close to the point symmetry.

If Expression (1) is satisfied, off-axial aberration such as coma, astigmatism, distortion, and lateral chromatic aberration can be appropriately corrected.

If the upper limit of Expression (1) is exceeded, the point symmetry of the optical system closer to the image side than the aperture stop of the imaging optical system cannot be secured. Then, off-axial aberration such as coma, astigmatism, distortion, and lateral chromatic aberration occurs and causes a problem.

If the lower limit of Expression (1) is exceeded, the point symmetry of the optical system closer to the image side than the aperture stop of the imaging optical system cannot be secured. Then, off-axial aberration such as coma, astigmatism, distortion, and lateral chromatic aberration occurs and causes a problem.

Expression (2) defines the condition for setting the radius of curvature R_img of the image plane and the focal length f_sys of the imaging optical system to be substantially equal to each other, which is the condition for appropriately correcting field curvature and astigmatism.

If Expression (2) is satisfied, an image plane shape of the imaging apparatus can be close to the petzval image plane. Therefore, field curvature can be corrected without occurrence of astigmatism over a wide angle of field.

If the upper limit of Expression (2) is exceeded, a difference from the petzval image plane becomes large at the periphery of the image plane, and hence field curvature occurs so that the imaging performance is deteriorated.

If the lower limit of Expression (2) is exceeded, a difference from the petzval image plane becomes large at the periphery of the image plane, and hence field curvature occurs so that the imaging performance is deteriorated.

If the imaging optical system has a small F value, the depth of focus is small. Therefore, a permissible range of the field curvature is narrow, and it is necessary to correct the field curvature with high accuracy.

Note that, if the image plane is not a spherical surface but an aspherical surface or a step-like surface, the radius of curvature of the image plane is defined as follows.

First, if the shape of the image plane is an aspherical surface, the radius of curvature of a reference spherical surface is regarded as the "radius of curvature of the image plane". The aspherical surface can be expressed by an expression α, and the reciprocal of a curvature c on an optical axis of Expression α is the radius of curvature.

$$z = \frac{cr^2}{1+\sqrt{1-(1+k)c^2r^2}} + Ar^4 + Br^6 + Cr^8 + Dr^{10} + \cdots \quad \alpha$$

Here, z represents a sag amount (mm) of the aspherical shape in the optical axis direction, c represents the curvature (1/mm) on the optical axis, r represents a distance (mm) from the optical axis in a radial direction, and A, B, C, and D respectively represent coefficients of fourth, sixth, eighth, and tenth orders.

Even if the image plane is an aspherical shape, it is possible to determine a radius of curvature of a reference curved surface by measuring the radius of curvature on the optical axis.

Next, a case where the image plane has a step-like shape is described.

In the case where small image sensors are arrayed or optical fibers are bound to form the curved image plane, the image plane has a step-like shape in the strict sense.

In this case, the curved surface connecting the center points of respective pixels of the image sensors or the center points of the respective optical fibers can be regarded as the image plane.

By calculating the radius of curvature of the reference curved surface from a result of fitting the curved surface with the above-mentioned expression a by the least square method, it is possible to determine the radius of curvature of the image plane.

In addition, the imaging apparatus of this embodiment adjusts the in-focus position by changing an interval between the imaging optical system and the image plane.

Figure 13A:
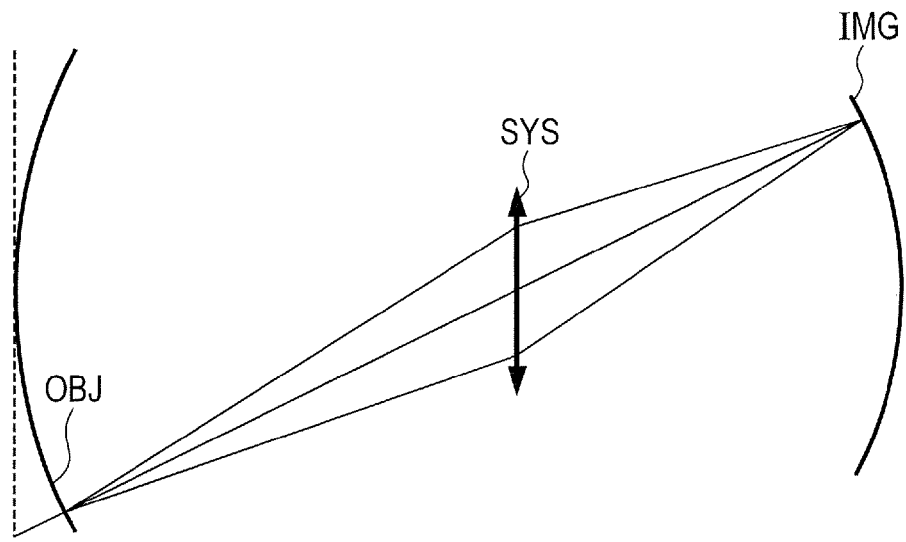
FIG. 13A is a diagram illustrating an imaging relationship when an object plane of the imaging apparatus according to an embodiment of the present invention is disposed at a finite distance.
Figure 13B:
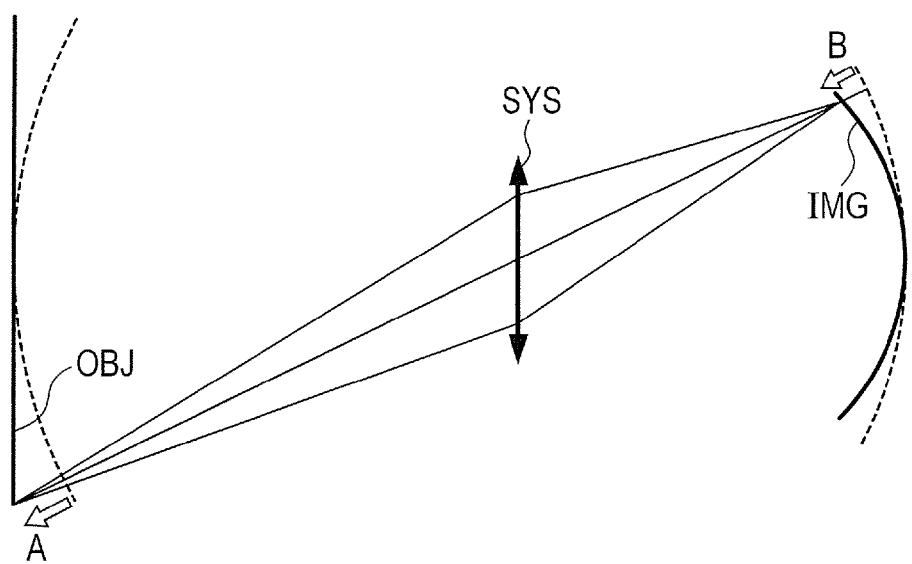
FIG. 13B is a diagram illustrating an imaging relationship when the object plane of the imaging apparatus according to the embodiment of the present invention is disposed at a finite distance.

FIGS. 13A and 13B illustrate an imaging relationship when an object plane is disposed at a finite distance.

In FIG. 13A, OBJ represents the object plane, SYS represents the imaging optical system, and IMG represents the image plane. The imaging optical system SYS forms an image of an object point on the object plane OBJ at an image point on the image plane IMG.

As illustrated in FIG. 13A, because the imaging optical system SYS forms the image of the object point at the same distance from the imaging optical system SYS on the petzval image plane, the object plane OBJ in this case becomes a curved shape.

However, it is preferred in the imaging optical system that the object plane OBJ be a flat surface.

As illustrated in FIG. 13B, object points disposed apart from the optical axis are not positioned on the curved object plane illustrated by a broken line but on a flat object plane illustrated by a solid line. Then, as illustrated by an arrow A of FIG. 13B, the object point moves in the direction apart from the imaging optical system SYS, and the image point also moves, as illustrated by an arrow B, from the petzval image plane illustrated by a broken line to the image plane IMG illustrated by a solid line in the direction approaching the imaging optical system SYS.

Figure 14:
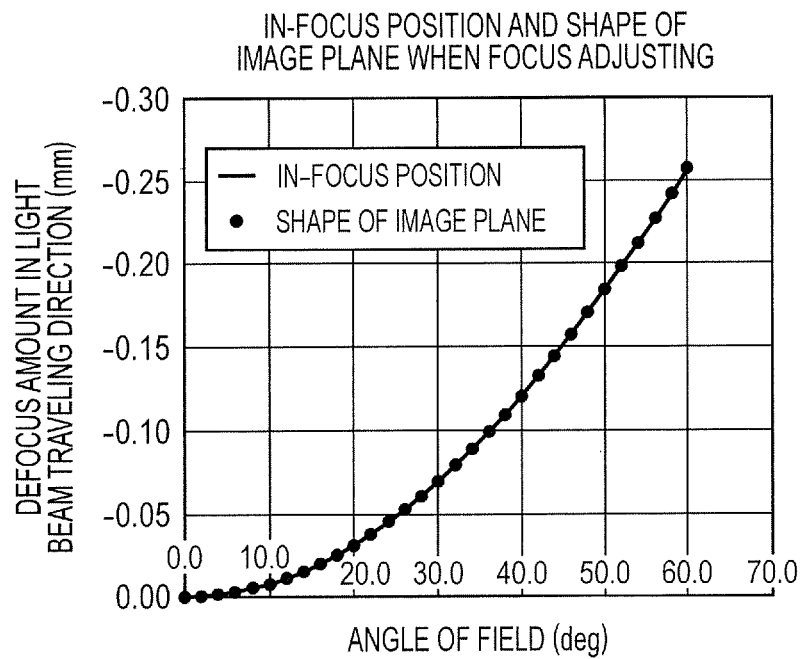
FIG. 14 is a diagram showing a relationship between an in-focus position and a shape of an image plane when focus adjustment is performed in the imaging apparatus according to the embodiment of the present invention.

This movement amount on the image plane side is regarded as a defocus amount in a traveling direction of a light beam, and an example in a model of the imaging optical system of FIG. 13B is shown in FIG. 14 as a graph.

FIG. 14 shows a relationship between the in-focus position and the shape of the image plane when focus adjustment is performed in an example.

In this example, parameters are set so that the focal length of the imaging optical system is f_sys=12.0 (mm), the radius of curvature of the image plane is R_img=12.0 (mm), the distance from the exit pupil to the image plane of the imaging optical system is d_pup=12.0 (mm), the object distance is S=−300 (mm), and the angle of field is ω=60 (degrees).

As described above, if the object plane is a flat surface, the in-focus position of each field angle light beam is defocused from the petzval image plane toward the imaging optical system side.

The defocus amount of the light beam in the traveling direction is shown in the graph of the in-focus position by a solid line.

In addition, the radius of curvature of the image plane is set substantially equal to the focal length of the imaging optical system, which corresponds to the petzval image plane shape with the object distance of infinity.

It should be understood that the in-focus position shown by solid line and the image plane shape shown by dots correspond to each other at the object distance of infinity. However, FIG. 14 shows that the in-focus position and the image plane shape correspond to each other precisely even in the case where the object distance is decreased to S=−300 (mm).

This means that the focus adjustment of the flat object plane can be performed without occurrence of field curvature in any object distance from infinity to S=−300 (mm).

In addition, the above-mentioned coincidence between the in-focus position and the image plane shape can be realized in a wide range of angle of field of −60 to +60 (degrees).

The focal length of the imaging optical system is set substantially equal to the distance from the exit pupil to the image plane of the imaging optical system, and the radius of curvature of the image plane is set substantially equal to the focal length of the imaging optical system. Then, the focus adjustment can be performed only by changing the distance between the imaging optical system and the image plane without changing the image plane shape.

For this purpose, it is necessary to satisfy Expressions (1) and (2).

Because the imaging optical system having a very small F value such as the imaging apparatus of this embodiment described above has a very small depth of focus, it is significantly important for the imaging apparatus that the focus adjustment with high accuracy can be easily realized.

(First Embodiment)

In this embodiment, in an imaging optical system, power of an optical system closer to the object side than an aperture stop and power of an optical system closer to the image side than the aperture stop are positive powers different from each other. Thus, it is possible to suppress aberration of a particularly high order so as to obtain high imaging performance.

Power arrangement of the imaging optical system is described in more detail.

In the imaging optical system of a recent imaging apparatus, a retrofocus type lens is common. The retrofocus type lens includes an optical system having negative power disposed closer to the object side than the aperture stop and an optical system having positive power disposed closer to the image side than the aperture stop.

In this structure, the optical systems in front of and behind the aperture stop have relatively strong negative power and relatively strong positive power compared with positive power necessary for the entire imaging optical system, and this structure gives power larger than necessary so as to cause large aberration. Therefore, there is a problem in that aberration is apt to cause particularly in higher order.

In addition, because the imaging optical system is not a point symmetry structure, off-axial aberration occurs greatly.

In contrast, in the imaging optical system of this embodiment, both the optical system closer to the object side than the aperture stop and the optical system closer to the image side than the aperture stop have positive power.

Therefore, compared with the positive power necessary for the entire imaging optical system, relatively small power can be given to the optical systems in front of and behind the aperture stop. Thus, occurrence of aberration can be suppressed.

In particular, because high order aberration can be suppressed, the structure can easily obtain high imaging performance.

In addition, because the structure is close to a point symmetry structure, occurrence of off-axial aberration is suppressed, and hence high imaging performance can be realized over a wide angle of field.

Further, in the imaging optical system of the imaging apparatus of this embodiment, the power of the optical system closer to the object side than the aperture stop is different from the power of the optical system closer to the image side than the aperture stop. Therefore, flexibility in optical design can be enhanced.

In particular, by setting the power of the optical system closer to the object side than the aperture stop to be smaller than the power of the optical system closer to the image side than the aperture stop, it is possible to obtain an advantage that axial aberration can be easily corrected.

Specifically, it is preferred to satisfy Expression (3):

$$0<\phi\_fro<\phi\_beh \quad (3),$$

where $\phi\_fro$ represents the power of the optical system closer to the object side than the aperture stop, and $\phi\_beh$ represents the power of the optical system closer to the image side than the aperture stop.

The spherical aberration and the axial chromatic aberration have tendency to be vulnerable to the influence of power of a surface having a high incident height h (surface having a large light beam width).

According to a third order aberration coefficient, spherical aberration occurs greatly in proportion to the fourth power of the incident height h, and the axial chromatic aberration occurs greatly in proportion to the square of the incident height h. In addition, high order spherical aberration occurs greatly in a surface in which the light beam width occupies a large ratio to the radius of curvature.

In the imaging optical system of this embodiment, both the optical system closer to the object side than the aperture stop and the optical system closer to the image side than the aperture stop have positive power. Thus, the imaging optical system of this embodiment has a feature that the optical system closer to the object side than the aperture stop has a large light beam width on each lens surface and that the optical system closer to the image side than the aperture stop has a small light beam width on each lens surface.

Therefore, the power of the optical system closer to the object side than the aperture stop is reduced so that the optical system closer to the image side than the aperture stop shares the power. Thus, spherical aberration and axial chromatic aberration generated in the optical system closer to the object side than the aperture stop is suppressed to be small and can be corrected easily by the optical system closer to the image side than the aperture stop.

In addition, because high order spherical aberration generated in the optical system closer to the object side than the aperture stop can also be suppressed to be small, spherical aberration can be appropriately corrected also at an F value smaller than F/2.0.

When the high order spherical aberration is appropriately corrected, chromatic spherical aberration can be easily corrected, and this is an important factor for realizing high imaging performance.

Thus, it is possible to realize the imaging optical system having a small F value and high imaging performance over a wide angle of field. Using this imaging optical system having a small F value and high imaging performance, it is possible to realize an imaging apparatus having high resolution.

Next, the size of the imaging optical system is described.

If the optical system closer to the object side than the aperture stop has negative power and the optical system closer to the image side than the aperture stop has positive power, which constitute a retrofocus type, the entire length of the imaging optical system becomes long.

On the other hand, in the imaging optical system of the imaging apparatus of this embodiment, both the power of the optical system closer to the object side than the aperture stop and the power of the optical system closer to the image side than the aperture stop are set to positive power.

When the optical systems on the object side and on the image side of the aperture stop are set to have positive powers, power necessary for the entire optical system can be obtained without a power loss. Thus, the imaging optical system can be compact.

Specific examples of this embodiment are hereinafter described.

EXAMPLE 1

An imaging optical system used for an imaging apparatus of this example includes an aperture stop and four lenses as illustrated in FIG. 1.

The imaging optical system includes, in order from the object side: a first lens G1 as a meniscus lens having a convex surface facing the object side; a second lens G2 as a plano-convex lens having a convex surface facing the object side; an aperture stop STO; a third lens G3 as a plano-convex lens having a convex surface facing the image side; and a fourth lens G4 as a meniscus lens having a convex surface facing the image side.

An exit surface of the first lens G1 is cemented to an incident surface of the second lens G2, an exit surface of the second lens G2 is cemented to an incident surface of the third lens G3, and an exit surface of the third lens G3 is cemented to an incident surface of the fourth lens G4.

The aperture stop STO is constituted by a light blocking member disposed on the cemented surface between the exit surface of the second lens G2 and the incident surface of the third lens G3.

In addition, IMG in FIG. 1 represents an image plane.

As illustrated in FIG. 1, the image plane IMG of an image sensor has a spherically curved shape, which is placed along a field curvature of the imaging optical system. Thus, good imaging performance is realized over the entire image plane IMG.

Table 1 shows a structure of the imaging apparatus of this example.

Surface number 1 is an incident surface of the first lens G1, surface number 2 is a cemented surface between an exit surface of the first lens G1 and an incident surface of the second lens G2, and surface number 3 is the cemented surface between the exit surface of the second lens G2 and the incident surface of the third lens G3, which is an aperture stop surface STO.

Surface number 4 is a cemented surface between the exit surface of the third lens G3 and the incident surface of the fourth lens G4, surface number 5 is an exit surface of the fourth lens G4, and surface number 6 is the image plane IMG of the image sensor.

Further, R represents a radius of curvature (mm), d represents a surface interval (mm), Nd represents a d-line refractive index, and vd represents an Abbe number.

TABLE 1

| Surface number | R | D | Nd | vd |
|---|---|---|---|---|
| 1 | 3.1178 | 2.2559 | 1.902000 | 25.1 |
| 2 | 1.0248 | 0.8652 | 1.850259 | 32.3 |
| 3 (STO) | Infinity | 1.0230 | 1.850259 | 32.3 |
| 4 | −1.1111 | 2.0263 | 1.922860 | 18.9 |
| 5 | −2.9693 | 0.5323 | | |
| 6 (IMG) | −3.5534 | | | |

A refractive index Nd2=1.850259 of the second lens G2 is set smaller than a refractive index Nd1=1.902000 of the first lens G1, and the cemented surface between the exit surface of the first lens G1 and the incident surface of the second lens G2 is formed as a lens surface having a convex shape facing the object side so as to have negative power.

A refractive index Nd4=1.922860 of the fourth lens G4 is set larger than a refractive index Nd3=1.850259 of the third lens G3, and the cemented surface between the exit surface of the third lens G3 and the incident surface of the fourth lens G4 is formed as a lens surface having a convex shape facing the image side so as to have negative power.

In the imaging apparatus of this example, by these two lens surfaces having negative power, spherical aberration, axial chromatic aberration, chromatic spherical aberration, and the like generated on the incident surface of the first lens G1 and the exit surface of the fourth lens G4 are appropriately corrected.

In addition, Table 2 shows the specifications of the imaging apparatus of this example.

TABLE 2

| Focal length of imaging optical system | f_sys | 3.600 (mm) |
|---|---|---|
| F value | F/# | 1.20 |
| Angle of field | 2ω | 120.0 (deg) |
| Entire length | L_sys | 6.170 (mm) |
| Distance from exit pupil to image plane | d_pup | 3.666 (mm) |

The imaging apparatus of this example has a very small F value of F/1.2 and a very wide angle of field of 120.0 (degrees), and still has a small entire length of 6.170 (mm), which is an example of the imaging apparatus realizing brightness, high resolution, a very wide angle of field, and a compact size, at the same time.

Table 3 shows values of Expressions (1), (2), and (4) in the imaging apparatus of this example.

TABLE 3

| Conditional expression (1) | f_sys/d_pup | 0.98 |
|---|---|---|
| Conditional expression (2) | |R_img|/f_sys | 0.94 |
| Conditional expression (4) | |R_img|/d_pup | 0.93 |

The value of Expression (1) is 0.98, which satisfies the range of Expression (1). Thus, good optical performance can be obtained over a wide angle of field.

The value of Expression (2) is 0.94, which satisfies the range of Expression (2). Thus, field curvature and astigmatism can be appropriately corrected over a very wide angle of field of 120.0 (degrees).

The following Expression (4) defines the condition for setting the radius of curvature R_img of the image plane to be substantially equal to the distance d_pup from the exit pupil to the image plane of the imaging optical system.

$$0.8 \leq |R\_img|/d\_pup \leq 1.5 \qquad (4)$$

If Expression (4) is satisfied, the imaging optical system can have a structure closer to point symmetry.

In the imaging apparatus of this example, the distance between the imaging optical system and the image plane is changed so as to perform focus adjustment.

In this case, if Expression (4) is satisfied, it is possible to suppress field curvature due to focus adjustment to be very small at an object distance in a wide range from infinity to a very close distance, and hence high resolution photography can be performed.

If the value falls below the lower limit of Expression (4), or if the value exceeds the upper limit of Expression (4), a difference from the structure in which the optical system closer to the image side than the aperture stop of the imaging apparatus is close to a point symmetry, that is, a difference from the structure close to concentric with respect to the field angle light beam becomes large. As a result, off-axial aberration occurs greatly and causes a problem. In addition, along with a variation of a subject distance, field curvature occurs and causes a problem.

The value of Expression (4) is 0.93, which satisfies the range of Expression (4).

In addition, in the imaging apparatus of this example, the focal length of the imaging optical system is set substantially equal to the distance from the exit pupil to the image plane of the imaging optical system.

Table 4 shows values of power ϕ_fro of the optical system closer to the object side than the aperture stop STO and power ϕ_beh of the optical system closer to the image side than the aperture stop STO, Expression (3), and a power ratio ϕ_beh/ϕ_fro in the imaging apparatus of this example.

TABLE 4

| Power of optical system closer to object side than aperture stop | ϕ_fro | 0.25614 (1/mm) |
|---|---|---|
| Power of optical system closer to image side than aperture stop | ϕ_beh | 0.26686 (1/mm) |
| Conditional expression (3) | 0 < ϕ_fro < ϕ_beh | Satisfied |
| Power ratio | ϕ_beh/ϕ_fro | 1.04 |

The power ϕ_fro of the optical system closer to the object side than the aperture stop STO is set different from the power ϕ_beh of the optical system closer to the image side than the aperture stop STO. Thus, compared with a conventional ball lens, flexibility of aberration correction is high, and ability of correcting spherical aberration or axial chromatic aberration is improved.

In particular, the power ϕ_fro of the optical system closer to the object side than the aperture stop STO is set smaller than the power ϕ_beh of the optical system closer to the image side than the aperture stop STO, and hence spherical aberration can be appropriately corrected.

Specifically, as shown in Table 3, the imaging apparatus of this example is structured to satisfy Expression (3).

In other words, both the optical system closer to the object side than the aperture stop STO and the optical system closer to the image side than the aperture stop STO have positive power, and the power of the optical system closer to the image side than the aperture stop STO is set 1.04 times larger than the power of the optical system closer to the object side than the aperture stop.

Therefore, the ability of correcting spherical aberration or axial chromatic aberration is improved, and high imaging performance can be obtained even at a small F value of F/1.2.

In addition, in the imaging apparatus of this example, curvature centers of all lens surfaces are disposed closer to the aperture stop than the positions of the lens surfaces so as to form concentric shapes with respect to the aperture stop.

However, the third surface is a flat plane, which is not regarded as a lens surface because the surfaces in front of and behind the third surface have the same refractive index.

In this way, the imaging apparatus has a structure close to point symmetry, and an incident angle of the field angle light beam to each lens surface can be close to an incident angle of the axial light to each lens surface.

Thus, it is possible to suppress occurrence of off-axial aberration, and axial aberration is appropriately corrected so as to realize the imaging apparatus that can perform good aberration correction in a wide range of the angle of field.

Figure 2:
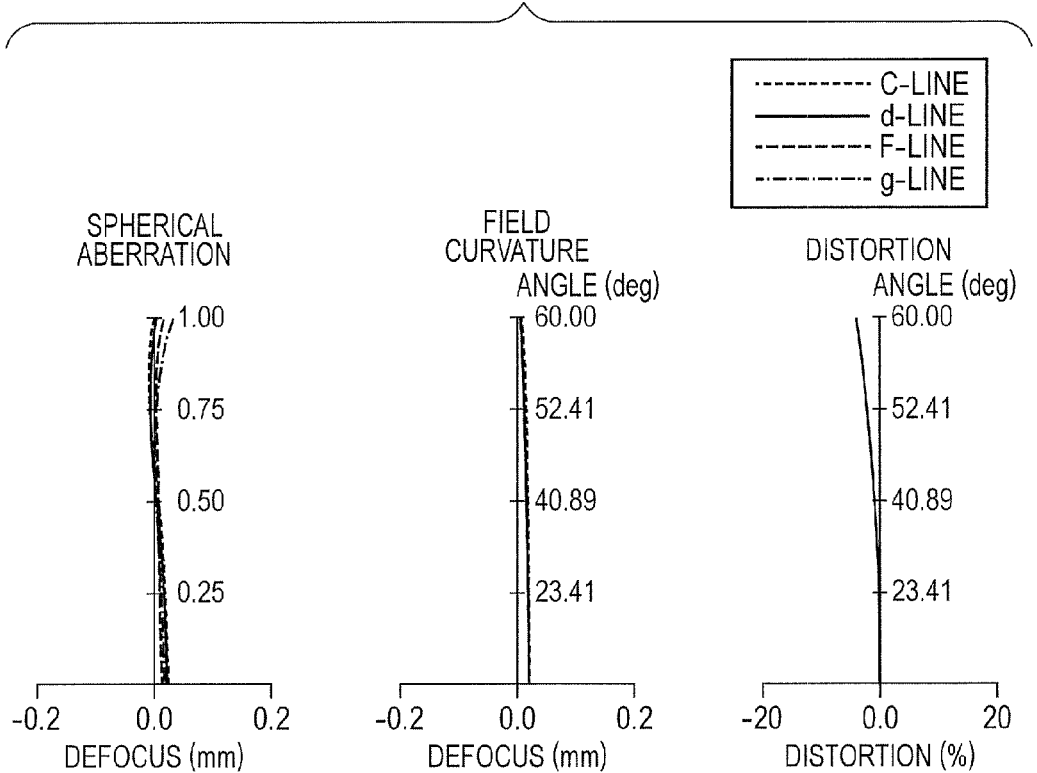
FIG. 2 is an axial aberration diagram of an imaging optical system according to Example 1 of the present invention.
Figure 3:
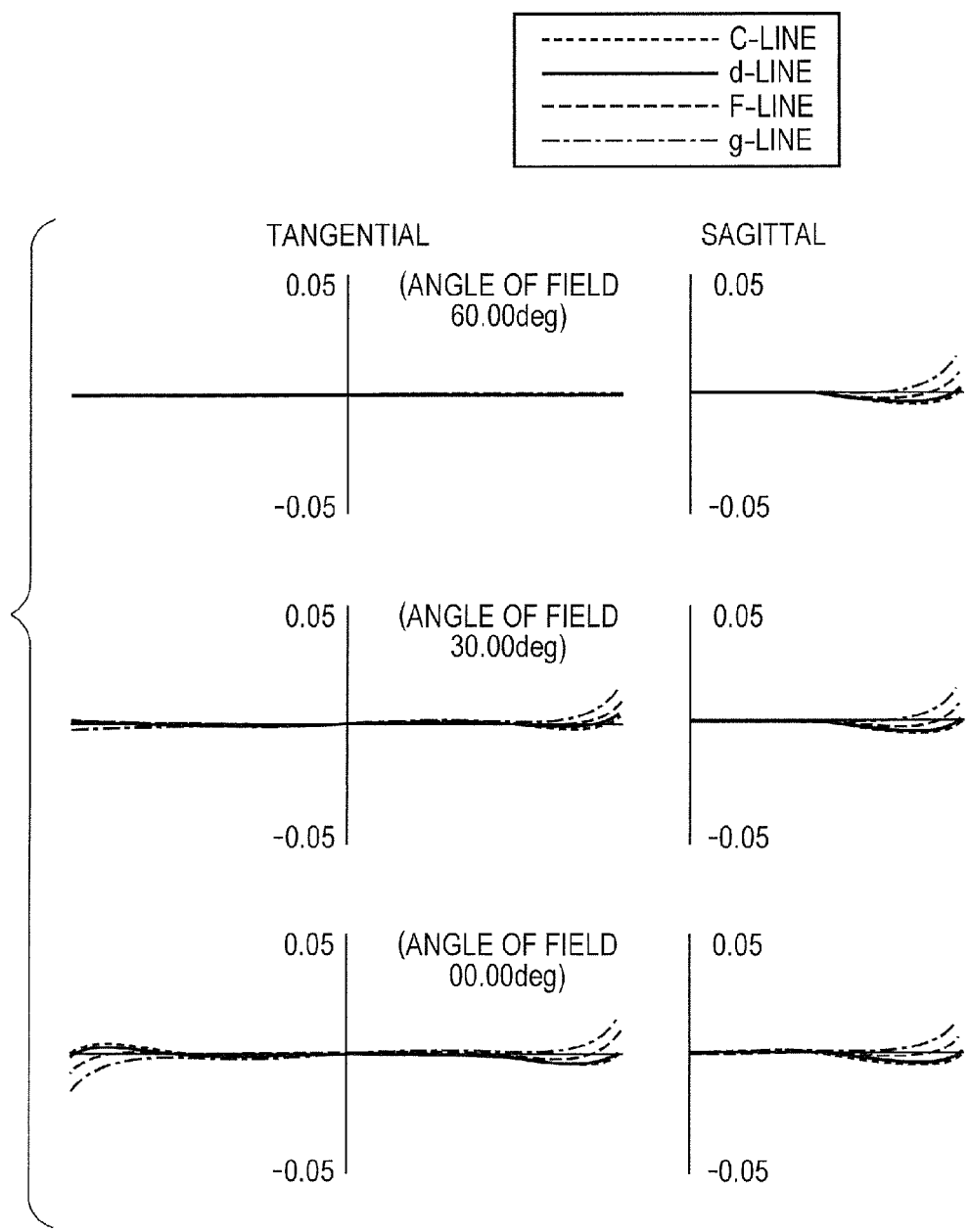
FIG. 3 is a lateral aberration diagram of the imaging optical system according to Example 1 of the present invention.

FIG. 2 illustrates an axial aberration diagram of the imaging optical system of this example, and FIG. 3 illustrates a lateral aberration diagram thereof.

As illustrated in FIG. 2, spherical aberration, axial chromatic aberration, astigmatism, field curvature, distortion, and chromatic spherical aberration are appropriately corrected. Here, chromatic spherical aberration is defined as a difference between a spherical aberration amount of a reference wavelength (for example, d-line) and a spherical aberration amount of each wavelength (for example, C-line, F-line, g-line, or the like).

In a bright optical system, high order spherical aberration is apt to occur, which has a tendency to be spherical aberration that rolls in a part having a large incident height.

The imaging apparatus of the example is a very bright optical system having F/1.2 and suppresses the rolling of spherical aberration in the part having a large incident height by the effect of this embodiment so as to realize an upright spherical aberration shape.

In this way, light beams at individual incident heights are condensed in a vicinity of the image plane. In particular, the spherical aberration shape is controlled so that light rays in a low part close to zero percent of the incident height are condensed a little back from the image plane and that light rays in a part higher than 50 percent of the incident height are condensed on the image plane.

In this way, light rays in the part having a large incident height are condensed on the image plane in a concentrated manner so as to suppress broadening of a spot diagram, and hence high imaging performance is realized.

As described above, using the effect of this embodiment, even if the imaging optical systems are different between the object side and the image side of the aperture stop, the structure on the image side of the aperture stop can be close to point symmetry.

In particular, when Expressions (2) and (4) are satisfied, occurrence of off-axial aberration such as coma, field curvature, distortion, and lateral chromatic aberration can be suppressed. Because the aberration can be limited only to axial aberration such as spherical aberration and axial chromatic aberration, the ability of correcting aberration can be significantly improved.

Therefore, it is possible to realize the imaging optical system capable of appropriately correcting aberration even in a very wide angle of field and a very small F value smaller than F/2.0, such as the imaging optical system of this example.

Further, because the above-mentioned imaging optical system can be realized in a simple lens structure, it is possible to reduce the size of the imaging optical system.

One of features of this example is that the imaging optical system is a "bright optical system".

Because the bright optical system can receive a large amount of light at one time, there are advantages that exposure time can be shortened, and that blur due to shaking, image blur due to movement of the object, noise, and the like can be reduced.

The received light amount increases in inverse proportion to the square of the F value. Therefore, with respect to a general optical system of F/3.5, the bright optical system of F/2.0 can receive approximately 3.1 times of light amount, and the bright optical system of F/1.2 according to this example can receive approximately 8.5 times of light amount.

In other words, using the imaging apparatus of this example, blur due to shaking, image blur due to movement of the object, and noise can be reduced to approximately 1/8.5, and hence an image with very high image quality can be taken.

Next, the peripheral light intensity ratio is described.

In a general imaging optical system, the peripheral light intensity ratio drops in accordance with the cosine fourth law. Therefore, the drop of the peripheral light intensity ratio is a large problem in the imaging optical system having a wide angle of field.

In the case of this example, the angle of field is $2\omega=120$ degrees and a half angle of field is $\omega=60$ degrees. The peripheral light intensity ratio at an angle of field of $\omega=60$ degrees is $\cos\omega\hat{\,}4=0.0625$, and only 6% of light amount on the optical axis reaches the periphery of the image sensor.

Therefore, the periphery of the photographed image becomes very dark, and hence a clear image cannot be obtained.

In recent years, some digital cameras and digital video cameras remarkably enhance sensitivity in the periphery so as to digitally correct peripheral darkening. However, because the SNR cannot be changed, noise becomes conspicuous, and image quality in the periphery is significantly deteriorated compared with that in the center portion.

The considerably small decrease of the peripheral light intensity ratio causes such a serious problem.

In contrast, the imaging optical system of this example exerts the effect on the peripheral darkening, too.

Because the focal length of each angle of field can be substantially equal to the focal length on the optical axis by satisfying Expression (2), peripheral light intensity can be increased by the square of $\cos\omega$.

Because the incident angle can be substantially orthogonal to the image sensor plane by satisfying Expression (3), the peripheral light intensity can be increased by the first power of $\cos\omega$.

Further, because the peripheral light intensity can be increased by the third power of $\cos\omega$ by satisfying Expressions (4) and (3) at the same time, the peripheral light intensity ratio can be proportional to the first power of $\cos\omega$.

Therefore, the imaging optical system of this example has a very wide angle of field of $2\omega=120$ degrees and still can permit 50% of light amount on the optical axis to reach the periphery of the image sensor because the peripheral light intensity ratio is $\cos^1\omega=0.0500$. This light amount is eight times larger than that of a general wide angle imaging optical system described above and there is an advantage of suppressing the peripheral darkening to be very small.

Thus, because it is possible to prevent the periphery of the image from being too dark, a sufficient contrast can be obtained even in the periphery.

In addition, it is possible to generate inconspicuous noise even in the case where sensitivity in the periphery is remarkably enhanced so as to digitally correct the peripheral darkening in the digital camera or the digital video camera.

In addition, in order to realize high resolution in the color imaging apparatus for taking images of a plurality of wavelengths, it is important to appropriately correct chromatic aberration.

Because the imaging optical system of this example satisfies Expressions (2) and (4), the structure suppresses lateral chromatic aberration as off-axial aberration. Because the target of correcting chromatic aberration is limited to axial chromatic aberration and chromatic spherical aberration as axial aberration, the ability of correcting chromatic aberration is improved.

In correcting the axial chromatic aberration, it is important to understand features of the aberration. Axial chromatic aberration and chromatic spherical aberration are both affected more significantly by power of the lens surface as the paraxial incident height to the lens surface is higher.

According to the third order aberration theory, axial chromatic aberration is proportional to the square of the paraxial incident height on the lens surface, and chromatic spherical aberration is proportional to the fourth power of the paraxial incident height on the lens surface.

In particular, because the chromatic spherical aberration is significantly affected by the incident height on the lens surface, it is preferred to reduce influence on chromatic aberration of the optical system closer to the object side than the aperture stop having a large incident height on the lens surface, and to increase influence on chromatic aberration of the optical system closer to the image side than the aperture stop so as to correct chromatic aberration.

With this structure, even in a bright optical system, it is possible to suppress occurrence of high order chromatic spherical aberration in the optical system closer to the object side than the aperture stop, and the optical system closer to the image side than the aperture stop can correct chromatic spherical aberration to be set close to zero (image plane) at a position having a large incident height.

Thus, it is possible to suppress the broadening of the spot diagram of each wavelength and realize high imaging performance.

Therefore, the power of the optical system closer to the object side than the aperture stop is set weaker than the power of the optical system closer to the image side than the aperture stop, and hence influence of the optical system closer to the object side than the aperture stop on chromatic aberration is suppressed to be small.

Further, in the imaging optical system of this example, an Abbe number of the lens closest to the object side is set larger than an Abbe number of the lens closest to the image side.

Specifically, the first lens, which is the lens disposed closest to the object side, has an Abbe number $vd\_most\_obj=25.1$, and the fourth lens, which is the lens disposed closest to the image side, has an Abbe number $vd\_most\_img=18.9$ so that the following Expression (5) is satisfied.

$$vd\_most\_img < vd\_most\_obj \quad (5)$$

In this way, influence of the first lens which is the lens disposed closest to the object side on chromatic aberration on the incident surface is reduced, and hence occurrence of axial chromatic aberration or chromatic spherical aberration is suppressed.

Therefore, axial chromatic aberration and chromatic spherical aberration can be easily corrected.

In addition, the influence on chromatic aberration is reduced also on the exit surface of the first lens.

For this reason, a difference between an Abbe number of a lens of the imaging optical system closest to the image side and an Abbe number of a lens of the imaging optical system adjacent to the lens in the imaging apparatus is set larger than a difference between an Abbe number of a lens of the imaging optical system closest to the object side and an Abbe number of a lens adjacent to the lens.

Specifically, an absolute value of a difference between an Abbe number $vd\_most\_img=18.9$ of the fourth lens which is the lens disposed closest to the image side and an Abbe number $vd\_next\_img=32.3$ of a lens adjacent to the fourth lens is $|\Delta vd\_most\_img|=13.4$, while an absolute value of a difference between an Abbe number $vd\_most\_obj=25.1$ of the first lens which is the lens disposed closest to the object side and an Abbe number $vd\_next\_obj=32.3$ of a lens adjacent to the first lens is $|\Delta vd\_most\_obj|=7.2$, and hence the following Expression (6) is satisfied.

$$|\Delta vd\_most\_img| > |\Delta vd\_most\_obj| \quad (6)$$

In this way, on the object side of the aperture stop in which the light beam width is large, the influence on chromatic aberration is reduced, and hence occurrence of chromatic aberration, particularly axial chromatic aberration and chromatic spherical aberration is suppressed to be small. Further, on the image side of the aperture stop in which the light beam width is small, influence on chromatic aberration is enhanced. Thus, axial chromatic aberration and chromatic spherical aberration are appropriately corrected.

With this structure, spherical aberration of each wavelength in a position of high incident height is set close to zero (image plane), and hence high imaging performance is realized, in which the broadening of a spot diagram of each wavelength is suppressed.

EXAMPLE 2

Figure 4:
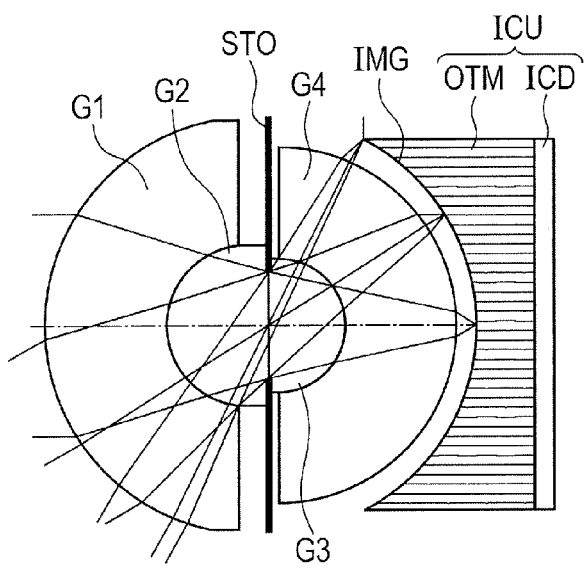
FIG. 4 is a diagram illustrating a structural example of an imaging apparatus according to Example 2 of the present invention.

An imaging optical system used for an imaging apparatus of this example includes an aperture stop and four lenses as illustrated in FIG. 4.

The imaging optical system includes, in order from the object side: a first lens G1 as a meniscus lens having a convex surface facing the object side; a second lens G2 as a plano-convex lens having a convex surface facing the object side; an aperture stop STO; a third lens G3 as a plano-convex lens having a convex surface facing the image side; and a fourth lens G4 as a meniscus lens having a convex surface facing the image side.

An exit surface of the first lens G1 is cemented to an incident surface of the second lens G2, an exit surface of the second lens G2 is cemented to an incident surface of the third lens G3, and an exit surface of the third lens G3 is cemented to an incident surface of the fourth lens G4.

The aperture stop STO is constituted by a light blocking member disposed on the cemented surface between the exit surface of the second lens G2 and the incident surface of the third lens G3.

IMG in FIG. 4 represents an image plane and is an incident surface of an optical transmission unit OTM.

The optical transmission unit OTM of this example is an image fiber formed of bound optical fibers of a few micron pitch and has a role of transmitting an image formed on the image plane of the imaging optical system to an image sensor ICD.

The incident surface of the optical transmission unit OTM has a spherically curved shape, and the exit surface is a flat surface having intimate contact with the image sensor ICD for connection. Thus, an image sensor unit ICU is constituted.

The incident surface shape of the optical transmission unit OTM is formed along the field curvature of the imaging optical system so as to realize good image formation over the entire region of the image plane IMG.

The optical transmission unit OTM is used in this example. In contrast to a structure in which the image sensor itself has a spherical surface, there is an advantage of easy production of the imaging unit ICU in which one surface of the optical transmission unit OTM has a spherical surface while the other surface is connected to the image sensor ICD.

Table 5 shows a structure of the imaging apparatus of this example.

Surface number 1 is an incident surface of the first lens G1, surface number 2 is a cemented surface between an exit surface of the first lens G1 and an incident surface of the second lens G2, and surface number 3 is a cemented surface between the exit surface of the second lens G2 and the incident surface of the third lens G3, which is an aperture stop surface STO.

Surface number 4 is a cemented surface between the exit surface of the third lens G3 and the incident surface of the fourth lens G4, surface number 5 is an exit surface of the fourth lens G4, and surface number 6 is the image plane IMG, which is an incident surface of the optical transmission unit OTM of the imaging unit ICU. Further, the exit surface of the optical transmission unit OTM is connected to the image sensor ICD.

In Table 5, R represents a radius of curvature (mm), d represents a surface interval (mm), Nd represents a d-line refractive index, and νd represents an Abbe number.

TABLE 5

| Surface number | R | D | Nd | νd |
|---|---|---|---|---|
| 1 | 3.3929 | 1.9894 | 2.102000 | 16.8 |
| 2 | 1.2782 | 1.6473 | 2.000600 | 25.5 |
| 3 (STO) | Infinity | 1.2244 | 2.000600 | 25.5 |
| 4 | −1.1067 | 1.8419 | 2.102000 | 16.8 |
| 5 | −2.8685 | 0.3207 | | |
| 6 (IMG) | −3.3496 | | | |

A refractive index Nd2=2.000600 of the second lens G2 is set smaller than a refractive index Nd1=2.102000 of the first lens G1, and the cemented surface between the exit surface of the first lens G1 and the incident surface of the second lens G2 is formed as a lens surface having a convex shape facing the object side so as to have negative power.

A refractive index Nd4=2.102000 of the fourth lens G4 is set larger than a refractive index Nd3=2.000600 of the third lens G3, and the cemented surface between the exit surface of the third lens G3 and the incident surface of the fourth lens G4 is formed as a lens surface having a convex shape facing the image side so as to have negative power.

In the imaging apparatus of this embodiment, by these two lens surfaces having negative power, spherical aberration, axial chromatic aberration, chromatic spherical aberration, and the like generated on the incident surface of the first lens G1 and the exit surface of the fourth lens G4 are appropriately corrected.

In addition, Table 6 shows the specifications of the imaging apparatus of this example.

TABLE 6

| Focal length of imaging optical system | f_sys | 3.600 (mm) |
|---|---|---|
| F value | F/# | 1.00 |
| Angle of field | 2ω | 120.0 (deg) |
| Entire length | L_sys | 6.703 (mm) |
| Distance from exit pupil to image plane | d_pup | 3.624 (mm) |

The imaging apparatus of this example has a F value of F/1.0, which is even smaller than that in the imaging apparatus of Example 1, and a very wide angle of field of 120.0 (degrees), and still has a small entire length of 6.703 (mm), which is an example of the imaging apparatus realizing brightness, high resolution, a very wide angle of field, and a compact size, at the same time.

Table 7 shows values of Expressions (1), (2), and (4) in the imaging apparatus of this example.

TABLE 7

| Conditional expression (1) | f_sys/d_pup | 0.99 |
|---|---|---|
| Conditional expression (2) | |R_img|/f_sys | 0.93 |
| Conditional expression (4) | |R_img|/d_pup | 0.92 |

The value of Expression (1) is 0.99, which satisfies the range of Expression (1).

The value of Expression (2) is 0.93, which satisfies the range of Expression (2).

Thus, field curvature and astigmatism can be appropriately corrected over a very wide angle of field of 120.0 (degrees).

The value of Expression (4) is 0.92, which satisfies the range of Expression (4).

Thus, good optical performance can be obtained over a wide angle of field.

Figure 5:
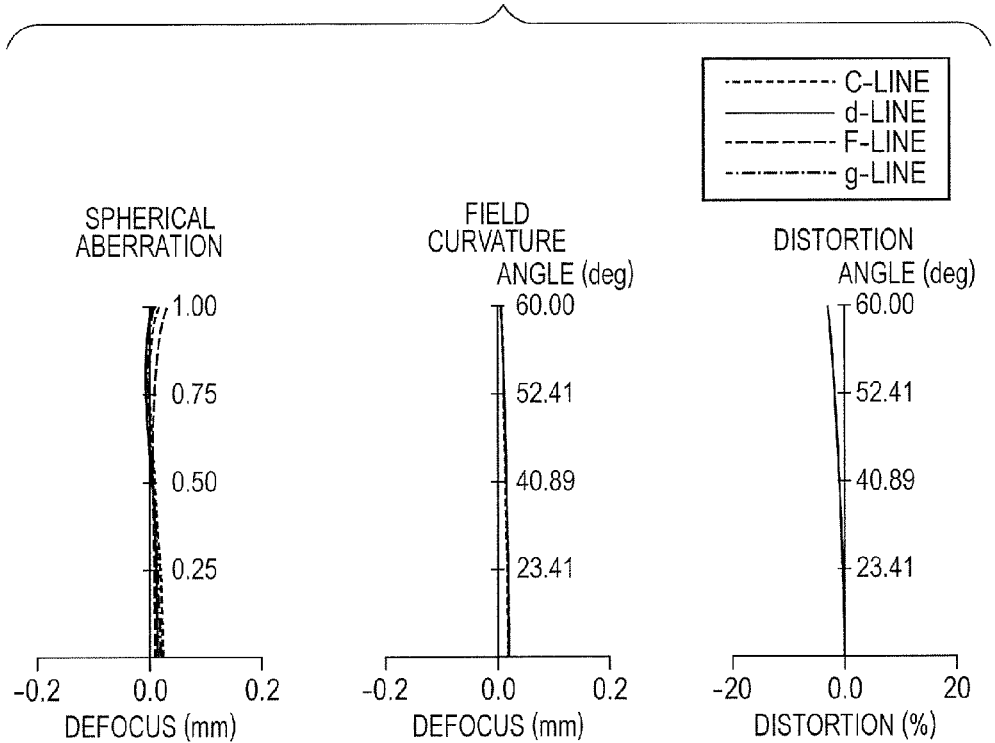
FIG. 5 is an axial aberration diagram of an imaging optical system according to Example 2 of the present invention.
Figure 6:
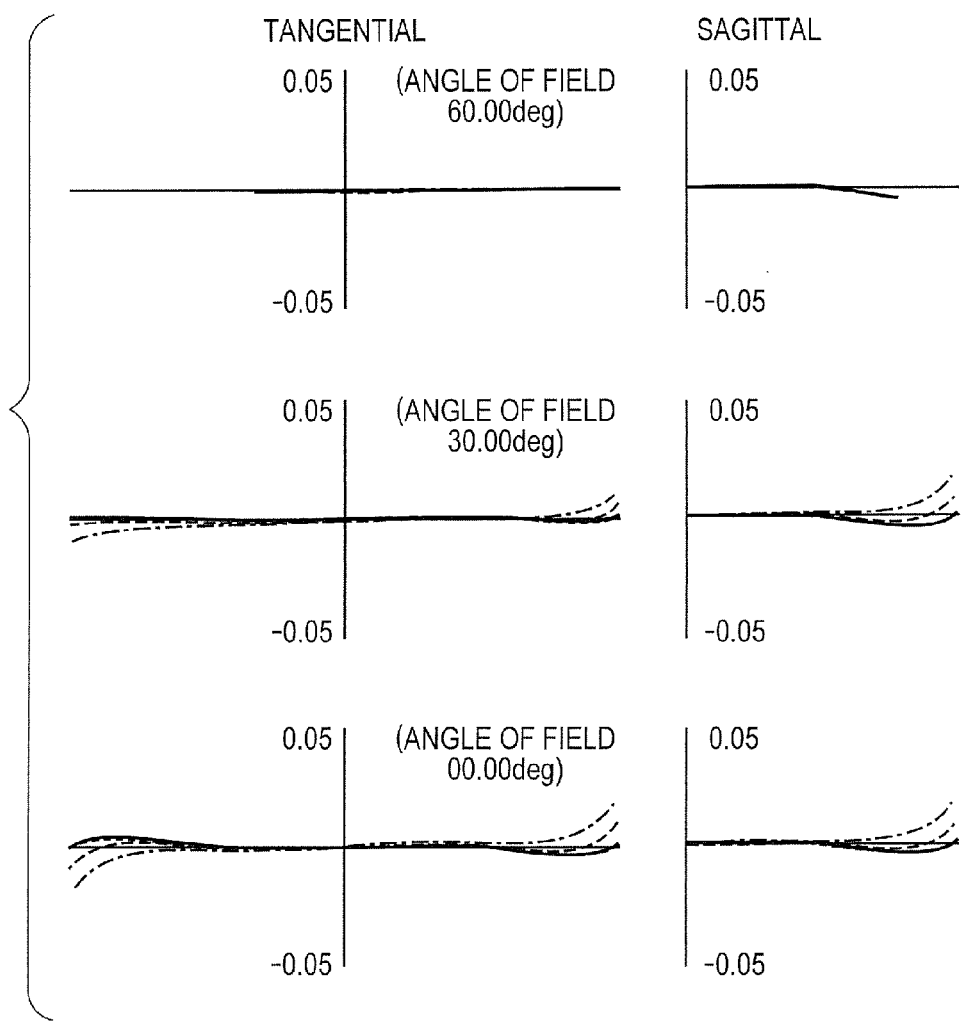
FIG. 6 is a lateral aberration diagram of the imaging optical system according to Example 2 of the present invention.

FIG. 5 illustrates an axial aberration diagram of the imaging optical system of this example, and FIG. 6 illustrates a lateral aberration diagram thereof.

Table 8 shows values of power $\phi\_fro$ of the optical system closer to the object side than the aperture stop STO and power $\phi\_beh$ of the optical system closer to the image side than the aperture stop STO, Expression (3), and a power ratio $\phi\_beh/\phi\_fro$ in the imaging apparatus of this example.

TABLE 8

| Power of optical system closer to object side than aperture stop | $\phi\_fro$ | 0.26989 | (1/mm) |
|---|---|---|---|
| Power of optical system closer to image side than aperture stop | $\phi\_beh$ | 0.32343 | (1/mm) |
| Conditional expression (3) | $0 < \phi\_fro < \phi\_beh$ | Satisfied | |
| Power ratio | $\phi\_beh/\phi\_fro$ | 1.20 | |

The power $\phi\_fro$ of the optical system closer to the object side than the aperture stop STO is set different from the power $\phi\_beh$ of the optical system closer to the image side than the aperture stop STO. Thus, compared with a conventional ball lens, flexibility of aberration correction is high, and ability of correcting spherical aberration or axial chromatic aberration is improved.

In particular, the power $\phi\_fro$ of the optical system closer to the object side than the aperture stop STO is set smaller than the power $\phi\_beh$ of the optical system closer to the image side than the aperture stop STO, and hence spherical aberration can be appropriately corrected.

Specifically, as shown in Table 8, the imaging apparatus of this example is structured to satisfy Expression (3).

Further, the structure satisfies the following Expression (7), and hence the effect of this embodiment can be sufficiently obtained.

$$\phi\_beh/\phi\_fro \geq 1.1 \qquad (7)$$

In other words, both the optical system closer to the object side than the aperture stop STO and the optical system closer to the image side than the aperture stop STO have positive power, and the power of the optical system closer to the image side than the aperture stop STO is set approximately 20% larger than the power of the optical system closer to the object side than the aperture stop. Therefore, the ability of correcting spherical aberration or axial chromatic aberration is improved, and high imaging performance can be obtained even in a very small F value of F/1.0.

In addition, in the imaging apparatus of this example, curvature centers of all lens surfaces are disposed closer to the aperture stop than the positions of the lens surfaces so as to form concentric shapes with respect to the aperture stop.

However, the third surface is a flat plane, which is not regarded as a lens surface because the surfaces in front of and behind the third surface have the same refractive index.

In this way, the imaging apparatus has a structure close to point symmetry, and an incident angle of the field angle light beam to each lens surface can be close to an incident angle of the axial light to each lens surface.

Thus, it is possible to suppress occurrence of off-axial aberration, and axial aberration is appropriately corrected so as to realize the imaging apparatus that can perform good aberration correction in a wide range of the angle of field.

In addition, in the imaging apparatus of this example, as shown in Table 5, the refractive index of the first lens G1 and the fourth lens G4 is Nd=2.102000, and the refractive index of the second lens G2 and the third lens G3 is Nd=2.000600, which are high refractive indexes.

Power $\phi s$ of a lens surface is given by the following expression:

$$\phi s = (N'-N)/R \quad (8),$$

where N represents a refractive index of the lens surface on the object side, N' represents a refractive index of the lens surface on the image side, and R represents a radius of curvature of the lens surface.

As to the incident surface of the lens closest to the object side in the imaging optical system of the imaging apparatus, there is air on the object side of the incident surface, and N in Expression (7) is N=1.000000.

N' in Expression (8) is the refractive index of the lens closest to the object side. If the refractive index is set higher, the radius of curvature R for obtaining the same lens surface power $\phi s$ can be set larger. In other words, if the refractive index of the lens closest to the object side is set higher, the radius of curvature of the incident surface can be set larger, and there is the effect that occurrence of spherical aberration is suppressed and that good imaging performance can be easily obtained.

It is preferred to set the refractive index of the lens closest to the object side in the imaging apparatus to be a high refractive index, and it is preferred to satisfy Expression (9).

$$1.850000 \leq Nd \leq 2.300000 \quad (9)$$

If the lower limit value of Expression (9) is exceeded, the radius of curvature of the incident surface of the lens closest to the object side becomes small. Then, spherical aberration occurs greatly and causes a problem.

If the upper limit value of Expression (9) is exceeded, the radius of curvature of the incident surface of the lens closest to the object side becomes large. Then, it is necessary to secure a large distance from the incident surface to the aperture stop, which causes a problem in that the size of the imaging apparatus is increased.

Similarly, it is preferred to set the refractive index of the lens closest to the image side in the imaging apparatus to be a high refractive index, and it is preferred to satisfy Expression (7).

The refractive index of the lens closest to the object side is set higher than the refractive index of the adjacent lens, and the exit surface of the lens closest to the object side has negative power so as to correct spherical aberration. In addition, the Abbe number of the lens closest to the object side is set lower than the Abbe number of the adjacent lens so as to correct chromatic aberration.

Similarly, the refractive index of the lens closest to the image side is set higher than the refractive index of the adjacent lens, and the incident surface of the lens closest to the image side has negative power so as to correct spherical aberration. In addition, the Abbe number of the lens closest to the image side is set lower than the Abbe number of the adjacent lens so as to correct chromatic aberration.

In this way, using this embodiment, it is possible to realize the imaging apparatus having a wide angle of field and high resolution.

EXAMPLE 3

Figure 7:
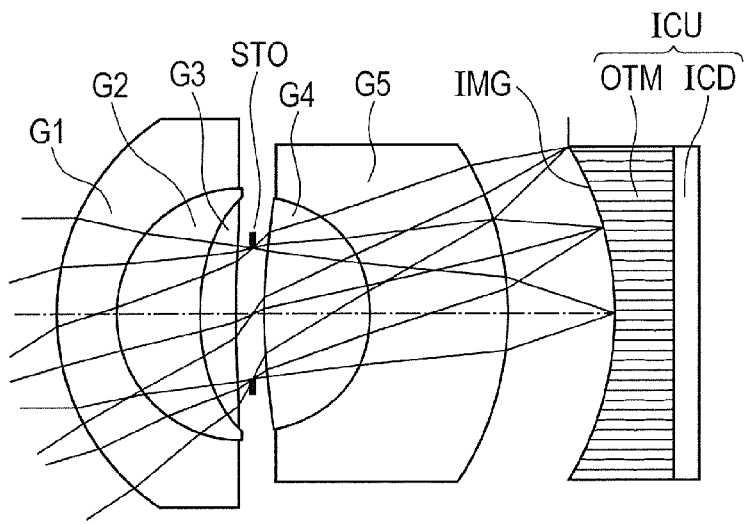
FIG. 7 is a diagram illustrating a structural example of an imaging apparatus according to Example 3 of the present invention.

The imaging optical system used for the imaging apparatus of this example includes an aperture stop and five lenses as illustrated in FIG. 7.

The imaging optical system includes, in order from the object side: a first lens G1 as a meniscus lens having a convex surface facing the object side; a second lens G2 as a meniscus lens having a convex surface facing the object side; a third lens G3 as a meniscus lens having a convex surface facing the object side; an aperture stop STO; a fourth lens G4 as a biconvex lens having a convex surface facing the image side; and a fifth lens G5 as a meniscus lens having a convex surface facing the image side.

The first lens G1 is cemented to the second lens G2, the second lens G2 is cemented to the third lens G3, and the fourth lens G4 is cemented to the fifth lens G5.

The aperture stop STO of the imaging apparatus of this example is disposed in an air layer between the third lens and the fourth lens, and a variable aperture stop can be disposed.

The variable aperture stop enables adjustment of brightness and control of depth of focus.

In an imaging apparatus having a small F value as in this example, the depth of focus becomes shallow. Therefore, it is required to control the depth of focus by the aperture stop.

When the aperture stop STO is disposed in the air layer, it is difficult to correct aberration. However, there is significant meaning in disposing the variable aperture stop in the imaging apparatus, and the method of correcting aberration when the aperture stop STO is disposed in the air layer is one of the important subjects.

In addition, the same imaging unit ICU as that in Example 2 is used.

Table 9 shows a structure of the imaging apparatus of this example.

Surface number 1 is an incident surface of the first lens G1, surface number 2 is a cemented surface between an exit surface of the first lens G1 and an incident surface of the second lens G2, surface number 3 is a cemented surface between the exit surface of the second lens G2 and an incident surface of the third lens G3, and surface number 4 is an incident surface of the third lens G3, which is connected to the air layer.

Surface number 5 is the aperture stop STO, which is disposed in the air layer. Surface number 6 is the incident surface of the fourth lens G4, surface number 7 is the cemented surface between the exit surface of the fourth lens G4 and the incident surface of the fifth lens G5, and surface number 8 is the exit surface of the fifth lens G5.

Surface number 9 is the image plane IMG, which is the incident surface of the optical transmission unit OTM of the imaging unit ICU. Further, the exit surface of the optical transmission unit OTM is connected to the image sensor ICD.

In Table 9, R represents a radius of curvature (mm), d represents a surface interval (mm), Nd represents a d-line refractive index, and νd represents an Abbe number.

TABLE 9

| Surface number | R | D | Nd | νd |
|---|---|---|---|---|
| 1 | 9.2950 | 2.3612 | 2.001100 | 23.6 |
| 2 | 5.0329 | 3.2825 | 1.726350 | 26.1 |
| 3 | 7.6974 | 1.4531 | 1.670939 | 55.7 |
| 4 | 43.5438 | 0.6507 | | |
| 5 (STO) | Infinity | 0.5000 | | |
| 6 | 25.3784 | 4.2148 | 1.882997 | 40.8 |
| 7 | −4.6940 | 5.4967 | 2.000800 | 25.0 |
| 8 | −12.3234 | 4.3457 | | |
| 9 (IMG) | −12.4205 | | | |

The refractive index Nd2=1.726350 of the second lens G2 is set smaller than the refractive index Nd1=2.001100 of the first lens G1, and a cemented surface between the exit surface of the first lens G1 and the incident surface of the second lens G2 is formed as a lens surface having a convex shape facing the object side so as to have negative power.

The refractive index Nd3=1.670939 of the third lens G3 is set smaller than the refractive index Nd1=1.726350 of the second lens G2, and a cemented surface between the exit surface of the second lens G2 and the incident surface of the third lens G3 is formed as a lens surface having a convex shape facing the object side so as to have negative power. The exit surface of the third lens G3 is formed as a lens surface having a convex shape facing the object side so as to have negative power.

The refractive index Nd5=2.000800 of the fifth lens G5 is set larger than the refractive index Nd4=1.882997 of the fourth lens G4, and the cemented surface between the exit surface of the fourth lens G4 and the incident surface of the fifth lens G5 is formed as a lens surface having a convex shape facing the image side so as to have negative power.

In the imaging apparatus of this example, by these four lens surfaces having negative power, spherical aberration, axial chromatic aberration, chromatic spherical aberration, and the like generated on the incident surface of the first lens G1, the incident surface of the fourth lens G4, and the exit surface of the fifth lens G5 are appropriately corrected.

In addition, Table 10 shows specifications of the imaging apparatus of this example.

TABLE 10

| Focal length of imaging optical system | f_sys | 11.997 (mm) |
|---|---|---|
| F value | F/# | 1.6 |
| Angle of field | 2ω | 65.5 (deg) |
| Entire length | L_sys | 17.959 (mm) |
| Distance from exit pupil to image plane | d_pup | 14.060 (mm) |

The imaging apparatus of this example is an example of the imaging optical system in which the aperture stop is disposed in the air layer, and the variable aperture stop is adopted. The bright optical system having F/1.6 is realized by the simple structure having five lenses. In addition, the entire length is 17.959 (mm) with respect to a focal length of 11.997 (mm), and hence the optical system is compact, in which L_sys/f_sys=1.50.

Table 11 shows values of Expressions (1), (2), and (4) in the imaging apparatus of this example.

TABLE 11

| Conditional expression (1) | f_sys/d_pup | 0.85 |
|---|---|---|
| Conditional expression (2) | |R_img|/f_sys | 1.04 |
| Conditional expression (4) | |R_img|/d_pup | 0.88 |

The value of Expression (1) is 0.85, which satisfies the range of Expression (1).

The value of Expression (2) is 1.04, which satisfies the range of Expression (2).

Thus, field curvature, astigmatism, and lateral chromatic aberration can be appropriately corrected over an angle of field of 65.5 (degrees).

The value of Expression (4) is 0.88, which satisfies the range of Expression (4).

Thus, good optical performance can be obtained over a wide angle of field.

Table 12 shows values of power $\phi\_fro$ of the optical system closer to the object side than the aperture stop STO and power $\phi\_beh$ of the optical system closer to the image side than the aperture stop STO, Expression (3), and a power ratio $\phi\_beh/\phi\_fro$ in the imaging apparatus of this example.

TABLE 12

| Power of optical system closer to object side than aperture stop | φ_fro | 0.0436 | (1/mm) |
|---|---|---|---|
| Power of optical system closer to image side than aperture stop | φ_beh | 0.0839 | (1/mm) |
| Conditional expression (3) | 0 < φ_fro < φ_beh | Satisfied | |
| Power ratio | φ_beh/φ_fro | 1.92 | |

The power $\phi\_fro$ of the optical system closer to the object side than the aperture stop STO is set different from the power $\phi\_beh$ of the optical system closer to the image side than the aperture stop STO. Thus, compared with a conventional ball lens, flexibility of aberration correction is high, and ability of correcting spherical aberration or axial chromatic aberration is improved.

Figure 8:
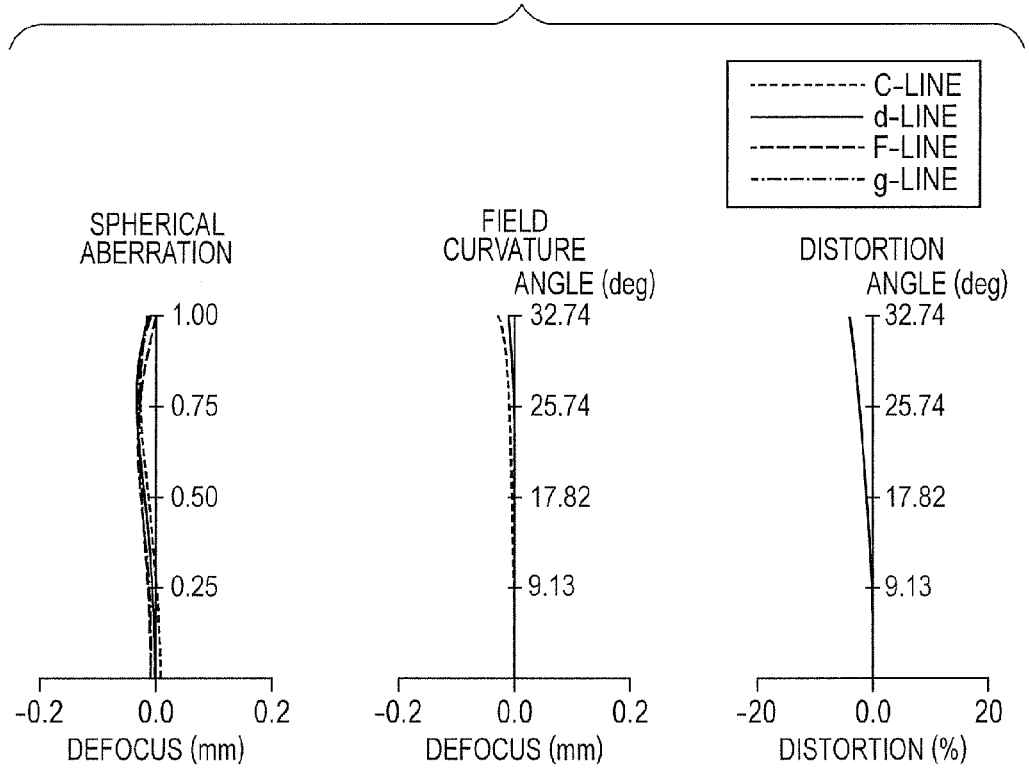
FIG. 8 is an axial aberration diagram of an imaging optical system according to Example 3 of the present invention.
Figure 9:
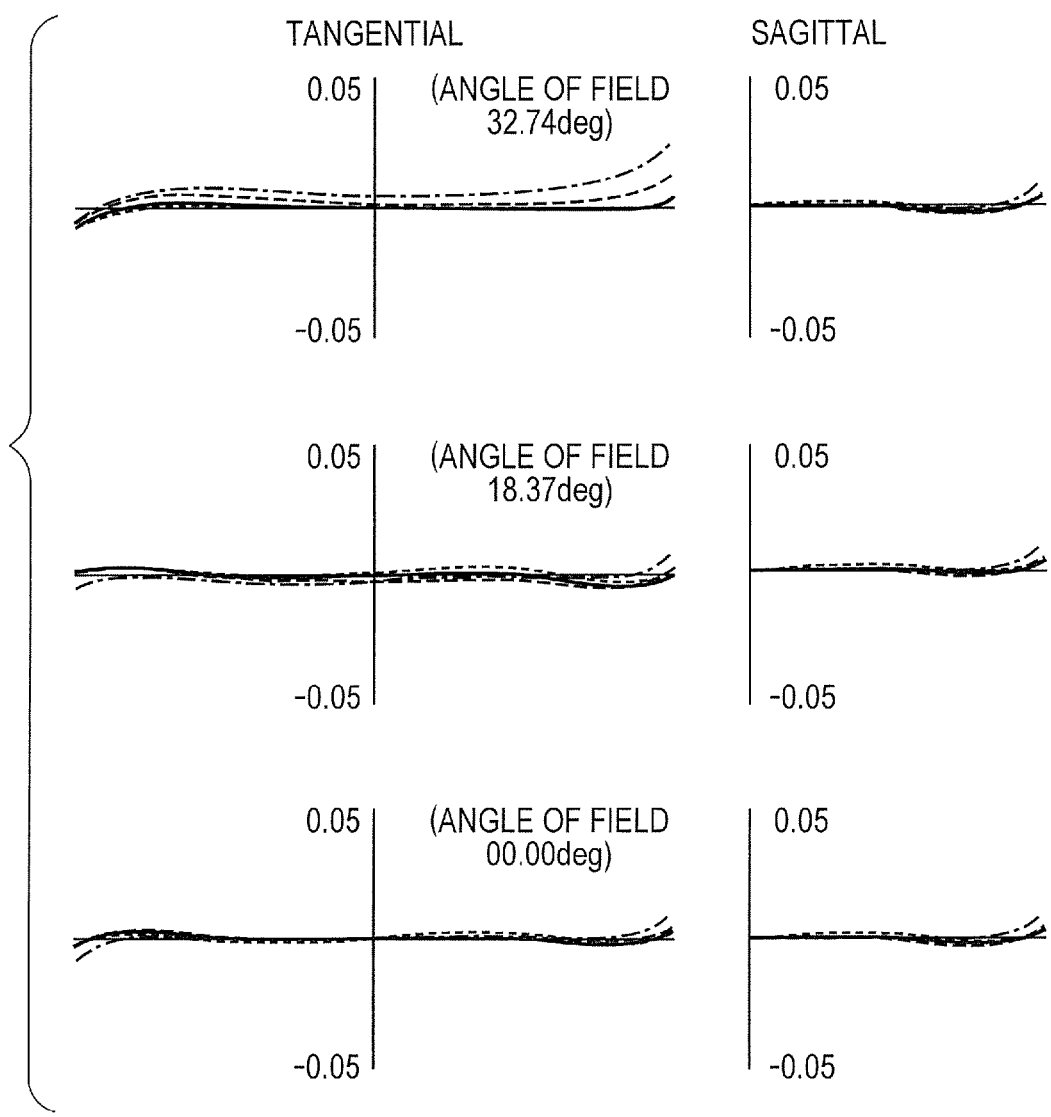
FIG. 9 is a lateral aberration diagram of the imaging optical system according to Example 3 of the present invention.

FIG. 8 illustrates an axial aberration diagram of the imaging optical system of this example, and FIG. 9 illustrates a lateral aberration diagram thereof.

In particular, the power $\phi\_fro$ of the optical system closer to the object side than the aperture stop STO is set smaller than the power $\phi\_beh$ of the optical system closer to the image side than the aperture stop STO, and hence spherical aberration can be appropriately corrected.

Specifically, as shown in Table 12, the imaging apparatus of this example is structured to satisfy Expression (10).

$$\phi\_beh/\phi\_fro \geq 1.10 \tag{10}$$

In other words, both the optical system closer to the object side than the aperture stop STO and the optical system closer to the image side than the aperture stop STO have positive power, and the power of the optical system closer to the image side than the aperture stop STO is set approximately 20% larger than the power of the optical system closer to the object side than the aperture stop. Therefore, the ability of correcting spherical aberration or axial chromatic aberration is improved. Even the optical system in which the aperture stop is disposed in the air layer can obtain high imaging performance with a small F value of F/1.6.

EXAMPLE 4

Figure 10:
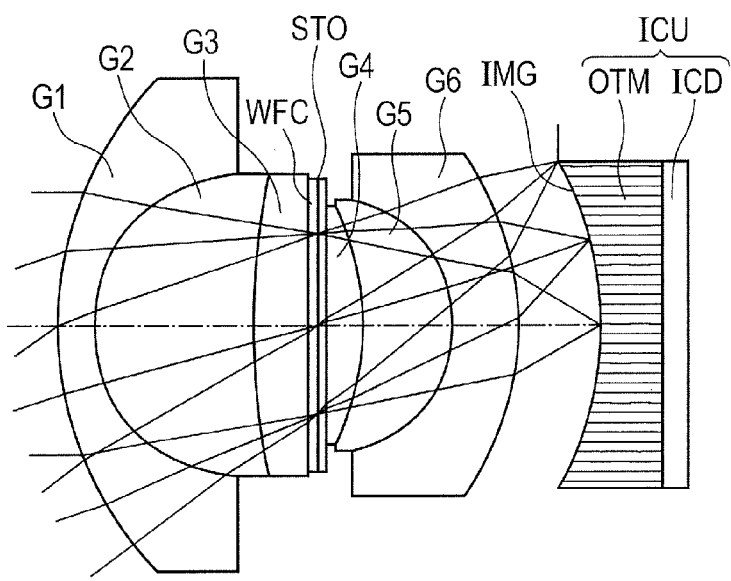
FIG. 10 is a diagram illustrating a structural example of an imaging apparatus according to Example 4 of the present invention.

An imaging optical system used for an imaging apparatus of this example includes the aperture stop STO, six lenses G1 to G6, and a wave front control unit WFC as illustrated in FIG. 10.

The imaging optical system includes, in order from the object side: the first lens G1 that is a meniscus lens having a convex surface facing the object side; the second lens G2 that is a meniscus lens having a convex surface facing the object side; the third lens G3 that is a plano-convex lens having a convex surface facing the object side; the wave front control element WFC in which a phase difference is given to a cemented surface between two flat glass plates; the aperture stop STO disposed on the cemented surface between the two flat glass plates of the wave front control element WFC; the fourth lens G4 that is a plano-convex lens having a convex surface facing the image side; the fifth lens G5 that is a meniscus lens having a convex surface facing the image side; and the sixth lens G6 that is a meniscus lens having a convex surface facing the image side.

All the optical elements from the first lens G1 to the sixth lens G6 are cemented to each other.

In this example, the same imaging unit ICU as that in Example 2 is used.

Tables 13A to 13D show a structure of the imaging apparatus of this example.

Surface number 1 is the incident surface of the first lens G1, surface number 2 is the cemented surface between the exit surface of the first lens G1 and the incident surface of the second lens G2, and surface number 3 is the cemented surface between the exit surface of the second lens G2 and the incident surface of the third lens G3.

In addition, surface number 4 is the cemented surface between the exit surface of the third lens G3 and an incident surface of the wave front control element WFC, and surface number 5 is the cemented surface between the two flat glass plates of the wave front control element WFC. At the position of surface number 5, a phase plate is disposed in an effective part, and the aperture stop surface STO is disposed in a non-effective part.

Surface number 6 is a cemented surface between an exit surface of the wave front control element WFC and the incident surface of the fourth lens G4, surface number 7 is the cemented surface between the exit surface of the fourth lens G4 and the incident surface of the fifth lens G5, and surface number 8 is a cemented surface between the exit surface of the fifth lens G5 and an incident surface of the sixth lens G6.

Surface number 9 is an exit surface of the sixth lens G6, and surface number 10 is the image plane IMG, which is an incident surface of the optical transmission unit OTM of the imaging unit ICU.

Further, the exit surface of the optical transmission unit OTM is connected to the image sensor ICD.

In Table 13A, R represents a radius of curvature (mm), d represents a surface interval (mm), Nd represents a d-line refractive index, and vd represents an Abbe number. Note that, the lens surface with a mark "(a)" in the R field is an aspherical surface while the lens surface with a mark "(p)" is the phase difference plate.

As the aspherical shape in this example, a rotation symmetry aspherical surface expressed by Expression (11) is used.

$$z = \frac{cr^2}{1+\sqrt{1-(1+k)c^2r^2}} + Ar^4 + Br^6 + Cr^8 + Dr^{10} \quad (11)$$

Here, z represents a sag amount (mm) of the aspherical shape in the optical axis direction, c represents a curvature (1/mm) on the optical axis, and r represents a distance (mm) from the optical axis in the radial direction. A, B, C, and D respectively represent coefficients of fourth, sixth, eighth, and tenth orders.

In addition, the phase difference given to the phase difference plate in this example is expressed by a rotation symmetry phase polynomial and has a phase difference distribution expressed by Expression (12).

$$\phi = \frac{cr^2}{1+\sqrt{1-c^2r^2}} + C_1r^2 + C_2r^4 + C_3r^6 + C_4r^8 \quad (12)$$

Here, $\phi$ represents a phase difference (wavelength), and $C_1$, $C_2$, $C_3$, and $C_4$ represent coefficients of second, fourth, sixth, and eighth orders, respectively. These are shown in the following Tables 13A to 13D.

TABLE 13A

| Surface number | R | D | Nd | vd |
|---|---|---|---|---|
| 1 | 9.2576 (a) | 1.0868 | 1.922860 | 18.9 |
| 2 | 4.2724 | 4.5322 | 1.849860 | 24.1 |
| 3 | 20.4855 | 1.5758 | 1.922860 | 20.9 |
| 4 (WFC) | Infinity | 0.2500 | 1.516800 | 64.2 |
| 5 (STO) | Infinity (p) | 0.2500 | 1.516800 | 64.2 |
| 6 | Infinity | 1.0208 | 1.882023 | 37.2 |
| 7 | −8.1725 | 2.6185 | 1.756999 | 47.7 |
| 8 | −3.6502 | 1.9300 | 1.804855 | 24.7 |
| 9 | −7.9006 (a) | 2.3903 | | |
| 10 (IMG) | −9.5769 | 1.0868 | | |

TABLE 13B

Aspherical surface coefficients (Surface number 1)

| Parameter | Symbol | Value |
|---|---|---|
| Conic constant | K | −2.45628E+00 |
| Fourth order coefficient | A | 3.21177E−04 |
| Sixth order coefficient | B | −1.74680E−06 |
| Eighth order coefficient | C | 0.00000E+00 |
| Tenth order coefficient | D | 0.00000E+00 |

TABLE 13C

Aspherical surface coefficients (Surface number 9)

| Parameter | Symbol | Value |
|---|---|---|
| Conic constant | K | −1.21591E+01 |
| Fourth order coefficient | A | −2.59045E−03 |
| Sixth order coefficient | B | 1.30885E−04 |
| Eighth order coefficient | C | −4.66439E−06 |
| Tenth order coefficient | D | 7.14736E−08 |

TABLE 13D

| Phase difference polynomial (Surface number 5) | | |
|---|---|---|
| Parameter | Symbol | Value |
| Diffraction order | | First order |
| Normalized wavelength | | 587.5618 (nm) |
| Second order coefficient | $C_1$ | −8.67933E−03 |
| Fourth order coefficient | $C_2$ | 4.41119E−04 |
| Sixth order coefficient | $C_3$ | 0.00000E+00 |
| Eighth order coefficient | $C_4$ | 0.00000E+00 |

In the imaging apparatus of this example, the incident surface of the first lens G1 as a lens closest to the object side and the exit surface of the fifth lens G5 as a lens closest to the image side are aspherical surfaces, which have an aspherical shape having power weakening in the periphery. Thus, spherical aberration is corrected.

In addition, Table 14 shows the specifications of the imaging apparatus of this example.

TABLE 14

| | | | |
|---|---|---|---|
| Focal length of imaging optical system | f_sys | 7.499 | (mm) |
| F value | F/# | 1.0 | |
| Angle of field | 2ω | 74.0 | (deg) |
| Entire length | L_sys | 13.264 | (mm) |
| Distance from exit pupil to image plane | d_pup | 7.166 | (mm) |

The imaging apparatus of this example improves the ability of correcting spherical aberration by setting the incident surface of the lens closest to the object side and the exit surface of the lens closest to the image side to be aspherical surfaces and by disposing the wave front control element at the position of the aperture stop. Even in the case of a long focal length of 7.499 (mm), it is possible to realize good imaging performance in a bright optical system of F/1.0.

Table 15 shows values of Expressions (1), (2), and (4) in the imaging apparatus of this example.

TABLE 15

| | | |
|---|---|---|
| Conditional expression (1) | f_sys/d_pup | 1.05 |
| Conditional expression (2) | |R_img|/f_sys | 1.28 |
| Conditional expression (4) | |R_img|/d_pup | 1.34 |

The value of Expression (1) is 1.05 and satisfies Expression (1).

The value of Expression (2) is 1.28 and satisfies the range of Expression (2).

The value of Expression (4) is 1.34 and satisfies the range of Expression (4).

Thus, field curvature, astigmatism, and lateral chromatic aberration can be easily corrected over an angle of field of 74.0 (degrees), and hence the bright optical system of F/1.0 is realized.

Figure 11:
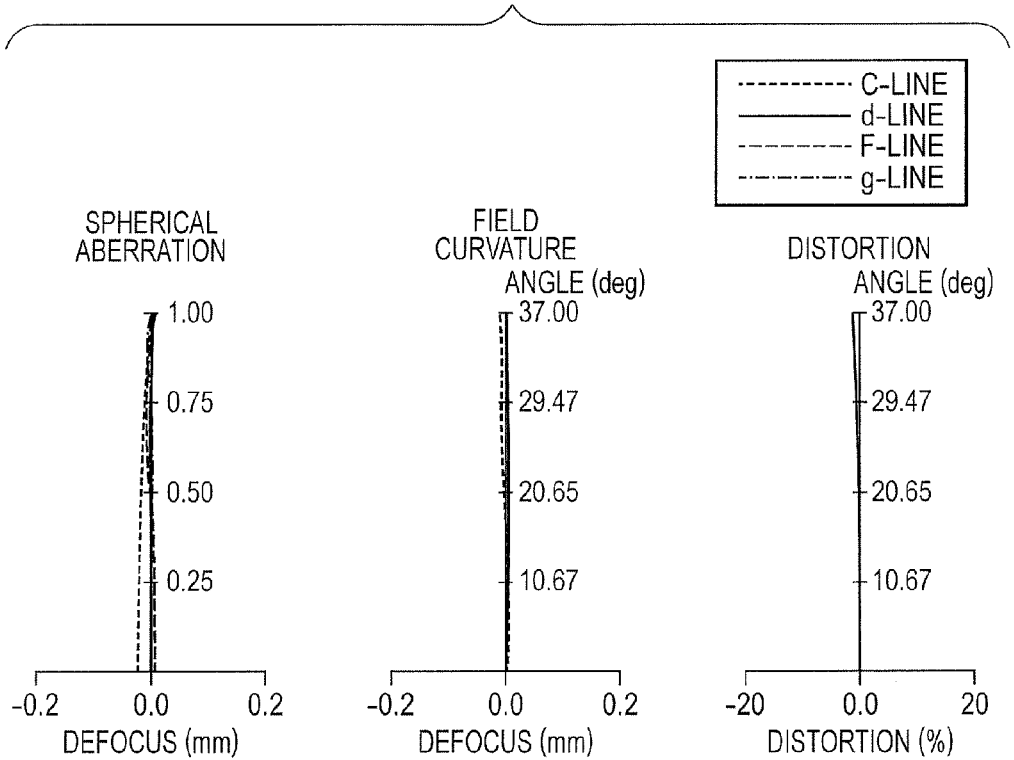
FIG. 11 is an axial aberration diagram of an imaging optical system according to Example 4 of the present invention.
Figure 12:
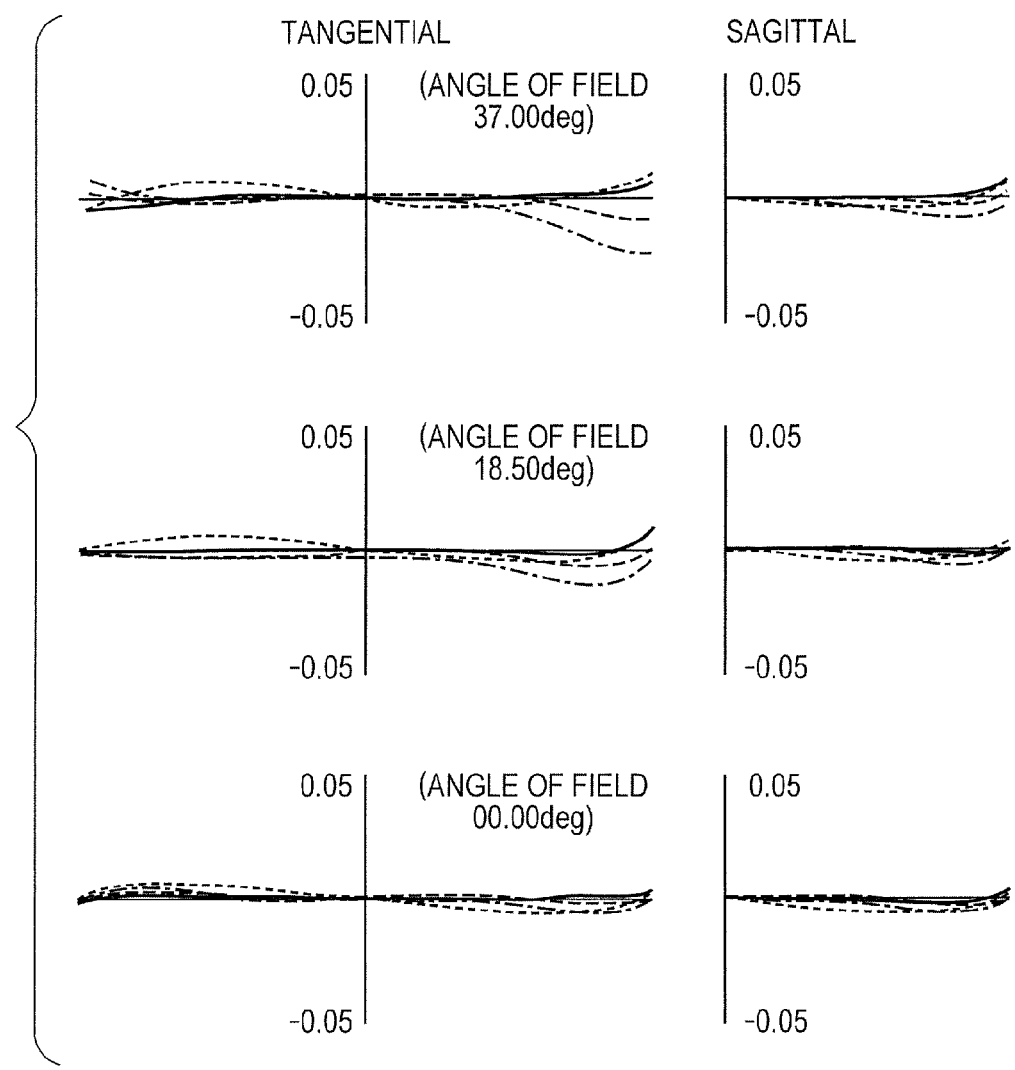
FIG. 12 is a lateral aberration diagram of the imaging optical system according to Example 4 of the present invention.

FIG. 11 illustrates an axial aberration diagram in the imaging optical system of this example, and FIG. 12 illustrates a lateral aberration diagram thereof.

Table 16 shows values of power $\phi\_fro$ of the optical system closer to the object side than the aperture stop STO and power $\phi\_beh$ of the optical system closer to the image side than the aperture stop STO, and a power ratio $\phi\_beh/\phi\_fro$ in the imaging apparatus of this example.

TABLE 16

| | | | |
|---|---|---|---|
| Power of optical system closer to object side than aperture stop | $\phi\_fro$ | 0.0862 | (1/mm) |
| Power of optical system closer to image side than aperture stop | $\phi\_beh$ | 0.1018 | (1/mm) |
| Conditional expression (3) | $0 < \phi\_fro < \phi\_beh$ | Satisfied | |
| Power ratio | $\phi\_beh/\phi\_fro$ | 1.18 | |

The power $\phi\_fro$ of the optical system closer to the object side than the aperture stop STO is set different from the power $\phi\_beh$ of the optical system closer to the image side than the aperture stop STO. Thus, compared with a conventional ball lens, flexibility of aberration correction is high, and ability of correcting spherical aberration or axial chromatic aberration is improved.

In particular, the power $\phi\_fro$ of the optical system closer to the object side than the aperture stop STO is set smaller than the power $\phi\_beh$ of the optical system closer to the image side than the aperture stop STO, and hence spherical aberration can be appropriately corrected.

Specifically, as shown in Table 16, the imaging apparatus of this example is structured to satisfy Expression (3).

Further, the structure satisfies Expression (7) described in Example 2, and the effect of this embodiment is sufficiently obtained.

In other words, both the optical system closer to the object side than the aperture stop STO and the optical system closer to the image side than the aperture stop STO have positive power, and the power of the optical system closer to the image side than the aperture stop STO is set approximately 20% larger than the power of the optical system closer to the object side than the aperture stop. Therefore, the ability of correcting spherical aberration or axial chromatic aberration is improved. Even the optical system in which the aperture stop is disposed in the air layer can obtain high imaging performance with a small F value of F/1.0.

(Second Embodiment)

This embodiment has a structure in which the wave front control element is disposed close to the aperture stop of the imaging optical system so as to improve the effect of correcting axial aberration.

Next, the structure of the above-mentioned wave front control element disposed close to the aperture stop is described more in detail.

The wave front control element can correct aberration by giving a phase difference to a wave front of the light beam and is, for example, a phase control element such as a phase difference plate, a diffractive optical element, and a phase modulation type spatial light modulator (liquid crystal element), or an aspherical surface having a very small aspherical amount.

In this embodiment, the wave front control element is disposed close to the aperture stop (including on the aperture stop) so as to give a phase difference to the light beam passing through the aperture stop. Thus, aberration can be appropriately corrected.

When the wave front control element is disposed close to the aperture stop, the influence of the wave front control element on off-axial aberration can be minimized. Therefore, the phase difference distribution of the wave front control element can have an optimal shape for correcting axial aberration, and the effect of correcting axial aberration can be improved.

Here, when a phase difference distribution, in which a phase of the wave front is delayed along with being away from the optical axis, is given to a phase of the wave front on the optical axis, spherical aberration can be appropriately corrected.

Note that, in this specification, the phrase "close to the aperture stop" is defined as between the lens closest to the aperture stop on the object plane side of the aperture stop and the lens closest to the aperture stop on the image plane side of the aperture stop.

In addition, because the imaging optical system is close to a point symmetry optical system, the same aberration remains in the axial light and in each off-axis light beam, and the aberration can be appropriately corrected by the common phase difference distribution shape.

In other words, when the wave front control element is disposed close to the aperture stop surface of the imaging optical system that is close to a point symmetry optical system, aberration can be appropriately corrected in a wide angle of field even in a bright optical system having an F value smaller than F/2.0. Further, the same effect can be obtained even in a very bright optical system having an F value smaller than F/1.4.

In addition, because the imaging optical system having a small F value has a narrow depth of field, even the compact camera can take an image in which background other than the focused plane is blurred.

Further, because the imaging optical system having a small F value can set the exposure time short in proportion to the square of the F value, blur due to shaking or image blur due to movement of an object, and shot noise can be greatly reduced. Thus, it is possible to provide an imaging apparatus that can take high quality images.

In the following, specific examples of this embodiment are described.

EXAMPLE 5

Figure 15:
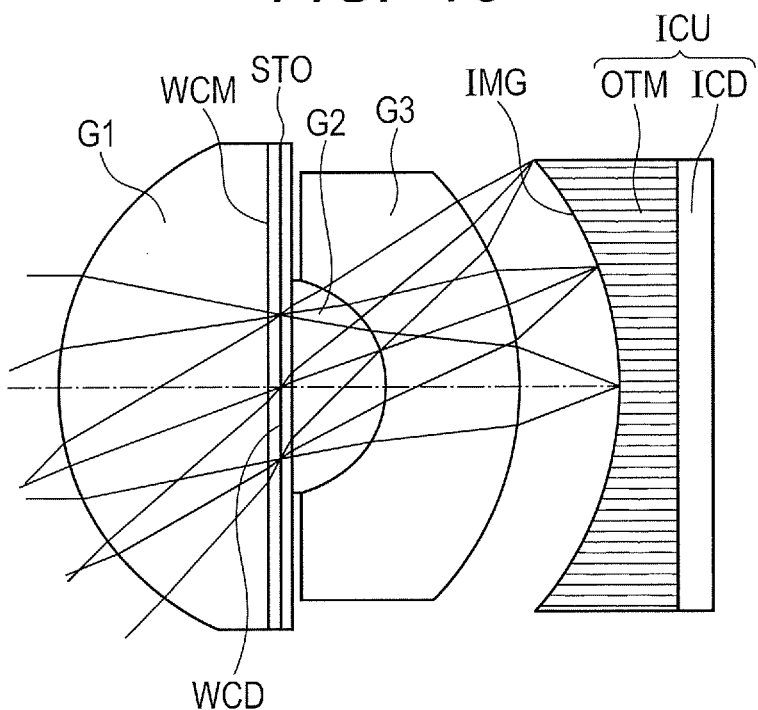
FIG. 15 is a diagram illustrating a structural example of an imaging apparatus according to Example 5 of the present invention.

An imaging optical system used for an imaging apparatus of this example includes three lenses G1, G2, and G3, and a wave front control unit WCM that also works as the aperture stop STO as illustrated in FIG. 15.

The imaging optical system includes, in order from the object side, the first lens G1 as a plano-convex lens having a convex surface facing the object side, the wave front control unit WCM, the second lens G2 as a plano-convex lens having a convex surface facing the image side, and the third lens G3 as a meniscus lens having a convex surface facing the image side. The exit surface of the first lens G1 is cemented to an incident surface of the wave front control unit WCM, an exit surface of the wave front control unit WCM is cemented to the incident surface of the second lens G2, and the exit surface of the second lens G2 is cemented to the incident surface of the third lens G3.

Figure 16:
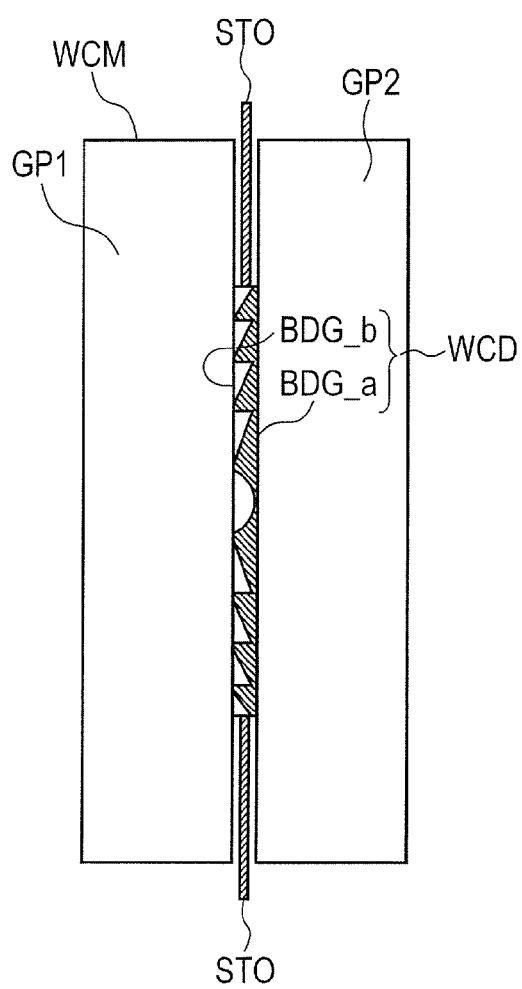
FIG. 16 is a schematic diagram of a wave front control unit of the imaging apparatus according to Example 5 of the present invention.
Figure 17:
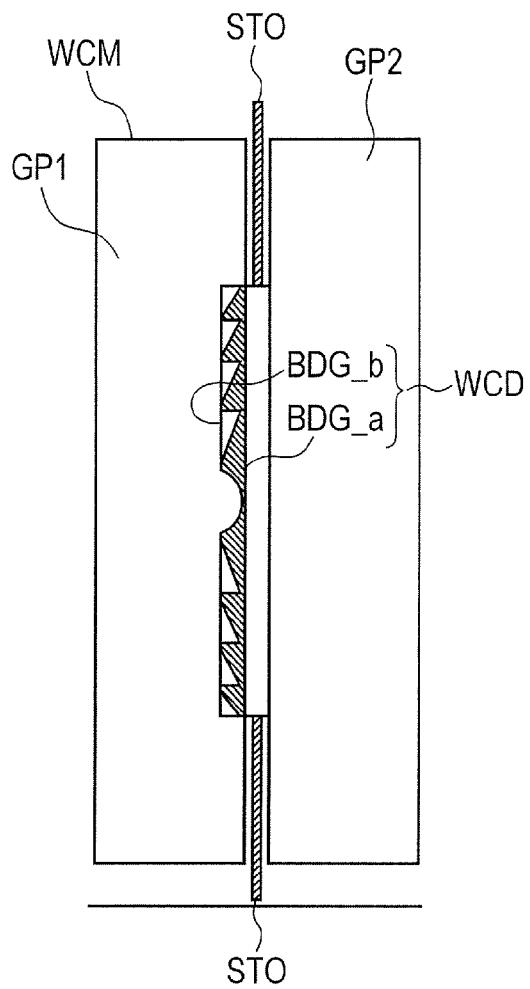
FIG. 17 is a schematic diagram of the wave front control unit of the imaging apparatus according to Example 5 of the present invention.
Figure 18:
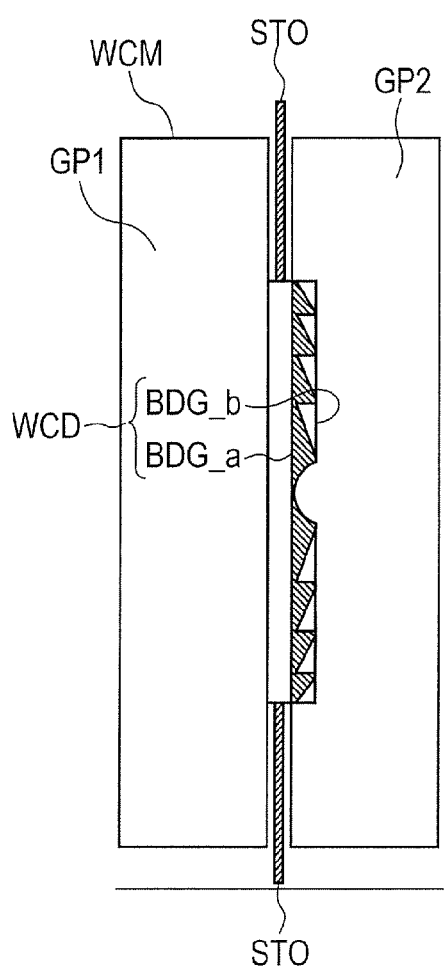
FIG. 18 is a schematic diagram of the wave front control unit of the imaging apparatus according to Example 5 of the present invention.
Figure 19:
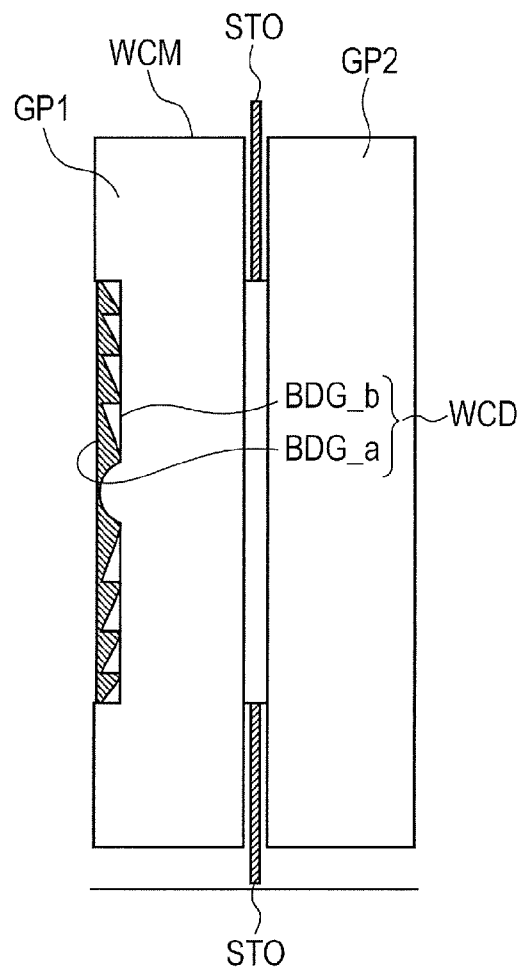
FIG. 19 is a schematic diagram of the wave front control unit of the imaging apparatus according to Example 5 of the present invention.
Figure 20:
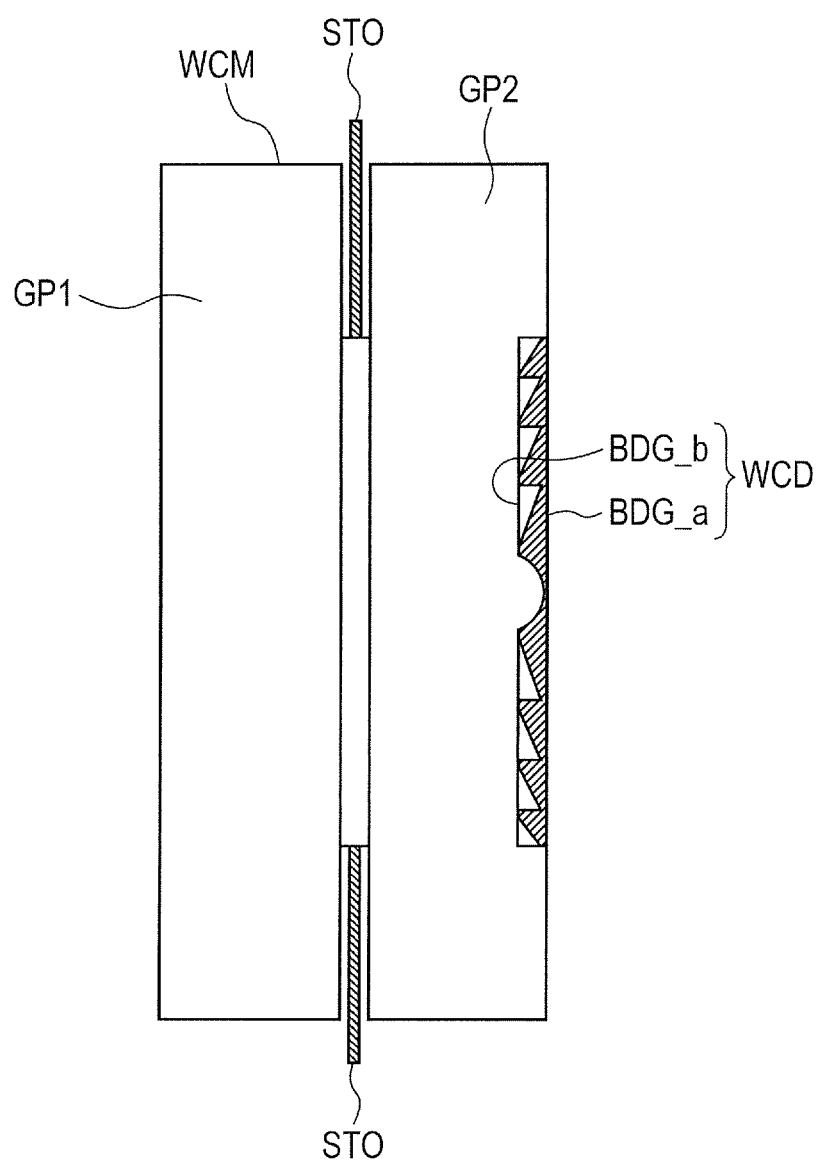
FIG. 20 is a schematic diagram of the wave front control unit of the imaging apparatus according to Example 5 of the present invention.

FIG. 16 is a schematic diagram of the wave front control unit WCM of the imaging apparatus of this example.

The wave front control unit WCM of the imaging apparatus of this example is constituted by two flat plates cemented to each other. In the effective part of the cemented surface, there are formed binary diffraction gratings BDG_a and BDG_b as a wave front control element WCD that gives a phase difference, so as to mainly correct spherical aberration and chromatic spherical aberration.

In addition, the wave front control unit WCM includes the light blocking member disposed in the non-effective part of the cemented surface between the two flat plates, which constitutes the aperture stop STO.

Note that, the wave front control element WCD is disposed on the aperture stop STO in this example. However, as illustrated in FIGS. 17 to 20, the wave front control element WCD may be disposed at any position between the lens closest to the aperture stop on the object plane side of the aperture stop and the lens closest to the aperture stop on the image plane side of the aperture stop.

The binary diffraction gratings BDG_a and BDG_b have the reference wavelength of the d-line, and the phase difference changes along with being away from the optical axis. Every time when the phase difference exceeds an integral multiple of the reference wavelength, a step difference of the binary diffraction grating is increased by one step.

The wave front control element WCD of this example has a structure in which the phase difference increases along with being away from the optical axis. The refractive index of the binary diffraction grating BDG_a is set higher than the refractive index of the binary diffraction grating BDG_b, and hence a desired phase difference is given to the wave front passing through the wave front control element WCD.

Note that, the binary diffraction grating BDG_b is not limited to air but may be optical glass or optical plastic. By setting the refractive index of the binary diffraction grating BDG_a higher than the refractive index of the binary diffraction grating BDG_b, it is possible to reduce total reflection of a wide angle of field light beam at an interface of the diffraction grating.

In FIG. 15, IMG represents an image plane.

As illustrated in FIG. 15, the image plane IMG of the imaging apparatus in this example is an incident surface of the optical transmission unit OTM that is formed into a spherical shape, which is formed along the field curvature of the imaging optical system. Therefore, good image formation is realized over the entire region of the image plane IMG.

The optical transmission unit OTM of the imaging apparatus in this example is an image fiber formed of bound optical fibers of a few micron pitch and has a role of transmitting an image formed on the image plane of the imaging optical system to the image sensor ICD.

The exit surface of the optical transmission unit OTM is formed to be a flat surface and is held in close contact with the image sensor ICD for connection, and thus the imaging unit ICU is formed.

The optical transmission unit OTM is used in this example. However, compared with a structure in which the image sensor itself is formed into a spherical surface shape, there is the advantage of easy production of the imaging unit ICU in which one surface of the optical transmission unit OTM is formed into a spherical surface shape while the other surface is connected to the image sensor ICD.

Table 17 shows a structure of the imaging apparatus of this example.

Surface number 1 is the incident surface of the first lens G1, surface number 2 is a cemented surface between the exit surface of the first lens G1 and the incident surface of the wave front control unit WCM, and surface number 3 is a cemented surface between the two flat glass plates of the wave front control unit WCM. The wave front control element WCD is disposed in the effective part, and the aperture stop STO is disposed in the non-effective part.

In this way, in the imaging apparatus of this example, the wave front control element WCD is disposed in the surface of the aperture stop STO.

Surface number 4 is the cemented surface between the exit surface of the wave front control unit WCM and the incident surface of the second lens G2, surface number 5 is the cemented surface between the exit surface of the second lens G2 and the incident surface of the third lens G3, and surface number 6 is the exit surface of the third lens G3.

Surface number 7 is the image plane IMG, which is the incident surface of the optical transmission unit OTM. Further, the exit surface of the optical transmission unit OTM (not shown) is connected to the image sensor ICD.

In Table 17, R represents a radius of curvature (mm), d represents a surface interval (mm), Nd represents a d-line refractive index, and νd represents an Abbe number. Note that, the surface with a mark "(p)" is the wave front control element.

TABLE 17

Configuration table

| Surface number | R | D | Nd | νd |
|---|---|---|---|---|
| 1 | 5.6187 | 4.520 | 1.74400 | 44.8 |
| 2 | Flat surface | 0.263 | 1.51680 | 64.2 |
| 3 (STO) | Flat surface(p) | 0.263 | 1.51680 | 64.2 |
| 4 | Flat surface | 1.990 | 1.83481 | 42.7 |
| 5 | −2.3218 | 2.938 | 2.00170 | 20.6 |
| 6 | −6.3973 | 2.148 | | |
| 7 (IMG) | −7.3276 | 4.520 | | |

The phase distribution shape given to the wave front control element WCD in the imaging apparatus of this example has a rotation symmetry shape with respect to the optical axis and is expressed by the phase polynomial of Expression (13).

$$\phi(r)=C_1 r^2+C_2 r^4+C_3 r^6+C_4 r^8+C_5 r^{10}+\ldots \quad (13)$$

Here, r represents a distance (mm) from the optical axis, $\phi(r)$ represents a phase difference (wavelength) at each distance r from the optical axis, and $C_1$, $C_2$, $C_3$, $C_4$ and $C_5$ represent coefficients of second, fourth, sixth, eighth, and tenth orders, respectively.

Table 18 shows parameters of the phase polynomial of the wave front control element WCD of surface number 3.

TABLE 18

Phase polynomial (Surface number 3)

| Parameter | Symbol | Value |
|---|---|---|
| Diffraction order | | First order |
| Normalized wavelength | | 587.5618 (nm) |
| Second order coefficient | $C_1$ | 0.00000E+00 |
| Fourth order coefficient | $C_2$ | 5.18443E−04 |
| Sixth order coefficient | $C_3$ | 0.00000E+00 |
| Eighth order coefficient | $C_4$ | 0.00000E+00 |
| Tenth order coefficient | $C_5$ | 0.00000E+00 |

The wave front control element WCD of the imaging apparatus of this example uses only the fourth order term of the phase polynomial of Expression (13).

Figure 21:
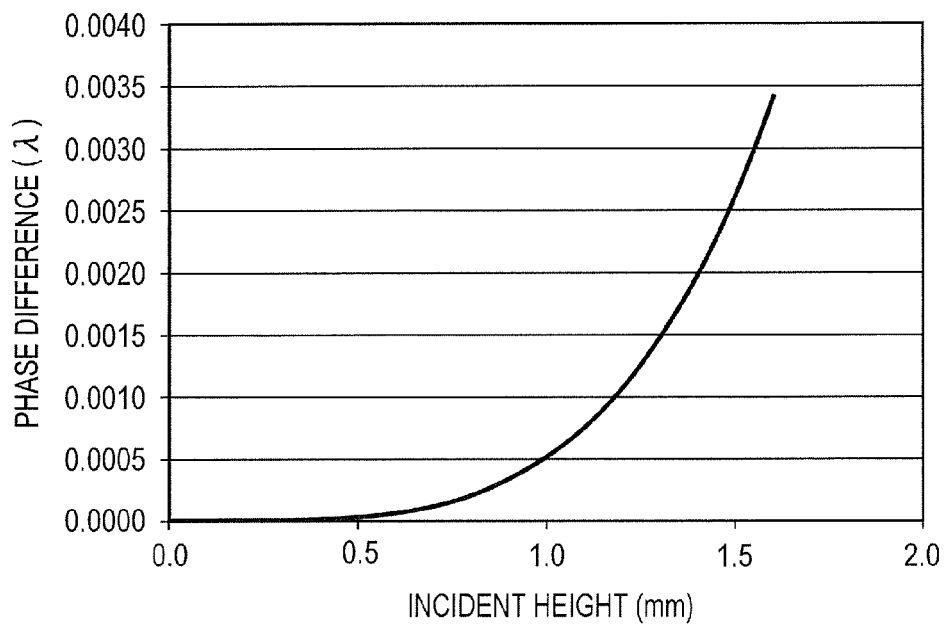
FIG. 21 is a diagram showing a phase difference distribution given to a wave front control element of the imaging apparatus according to Example 5 of the present invention.

FIG. 21 shows the phase difference distribution given to the wave front control element WCD of this example.

In the wave front control element WCD, the phase difference is increased in a positive direction along with being away from the optical axis, so as to form a wave front in which the phase is gradually delayed along with being away from the optical axis.

Power P(r) due to the phase difference of the wave front control element WCD is determined by calculating a second order differential of the phase polynomial of Expression (13) by the distance r from the optical axis and by multiplying the result by "−1", which is expressed by Expression (14).

$$P(r)=-(2C_1+12C_2 r^2+30C_3 r^4+56C_4 r^6+90C_5 r^8+\ldots) \quad (14)$$

Further, because power P(0) due to the phase difference on the optical axis (r=0) is −2$C_1$, a difference between the power P(r) due to the phase difference at each distance r and the power P(0) due to the phase difference on the optical axis (r=0), namely, a power difference ΔP(r) due to the phase difference is expressed by Expression (15).

$$\Delta P(r)=-(12C_2 r^2+30C_3 r^4+56C_4 r^6+90C_5 r^8+\ldots) \quad (15)$$

Figure 22:
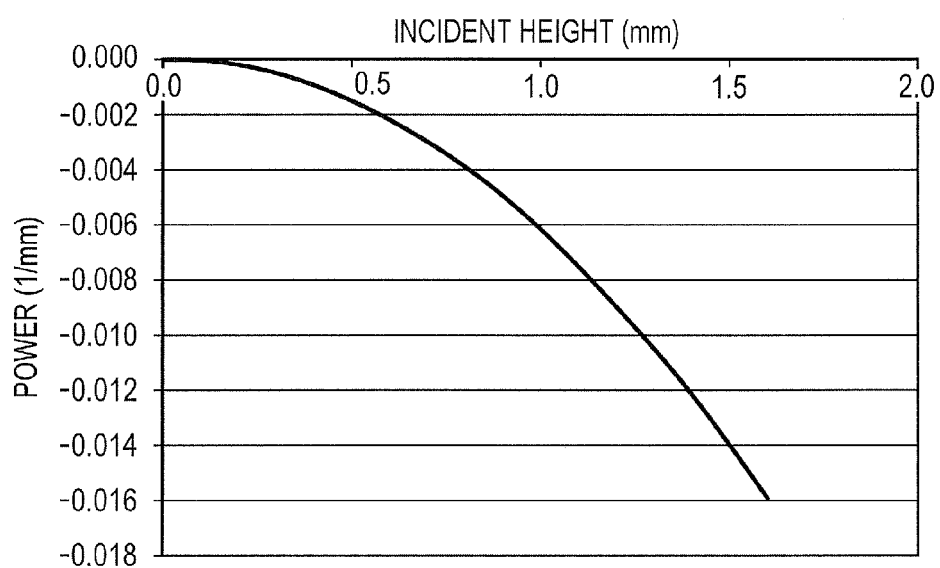
FIG. 22 is a diagram showing a power difference due to a phase difference of the wave front control element of the imaging apparatus according to Example 5 of the present invention.

FIG. 22 shows the power difference ΔP(r) due to the phase difference of the wave front control element WCD of this example.

The wave front control element WCD has power gradually increasing in a negative direction along with being away from the optical axis and has the effect of moving a condensed position of the light beam having a high incident height position backward. The imaging optical system has positive power as a whole, and the spherical aberration tends to be "under". Therefore, the light ray having a higher incident height position forms the image further frontward than the light ray close to the optical axis.

Therefore, based on the effect of the wave front control element WCD of this example, the condensed position at a higher incident height position is moved further backward. Thus, spherical aberration can be corrected.

This tendency is more conspicuous in the imaging optical system having a smaller F value, and hence the effect of correcting spherical aberration by the wave front control element WCD becomes larger.

As to chromatic spherical aberration, an amount or a shape of spherical aberration of the C-line (656.2725 nm), the F-line (486.1327 nm), or the g-line (435.8343 nm), for example, is different from that of the reference wavelength d-line (587.5618 nm), and hence there is a problem in that the condensed position cannot be on the same image plane. Specifically, with respect to the reference wavelength d-line, there is a tendency that an amount of being "under" of spherical aberration increases at a high incident height position in a short wavelength such as the F-line or the g-line, while the amount of being "under" of spherical aberration decreases at a high incident height position in a long wavelength such as the C-line.

As to the power due to the phase difference, stronger power can be obtained for a shorter wavelength. Therefore, also in the wave front control element WCD of this example, a correction amount of spherical aberration becomes larger for a shorter wavelength so that chromatic spherical aberration can be corrected.

Figure 23:
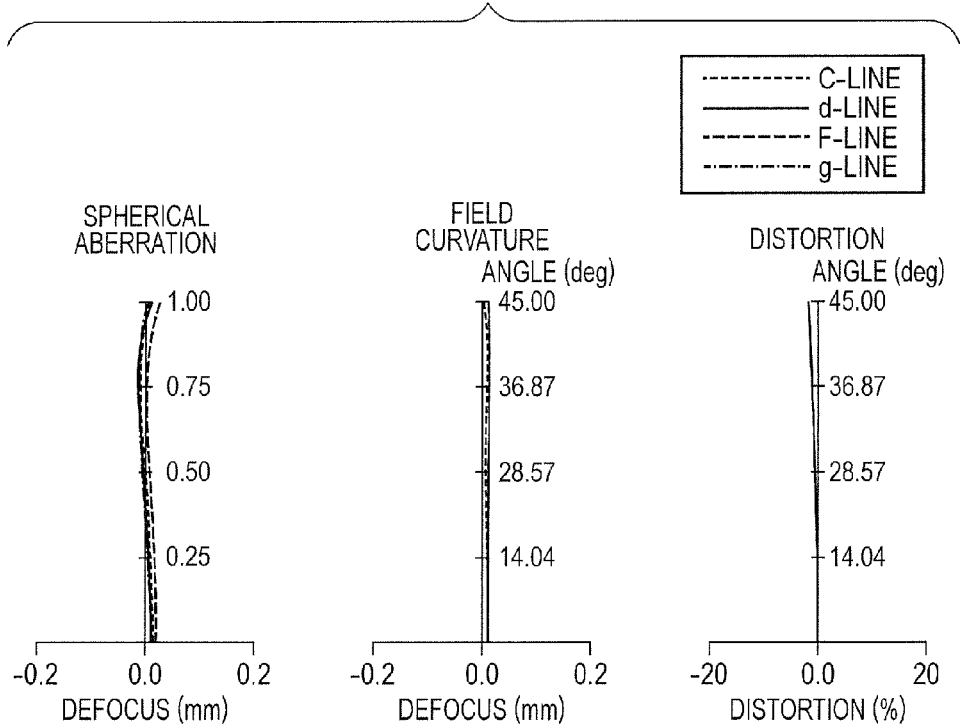
FIG. 23 is an axial aberration diagram of an imaging optical system according to Example 5 of the present invention.
Figure 24:
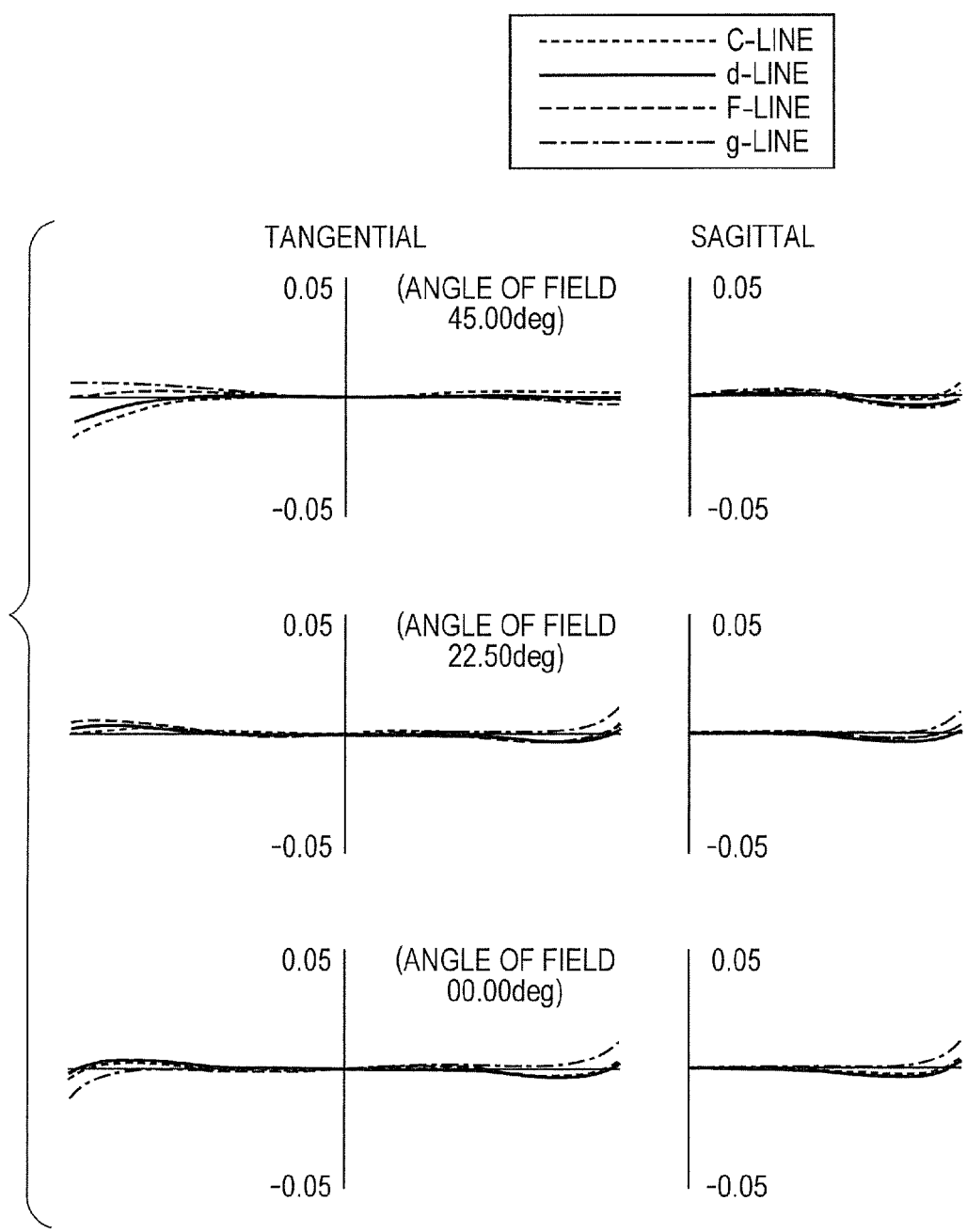
FIG. 24 is a lateral aberration diagram of the imaging optical system according to Example 5 of the present invention.

FIG. 23 illustrates an axial aberration diagram of the imaging optical system of this example, and FIG. 24 illustrates a lateral aberration diagram thereof. As illustrated in FIG. 23, spherical aberration, axial chromatic aberration, astigmatism, field curvature, distortion, and chromatic spherical aberration are appropriately corrected.

Here, the chromatic spherical aberration is defined as a difference between the spherical aberration amount of the reference wavelength (for example, d-line) and the spherical aberration amount of each wavelength (for example, C-line, F-line, or g-line).

In particular, the light beam in the entire region from a low incident light beam height to a high incident light beam height can be condensed on the image plane, and hence spherical aberration can be very appropriately corrected.

In addition, axial chromatic aberration and chromatic spherical aberration are also very appropriately corrected so that high imaging performance is obtained.

As illustrated in FIG. 24, good performance is obtained in each field angle light beam, and coma, field curvature, and lateral chromatic aberration are appropriately corrected.

Table 19 shows the specifications of the imaging apparatus of this example.

TABLE 19

| Focal length of imaging optical system | f_sys | 6.699 (mm) |
|---|---|---|
| F value | F/# | 1.40 |
| Angle of field | 2ω | 90.0 (deg) |
| Entire length | L_sys | 9.974 (mm) |
| Distance from exit pupil to image plane | d_pup | 6.595 (mm) |
| Distance from aperture stop to image plane | d_ape | 7.340 (mm) |
| Distance from aperture stop to last plane | d_ape_last | 5.191 (mm) |

The imaging apparatus of this example has a small F value of F/1.4, a wide angle of field of 90.0 (degrees), and a compact size with the entire length of 9.974 (mm), which is an example of the imaging apparatus in which brightness, high resolution, a very wide angle of field, and a compact size are realized at the same time.

Table 20 shows values of Expressions (1), (2), (4), and (17) of the imaging apparatus of this example.

TABLE 20

| Conditional expression (1) | f_sys/d_pup | 1.02 |
|---|---|---|
| Conditional expression (2) | |R_img|/f_sys | 1.09 |
| Conditional expression (4) | |R_img|/d_pup | 1.11 |
| Conditional expression (17) | d_pup/d_ape | 0.899 |

The value of Expression (1) is 1.02 and satisfies the range of Expression (1). Thus, the optical system of the imaging optical system on the image side of the aperture stop can be close to a point symmetry structure, and hence coma, astigmatism, distortion, and lateral chromatic aberration can be appropriately corrected.

The value of Expression (2) is 1.09 and satisfies the range of Expression (2). Thus, field curvature and astigmatism can be appropriately corrected over a wide angle of field of 90.0 (degrees).

When Expressions (1) and (2) are satisfied, focus adjustment can be performed from infinity to a close distance only by changing the distance between the imaging optical system and the image plane without changing the image plane shape.

In addition, in the imaging apparatus of this embodiment, a radius of curvature of the image plane is set substantially equal to the distance from the exit pupil to the image plane of the imaging optical system.

The value of Expression (4) is 1.11 and satisfies the range of Expression (4).

Thus, the imaging optical system is close to a point symmetry structure, and hence coma, astigmatism, distortion, and lateral chromatic aberration are appropriately corrected. Further, focus adjustment can be performed while maintaining high resolution in a wide focus adjustment range from infinity to a close distance.

In the imaging apparatus of this example, the wave front control element WCD is disposed on the surface of the aperture stop STO, and coma occurs due to a phase difference given to the wave front control element WCD.

The wave front control element WCD of this example delays the wave front of the light beam at the periphery with respect to the optical axis.

Because the field angle light beam obliquely enters the wave front control element WCD, the distance from the wave front control element WCD to the image plane is different between the upper ray and the lower ray. As a result, a large optical path difference occurs and causes coma.

This is described with reference to FIG. 15. The distance from the wave front control element WCD to the plane closest to the image side is longer for the upper ray than for the lower ray of the field angle light beam.

In other words, on the plane closest to the image side, the lower ray reaches a position further apart from the principal ray than the upper ray.

Therefore, it is necessary to set a distance from a reach point of each light ray on the lens surface closest to the image side to an image point on the image plane to be longer for the lower ray than for the upper ray.

In the imaging apparatus of this embodiment, the image plane has a concentric shape for the field angle light beam. Therefore, in a usual case, the distance from a reach point of each light beam on the lens surface closest to the image side to an image point on the image plane is almost the same between the upper ray and the lower ray.

However, in the imaging apparatus of this example, the field angle light beam propagates from the lens surface closest to the image side to the image plane so as to expand outward. Thus, the distance from a reach point of each light ray on the lens surface closest to the image side to an image point on the image plane is longer for the lower ray than for the upper ray.

In this way, coma can be appropriately corrected.

Specifically, it is preferred to dispose the curvature center from the lens surface closest to the image side to be closer to the object side than the aperture stop.

In the imaging apparatus of this example, the radius of curvature of the lens surface closest to the image side is R_last=−6.3973 (mm), and the distance from the aperture stop to the lens surface closest to the image side is d_ape_last=5.191 (mm).

Therefore, the relationship of Expression (16) is satisfied, and the curvature center from the lens surface closest to the image side is disposed closer to the object side than the aperture stop.

$$|R\_last| > d\_ape\_last \qquad (16)$$

In addition, the distance from the exit pupil to the image plane of the imaging optical system d_pup=6.595 (mm) is set shorter than the distance from the aperture stop to the image plane d_ape=7.340 (mm), and hence the field angle light beam expands outward when propagating from the lens surface closest to the image side to the image plane.

In this case, when the condition of Expression (8) is satisfied, coma can be appropriately corrected.

$$0.7 \leq d\_pup/d\_ape \leq 0.95 \qquad (17)$$

Next, an action of improving the peripheral darkening is described.

In the imaging optical system of the imaging apparatus of this example, the radius of curvature of the image plane is set substantially equal to the focal length of the imaging optical system. Thus, the focal length can be substantially uniform in the full angle of field.

Thus, the square of cos ω of the peripheral light intensity ratio can be improved.

The largest half angle of field in this example is ω=45.0 (degrees) so that $\cos^2 \omega$ is 0.5 in contrast to $\cos^4 \omega = 0.25$. Thus, peripheral light intensity can be improved by 2 times.

By satisfying Expression (2), it is possible to obtain a reasonable effect.

Further, in the imaging optical system of the imaging apparatus of this example, the radius of curvature of the image plane is set substantially equal to the distance from the exit pupil to the image plane of the imaging optical system, and hence the incident angle to the image plane can be substantially orthogonal.

Thus, the peripheral light intensity ratio can be improved by the first power of cos ω.

The largest half angle of field in this example is ω=45.0 (degrees) so that $\cos^3 \omega$ is 0.35 in contrast to $\cos^4 \omega = 0.25$. Thus, peripheral light intensity can be improved by 1.4 times.

By satisfying Expression (4), it is possible to obtain a reasonable effect.

By satisfying Expressions (2) and (4) at the same time, the peripheral light intensity ratio can be improved by the third power of cos ω, and hence the peripheral light intensity can be improved by 2.8 times.

Thus, because the peripheral light intensity ratio of the imaging optical system having a wide angle of field can be significantly improved, it is possible to provide the imaging apparatus that can take an image having high image quality with high contrast and little noise over a wide angle of field.

As described above, according to the structure of this example, it is possible to realize the imaging apparatus having good imaging performance over a wide angle of field even at an F value smaller than F/2.0 with a compact structure.

In addition, the peripheral darkening can be significantly improved, and hence it is possible to realize the imaging optical system that is very bright over a wide angle of field.

Thus, because the exposure time can be significantly reduced, it is possible to provide the imaging apparatus that can take an image having high quality with appropriately reduced blur due to shaking, image blur due to movement of the object, and noise.

In addition, it is possible to provide the imaging optical system with the compact structure in which a defocused subject can be significantly blurred.

Further, using the above-mentioned high performance imaging optical system with the simple structure, focus adjustment can be performed in a wide range from infinity to a close distance with little deterioration of imaging performance.

EXAMPLE 6

Figure 25:
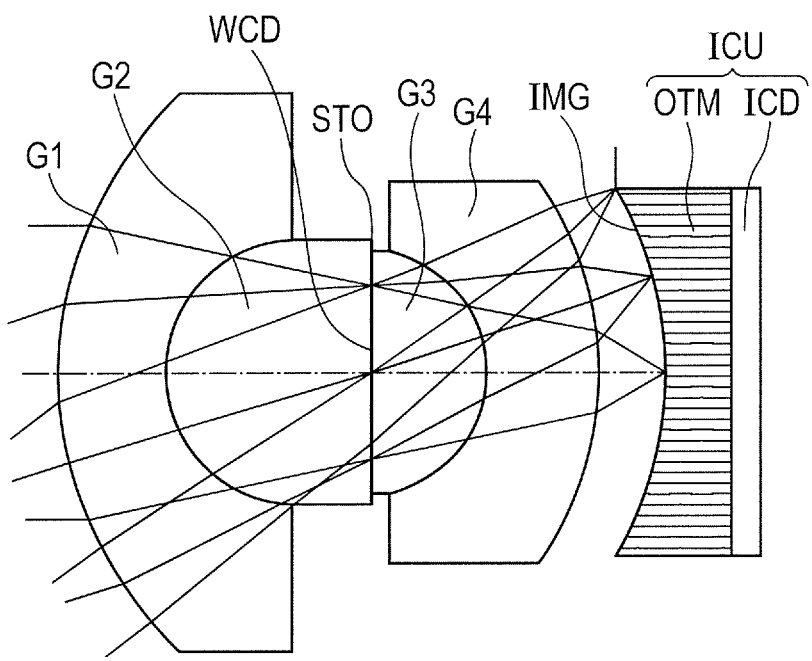
FIG. 25 is a diagram illustrating a structural example of an imaging apparatus according to Example 6 of the present invention.

An imaging optical system used for an imaging apparatus of this example includes four lenses G1, G2, G3, and G4, the aperture stop STO, and a wave front control element WCD as illustrated in FIG. 25.

The imaging optical system includes, in order from the object side: a first lens G1 as a meniscus lens having a convex surface facing the object side; a second lens G2 as a plano-convex lens having a convex surface facing the object side; a third lens G3 as a plano-convex lens having a convex surface facing the image side; and a fourth lens G4 as a meniscus lens having a convex surface facing the image side.

In FIG. 25, IMG represents an image plane. As illustrated in FIG. 25, the image plane IMG of the imaging apparatus in this example is an incident surface of the optical transmission unit OTM that is formed into a spherical shape, which is formed along the field curvature of the imaging optical system. Therefore, good image formation is realized over the entire region of the image plane IMG.

The optical transmission unit OTM of the imaging apparatus in this example is an image fiber formed of bound optical fibers of a few micron pitch and has a role of transmitting an image formed on the image plane of the imaging optical system to the image sensor ICD.

The exit surface of the optical transmission unit OTM is formed to be a flat surface and is held in close contact with the image sensor ICD for connection, and thus the imaging unit ICU is formed.

Table 21 shows a structure of the imaging apparatus of this example.

Surface number 1 is the incident surface of the first lens G1 and has a rotation symmetry aspherical shape expressed by the polynomial of Expression (11).

Surface number 2 is the cemented surface between the exit surface of the first lens G1 and the incident surface of the second lens G2, and surface number 3 is the cemented surface between the exit surface of the second lens G2 and the incident surface of the third lens G3. The wave front control element WCD is disposed in the effective part, and the aperture stop STO is disposed in the non-effective part.

In this way, in the imaging apparatus of this example, the wave front control element WCD is disposed on the surface of the aperture stop STO.

Surface number 4 is the cemented surface between the exit surface of the third lens G3 and the incident surface of the fourth lens G4, and surface number 5 is the exit surface of the fourth lens G4, which has a rotation symmetry aspherical shape expressed by the polynomial of Expression (11).

Surface number 7 is the image plane IMG, which is the incident surface of the optical transmission unit OTM. Further, the exit surface of the optical transmission unit OTM (not shown) is connected to the image sensor ICD.

In Table 21, R represents a radius of curvature (mm), d represents a surface interval (mm), Nd represents a d-line refractive index, and vd represents an Abbe number. Note that, the surface with a mark "(a)" is an aspherical surface while the surface with a mark "(p)" is a surface provided with the wave front control element in the effective part.

TABLE 21

| Configuration table | | | | |
|---|---|---|---|---|
| Surface number | R | d | Nd | vd |
| 1 | 9.0932(a) | 2.7636 | 2.00060 | 25.5 |
| 2 | 3.3892 | 5.2692 | 2.00100 | 29.1 |
| 3 (STO) | Flat surface(p) | 2.9521 | 1.91082 | 35.3 |
| 4 | −3.1249 | 2.9342 | 2.00270 | 19.3 |
| 5 | −8.0232(a) | 1.6787 | | |
| 6 (IMG) | −9.1592 | | | |

The aspherical surface of the imaging apparatus of this example has a rotation symmetry aspherical surface whose center is the optical axis and is expressed by the polynomial of Expression (11).

The aspherical surface coefficients of the first surface of the imaging apparatus of this example are shown in Table 22A, the aspherical surface coefficients of the fifth surface are shown in Table 22B, and the coefficients of the phase difference polynomial of the third surface are shown in Table 22C.

TABLE 22A

| Aspherical surface coefficients (Surface number 1) | | |
|---|---|---|
| Parameter | Symbol | Value |
| Conic constant | K | −7.67865E−01 |
| Fourth order coefficient | A | 8.91147E−05 |
| Sixth order coefficient | B | 8.34469E−07 |

TABLE 22A-continued

Aspherical surface coefficients (Surface number 1)

| Parameter | Symbol | Value |
|---|---|---|
| Eighth order coefficient | C | −1.30692E−08 |
| Tenth order coefficient | D | 1.51136E−10 |

TABLE 22B

Aspherical surface coefficients (Surface number 5)

| Parameter | Symbol | Value |
|---|---|---|
| Conic constant | K | −8.00433E+00 |
| Fourth order coefficient | A | −1.68038E−03 |
| Sixth order coefficient | B | 5.00405E−05 |
| Eighth order coefficient | C | −1.02512E−06 |
| Tenth order coefficient | D | 5.65476E−09 |

TABLE 22C

Phase polynomial (Surface number 3)

| Parameter | Symbol | Value |
|---|---|---|
| Diffraction order | | First order |
| Normalized wavelength | | 587.5618 (nm) |
| Second order coefficient | $C_1$ | −5.72626E−03 |
| Fourth order coefficient | $C_2$ | 5.73805E−04 |
| Sixth order coefficient | $C_3$ | 4.34455E−06 |
| Eighth order coefficient | $C_4$ | −1.44872E−06 |
| Tenth order coefficient | $C_5$ | 7.68743E−09 |

As shown in Table 22C, the wave front control element WCD of this example uses the second to the tenth power terms of the phase polynomial of Expression (13) so as to give the phase difference.

Figure 26:
FIG. 26 is a diagram showing a phase difference distribution given to a wave front control element according to Example 6 of the present invention.

FIG. 26 shows a phase difference distribution given to the wave front control element WCD of this example.

The wave front control element WCD increases the phase difference in the negative direction along with being away from the optical axis, so as to form the wave front in which the phase is advanced gradually along with being away from the optical axis.

Positive power is given to the whole light beam, and the wave front control element WCD shares a part of power of the imaging optical system.

On the other hand, the wave front control element WCD has a role of correcting spherical aberration.

In order to correct spherical aberration, it is important to move a condensed position of the light beam at a high incident height position with respect to a condensed position of the axial light. As indicated by Expression (15), a power difference due to the phase difference between a light ray at a high incident height position and the optical axis is important.

The imaging optical system has positive power as a whole, and the spherical aberration tends to be "under". Therefore, the light ray having a higher incident height position forms the image further frontward than the light ray close to the optical axis.

When power in a relatively negative direction is given to the former, the effect of moving the condensed position of the light ray at a high incident height position backward is obtained, and spherical aberration can be corrected.

Figure 27:
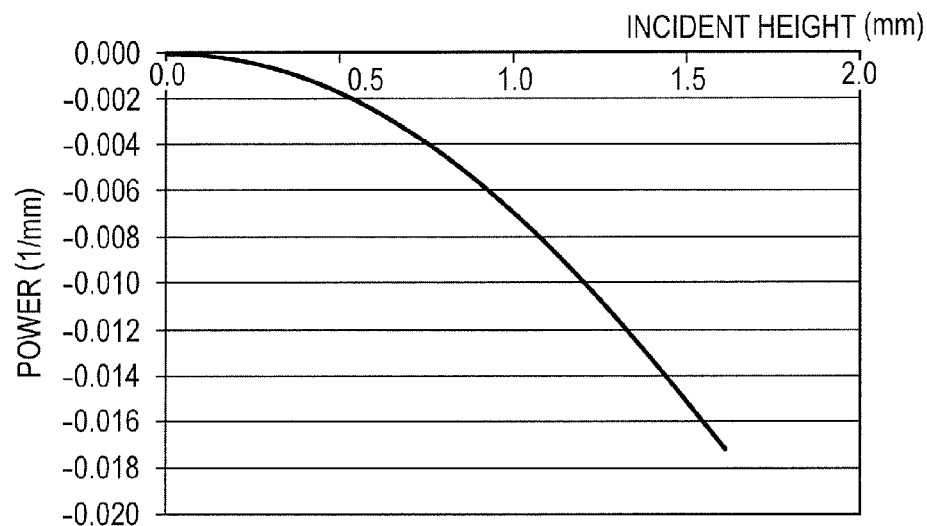
FIG. 27 is a diagram showing a power difference due to a phase difference of the wave front control element according to Example 6 of the present invention.

FIG. 27 shows the power difference ΔP(r) due to the phase difference of the wave front control element WCD of this example. The wave front control element WCD has power gradually increasing in the negative direction along with being away from the optical axis, and hence spherical aberration can be appropriately corrected.

In the imaging optical system having a very small F value equal to or smaller than F/1.4, this tendency becomes more conspicuous as each incident position is higher so that there is greater significance of correcting spherical aberration by the wave front control element WCD. As to chromatic spherical aberration, an amount or a shape of spherical aberration of the C-line (656.2725 nm), the F-line (486.1327 nm), or the g-line (435.8343 nm), for example, is different from that of the reference wavelength d-line (587.5618 nm), and hence there is a problem in that the condensed position cannot be on the same image plane.

Specifically, with respect to the reference wavelength d-line, there is such a tendency that an amount of being "under" of spherical aberration increases at a high incident height position in a short wavelength such as the F-line or the g-line, while the amount of being "under" of spherical aberration decreases at a high incident height position in a long wavelength such as the C-line.

As to the power due to the phase difference, stronger power can be obtained for a shorter wavelength. Therefore, also in the wave front control element WCD of this example, a correction amount of spherical aberration becomes larger for a shorter wavelength so that chromatic spherical aberration can be corrected.

Figure 28:
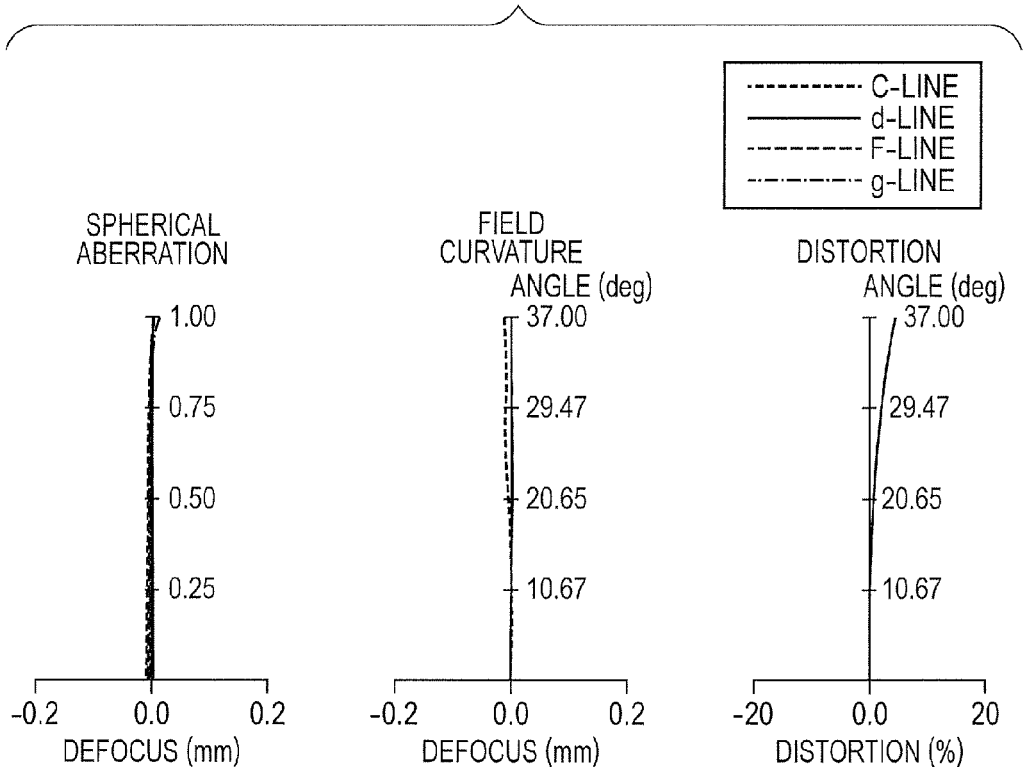
FIG. 28 is an axial aberration diagram of an imaging optical system according to Example 6 of the present invention.
Figure 29:
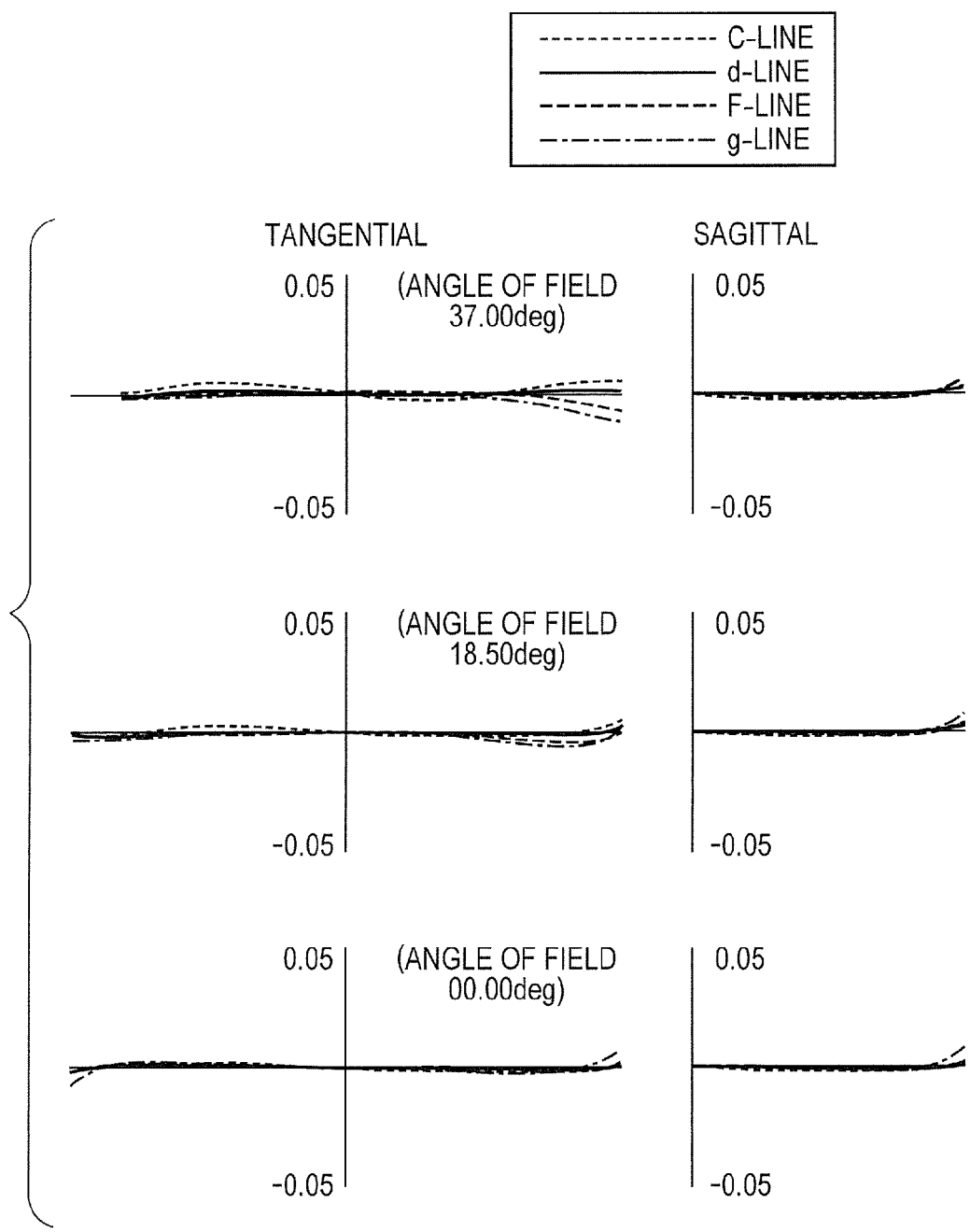
FIG. 29 is a lateral aberration diagram of the imaging optical system according to Example 6 of the present invention.

FIG. 28 illustrates an axial aberration diagram of the imaging optical system of this example, and FIG. 29 illustrates a lateral aberration diagram thereof.

As illustrated in FIG. 28, spherical aberration, axial chromatic aberration, astigmatism, field curvature, distortion, and chromatic spherical aberration are appropriately corrected.

Here, the chromatic spherical aberration is defined as a difference between the spherical aberration amount of the reference wavelength (for example, d-line) and the spherical aberration amount of each wavelength (for example, C-line, F-line, or g-line).

In particular, the light beam in the entire region from a low incident light beam height to a high incident light beam height can be condensed on the image plane, and hence spherical aberration can be very appropriately corrected.

In addition, axial chromatic aberration and chromatic spherical aberration are also very appropriately corrected so that high imaging performance is obtained.

As illustrated in FIG. 29, good performance is obtained in each field angle light beam, and coma, field curvature, and lateral chromatic aberration are appropriately corrected.

Table 23 shows the specifications of the imaging apparatus of this example.

TABLE 23

| | | |
|---|---|---|
| Focal length of imaging optical system | f_sys | 7.499 (mm) |
| F value | F/# | 1.00 |
| Angle of field | 2ω | 90.0 (deg) |
| Entire length | L_sys | 13.919 (mm) |
| Distance from exit pupil to image plane | d_pup | 6.334 (mm) |
| Distance from aperture stop to image plane | d_ape | 7.565 (mm) |
| Distance from aperture stop to last plane | d_ape_last | 5.886 (mm) |

The imaging apparatus of this example has a small F value of F/1.0, a wide angle of field of 90.0 (degrees), and a compact size with the entire length of 9.974 (mm), which is an example of the imaging apparatus in which brightness, high resolution, a very wide angle of field, and a compact size are realized at the same time.

Table 24 shows values of Expressions (1), (2), (4), and (17) of the imaging apparatus of this example.

TABLE 24

| | | |
|---|---|---|
| Conditional expression (1) | f_sys/d_pup | 1.18 |
| Conditional expression (2) | \|R_img\|/f_sys | 1.22 |
| Conditional expression (4) | \|R_img\|/d_pup | 1.45 |
| Conditional expression (17) | d_pup/d_ape | 0.837 |

The value of Expression (1) is 1.18 and satisfies the range of Expression (1). Thus, the optical system of the imaging optical system in the image aide of the aperture stop can be close to a point symmetry structure, and hence coma, astigmatism, distortion, and lateral chromatic aberration can be appropriately corrected.

The value of Expression (2) is 1.22 and satisfies the range of Expression (2). Thus, field curvature and astigmatism can be appropriately corrected over a wide angle of field of 90.0 (degrees).

The value of Expression (4) is 1.45 and satisfies the range of Expression (4). Thus, the imaging optical system is close to a point symmetry structure, and hence coma, astigmatism, distortion, and lateral chromatic aberration are appropriately corrected.

Further, in the imaging apparatus of this example, the distance between the imaging optical system and the image plane is changed so as to perform focus adjustment. Because Expression (4) is satisfied, it is possible to perform focus adjustment while maintaining high resolution in a wide focus adjustment range from infinity to a close distance.

In the imaging apparatus of this example, the radius of curvature of the lens surface closest to the image side is R_last=−8.0232 (mm), and the distance from the aperture stop to the lens surface closest to the image side is d_ape_l-ast=5.886 (mm).

The relationship of Expression (16) is satisfied, and the curvature center from the lens surface closest to the image side is disposed closer to the object side than the aperture stop. Thus, the structure is suitable for appropriately correcting coma generated by the wave front control element WCD.

In addition, the distance from the exit pupil to the image plane of the imaging optical system d_pup=6.334 (mm) is set shorter than the distance from the aperture stop to the image plane d_ape=7.565 (mm), and hence the field angle light beam expands outward when traveling from the lens surface closest to the image side to the image plane.

Expression (17) is satisfied, and the structure is suitable for appropriately correcting coma generated by the wave front control element WCD.

EXAMPLE 7

Figure 30:
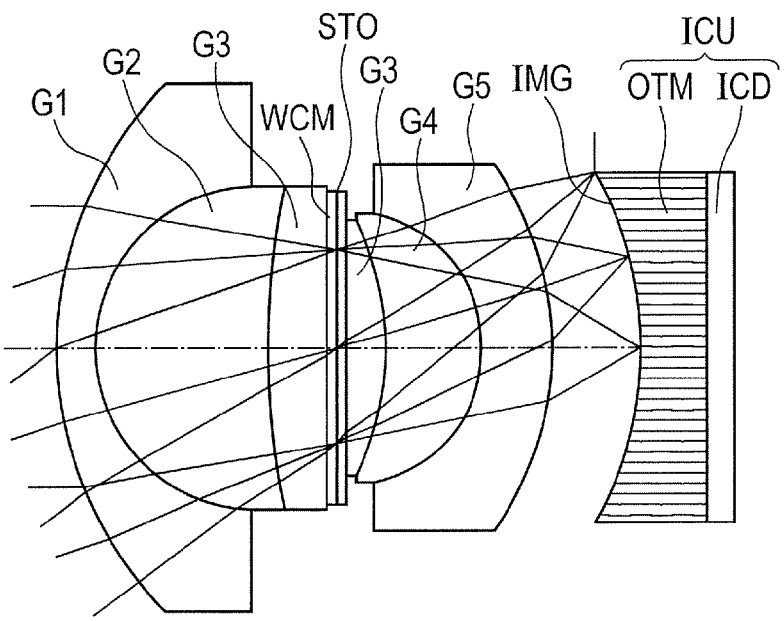
FIG. 30 is a diagram illustrating a structural example of an imaging apparatus according to Example 7 of the present invention.

An imaging optical system used for an imaging apparatus of this example includes six lenses G1 to G6, the aperture stop STO, and the wave front control unit WCM as illustrated in FIG. 30.

The imaging optical system includes, in order from the object side, the first lens G1 as a meniscus lens having a convex surface facing the object side, the second lens G2 as a meniscus lens having a convex surface facing the object side, and the third lens G3 as a plano-convex lens having a convex surface facing the object side.

Next, there are disposed the wave front control unit WCM, the fourth lens G4 as a plano-convex lens having a convex surface facing the image side, the fifth lens G5 as a meniscus lens having a convex surface facing the image side, and the sixth lens G6 as a meniscus lens having a convex surface facing the image side.

All the optical elements from the first lens G1 to the sixth lens G6 are cemented to each other. In the imaging apparatus according to this example, the same imaging unit ICU as that in Example 5 is disposed.

Table 25 shows a structure of the imaging apparatus of this example.

Surface number 1 is the incident surface of the first lens G1, surface number 2 is the cemented surface between the exit surface of the first lens G1 and the incident surface of the second lens G2, and surface number 3 is the cemented surface between the exit surface of the second lens G2 and the incident surface of the third lens G3.

Surface number 4 is a cemented surface between the exit surface of the third lens G3 and the incident surface of the wave front control unit WCM, and surface number 5 is the cemented surface between the two flat glass plates of the wave front control unit WCM. At the surface of the surface number 5, the phase difference plate as the wave front control element WCD is disposed in the effective part, and the aperture stop surface STO is disposed in the non-effective part.

Surface number 6 is a cemented surface between the exit surface of the wave front control unit WCM and the incident surface of the fourth lens G4, surface number 7 is the cemented surface between the exit surface of the fourth lens G4 and the incident surface of the fifth lens G5, and surface number 8 is a cemented surface between the exit surface of the fifth lens G5 and the incident surface of the sixth lens G6.

In addition, surface number 9 is the exit surface of the sixth lens G6, and surface number 10 is the image plane IMG, which is the incident surface of the optical transmission unit OTM of the imaging unit ICU.

Further, the exit surface of the optical transmission unit OTM is connected to the image sensor ICD.

In Table 25, R represents a radius of curvature (mm), d represents a surface interval (mm), Nd represents a d-line refractive index, and vd represents an Abbe number. Note that, the lens surface with a mark "(a)" in the R field is an aspherical surface while the surface with a mark "(p)" is the wave front control element.

TABLE 25

| Surface number | R | d | Nd | vd |
|---|---|---|---|---|
| 1 | 9.2576(a) | 1.0868 | 1.922860 | 18.9 |
| 2 | 4.2724 | 4.5322 | 1.849860 | 24.1 |
| 3 | 20.4855 | 1.5758 | 1.922860 | 20.9 |
| 4 | Infinity | 0.2500 | 1.516800 | 64.2 |
| 5 (STO) | Infinity(p) | 0.2500 | 1.516800 | 64.2 |
| 6 | Infinity | 1.0208 | 1.882023 | 37.2 |
| 7 | −8.1725 | 2.6185 | 1.756999 | 47.7 |
| 8 | −3.6502 | 1.9300 | 1.804855 | 24.7 |
| 9 | −7.9006(a) | 2.3903 | | |
| 10 (IMG) | −9.5769 | 1.0868 | | |

The aspherical surface of the imaging apparatus of this example has a rotation symmetry aspherical surface whose center is the optical axis and is expressed by the polynomial of Expression (11).

The aspherical surface coefficients of the first surface of the imaging apparatus of this example are shown in Table 26A, the aspherical surface coefficients of the ninth surface are shown in Table 26B, and the coefficients of the phase difference polynomial of the fifth surface are shown in Table 26C.

TABLE 26A

Aspherical surface coefficients (Surface number 1)

| Parameter | Symbol | Value |
|---|---|---|
| Conic constant | K | −2.45628E+00 |
| Fourth order coefficient | A | 3.21177E−04 |
| Sixth order coefficient | B | −1.74680E−06 |
| Eighth order coefficient | C | 0.00000E+00 |
| Tenth order coefficient | D | 0.00000E+00 |

TABLE 26B

Aspherical surface coefficients (Surface number 9)

| Parameter | Symbol | Value |
|---|---|---|
| Conic constant | K | −1.21591E+01 |
| Fourth order coefficient | A | −2.59045E−03 |
| Sixth order coefficient | B | 1.30885E−04 |
| Eighth order coefficient | C | −4.66439E−06 |
| Tenth order coefficient | D | 7.14736E−08 |

TABLE 26C

Phase difference polynomial (Surface number 5)

| Parameter | Symbol | Value |
|---|---|---|
| Diffraction order | | First order |
| Normalized wavelength | | 587.5618 (nm) |
| Second order coefficient | $C_1$ | −8.67933E−03 |
| Fourth order coefficient | $C_2$ | 4.41119E−04 |
| Sixth order coefficient | $C_3$ | 0.00000E+00 |
| Eighth order coefficient | $C_4$ | 0.00000E+00 |
| Tenth order coefficient | $C_5$ | 0.00000E+00 |

Figure 31:
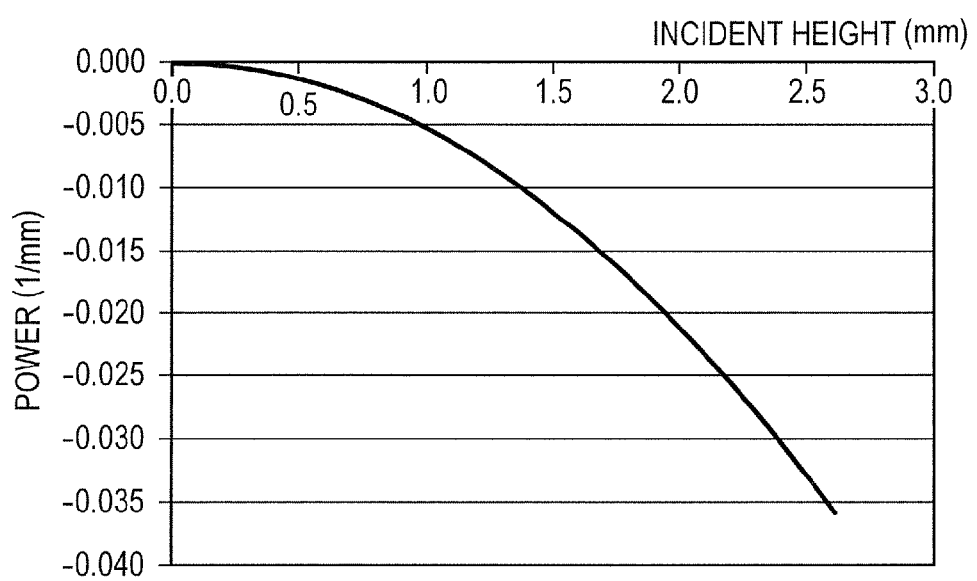
FIG. 31 is a diagram showing a power difference due to a phase difference of a wave front control element according to Example 7 of the present invention.

FIG. 31 shows the power difference ΔP(r) due to the phase difference of the wave front control element WCD of this example. The wave front control element WCD has a structure in which the power gradually increases in the negative direction along with being away from the optical axis. Spherical aberration can be changed in the direction of "over", and hence spherical aberration can be appropriately corrected.

In addition, as to the power due to the phase difference, the periphery power is larger in the negative direction than the power on the optical axis so that spherical aberration can be changed further in the direction of "over" for a short wavelength than for a long wavelength. Thus, chromatic spherical aberration can also be appropriately corrected.

Figure 32:
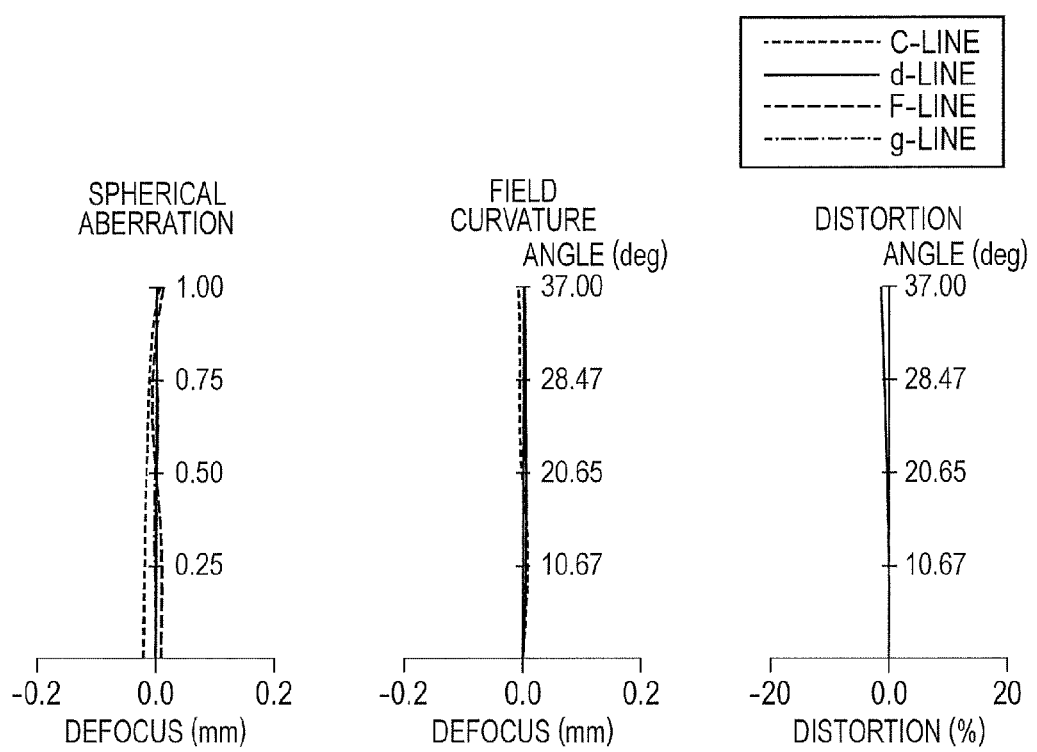
FIG. 32 is an axial aberration diagram of an imaging optical system according to Example 7 of the present invention.
Figure 33:
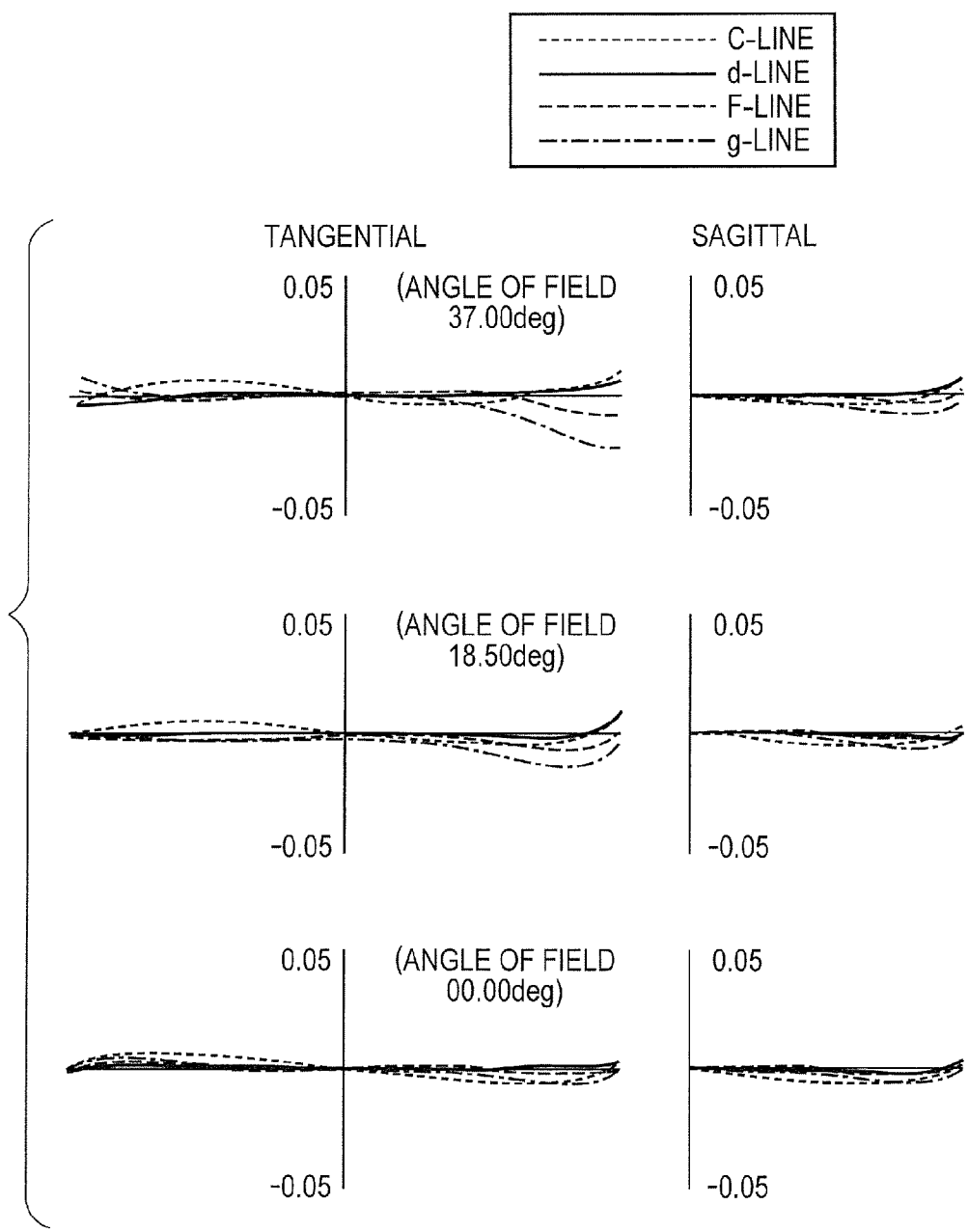
FIG. 33 is a lateral aberration diagram of the imaging optical system according to Example 7 of the present invention.

FIG. 32 illustrates an axial aberration diagram of the imaging optical system of this example, and FIG. 33 illustrates a lateral aberration diagram thereof.

As illustrated in FIG. 32, spherical aberration, axial chromatic aberration, astigmatism, field curvature, distortion, and chromatic spherical aberration are appropriately corrected.

In particular, the light beam in the entire region from a low incident light beam height to a high incident light beam height can be condensed on the image plane, and hence spherical aberration can be very appropriately corrected.

In addition, axial chromatic aberration and chromatic spherical aberration are also very appropriately corrected so that high imaging performance is obtained.

As illustrated in FIG. 33, good performance is obtained in each field angle light beam, and coma, field curvature, and lateral chromatic aberration are appropriately corrected.

In the imaging apparatus of this example, the incident surface of the first lens G1 as the lens closest to the object side and the exit surface of the fifth lens G5 as the lens closest to the image side are aspherical surfaces, which each have an aspherical shape in which the power is reduced in the periphery, and hence spherical aberration is corrected.

In addition, Table 27 shows the specifications of the imaging apparatus of this example.

TABLE 27

| Focal length of imaging optical system | f_sys | 7.499 | (mm) |
|---|---|---|---|
| F value | F/# | 1.0 | |
| Angle of field | 2ω | 74.0 | (deg) |
| Entire length | L_sys | 13.264 | (mm) |
| Distance from exit pupil to image plane | d_pup | 7.166 | (mm) |
| Distance from aperture stop to image plane | d_ape | 8.210 | (mm) |
| Distance from aperture stop to last plane | d_ape_last | 5.819 | (mm) |

In the imaging apparatus of this example, the incident surface of the lens closest to the object side and the exit surface of the lens closest to the image side are aspherical surfaces. Further, the wave front control element is disposed at the position of the aperture stop, so as to improve ability of correcting spherical aberration. Thus, it is possible to realize good imaging performance in the bright optical system of F/1.0 even in the case of a long focal length of 7.499 (mm).

Table 28 shows values of Expressions (1), (2), (4), and (17) of the imaging apparatus of this example.

TABLE 28

| Conditional expression (1) | f_sys/d_pup | 1.05 |
|---|---|---|
| Conditional expression (2) | |R_img|/f_sys | 1.28 |
| Conditional expression (4) | |R_img|/d_pup | 1.34 |
| Conditional expression (17) | d_pup/d_ape | 0.873 |

The value of Expression (1) is 1.05 and satisfies the range of Expression (1). Thus, the optical system of the imaging optical system from the aperture stop to the image side can be close to a point symmetry structure, and hence coma, astigmatism, distortion, and lateral chromatic aberration can be appropriately corrected.

The value of Expression (2) is 1.28 and satisfies the range of Expression (2). Thus, field curvature and astigmatism can be appropriately corrected over a wide angle of field.

The value of Expression (4) is 1.34 and satisfies the range of Expression (4). Thus, the imaging optical system is close to a point symmetry structure, and hence coma, astigmatism, distortion, and lateral chromatic aberration are appropriately corrected. In addition, the imaging apparatus of the example also performs focus adjustment by changing the distance between the imaging optical system and the image plane. Because Expression (4) is satisfied, focus adjustment can be performed in a wide focus adjustment range from infinity to a close distance while maintaining high resolution.

In the imaging apparatus of this example, the radius of curvature of the lens surface closest to the image side is R_last=−7.9006 (mm), and the distance from the aperture stop to the lens surface closest to the image side is d_ape_last=5.819 (mm).

The relationship of Expression (16) is satisfied, and the curvature center from the lens surface closest to the image side is disposed closer to the object side than the aperture stop. Thus, the structure is suitable for appropriately correcting coma generated by the wave front control element WCD.

In addition, the distance from the exit pupil to the image plane of the imaging optical system d_pup=7.166 (mm) is set shorter than the distance from the aperture stop to the image plane d_ape=8.210 (mm). Thus, the field angle light beam expands outward when propagating from the lens surface closest to the image side to the image plane.

Expression (17) is satisfied, and hence the structure is suitable for appropriately correcting coma generated by the wave front control element WCD.

Thus, the very bright imaging apparatus of F/1.0 over an angle of field of 74.0 (degrees) is realized.

(Third Embodiment)

In this embodiment, an imaging optical system having a wide angle and a small F value is structured to change an aperture stop diameter.

Next, the above-mentioned aperture stop is described in more detail.

The aperture stop of this embodiment has a feature that the aperture stop diameter can be variable.

In the ball lens described in Japanese Patent Application Laid-Open No. S63-081413, optical glass is filled in the opening of the aperture stop so that the aperture stop diameter cannot be changed.

Therefore, in this embodiment, the aperture stop is disposed in a fluid medium so that the aperture stop diameter can be variable.

Here, the fluid medium means a gas such as air or a liquid such as water or oil. In general, the fluid medium has a refractive index lower than that of an optical material such as optical glass or optical plastic.

Therefore, a refractive index difference between the fluid medium and the lens surface causes deterioration of optical performance.

For instance, a case of the ball lens in which a space around the aperture stop is filled with the fluid medium is described.

When the ball lens is divided into two at position of the aperture stop and the fluid medium is filled therebetween, the axial light is not affected so much, but the field angle light beam is significantly refracted at the lens surface coming into contact with the fluid medium.

The ball lens corrects aberration by its point symmetry. However, if the field angle light beam is significantly refracted at the interface between the lens surface and the fluid medium, the point symmetry of the optical path is significantly deteriorated so that large aberration occurs as a problem.

Specifically, due to the large refraction at the lens surface, coma, astigmatism, field curvature, or lateral chromatic aberration significantly occurs and causes a problem.

In addition, when the region of the fluid medium is formed as a spherical surface whose center is the aperture stop, the point symmetry is maintained also for the field angle light beam.

However, because the distance to the aperture stop is short, the radius of curvature of the spherical surface becomes small. As a result, there causes a problem of light beam vignetting when a part of the field angle light beam is totally reflected.

In other words, the imaging optical system having a small F value cannot be realized.

Therefore, in this embodiment, the lens surface on the object side of the aperture stop, which comes into contact with the fluid medium, has a shape of a concave surface. Thus, refraction by the lens surface is reduced so as to suppress occurrence of aberration.

In addition, the lens surface on the image side of the aperture stop, which comes into contact with the fluid medium, has a shape of a convex surface. Thus, the power given by the above-mentioned concave surface is canceled. Thus, an angle of the field angle light beam in a rear unit is reset to an angle in a front unit, and the rear unit has a structure close to a point symmetry optical system so that aberration can be appropriately corrected.

In this way, using the structure of this embodiment, it is possible to provide the imaging apparatus that can change the aperture stop diameter in the imaging optical system having a wide angle and a small F value. In particular, a large effect can be obtained in a bright imaging optical system having an F value smaller than F/2.0.

In the following, specific examples of this embodiment are described.

EXAMPLE 8

Figure 34:
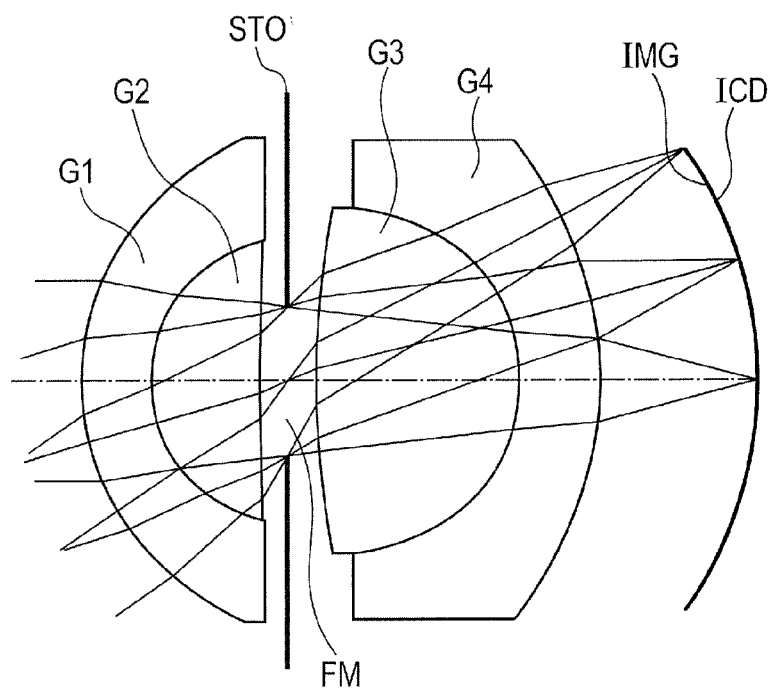
FIG. 34 is a diagram illustrating a structural example of an imaging apparatus according to Example 8 of the present invention.

An imaging optical system used for an imaging apparatus of this example includes the four lenses G1, G2, G3, and G4 and the aperture stop STO disposed in a fluid medium FM as illustrated in FIG. 34.

The imaging optical system includes, in order from the object side: the first lens G1 as a meniscus lens having a convex surface facing the object side; the second lens G2 as a meniscus lens having a convex surface facing the object side; the aperture stop STO; the third lens G3 as a biconvex lens; and the fourth lens G4 as a meniscus lens having a convex surface facing the image side.

In FIG. 34, IMG represents the image plane.

In the imaging apparatus according to this example, the image sensor ICD is formed into a sphere shape so as to form the curved image plane IMG. Thus, good imaging performance is realized over the entire region of the image plane IMG.

Table 29 shows a structure of the imaging apparatus of this example.

Surface number 1 is the incident surface of the first lens G1, surface number 2 is the cemented surface between the exit surface of the first lens G1 and the second lens G2, surface number 3 is the exit surface of the second lens G2, and surface number 4 is the aperture stop STO.

Surface number 5 is the incident surface of the third lens G3, surface number 6 is the cemented surface between the exit surface of the third lens G3 and the incident surface of the fourth lens G4, surface number 7 is the exit surface of the fourth lens G4, and surface number 8 is the image plane IMG.

In Table 29, R represents a radius of curvature (mm), d represents a surface interval (mm), Nd represents a d-line refractive index, and vd represents an Abbe number.

TABLE 29

| Configuration table | | | | |
|---|---|---|---|---|
| Surface number | R | d | Nd | vd |
| 1 | 2.3152 | 0.6287 | 1.79504 | 28.7 |
| 2 | 1.2804 | 0.9803 | 1.54814 | 45.9 |
| 3 | 15.6214 | 0.2500 | | Air |
| 4 (STO) | Flat surface | 0.2500 | | Air |
| 5 | 7.4031 | 1.8338 | 1.72000 | 46.0 |

TABLE 29-continued

Configuration table

| Surface number | R | d | Nd | vd |
|---|---|---|---|---|
| 6 | −1.5547 | 0.7551 | 1.84681 | 23.6 |
| 7 | −3.3021 | 1.4146 | | Air |
| 8 (IMG) | −3.6328 | | | |

In the imaging apparatus of this example, the space between the second lens G2 and the third lens G3 is filled with air as the fluid medium FM. The aperture stop STO is disposed in the air so that the aperture stop STO has a variable aperture stop diameter.

In addition, the refractive index of the air is Nd=1.000, which is significantly lower than that of the optical glass. Therefore, there is a problem in that the field angle light beam is refracted at the interface between the optical glass and the air with a large angle, which causes large aberration.

In the imaging apparatus of this example, too, the refractive index Nd=1.000 of the air is significantly lower than the refractive index $Nd_2$=1.54814 of the second lens G2 and the refractive index $Nd_3$=1.72000 of the third lens G3, there both the second lens G2 and the third lens G3 contact with the air.

Therefore, the exit surface of the second lens (surface number 3) coming into contact with the fluid medium FM on the object side of the aperture stop STO has a concave surface so that the refraction angle of the field angle light beam is reduced. Thus, coma generated at the exit surface of the second lens is suppressed to be small.

The incident surface of the third lens (surface number 5) coming into contact with the fluid medium FM on the image side of the aperture stop STO is has a convex surface, so as to cancel the negative power given by the exit surface of the second lens. Thus, field curvature and lateral chromatic aberration are corrected.

In addition, coma generated by the exit surface of the second lens is corrected.

Thus, even if the fluid medium having a low refractive index is disposed inside the optical system close to a point symmetry structure, aberration of the field angle light beam can be appropriately corrected. Therefore, it is possible to realize the imaging optical system having a variable aperture stop diameter while maintaining high optical performance.

In addition, concerning such problem that the field angle light beam is significantly refracted by the exit surface of the second lens coming into contact with the air so that coma, astigmatism, lateral chromatic aberration, chromatic field curvature, or the like occurs, the imaging apparatus of this example has a further solution so as to realize good aberration correction.

Specifically, the radius of curvature $R_3$=15.6214 (mm) of the exit surface of the second lens (surface number 3) is set larger than the distance $d_3$=0.2500 (mm) from the exit surface of the second lens to the aperture stop STO.

Thus, the refraction angle of each light beam at the exit surface of the second lens is reduced while avoiding vignetting of the field angle light beam by the exit surface of the second lens.

In addition, the radius of curvature $R_5$=7.4031 (mm) of the incident surface of the third lens (surface number 5) is set smaller than the radius of curvature $R_3$=15.6214 (mm) of the exit surface of the second lens (surface number 3).

In other words, a relationship between the radius of curvature Rf of the lens surface coming into contact with the fluid medium FM on the object side of the aperture stop STO and the radius of curvature Rr of the lens surface coming into contact with the fluid medium FM on the image side of the aperture stop STO satisfies the following Expression (18).

$$|R_r| < |R_f| \qquad (18)$$

In this way, a radius of curvature smaller than that of the exit surface of the second lens is given to the incident surface of the third lens, and hence lateral chromatic aberration and chromatic field curvature can be appropriately corrected.

In particular, a relationship between power $\phi_f$ of the lens surface coming into contact with the fluid medium FM on the object side of the aperture stop STO and power (Pr of the lens surface coming into contact with the fluid medium FM on the image side of the aperture stop STO satisfies the following Expression (19). Thus, lateral chromatic aberration and chromatic field curvature can be corrected with good balance.

$$-5 \leq \frac{\phi_r}{\phi_f} \leq -1 \qquad (19)$$

Here, $N_{i+1}$ represents a refractive index of the medium on the image side of the lens surface, $N_i$ represents a refractive index of the medium on the object side of the lens surface, and $R_i$ represents a radius of curvature of the lens surface. Then, power $\phi_i$ of each surface is expressed by the following Expression (20).

$$\phi_i = \frac{(N_{i+1} - N_i)}{R_i} \qquad (20)$$

In the imaging apparatus of this example, power of the exit surface of the second lens is $\phi_3$=−0.0351, power of the incident surface of the third lens is $\phi_5$=0.0973, and a ratio between the power of the exit surface of the second lens and the power of the incident surface of the third lens is $\phi_5/\phi_3$=−2.772.

Because the exit surface of the second lens and the incident surface of the third lens are structured to satisfy Expression (19), lateral chromatic aberration and field curvature can be corrected with good balance.

Thus, imaging performance of the field angle light beam is further improved in the imaging apparatus having a variable aperture stop diameter, a small F value, and a wide angle of field.

Table 30 shows the specifications of the imaging apparatus of this example.

TABLE 30

| Focal length of imaging optical system | f_sys | 3.600 (mm) |
|---|---|---|
| F value | F/# | 1.20 |
| Angle of field | 2ω | 120.0 (deg) |
| Entire length | L_sys | 6.229 (mm) |
| Distance from exit pupil to image plane | d_pup | 3.503 (mm) |

The imaging apparatus of this example has a small F value of F/1.2, a very wide angle of field of 120.0 (degrees), and a compact size with the entire length of 6.229 (mm), which is an example of the imaging apparatus in which brightness, high resolution, a very wide angle of field, and a compact size are realized at the same time.

Table 31 shows values of Expressions (1), (2), and (4) of the imaging apparatus of this example.

TABLE 31

| Conditional expression (1) | f_sys/d_pup | 1.03 |
| --- | --- | --- |
| Conditional expression (2) | |R_img|/f_sys | 1.02 |
| Conditional expression (4) | |R_img|/d_pup | 1.05 |

The value of Expression (1) is 1.03 and satisfies the range of Expression (1). Thus, the optical system of the imaging optical system from the aperture stop to the image side can be close to a point symmetry structure, and hence coma, astigmatism, and lateral chromatic aberration can be appropriately corrected.

The value of Expression (2) is 1.02 and satisfies the range of Expression (2). Thus, field curvature and astigmatism can be appropriately corrected over a wide angle of field of 120.0 (degrees).

When Expressions (1) and (2) are satisfied, focus adjustment can be performed from infinity to a close distance only by changing the distance between the imaging optical system and the image plane without changing the image plane shape.

In addition, in the imaging apparatus of this embodiment, a radius of curvature of the image plane is set substantially equal to the distance from the exit pupil to the image plane of the imaging optical system.

The value of Expression (4) is 1.05 and satisfies the range of Expression (4). Thus, the imaging optical system is close to a point symmetry structure, and hence coma, astigmatism, distortion, and lateral chromatic aberration are appropriately corrected. Further, focus adjustment can be performed while maintaining high resolution in a wide focus adjustment range from infinity to a close distance.

Figure 35:
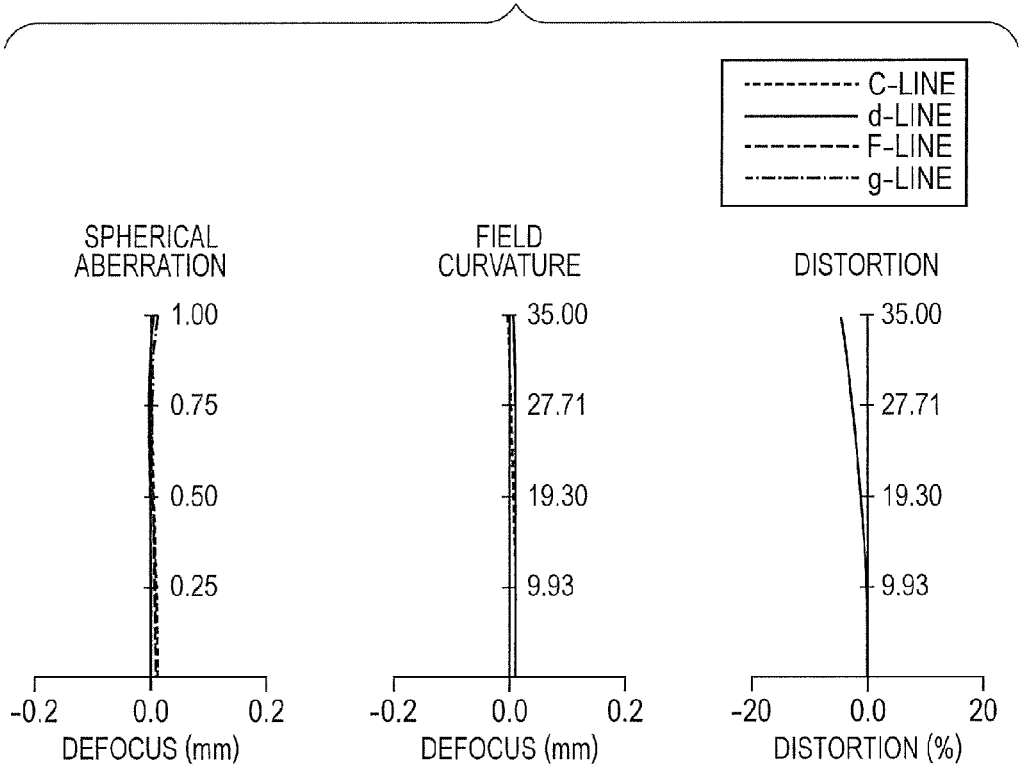
FIG. 35 is an axial aberration diagram of the imaging optical system according to Example 8 of the present invention.
Figure 36:
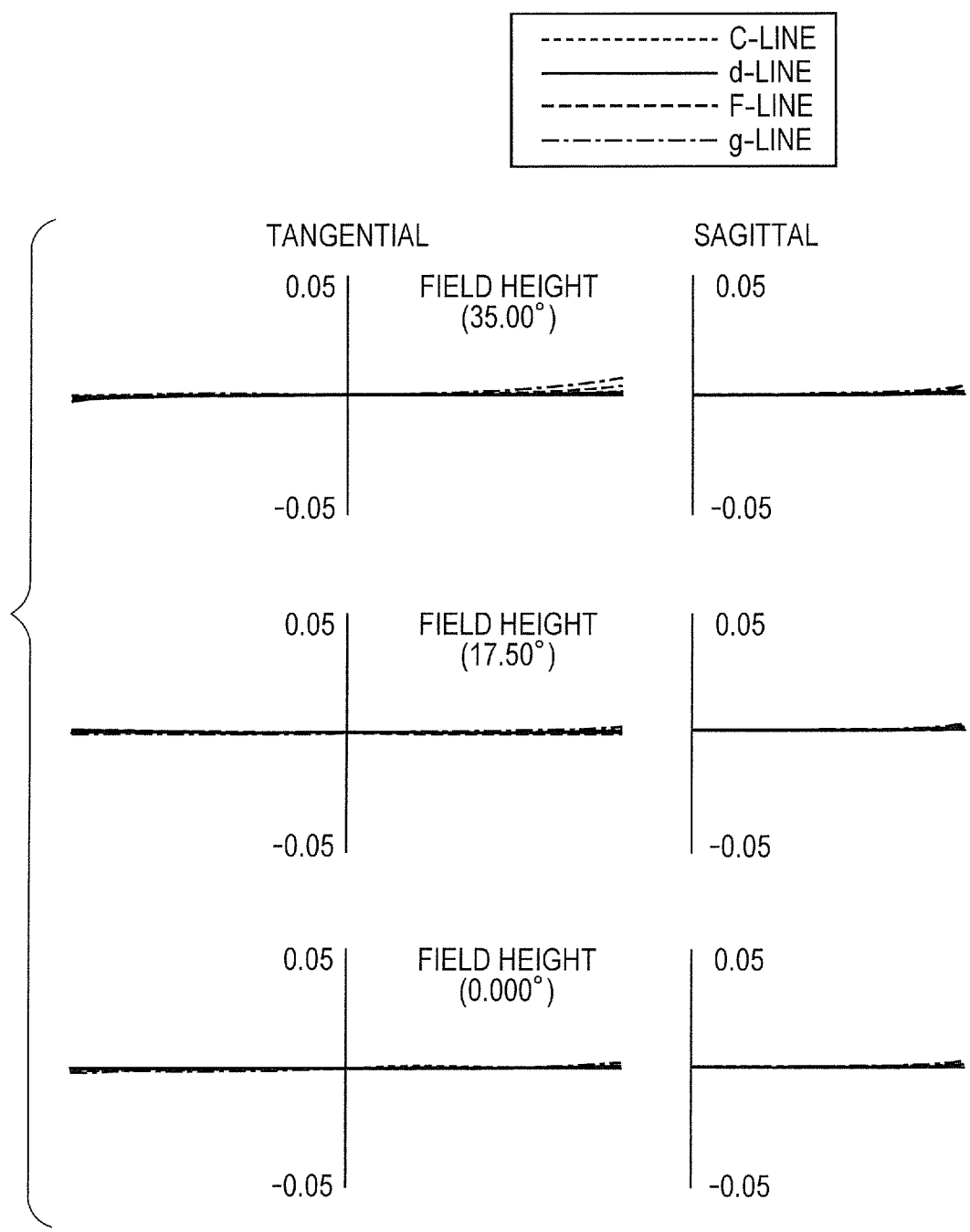
FIG. 36 is a lateral aberration diagram of the imaging optical system according to Example 8 of the present invention.

FIG. 35 illustrates an axial aberration diagram of the imaging optical system of this example, and FIG. 36 illustrates a lateral aberration diagram thereof.

As illustrated in FIG. 35, spherical aberration, axial chromatic aberration, astigmatism, field curvature, distortion, and chromatic spherical aberration are appropriately corrected. Here, the chromatic spherical aberration is defined as a difference between the spherical aberration amount of the reference wavelength (for example, d-line) and the spherical aberration amount of each wavelength (for example, C-line, F-line, or g-line).

As illustrated in FIG. 36, good performance is obtained in each field angle light beam, and coma, field curvature, and lateral chromatic aberration are appropriately corrected. In particular, the effect of this embodiment can be sufficiently exerted on a light beam having a large angle of field (for example, a field angle light beam having an angle of field ω=35 (degrees)), and hence good imaging performance is obtained with a small F value over a wide angle of field.

Next, an action of improving the peripheral darkening is described.

In the imaging optical system of the imaging apparatus of this example, the radius of curvature of the image plane is set substantially equal to the focal length of the imaging optical system so that the focal length can be substantially uniform over the full angle of field.

Thus, the peripheral light intensity ratio can be improved by the square of cos ω.

The largest half angle of field in this example is ω=60.0 (degrees) so that $\cos^2 \omega$ is 0.25 in contrast to $\cos^4 \omega = 0.0625$. Thus, peripheral light intensity can be improved by 4 times.

When Expression (2) is satisfied, it is possible to obtain a reasonable effect.

Further, in the imaging optical system of the imaging apparatus of this example, the radius of curvature of the image plane is set substantially equal to the distance from the exit pupil to the image plane of the imaging optical system, and hence the incident angle to the image plane can be substantially orthogonal.

Thus, the peripheral light intensity ratio can be improved by the first power of cos ω.

The largest half angle of field in this example is ω=60.0 (degrees) so that $\cos^3 \omega$ is 0.125 in contrast to $\cos^4 \omega = 0.0625$. Thus, peripheral light intensity can be improved by 2 times.

When Expression (4) is satisfied, it is possible to obtain a reasonable effect.

When Expressions (2) and (4) are satisfied at the same time, the peripheral light intensity ratio can be improved by the third power of cos ω, and the peripheral light intensity can be increased to be 8 times the conventional value.

Thus, because the peripheral light intensity ratio of the imaging optical system having a wide angle of field can be significantly improved, it is possible to provide the imaging apparatus that can take a high quality image with high contrast and little noise over a wide angle of field.

As described above, using the effect of this embodiment, it is possible to realize the imaging apparatus having good imaging performance over a wide angle of field even at a small F value with a compact structure.

In addition, the peripheral darkening can be significantly improved, and hence it is possible to realize the imaging optical system that is very bright over a wide angle of field.

Thus, because the exposure time can be significantly shortened, it is possible to provide the imaging apparatus that can take a high quality image in which blur due to shaking, image blur due to movement of the object, and noise are appropriately reduced.

In addition, it is possible to provide an imaging optical system with a compact structure in which a defocused subject can be significantly blurred.

Further, using the above-mentioned high performance imaging optical system with the simple structure, focus adjustment can be performed with little deterioration of imaging performance in a wide range from infinity to a close distance.

EXAMPLE 9

Figure 37:
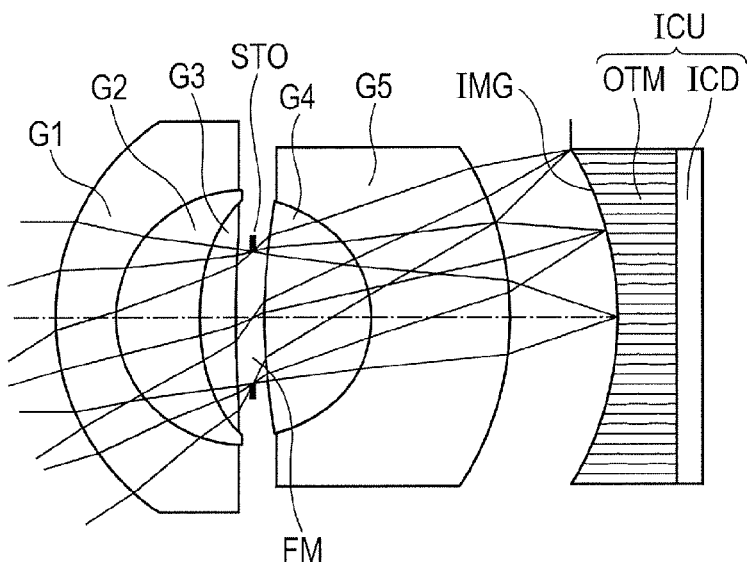
FIG. 37 is a diagram illustrating a structural example of an imaging apparatus according to Example 9 of the present invention.

An imaging optical system used in an imaging apparatus of this example includes five lenses G1, G2, G3, G4, and G5 and the aperture stop STO disposed in the fluid medium as illustrated in FIG. 37.

The imaging optical system includes, in order from the object side: the first lens G1 as a meniscus lens having a convex surface facing the object side; the second lens G2 as a meniscus lens having a convex surface facing the object side; the third lens G3 as a meniscus lens having a convex surface facing the object side; the aperture stop STO; the fourth lens G4 as a biconvex lens; and the fifth lens G5 as a meniscus lens having a convex surface facing the image side.

The aperture stop STO of the imaging apparatus of this example is disposed in the air layer between the third lens G3 and the fourth lens G4, and the variable aperture stop can be disposed.

In the imaging apparatus according to this example, the image sensor ICD is formed into a sphere shape so as to form the curved image plane IMG. Thus, good imaging performance is realized over the entire region of the image plane IMG.

In addition, IMG in FIG. 37 represents the image plane and the incident surface of the optical transmission unit OTM. The image plane is formed into a sphere shape so as to form the curved image plane IMG. Thus, good imaging performance is realized over the entire region of the image plane IMG.

The optical transmission unit OTM of this example is an image fiber formed of bound optical fibers of a few micron pitch and has a role of transmitting an image formed on the image plane of the imaging optical system to the image sensor ICD.

The incident surface of the optical transmission unit OTM is formed into a spherically curved shape, and the exit surface is formed as a flat surface so as to be in intimate contact with the image sensor ICD for connection. Thus, the imaging unit ICU is formed.

The incident surface shape of the optical transmission unit OTM is formed along the field curvature of the imaging optical system. Thus, good image formation is realized over the entire region of the image plane IMG.

The optical transmission unit OTM is used in this example. However, compared with a structure in which the image sensor itself is formed into a spherical surface shape, there is the advantage of easy production of the imaging unit ICU in which one surface of the optical transmission unit OTM is formed into a spherical surface shape while the other surface is connected to the image sensor ICD.

Table 32 shows a structure of the imaging apparatus of this example.

Surface number 1 is the incident surface of the first lens G1, surface number 2 is the cemented surface between the exit surface of the first lens G1 and the incident surface of the second lens G2, and surface number 3 is the cemented surface between the exit surface of the second lens G2 and the incident surface of the third lens G3. Surface number 4 is the exit surface of the third lens G3 and is connected to the air layer.

Surface number 5 is the aperture stop STO and is disposed in the air layer.

Surface number 6 is the incident surface of the fourth lens G4, surface number 7 is the cemented surface between the exit surface of the fourth lens G4 and the incident surface of the fifth lens G5, and surface number 8 is the exit surface of the fifth lens G5.

Surface number 9 is the image plane IMG and is the incident surface of the optical transmission unit OTM of the imaging unit ICU. Further, the exit surface of the optical transmission unit OTM is connected to the image sensor ICD.

In Table 32, R represents a radius of curvature (mm), d represents a surface interval (mm), Nd represents a d-line refractive index, and νd represents an Abbe number.

TABLE 32

| Surface number | R | d | Nd | νd |
| --- | --- | --- | --- | --- |
| 1 | 9.2950 | 2.3612 | 2.001100 | 23.6 |
| 2 | 5.0329 | 3.2825 | 1.726350 | 26.1 |
| 3 | 7.6974 | 1.4531 | 1.670939 | 55.7 |
| 4 | 43.5438 | 0.6507 | Air | |
| 5 (STO) | Infinity | 0.5000 | Air | |
| 6 | 25.3784 | 4.2148 | 1.882997 | 40.8 |
| 7 | −4.6940 | 5.4967 | 2.000800 | 25.0 |
| 8 | −12.3234 | 4.3457 | Air | |
| 9 (IMG) | −12.4205 | | | |

In the imaging apparatus of this example, the space between the third lens G3 and the fourth lens G4 is filled with air as the fluid medium FM. The aperture stop STO is disposed in the air, and the aperture stop diameter is variable.

The lens surface coming into contact with the air layer on the object side of the aperture stop STO is the exit surface of the third lens (surface number 4), and the lens surface coming into contact with the air layer on the image side of the aperture stop STO is the incident surface of the fourth lens G4 (surface number 6).

The exit surface of the third lens has a shape of a concave surface, and the incident surface of the fourth lens G4 has a shape of a convex surface.

Thus, it is possible to provide the imaging apparatus having high imaging performance over a wide angle of field and a variable aperture stop diameter.

In addition, concerning such problem that the field angle light beam is significantly refracted by the exit surface of the third lens coming into contact with the air so that coma, astigmatism, lateral chromatic aberration, chromatic field curvature, or the like occurs, the imaging apparatus of this example has a further solution so as to realize good aberration correction.

Specifically, the radius of curvature $R_4$=43.5438 (mm) of the exit surface of the third lens is set larger than the distance $d_4$=0.6507 (mm) from the exit surface of the third lens to the aperture stop STO.

Thus, the refraction angle at the exit surface of the third lens is reduced while avoiding vignetting of the field angle light beam by the exit surface.

In addition, the radius of curvature $R_6$=25.3784 (mm) of the incident surface of the fourth lens is set smaller than the radius of curvature $R_4$=43.5438 (mm) of the exit surface of the third lens. Thus, the relationship of Expression (18) is satisfied.

In this way, a radius of curvature smaller than that of the exit surface of the third lens is given to the incident surface of the fourth lens, and hence lateral chromatic aberration and chromatic field curvature can be appropriately corrected.

Further, power of the exit surface of the third lens is $\phi_4$=−0.0154, power of the incident surface of the fourth lens is $\phi_6$=0.0348, and a ratio between the power of the exit surface of the third lens and the power of the incident surface of the fourth lens is $\phi_6/\phi_4$=−2.258.

Because the exit surface of the third lens and the incident surface of the fourth lens are structured to satisfy Expression (19), lateral chromatic aberration and field curvature can be corrected with good balance.

Thus, imaging performance of the field angle light beam is further improved in the imaging apparatus having a variable aperture stop diameter, a small F value, and a wide angle of field.

Further, Table 33 shows the specifications of the imaging apparatus of this example.

TABLE 33

| Focal length of imaging optical system | f_sys | 11.997 (mm) |
| --- | --- | --- |
| F value | F/# | 1.6 |
| Angle of field | 2ω | 65.5 (deg) |
| Entire length | L_sys | 17.959 (mm) |
| Distance from exit pupil to image plane | d_pup | 14.060 (mm) |

The imaging apparatus of this example is an example of the imaging optical system in which the aperture stop is disposed in the air layer, and the variable aperture stop is adopted.

With the simple structure of five lenses, the bright optical system of F/1.6 is realized.

In addition, the entire length is 17.959 (mm) in contrast to the focal length 11.997 (mm) so that the compact optical system of L_sys/f_sys=1.50 is realized.

Table 34 shows values of Expressions (1), (2), and (4) of the imaging apparatus of this example.

TABLE 34

| Conditional expression (1) | f_sys/d_pup | 0.85 |
| Conditional expression (2) | |R_img|/f_sys | 1.04 |
| Conditional expression (4) | |R_img|/d_pup | 0.88 |

The value of Expression (1) is 0.85 and satisfies the range of Expression (1). Thus, the optical system of the imaging optical system in the image side of the aperture stop can be close to a point symmetry structure, and hence coma, astigmatism, and lateral chromatic aberration can be appropriately corrected.

The value of Expression (2) is 1.04 and satisfies the range of Expression (2). Thus, field curvature and astigmatism can be appropriately corrected over an angle of field of 65.5 (degrees).

When Expressions (1) and (2) are satisfied, focus adjustment can be performed from infinity to a close distance only by changing the distance between the imaging optical system and the image plane without changing the image plane shape.

The value of Expression (4) is 0.88 and satisfies the range of Expression (4). Thus, the field curvature due to focus adjustment can be suppressed to be very small at an object distance in a wide range from infinity to a close distance so that high resolution photography can be performed.

In this way, also in this example, it is possible to realize the imaging apparatus having good imaging performance over a wide angle of field even at a small F value with a compact structure.

Figure 38:
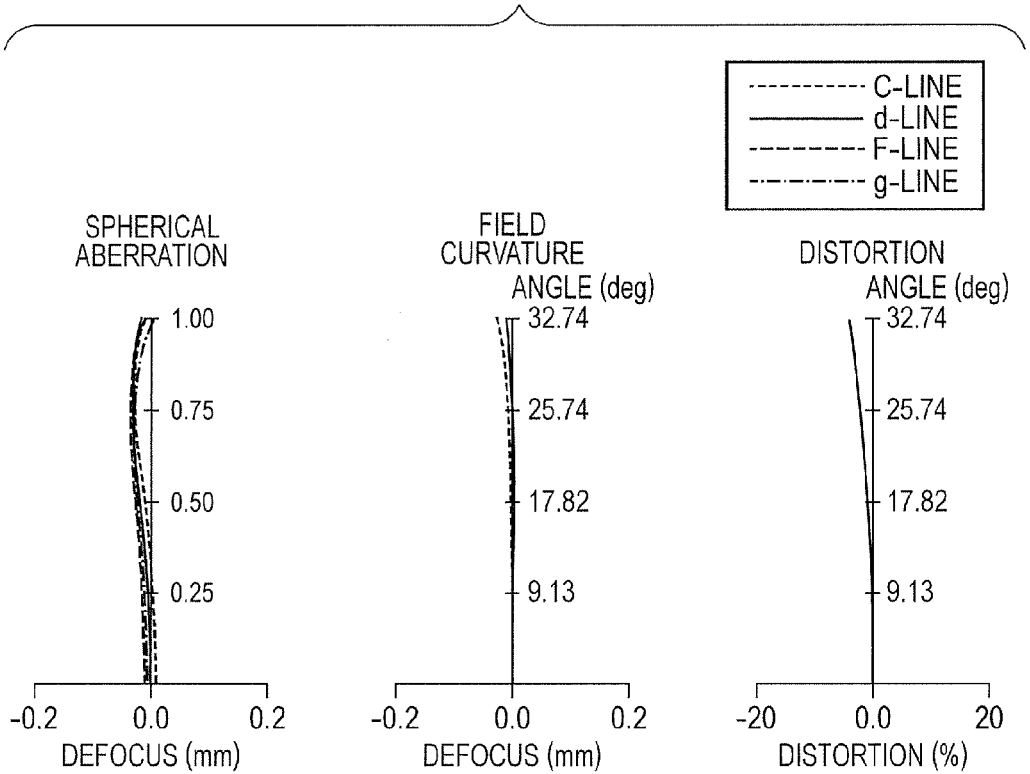
FIG. 38 is an axial aberration diagram of an imaging optical system according to Example 9 of the present invention.
Figure 39:
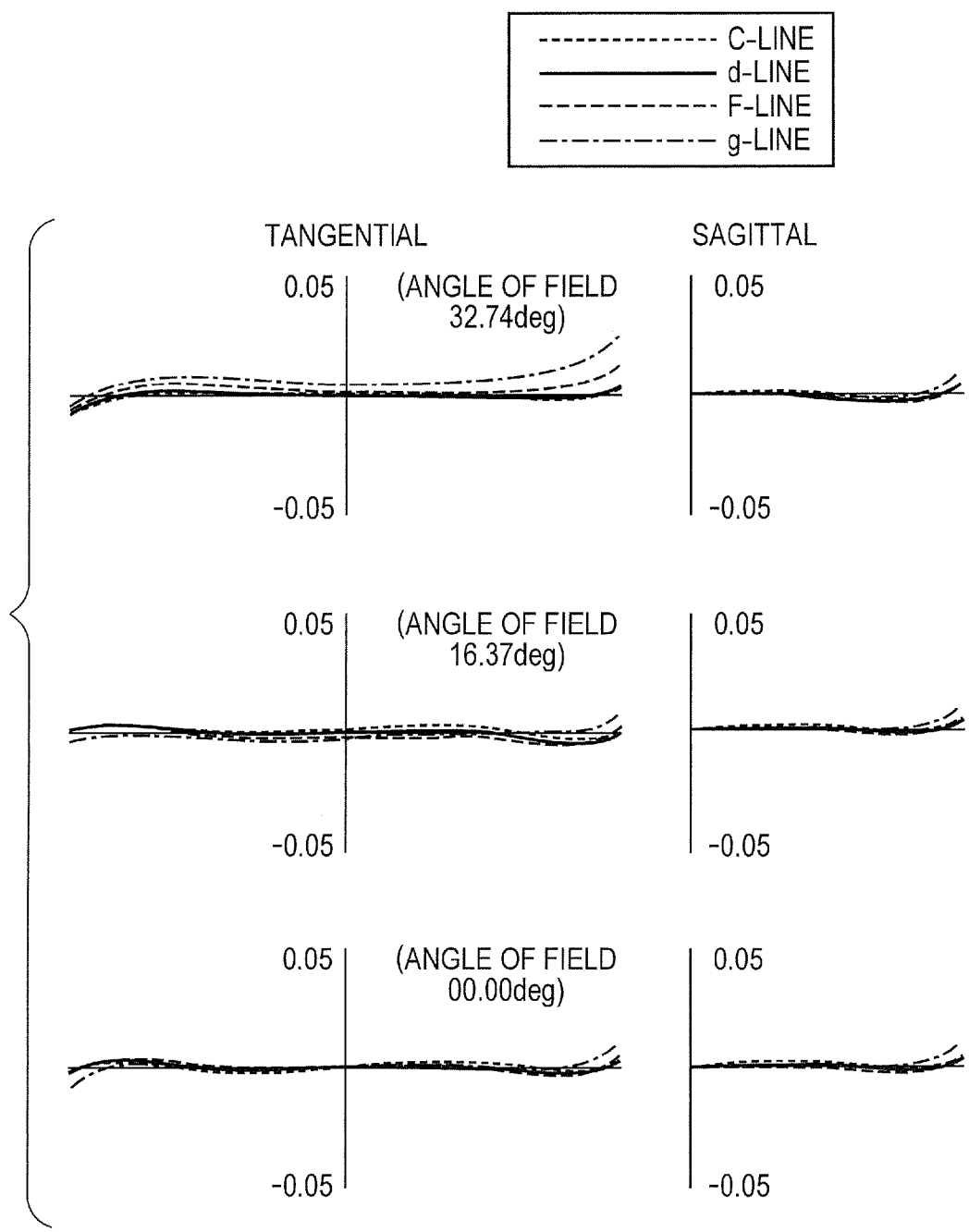
FIG. 39 is a lateral aberration diagram of the imaging optical system according to Example 9 of the present invention.

FIG. 38 illustrates an axial aberration diagram of the imaging optical system of this example, and FIG. 39 illustrates a lateral aberration diagram thereof.

As illustrated in FIG. 38, spherical aberration, axial chromatic aberration, astigmatism, field curvature, and chromatic spherical aberration are appropriately corrected.

Because the spherical aberration and the chromatic spherical aberration are appropriately corrected, good imaging performance is realized also at a small F value.

In addition, because astigmatism and field curvature are appropriately corrected, good imaging performance is realized also in a wide angle of field.

In particular, astigmatism is corrected, and the effect of this embodiment is sufficiently exerted.

As illustrated in FIG. 39, coma, field curvature, and lateral chromatic aberration are appropriately corrected, and good performance is obtained in each field angle light beam.

In particular, coma is corrected, and the effect of this embodiment is sufficiently exerted.

EXAMPLE 10

Figure 40:
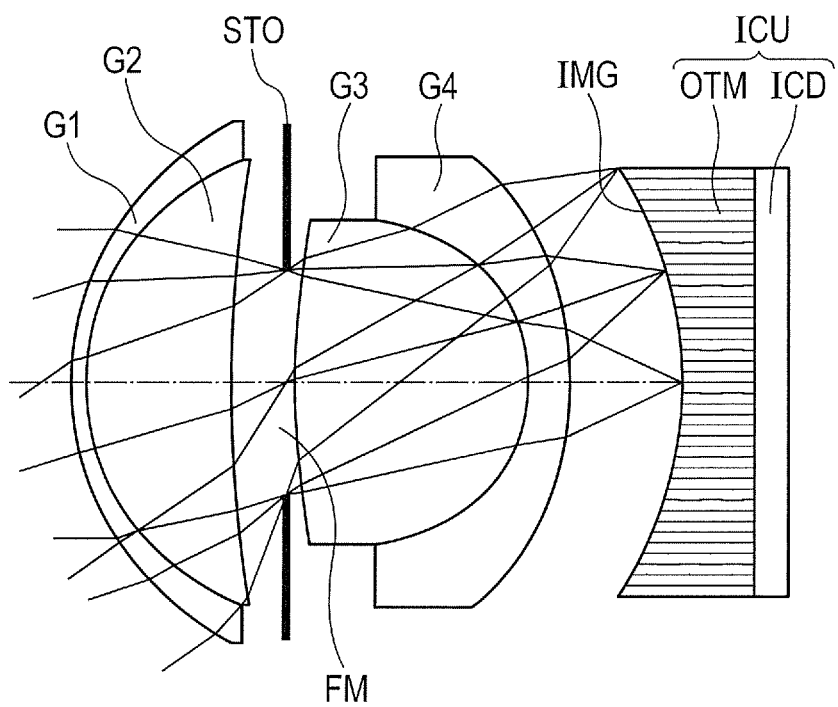
FIG. 40 is a diagram illustrating a structural example of an imaging apparatus according to Example 10 of the present invention.

An imaging optical system used in an imaging apparatus of this example includes four lenses G1, G2, G3, and G4 and the aperture stop STO disposed in the fluid medium as illustrated in FIG. 40.

The imaging optical system includes, in order from the object side: the first lens G1 as a meniscus lens having a convex surface facing the object side; the second lens G2 as a meniscus lens having a convex surface facing the object side; the aperture stop STO; the third lens G3 as a biconvex lens; and the fourth lens G4 as a meniscus lens having a convex surface facing the image side.

Similarly in the imaging apparatus of this example, the aperture stop STO is disposed in the air layer between the second lens G2 and the third lens G3, and the variable aperture stop is disposed. The imaging unit ICU of this example is the same as that in Example 9. Table 35 shows a structure of the imaging apparatus of this example. Surface number 1 is the incident surface of the first lens G1 and has a rotation symmetry aspherical shape expressed by the polynomial of Expression (11). Surface number 2 is the cemented surface between the exit surface of the first lens G1 and the incident surface of the second lens G2. Surface number 3 is the exit surface of the second lens G2 and has a rotation symmetry aspherical shape expressed by the polynomial of Expression (11). Surface number 4 is the aperture stop STO and is disposed in the air layer. The surface number 5 is the incident surface of the third lens G3 and has a rotation symmetry aspherical shape expressed by the polynomial of Expression (11). The surface number 6 is the cemented surface between the exit surface of the third lens G3 and the incident surface of the fourth lens G4. Surface number 7 is the exit surface of the fourth lens G4 and has a rotation symmetry aspherical shape expressed by the polynomial of Expression (11). Surface number 8 is the image plane IMG, which is the incident surface of the optical transmission unit OTM. Further, the exit surface of the optical transmission unit OTM (not shown) is connected to the image sensor ICD.

In Table 35, R represents a radius of curvature (mm), d represents a surface interval (mm), Nd represents a d-line refractive index, and vd represents an Abbe number. Note that, the surface with a mark "(a)" is an aspherical surface.

TABLE 35

| Configuration table | | | | |
| --- | --- | --- | --- | --- |
| Surface number | R | d | Nd | vd |
| 1 | 9.0343(a) | 0.5000 | 2.00270 | 19.3 |
| 2 | 7.6693 | 4.7626 | 1.62230 | 53.2 |
| 3 | 52.9741(a) | 1.7051 | Air | |
| 4 (STO) | Flat surface | 0.3000 | Air | |
| 5 | 23.2147(a) | 7.6142 | 1.69500 | 42.2 |
| 6 | −5.2287 | 1.3812 | 1.92286 | 20.9 |
| 7 | −11.4729(a) | 3.6728 | Air | |
| 8 (IMG) | −12.4694 | | | |

As to the imaging apparatus of this example, Table 36(A) shows aspherical surface coefficients of surface number 1. Table 36(B) shows aspherical surface coefficients of surface number 3. Table 36(C) shows aspherical surface coefficients of surface number 5. Table 36(D) shows aspherical surface coefficients of surface number 7.

TABLE 36(A)

| Aspherical surface coefficients (Surface number 1) | | |
| --- | --- | --- |
| Parameter | Symbol | Value |
| Conic constant | K | −9.38334E−02 |
| Fourth order coefficient | A | −4.58788E−06 |
| Sixth order coefficient | B | −1.37765E−07 |
| Eighth order coefficient | C | 1.61144E−09 |
| Tenth order coefficient | D | −4.58504E−11 |

TABLE 36(B)

Aspherical surface coefficients (Surface number 3)

| Parameter | Symbol | Value |
|---|---|---|
| Conic constant | K | 2.56112E+01 |
| Fourth order coefficient | A | 1.25978E−05 |
| Sixth order coefficient | B | −9.35781E−07 |
| Eighth order coefficient | C | 1.11123E−08 |
| Tenth order coefficient | D | −6.72938E−11 |

TABLE 36(C)

Aspherical surface coefficients (Surface number 5)

| Parameter | Symbol | Value |
|---|---|---|
| Conic constant | K | 9.31013E+00 |
| Fourth order coefficient | A | −2.54505E−04 |
| Sixth order coefficient | B | 3.67515E−08 |
| Eighth order coefficient | C | −2.31857E−07 |
| Tenth order coefficient | D | 7.60027E−09 |

TABLE 36(D)

Aspherical surface coefficients (Surface number 7)

| Parameter | Symbol | Value |
|---|---|---|
| Conic constant | K | −1.46966E−01 |
| Fourth order coefficient | A | −8.44255E−05 |
| Sixth order coefficient | B | −3.95820E−07 |
| Eighth order coefficient | C | −4.20813E−08 |
| Tenth order coefficient | D | −1.12533E−10 |

In the imaging apparatus of this example, the space between the second lens G2 and the third lens G3 is filled with air as the fluid medium FM. The aperture stop STO is disposed in the air, and the aperture stop diameter is variable.

The lens surface coming into contact with the air layer on the object side of the aperture stop STO is the exit surface of the second lens (surface number 3), and the lens surface coming into contact with the air layer on the image side of the aperture stop STO is the incident surface of the third lens G3 (surface number 5).

Also in the imaging apparatus of this example, the exit surface of the second lens (surface number 3) is a concave surface, and the incident surface of the third lens G3 (surface number 5) is a convex surface.

Thus, it is possible to provide the imaging apparatus having high imaging performance over a wide angle of field and a variable aperture stop diameter.

In addition, concerning such problem that the field angle light beam is significantly refracted by the exit surface of the second lens coming into contact with the air so that coma, astigmatism, lateral chromatic aberration, chromatic field curvature, or the like occurs, the imaging apparatus of this example has a further solution so as to realize good aberration correction.

Specifically, the radius of curvature $R_3$=52.9741 (mm) of the exit surface of the second lens (surface number 3) is set larger than the distance $d_3$=1.7051 (mm) from the exit surface of the second lens (surface number 3) to the aperture stop STO.

Thus, the refraction angle is reduced while avoiding vignetting of the field angle light beam by the exit surface of the second lens.

In addition, the radius of curvature $R_5$=23.2147 (mm) of the incident surface of the third lens G3 (surface number 5) is set smaller than the radius of curvature $R_3$=52.9741 (mm) of the exit surface of the second lens (surface number 3), and the following Expression (18) is satisfied.

In this way, a radius of curvature smaller than that of the exit surface of the second lens is given to the incident surface of the third lens, and hence lateral chromatic aberration and chromatic field curvature can be appropriately corrected.

Further, power of the exit surface of the second lens is $\phi_3$=−0.0117, power of the incident surface of the third lens is $\phi_5$=0.0299, and a ratio between the power of the exit surface of the second lens and the power of the incident surface of the third lens is $\phi_5/\phi_3$=−2.549.

Because the exit surface of the third lens and the incident surface of the fourth lens are structured to satisfy Expression (19), lateral chromatic aberration and field curvature can be corrected with good balance.

Thus, imaging performance of the field angle light beam is further improved in the imaging apparatus having a variable aperture stop diameter, a small F value, and a wide angle of field.

In addition, in the imaging apparatus of this example, the distance $d_5$=0.3000 (mm) from the aperture stop STO to the incident surface of the third lens G3 is set shorter than the distance $d_3$=1.7051 (mm) from the exit surface of the second lens to the aperture stop STO.

Therefore, lateral chromatic aberration can be corrected more appropriately.

Thus, imaging performance of the field angle light beam can be improved more in the imaging apparatus having a small F value and a wide angle of field.

Figure 41A:
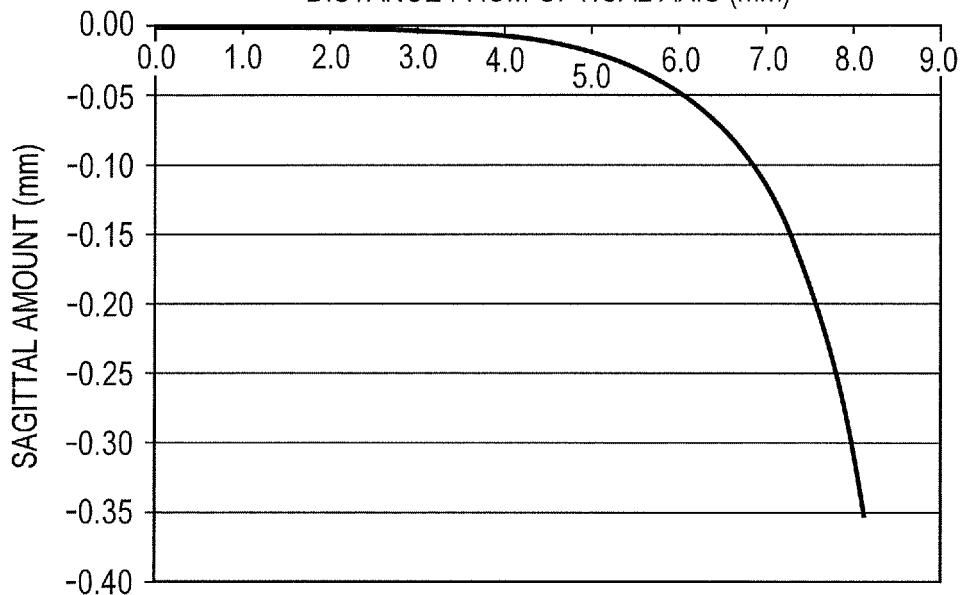
FIG. 41A is a diagram showing an aspherical amount of an imaging optical system used for the imaging apparatus according to Example 10 of the present invention.
Figure 41B:
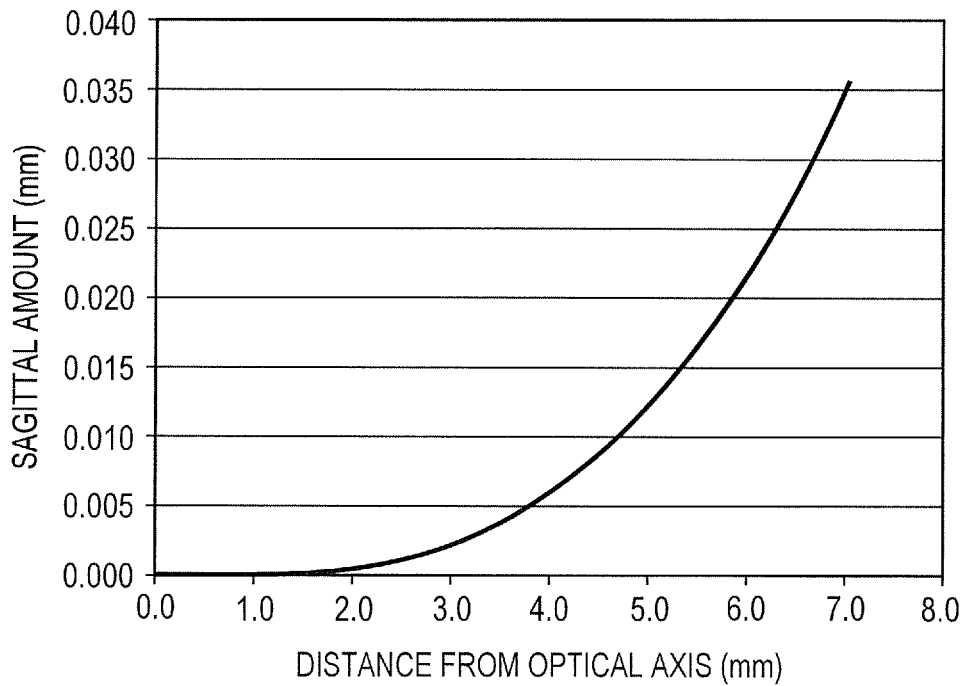
FIG. 41B is a diagram showing the aspherical amount of the imaging optical system used for the imaging apparatus according to Example 10 of the present invention.
Figure 42A:
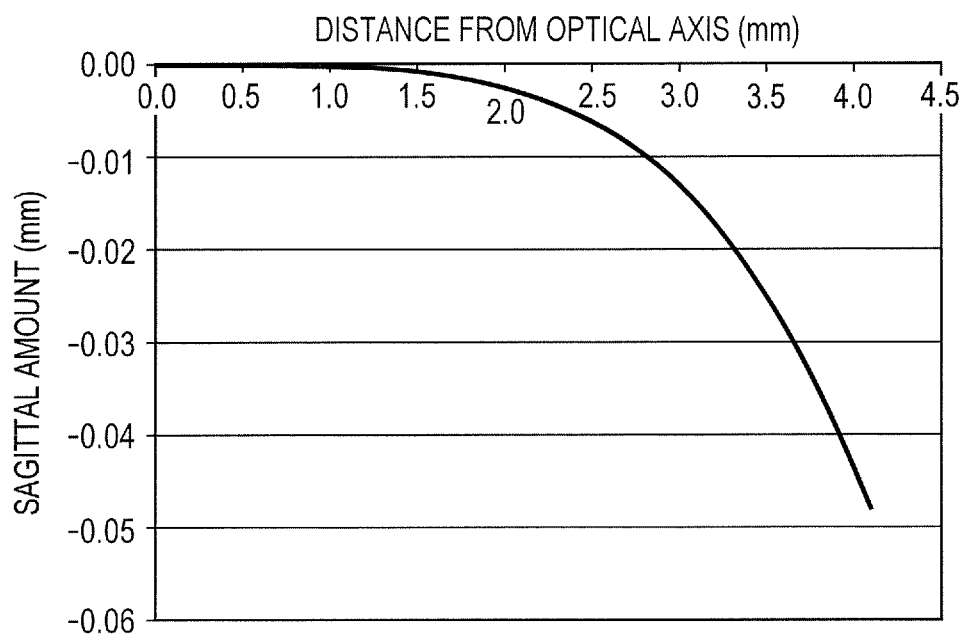
FIG. 42A is a diagram illustrating the aspherical amount of the imaging optical system used for the imaging apparatus according to Example 10 of the present invention.
Figure 42B:
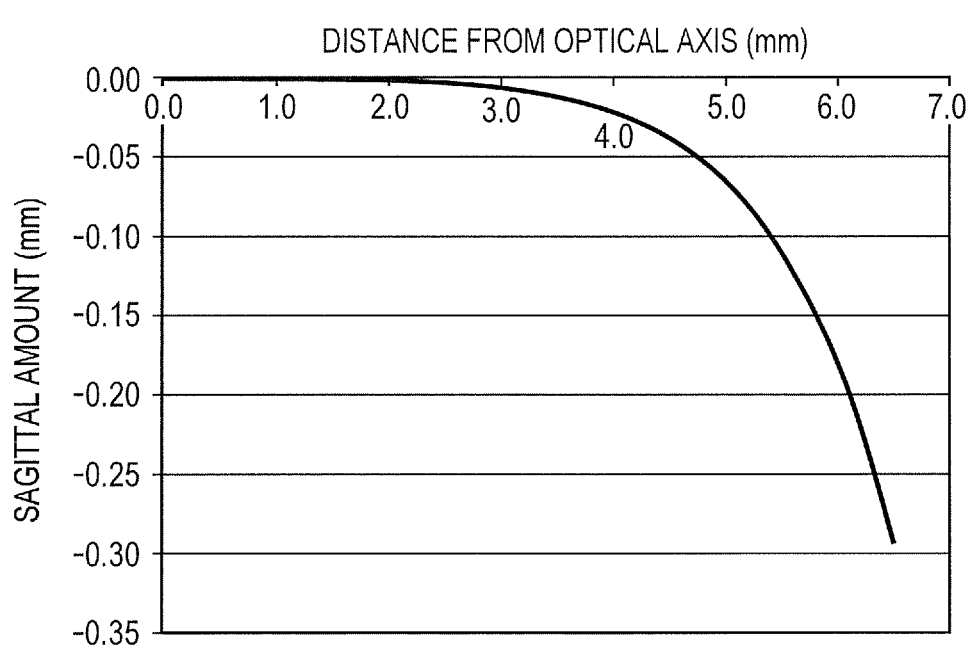
FIG. 42B is a diagram illustrating the aspherical amount of the imaging optical system used for the imaging apparatus according to Example 10 of the present invention.

In addition, FIG. 41A shows an aspherical amount of surface number 1, FIG. 41B shows an aspherical amount of surface number 3, FIG. 42A shows an aspherical amount of surface number 5, and FIG. 42B shows an aspherical amount of surface number 7.

Here, the aspherical amount means a sag amount $\Delta Z_{ASP}$ that is a displacement of the aspherical surface from the reference spherical surface to the optical axis direction, and is obtained by subtracting a sag amount of the spherical surface from a sag amount of an aspherical surface polynomial of Expression (11).

Specifically, the aspherical amount is expressed by the following Expression (21).

$$\Delta z_{ASP} = \left( \frac{cr^2}{1+\sqrt{1-(1+k)c^2r^2}} + Ar^4 + Br^6 + Cr^8 + Dr^{10} \right) - \left( \frac{cr^2}{1+\sqrt{1-c^2r^2}} \right) \quad (21)$$

The aspherical amount of surface number 1 is negative in the periphery of the lens surface and is displaced from the reference spherical surface to the object side.

The aspherical amount of surface number 3 is positive in the periphery of the lens surface and is displaced from the reference spherical surface to the object side. The aspherical amount of surface number 5 is negative in the periphery of the lens surface and is displaced from the reference spherical surface to the object side.

The aspherical amount of surface number 7 is negative in the periphery of the lens surface and is displaced from the reference spherical surface to the object side.

By these aspherical shapes, more appropriate imaging performance is obtained.

In particular, the exit surface of the second lens (surface number 3) is a concave surface, the aspherical shape displaced from the reference spherical surface to the image side in the periphery of the lens surface (having a positive aspherical amount) is given, and a negative power component is added to the periphery. Thus, aberration generated by the air layer can be appropriately corrected.

Further, the incident surface of the third lens G3 (surface number 5) is a convex surface, the aspherical shape displaced from the reference spherical surface to the object side in the periphery of the lens surface (having a negative aspherical amount) is given, and a negative power component is added to the periphery. Thus, aberration generated by the air layer can be appropriately corrected.

Further, when the configurations of both the lenses are realized at the same time, aberration can be corrected more appropriately so that high imaging performance can be obtained.

Table 37 shows the specifications of the imaging apparatus of this example.

TABLE 37

| Focal length of imaging optical system | f_sys | 11.997 | (mm) |
| F value | F/# | 1.20 | |
| Angle of field | 2ω | 70.0 | (deg) |
| Entire length | L_sys | 16.263 | (mm) |
| Distance from exit pupil to image plane | d_pup | 12.968 | (mm) |

The imaging apparatus of this example has a remarkably small F value of F/1.2, a wide angle of field of 70.0 (degrees), and a compact size with the entire length of 16.263 (mm), which is an example of the imaging apparatus in which brightness, high resolution, and a compact size are realized at the same time.

Table 38 shows values of Expressions (1), (2), and (4) of the imaging apparatus of this example.

TABLE 38

| Conditional expression (1) | f_sys/d_pup | 1.07 |
| Conditional expression (2) | |R_img|/f_sys | 1.04 |
| Conditional expression (4) | |R_img|/d_pup | 1.11 |

The value of Expression (1) is 1.07 and satisfies the range of Expression (1). Thus, the optical system of the imaging optical system from the aperture stop to the image side can be close to a point symmetry structure, and hence coma, astigmatism, distortion, and lateral chromatic aberration can be appropriately corrected.

The value of Expression (2) is 1.04 and satisfies the range of Expression (2). Thus, field curvature and astigmatism can be appropriately corrected over a wide angle of field of 70.0 (degrees).

The value of Expression (4) is 1.11 and satisfies the range of Expression (4). Thus, the imaging optical system is close to a point symmetry structure, and hence coma, astigmatism, distortion, and lateral chromatic aberration are appropriately corrected.

Further, in the imaging apparatus of this example, the distance between the imaging optical system and the image plane is changed so as to perform focus adjustment. Because Expression (4) is satisfied, focus adjustment can be performed while maintaining high resolution in a wide focus adjustment range from infinity to a close distance.

Figure 43:
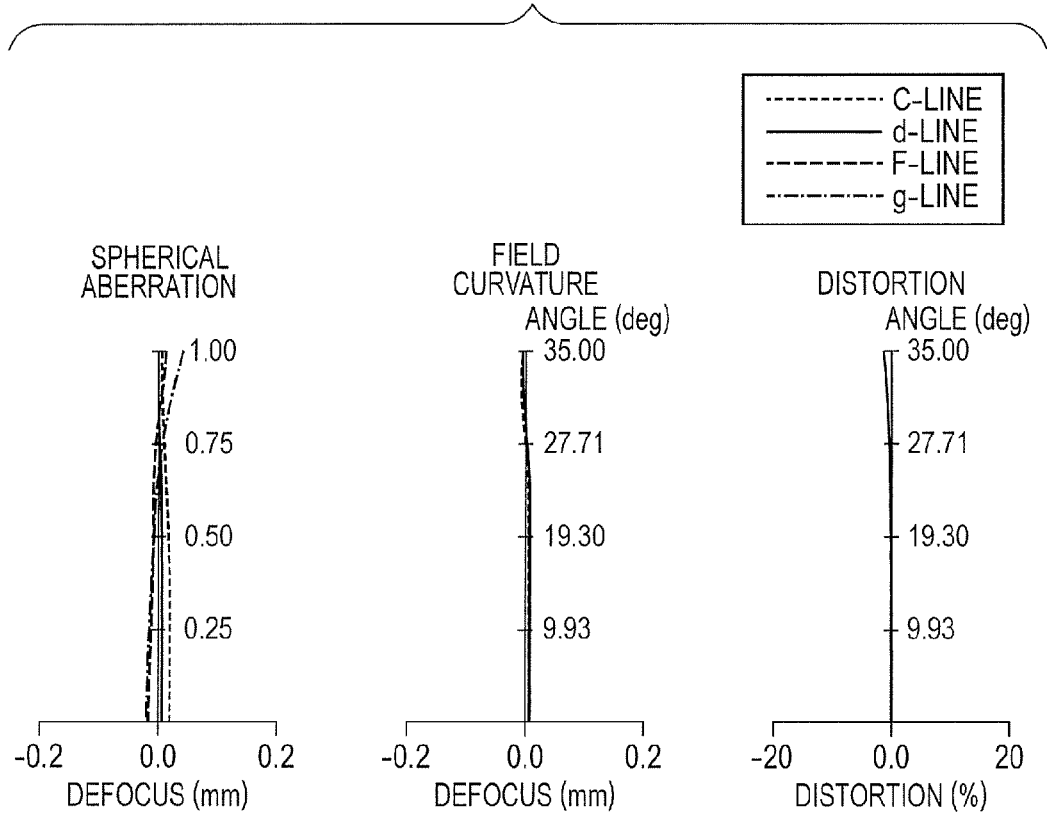
FIG. 43 is an axial aberration diagram of the imaging optical system according to Example 10 of the present invention.
Figure 44:
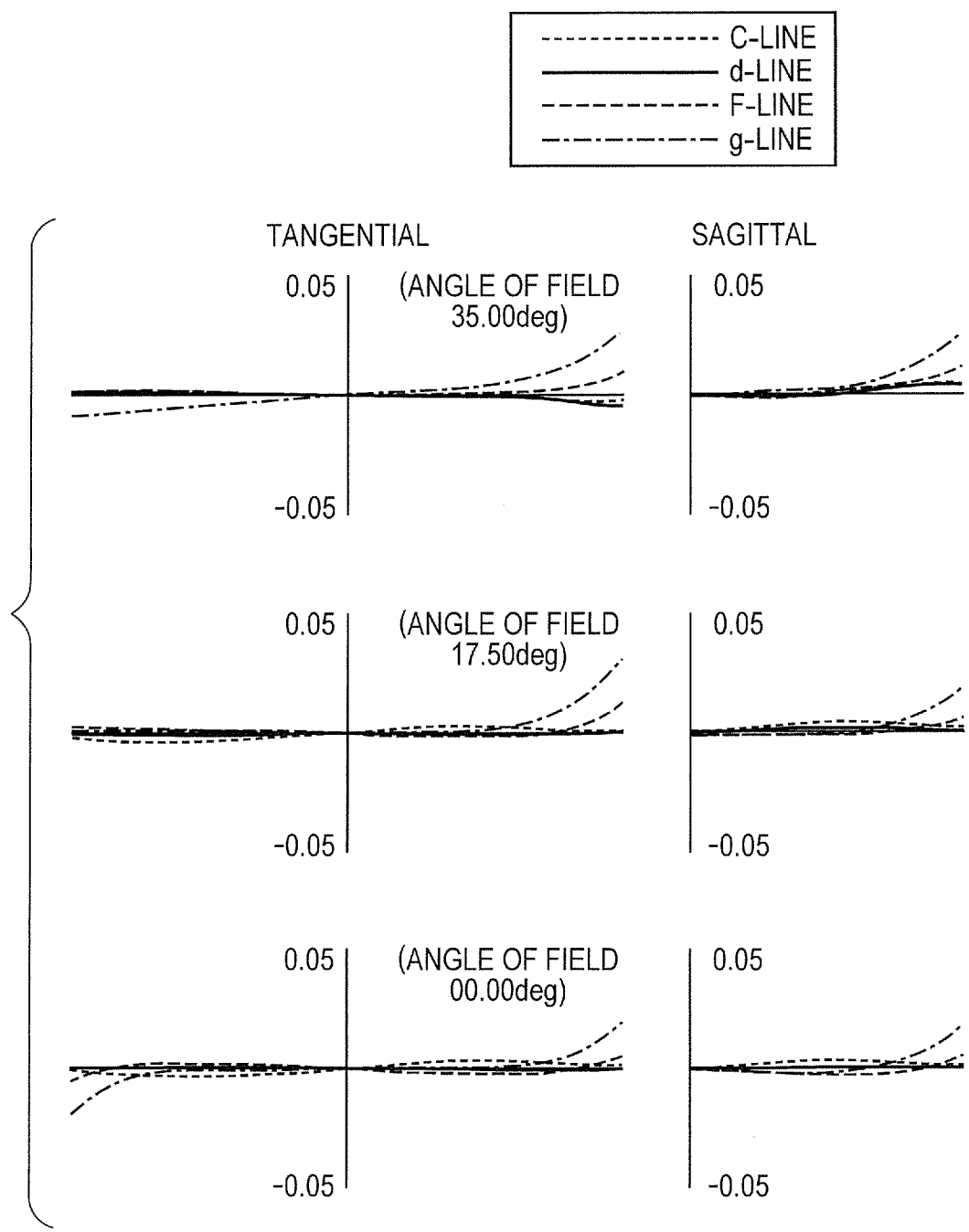
FIG. 44 is a lateral aberration diagram of the imaging optical system according to Example 10 of the present invention.

FIG. 43 illustrates an axial aberration diagram of the imaging optical system of this example, and FIG. 44 illustrates a lateral aberration diagram thereof. As illustrated in FIG. 43, spherical aberration, axial chromatic aberration, astigmatism, field curvature, and chromatic spherical aberration are appropriately corrected. In particular, the light beam can be condensed on the image plane in the entire range from a low incident height light ray to a high incident height light ray. Thus, spherical aberration can be very appropriately corrected.

In addition, axial chromatic aberration and chromatic spherical aberration are also very appropriately corrected, and hence high imaging performance can be obtained.

As illustrated in FIG. 44, coma, field curvature, and lateral chromatic aberration are appropriately corrected, and good performance is obtained in each field angle light beam.

As in this example, both the lens surface closest to the object side and the lens surface closest to the image side can be aspherical surfaces to which the aspherical amount displaced from the reference spherical surface to the outside of the imaging optical system in the periphery of the lens surface is given. Thus, spherical aberration can be corrected with high accuracy over a wide angle of field.

EXAMPLE 11

Figure 45:
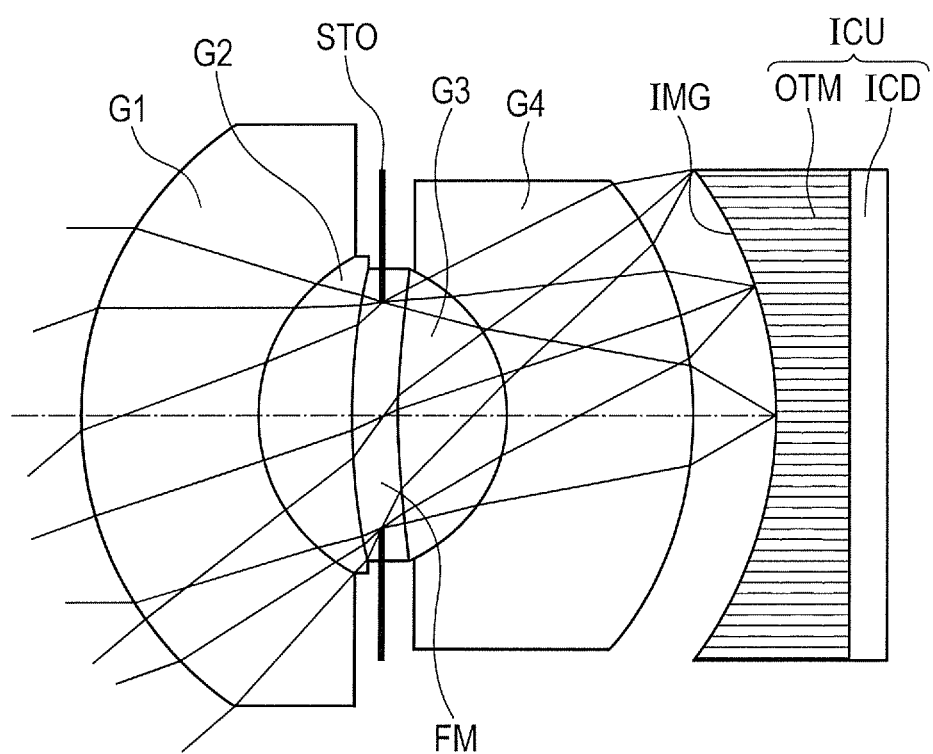
FIG. 45 is a diagram illustrating a structural example of an imaging apparatus according to Example 11 of the present invention.

An imaging optical system used in an imaging apparatus of this example includes four lenses G1, G2, G3, and G4 and the aperture stop STO disposed in the fluid medium as illustrated in FIG. 45.

The imaging optical system includes, in order from the object side: the first lens G1 as a meniscus lens having a convex surface facing the object side; the second lens G2 as a meniscus lens having a convex surface facing the object side; the third lens G3 as a biconvex lens having a convex surface facing the image side; and the fourth lens G4 as a meniscus lens having a convex surface facing the image side.

In addition, the space between the second lens G2 and the third lens G3 is filled with silicone oil as the fluid medium FM, and the aperture stop STO is disposed therein. The imaging unit ICU of this example is the same as that in Example 9.

Table 39 shows a structure of the imaging apparatus of this example.

Surface number 1 is the incident surface of the first lens G1, and surface number 2 is the cemented surface between the exit surface of the first lens G1 and the incident surface of the second lens G2. Surface number 3 is the exit surface of the second lens G2 having a rotation symmetry aspherical shape expressed by the polynomial of Expression (11). In addition, surface number 3 is the lens surface coming into contact with the fluid medium in which the aperture stop is disposed on the object side than of aperture stop.

Surface number 4 is the aperture stop STO and is disposed in the silicon oil. Surface number 5 is the incident surface of the third lens G3 having a rotation symmetry aspherical shape expressed by the polynomial of Expression (11). In addition, the surface number 5 is the lens surface coming into contact with the fluid medium in which the aperture stop is disposed on the image side than of aperture stop.

Surface number 6 is the cemented surface between the exit surface of the third lens G3 and the incident surface of the fourth lens G4. Surface number 7 is the exit surface of the fourth lens G4 having a rotation symmetry aspherical shape expressed by the polynomial of Expression (11). Surface number 8 is the image plane IMG, which is the incident surface of the curved image sensor.

In Table 39, R represents a radius of curvature resents a surface interval (mm), Nd represent-line refractive index, and vd represents an Abbe number. Note that, the surface with a mark "(a)" is an aspherical surface.

TABLE 39

Configuration table

| Surface number | R | d | Nd | vd |
|---|---|---|---|---|
| 1 | 11.1500 | 5.6861 | 2.00270 | 19.3 |
| 2 | 5.6510 | 3.0063 | 1.88300 | 40.8 |
| 3 | 25.6855(a) | 1.0000 | 1.40400 | 50.0 |
| 4 (STO) | Flat surface | 0.5000 | 1.40400 | 50.0 |
| 5 | 20.4801(a) | 3.4942 | 1.87801 | 38.5 |
| 6 | −4.9914 | 6.0698 | 2.00060 | 25.5 |
| 7 | −12.0967(a) | 2.6401 | Air | |
| 8 (IMG) | −13.1649 | | | |

As to the imaging apparatus of this example, Table 40(A) shows aspherical surface coefficients of surface number 3. Table 40(B) shows aspherical surface coefficients of surface number 5. Table 40(C) shows aspherical surface coefficients of surface number 7.

TABLE 40(A)

Aspherical surface coefficients (Surface number 3)

| Parameter | Symbol | Value |
|---|---|---|
| Conic constant | K | −7.80416E−01 |
| Fourth order coefficient | A | 1.25565E−04 |
| Sixth order coefficient | B | −7.06450E−07 |
| Eighth order coefficient | C | −2.54125E−07 |
| Tenth order coefficient | D | 6.69057E−09 |

TABLE 40(B)

Aspherical surface coefficients (Surface number 5)

| Parameter | Symbol | Value |
|---|---|---|
| Conic constant | K | 1.26266E+00 |
| Fourth order coefficient | A | −2.60614E−04 |
| Sixth order coefficient | B | −1.41325E−05 |
| Eighth order coefficient | C | 1.21573E−06 |
| Tenth order coefficient | D | −4.53144E−08 |

TABLE 40(C)

Aspherical surface coefficients (Surface number 7)

| Parameter | Symbol | Value |
|---|---|---|
| Conic constant | K | −9.42506E−01 |
| Fourth order coefficient | A | −6.45473E−05 |
| Sixth order coefficient | B | −2.93067E−07 |
| Eighth order coefficient | C | 2.59828E−09 |
| Tenth order coefficient | D | −2.85562E−10 |

In the imaging apparatus of this example, the space between the second lens G2 and the third lens G3 is filled with silicone oil as the fluid medium FM. The aperture stop STO is disposed in the silicone oil, and the aperture stop diameter is variable.

The refractive index of silicone oil is Nd=1.404, which is higher than the refractive index of air and is close to the refractive index of the optical glass of the second lens and the third lens coming into contact with the silicone oil.

Therefore, it is possible to decrease the refraction angle of the field angle light beam on the exit surface of the second lens or the incident surface of the third lens, which can give the effect of suppressing generated aberration to be small. The silicone oil is used as the fluid medium FM in this example, but it is possible to use water. The refractive index of water is Nd=1.333, which is higher than the refractive index Nd=1.000 of air and is close to the refractive index of the optical glass. Therefore, it is possible to give the substantially same effect as the silicone oil.

In this way, the fluid medium FM in which the aperture stop is disposed is preferred to have the refractive index Nd>1.000. Thus, aberration can be suppressed to be small, and it is effective to realize high resolution.

In the imaging apparatus of this example, the lens surface disposed closer to the object side than the aperture stop and coming into contact with the fluid medium is the exit surface of the second lens G2 (surface number 3), and the lens surface closer to the image side than the aperture stop and coming into contact with the fluid medium is the incident surface of the third lens G3 (surface number 5).

In the imaging apparatus of this example, too, the exit surface of the second lens (surface number 3) has a concave surface, and the incident surface of the third lens G3 (surface number 5) is set to have a convex surface.

Thus, it is possible to provide the imaging apparatus having high imaging performance over a wide angle of field and a variable aperture stop diameter.

In addition, concerning such problem that the field angle light beam is significantly refracted by the exit surface of the second lens coming into contact with the silicone oil so that coma, astigmatism, lateral chromatic aberration, chromatic field curvature, or the like occurs, the imaging apparatus of this example has a further solution so as to realize good aberration correction.

Specifically, the radius of curvature $R_3$=25.6855 (mm) of the exit surface of the second lens (surface number 3) is set larger than the distance $d_3$=1.0000 (mm) from the exit surface of the second lens (surface number 3) to the aperture stop STO. Thus, the refraction angle is reduced while avoiding vignetting of the field angle light beam by the exit surface of the second lens.

In addition, the radius of curvature $R_5$=20.4801 (mm) of the incident surface of the third lens G3 (surface number 5) is set smaller than the radius of curvature $R_3$=25.6855 (mm) of the exit surface of the second lens (surface number 3), and the following Expression (18) is satisfied.

In this way, a radius of curvature smaller than that of the exit surface of the second lens is given to the incident surface of the third lens, and hence lateral chromatic aberration and chromatic field-curvature can be appropriately corrected.

Further, power of the exit surface of the second lens is $\phi_3$=−0.0186, power of the incident surface of the third lens is $\phi_5$=0.0231, and a ratio between the power of the exit surface of the second lens and the power of the incident surface of the third lens is $\phi_5/\phi_3$=−1.241.

Because the exit surface of the second lens G2 and the incident surface of the third lens G3 are structured to satisfy Expression (19), lateral chromatic aberration and field curvature can be corrected with good balance.

Thus, imaging performance of the field angle light beam is further improved in the imaging apparatus having a variable aperture stop diameter, a small F value, and a wide angle of field.

In addition, in the imaging apparatus of this example, the distance $d_5$=0.500 (mm) from the aperture stop STO to the incident surface of the third lens G3 is set shorter than the distance $d_3$=1.000 (mm) from the exit surface of the second lens to the aperture stop STO.

Therefore, lateral chromatic aberration can be corrected more appropriately.

Thus, imaging performance of the field angle light beam can be improved more in the imaging apparatus having a small F value and a wide angle of field.

In this way, stronger power is given to the incident surface of the third lens G3 than to the exit surface of the second lens, and hence lateral chromatic aberration and chromatic field curvature can be appropriately corrected.

In addition, in the imaging apparatus of this example, the distance $d_5$=0.5000 (mm) from the aperture stop STO to the incident surface of the third lens G3 is set shorter than the distance $d_3$=1.0000 (mm) from the exit surface of the second lens to the aperture stop STO.

Therefore, coma as well as lateral chromatic aberration can be corrected appropriately.

Thus, imaging performance of the field angle light beam can be improved more in the imaging apparatus having a small F value and a wide angle of field.

Figure 46A:
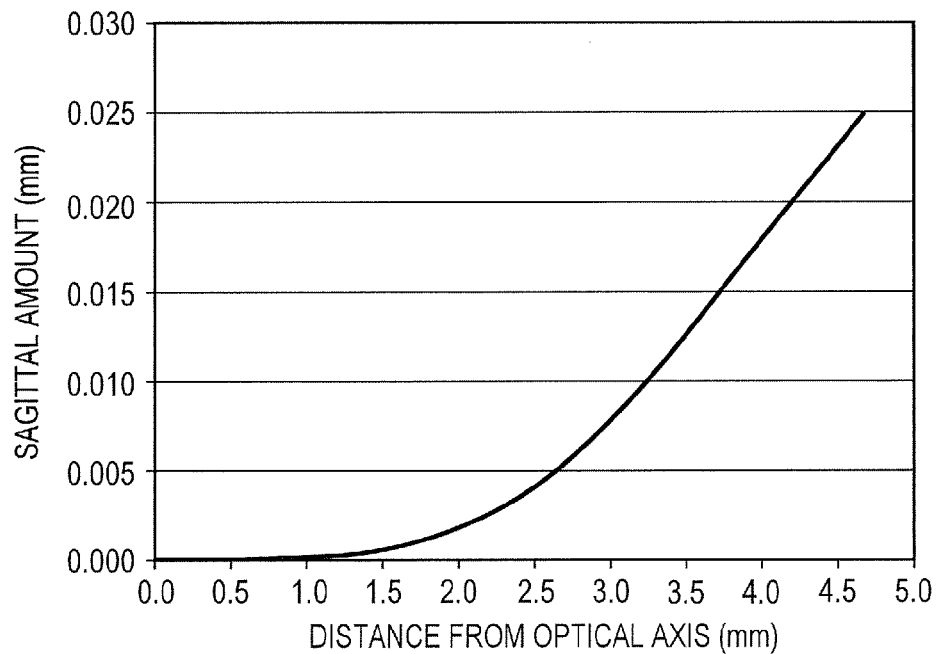
FIG. 46A is a diagram showing an aspherical amount of an imaging optical system used for the imaging apparatus according to Example 11 of the present invention.
Figure 46B:
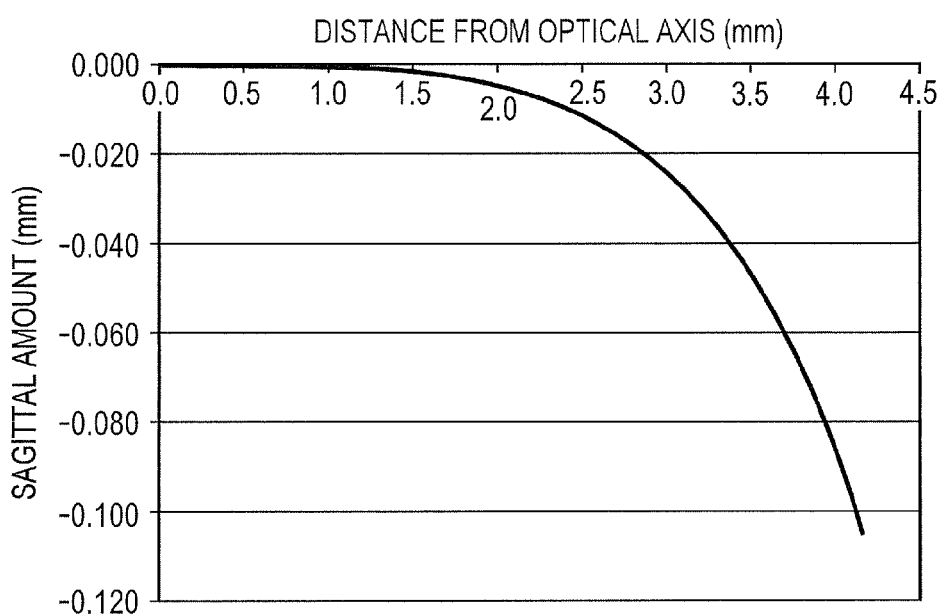
FIG. 46B is a diagram showing the aspherical amount of the imaging optical system used for the imaging apparatus according to Example 11 of the present invention.
Figure 47:
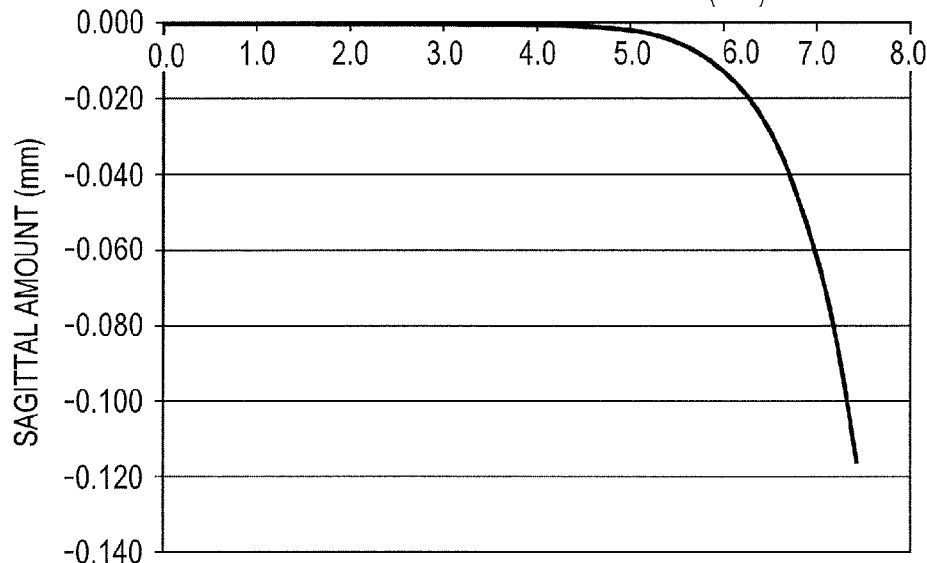
FIG. 47 is a diagram showing the aspherical amount of the imaging optical system used for the imaging apparatus according to Example 11 of the present invention.

In addition, FIG. 46A shows the aspherical amount of surface number 3, FIG. 46B shows the aspherical amount of surface number 5, and FIG. 47 shows the aspherical amount of surface number 7.

The aspherical amount of surface number 3 is positive in the periphery of the lens surface and has an aspherical shape displaced from the reference spherical surface to the image side. The aspherical amount of surface number 5 is negative in the periphery of the lens surface and has an aspherical shape displaced from the reference spherical surface to the object side.

The aspherical amount of surface number 7 is negative in the periphery of the lens surface and has an aspherical shape displaced from the reference spherical surface to the object side.

By these aspherical shapes, more appropriate imaging performance is obtained.

In particular, the exit surface of the second lens (surface number 3) has a concave surface, the aspherical shape displaced from the reference spherical surface to the image side in the periphery of the lens surface (having a positive aspherical amount) is given, and a negative power component is added to the periphery. Thus, aberration generated by the silicon oil layer can be appropriately corrected.

Further, the incident surface of the third lens G3 (surface number 5) has a convex surface having the aspherical shape displaced from the reference spherical surface to the object side in the periphery of the lens surface (having a negative aspherical amount), and a negative power component is added to the periphery. Thus, aberration generated by the silicon oil layer can be more appropriately corrected.

Further, when the configurations of both the lenses are realized at the same time, aberration can be corrected more appropriately so that high imaging performance can be obtained.

Table 43 shows the specifications of the imaging apparatus of this example.

TABLE 43

| Focal length of imaging optical system | f_sys | 3.600 (mm) |
|---|---|---|
| F value | F/# | 1.20 |
| Angle of field | 2ω | 120.0 (deg) |

TABLE 43-continued

| Entire length | L_sys | 6.044 (mm) |
|---|---|---|
| Distance from exit pupil to image plane | d_pup | 3.616 (mm) |

The imaging apparatus of this example has a small F value of F/1.2, a very wide angle of field of 120.0 (degrees), and a compact size with the entire length of 6.044 (mm), which is an example of the imaging apparatus in which brightness, high resolution, a very wide angle of field, and a compact size are realized at the same time.

Table 44 shows values of Expressions (1), (2), and (4) of the imaging apparatus of this example.

TABLE 44

| Conditional expression (1) | f_sys/d_pup | 0.96 |
|---|---|---|
| Conditional expression (2) | |R_img|/f_sys | 1.01 |
| Conditional expression (4) | |R_img|/d_pup | 0.97 |

The value of Expression (1) is 0.96 and satisfies the range of Expression (1). Thus, the optical system of the imaging optical system in the image side of the aperture stop can be close to a point symmetry structure, and hence coma, astigmatism, distortion, and lateral chromatic aberration can be appropriately corrected.

The value of Expression (2) is 1.01 and satisfies the range of Expression (2). Thus, field curvature and astigmatism can be appropriately corrected over a wide angle of field of 120.0 (degrees).

The value of Expression (4) is 0.97 and satisfies the range of Expression (4). Thus, the imaging optical system is close to a point symmetry structure, and hence coma, astigmatism, distortion, and lateral chromatic aberration are appropriately corrected.

Further, in the imaging apparatus of this example, the distance between the imaging optical system and the image plane is changed so as to perform focus adjustment. Because Expression (4) is satisfied, focus adjustment can be performed while maintaining high resolution in a wide focus adjustment range from infinity to a close distance.

Figure 48:
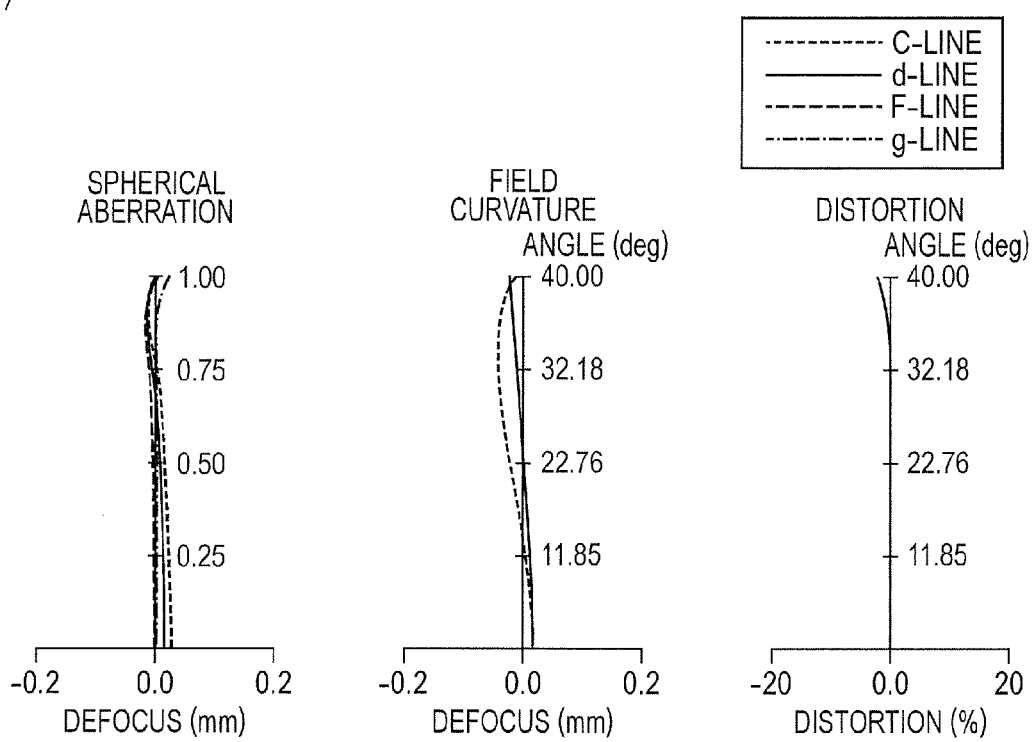
FIG. 48 is an axial aberration diagram of the imaging optical system according to Example 11 of the present invention.
Figure 49:
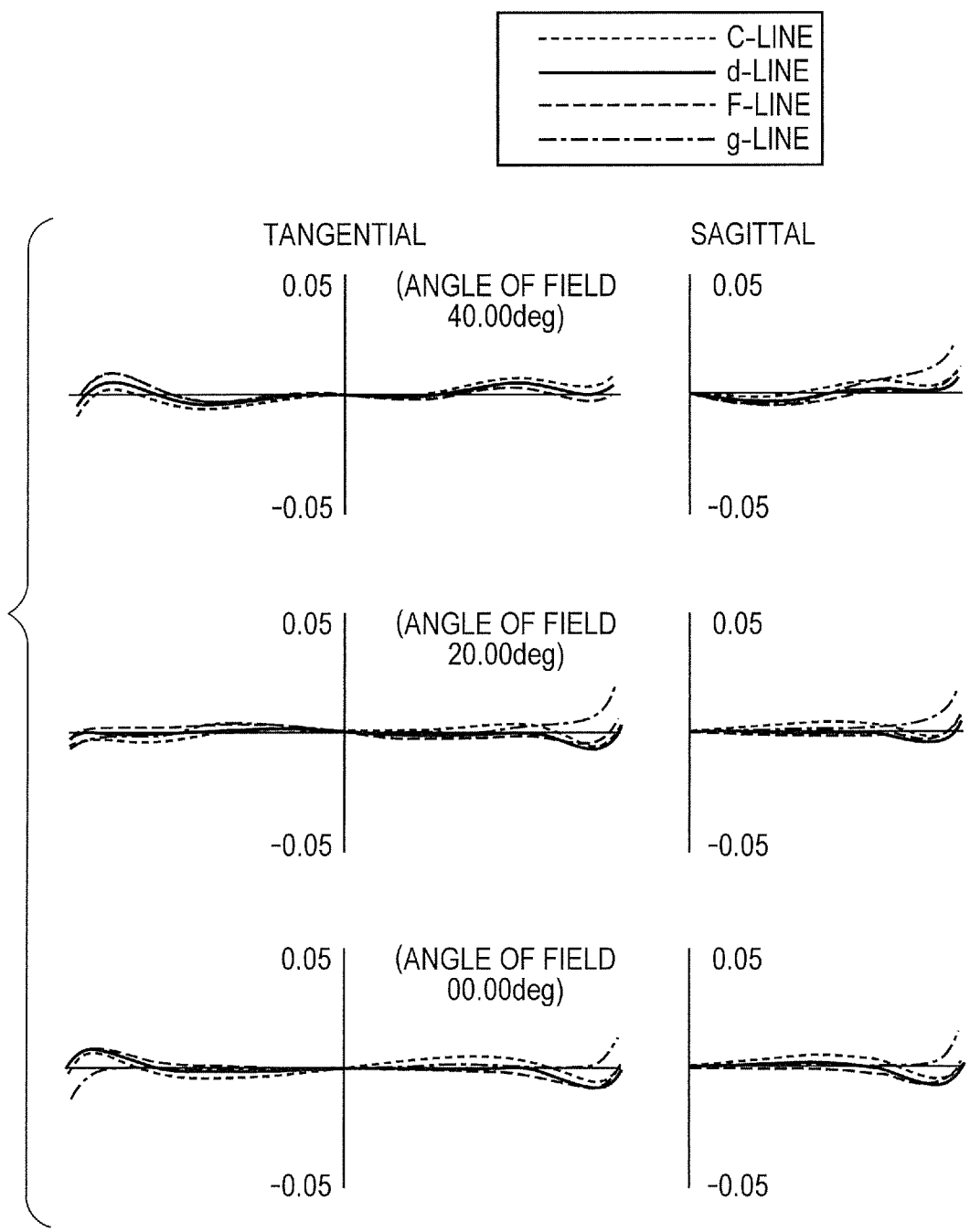
FIG. 49 is a lateral aberration diagram of the imaging optical system according to Example 11 of the present invention.

FIG. 48 illustrates an axial aberration diagram of the imaging optical system of this example, and FIG. 49 illustrates a lateral aberration diagram thereof.

As illustrated in FIG. 48, spherical aberration, axial chromatic aberration, astigmatism, field curvature, and chromatic spherical aberration are very appropriately corrected.

In particular, the light beam in the entire region from a low incident light beam height to a high incident light beam height can be condensed on the image plane, and hence spherical aberration can be very appropriately corrected.

In addition, axial chromatic aberration and chromatic spherical aberration are also very appropriately corrected so that high imaging performance is obtained.

As illustrated in FIG. 49, good performance is obtained in each field angle light beam, and coma, field curvature, and lateral chromatic aberration are very appropriately corrected.

As in this example, both the lens surface closest to the object side and the lens surface closest to the image side are formed as aspherical surfaces to which the aspherical amount displaced from the reference spherical surface to the outside of the imaging optical system in the periphery of the lens surface is given. Thus, spherical aberration can be corrected with high accuracy over a wide angle of field.

(Fourth Embodiment)

This embodiment has the structure in which at least one of the lens surface closest to the object side and the lens surface closest to the image side of the imaging optical system is formed as the aspherical surface having the aspherical amount displaced from the reference spherical surface to the outside of the imaging optical system in the periphery of the lens surface. Thus, spherical aberration can be appropriately corrected also in a bright optical system having a wide angle of field.

Next, description is given of an action of the structure in which at least one of the lens surface closest to the object side and the lens surface closest to the image side of the imaging optical system is formed as the aspherical surface having the aspherical amount displaced from the reference spherical surface to the outside of the imaging optical system in the periphery of the lens surface.

The aspherical surface having the aspherical amount displaced from the reference spherical surface to the outside of the imaging optical system in the periphery of the lens surface mainly acts on correction of spherical aberration.

The imaging optical system has positive power as a whole, and spherical aberration usually becomes "under".

In view of the optical path length from the object point to the image point, this is caused by a factor that the optical path length of the light beam in a high incident height position is shorter compared with that of the axial light.

In addition, in view of the wave front, this is caused by a factor that the phase of the light beam is advanced in a high incident height position compared with that on the optical axis.

Therefore, at least one of the lens surface closest to the object side and the lens surface closest to the image side of the imaging optical system is formed of the aspherical surface having the aspherical amount displaced from the reference spherical surface to the outside of the imaging optical system in the periphery of the lens surface.

The lens surface closest to the object side or the lens surface closest to the image side in the imaging optical system is the outermost lens surface among the lens surfaces included in the imaging optical system. The inside of the lens surface is filled with the optical glass, and the outside of the lens surface is filled with the air.

In general, the refractive index of the optical glass is Nd=1.45 to 2.15, which is higher than the refractive index of the air, Nd=1.0.

In this case, a part of the optical path of the light beam passing through the periphery of the lens surface is replaced from the air to the optical glass by the aspherical surface having the aspherical amount displaced from the reference spherical surface to the outside of the imaging optical system in the periphery of the lens surface. Thus, the optical path length can be substantially increased. Alternatively, the phase of the wave front can be delayed. Thus, spherical aberration can be appropriately corrected.

In addition, in view of the power, it is possible to constitute the aspherical surface in which the power of the periphery of the lens surface is shifted in the negative direction by the aspherical surface having the aspherical amount displaced from the reference spherical surface to the outside of the imaging optical system in the periphery of the lens surface.

If the reference spherical surface has positive power, it is possible to structure the aspherical surface in which the positive power in the periphery is reduced compared with that on the optical axis.

Thus, the power received by the light ray in a high incident height position can be relatively reduced to the power received by principal ray, and hence spherical aberration in the "under" state can be appropriately corrected.

Figure 84:
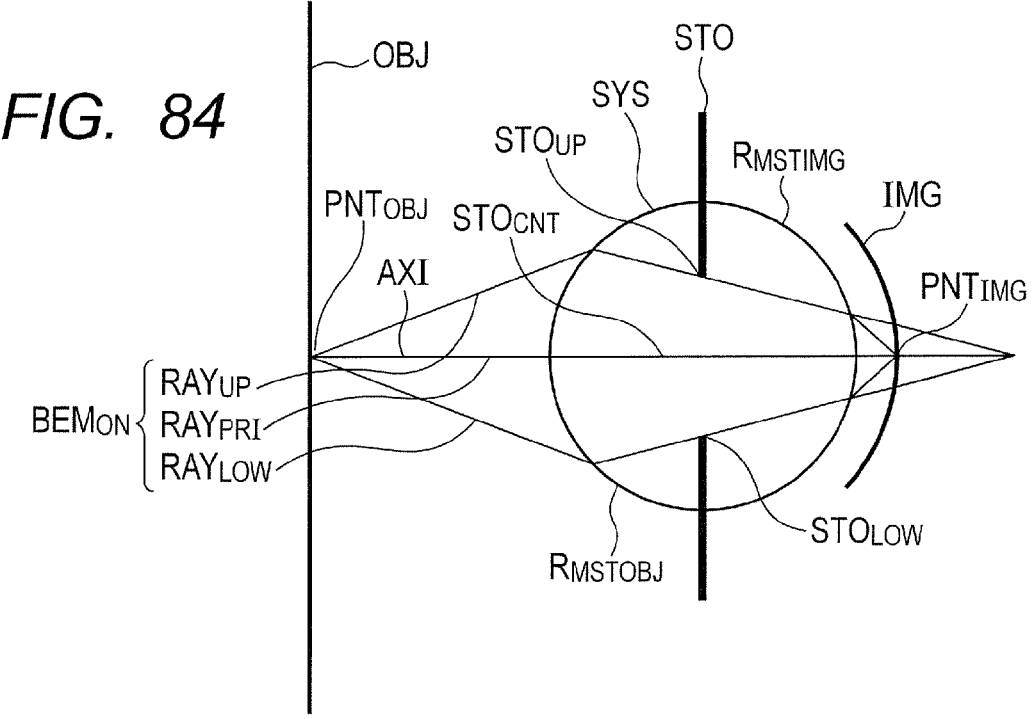
FIG. 84 is an optical path diagram schematically illustrating a manner in which an image of axial light is formed in the imaging apparatus according to the embodiment of the present invention.
Figure 85:
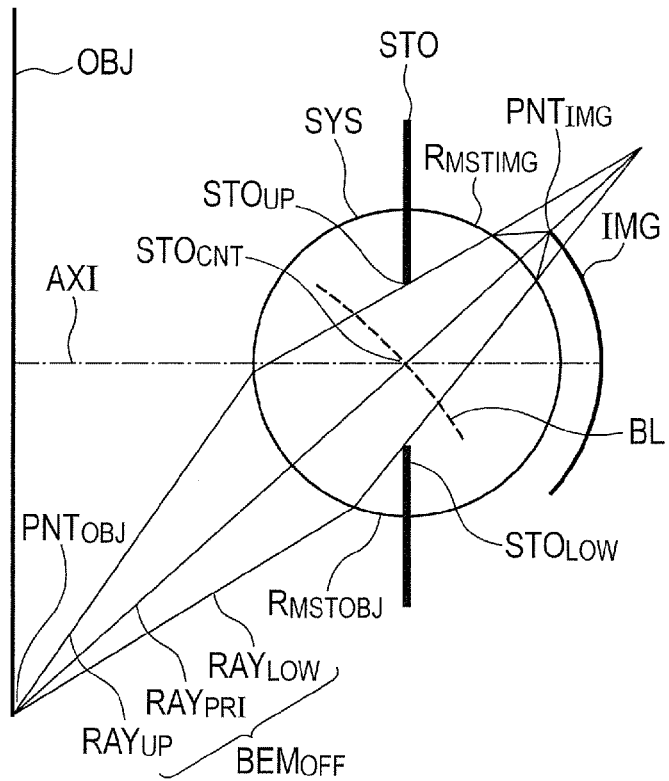
FIG. 85 is an optical path diagram schematically illustrating a manner in which an image of axial light is formed in the imaging apparatus according to the embodiment of the present invention.

FIG. 84 is an optical path diagram schematically illustrating a manner of image formation by the axial light in the imaging apparatus of this embodiment, and FIG. 85 is an optical path diagram schematically illustrating a manner of image formation by the field angle light beam.

FIGS. 84 and 85 schematically illustrate a manner in which a field angle light beam BEM from the object point $PNT_{OBJ}$ on the object plane OBJ forms an image at the image point $PNT_{IMG}$ on the image plane IMG by the imaging optical system SYS.

As illustrated in FIG. 84, the axial light is defined as a case where the object point $PNT_{OBJ}$ is on the optical axis AXI of the imaging optical system SYS. As illustrated in FIG. 85, the field angle light beam is defined as a case where the object point $PNT_{OBJ}$ is not on the optical axis AXI of the imaging optical system SYS.

The light beam widths of the axial light and the field angle light beam are limited by the aperture stop STO. The light ray passing through an opening center $STO_{CNT}$ of the aperture stop is defined as a principal ray $RAY_{PRI}$, the light ray passing through an opening upper end $STO_{UP}$ is defined as an upper ray $RAY_{UP}$, and the light ray passing through an opening lower end $STO_{LOW}$ is defined as a lower ray $RAY_{LOW}$.

In FIG. 84, the axial light $BEM_{ON}$ is refracted by a lens surface $R_{MSTOBJ}$ closest to the object side, and its light beam width is limited by the aperture stop STO. Then, the axial light $BEM_{ON}$ is refracted by a lens surface $R_{MSTIMG}$ closest to the image side so as to form an image on the image plane IMG.

As to reach positions of the light rays on the lens surface $R_{MSTOBJ}$ closest to the object side, the principal ray $RAY_{PRI}$ is on the optical axis AXI, the upper ray $RAY_{UP}$ is close to the upper side periphery, and the lower ray $RAY_{LOW}$ is close to the lower side periphery. The lens surface $R_{MSTOBJ}$ closest to the object side is the surface having a largest light beam width in the imaging optical system SYS.

Spherical aberration has a feature of being vulnerable to the influence of power of the surface having a high incident height h (surface having a large light beam width). According to the third order aberration coefficient, spherical aberration is proportional to the fourth power of the incident height h and is considerably affected by power of the lens surface.

Therefore, when the lens surface $R_{MSTOBJ}$ closest to the object side is formed of the aspherical surface, the action of the aspherical surface can be effectively exerted.

In addition, by using the aspherical surface having power decreased more in the periphery than on the optical axis, power for the upper ray $RAY_{UP}$ having a high incident height or power for the lower ray $RAY_{LOW}$ can be decreased more than that on the optical axis. Therefore, the spherical aberration to be "under" can be appropriately corrected.

In addition, because the influence to spherical aberration is large, the spherical aberration amount to be given can be controlled to be small.

As illustrated in FIG. 85, when the object point $PNT_{OBJ}$ is below the optical axis of the imaging optical system SYS, the optical path length of the upper ray $RAY_{UP}$ (from the object point $PNT_{OBJ}$ to the opening upper end $STO_{OP}$ of the aperture stop) is longer than the optical path length of the principal ray $RAY_{PRI}$ (from the object point $PNT_{OBJ}$ to the opening center $STO_{CNT}$ of the aperture stop) in the field angle light beam BEM.

Therefore, there is a problem in that the incident height in the direction along the principal ray $RAY_{PRI}$ is higher than the incident height of the axial light in the light beam closer to the upper ray $RAY_{UP}$ than the principal ray $RAY_{PRI}$, which causes large spherical aberration. This problem becomes more conspicuous as the angle of field becomes wider.

On the other hand, the reach point of the upper ray $RAY_{UP}$ of the field angle light beam BEM on the lens surface $R_{MSTIMG}$ closest to the image side is closer to the periphery of the lens surface $R_{MSTIMG}$ closest to the image side than the reach point of the principal ray $RAY_{PRI}$.

Therefore, the lens surface $R_{MSTIMG}$ closest to the image side is formed as the aspherical surface having power decreased more in the periphery than on the optical axis. Then, it is possible to constitute the lens surface that can give weaker power to the light beam closer to the upper ray $RAY_{UP}$ than to the principal ray $RAY_{PRI}$.

Thus, it is possible to appropriately correct spherical aberration generated significantly in the light beam closer to the upper ray $RAY_{UP}$ than the principal ray $RAY_{PRI}$ of the field angle light beam.

In addition, spherical aberration occurs also in the light beam closer to the lower ray $RAY_{LOW}$ than the principal ray $RAY_{PRI}$ of the field angle light beam.

The reach point of the lower ray $RAY_{LOW}$ of the field angle light beam BEM on the lens surface $R_{MSTOBJ}$ closest to the object side is closer to the periphery of the lens surface $R_{MSTOBJ}$ closest to the object side than the reach point of the principal ray $RAY_{PRI}$.

Therefore, the lens surface $R_{MSTOBJ}$ closest to the object side is formed as the aspherical surface having power decreased more in the periphery than on the optical axis. Then, it is possible to constitute the lens surface that can give weaker power to the light beam closer to the lower ray $RAY_{LOW}$ than to the principal ray $RAY_{PRI}$.

Thus, it is possible to appropriately correct spherical aberration generated in the light beam closer to the lower ray $RAY_{LOW}$ than the principal ray $RAY_{PRI}$ of the field angle light beam.

Further, when both the lens surface closest to the object side and the lens surface closest to the image side are formed as the aspherical surfaces having power reduced more in the periphery than on the optical axis, it is possible to realize the structure optimal for the axial light, the light beam closer to the upper ray than the principal ray of the field angle light beam, and the light beam closer to the lower ray than the principal ray of the field angle light beam.

In the imaging optical system having a small F value, it is difficult to correct spherical aberration only by the spherical surface lens. However, according to this embodiment, spherical aberration can be appropriately corrected.

In particular, in the imaging apparatus using a very bright imaging optical system having F/1.4 or smaller, imaging performance can be significantly improved by correcting spherical aberration as in this embodiment.

When the cemented surface is formed as the aspherical surface, there is a disadvantage that it is difficult to form the two surfaces into the same aspherical shape. If the lens surface closest to the object side or the lens surface closest to the image side of the imaging optical system is formed as the aspherical surface, there is an advantage that production becomes easy.

In the following, an example of this embodiment is described.

EXAMPLE 12

In Example 12, a structural example of the imaging apparatus to which this embodiment is applied is described.

Figure 50:
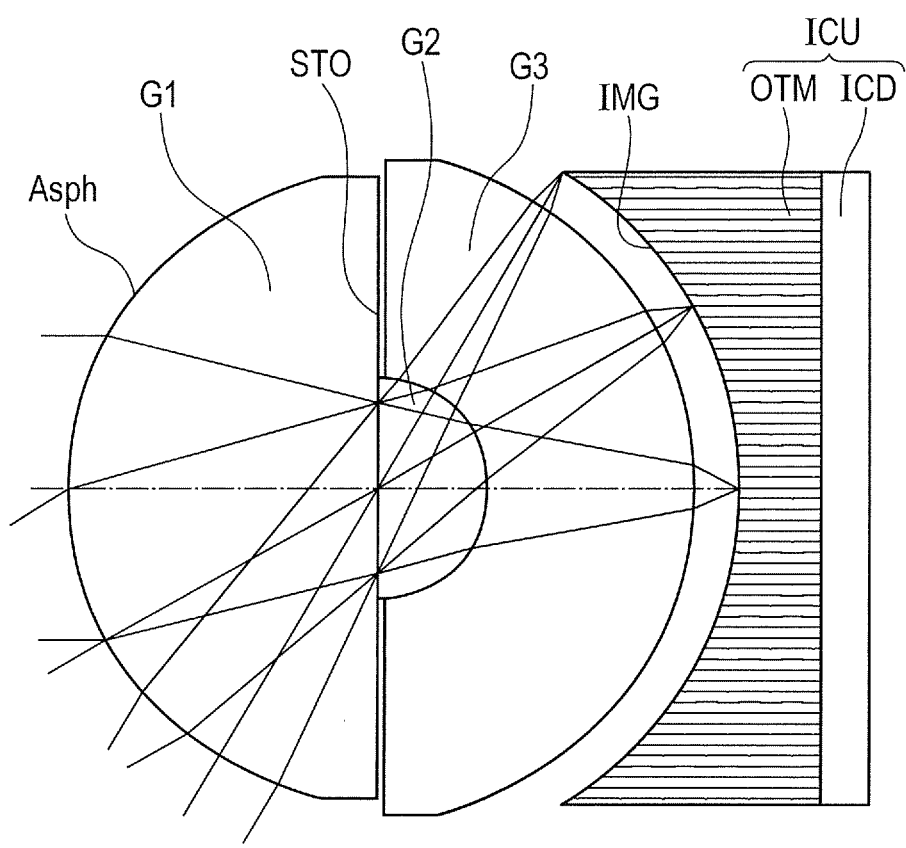
FIG. 50 is a diagram illustrating a structural example of an imaging apparatus according to Example 12 of the present invention.

An imaging optical system used in an imaging apparatus of this example includes three lenses G1, G2, and G3 and the aperture stop STO as illustrated in FIG. 50.

The imaging optical system includes, in order from the object side: a first lens G1 as a plano-convex lens having a convex surface facing the object side; a second lens G2 as a plano-convex lens having a convex surface facing the image side; and a third lens G3 as a meniscus lens having a convex surface facing the image side.

The exit surface of the first lens G1 is cemented to the incident surface of the second lens G2, and the light blocking member is disposed in the non-effective part of the cemented surface so as to constitute the aperture stop STO.

In FIG. 50, IMG represents the image plane.

As illustrated in FIG. 50, in the imaging apparatus according to this example, the incident surface of the optical transmission unit OTM formed into a sphere shape is used as the image plane IMG, and the curved shape of the image plane is formed along the field curvature of the imaging optical system. Thus, good imaging performance is realized over the entire region of the image plane IMG.

The optical transmission unit OTM of the imaging apparatus according to this example is an image fiber formed of bound optical fibers of a few micron pitch and has a role of transmitting an image formed on the image plane to the image sensor ICD.

The exit surface of the optical transmission unit OTM is formed to be a flat surface so as to be in intimate contact with the image sensor ICD for connection. Thus, an image is transmitted to the image sensor ICD.

In this way, in the imaging apparatus of this example, the optical transmission unit OTM and the image sensor ICD constitute the imaging unit ICU.

Table 45 shows a structure of the imaging apparatus of this example.

Surface number 1 is the incident surface of the first lens G1, surface number 2 is the cemented surface between the exit surface of the first lens G1 and the second lens G2, surface number 3 is the cemented surface between the exit surface of the second lens G2 and the incident surface of the third lens G3, and surface number 4 is the exit surface of the third lens G3.

The light blocking member is disposed in the non-effective part in the plane of the surface number 2 between the exit surface of the first lens G1 and the second lens G2 indicated by surface number 2, and hence the aperture stop STO is constituted.

Surface number 5 is the image plane IMG, which is the incident surface of the optical transmission unit OTM. Further, the exit surface of the optical transmission unit OTM (not shown) is connected to the image sensor ICD so as to constitute the imaging unit ICU.

In Table 45, R represents a radius of curvature (mm), d represents a surface interval (mm), Nd represents a d-line refractive index, and vd represents an Abbe number. Note that, the surface with a mark "(a)" is an aspherical surface.

TABLE 45

Configuration table

| Surface number | R | d | Nd | vd |
| --- | --- | --- | --- | --- |
| 1 | 3.1146(a) | 3.0661 | 1.87801 | 38.5 |
| 2 (STO) | Flat surface | 1.1017 | 1.87801 | 38.5 |
| 3 | −1.0868 | 2.0614 | 2.00520 | 21.0 |

TABLE 45-continued

Configuration table

| Surface number | R | d | Nd | vd |
|---|---|---|---|---|
| 4 | −3.2821 | 0.4524 | | |
| 5 (IMG) | −3.6698 | | | |

The aspherical surface of the imaging apparatus of this example is formed as the rotation symmetry aspherical surface whose center is the optical axis, and is expressed by the polynomial of Expression (11).

The aspherical surface coefficients of the first surface of the imaging apparatus of this example are shown in Table 46.

TABLE 46

Aspherical surface coefficients (Surface number 1)

| Parameter | Symbol | Value |
|---|---|---|
| Conic constant | K | −3.58921E−03 |
| Fourth order coefficient | A | −5.87301E−05 |
| Sixth order coefficient | B | 5.16920E−06 |
| Eighth order coefficient | C | 0.00000E+00 |
| Tenth order coefficient | D | 0.00000E+00 |

When the first order differential of the aspherical surface polynomial of Expression (11) by the distance r from the optical axis in the radial direction is calculated, the first order differential value is determined by Expression (22).

$$\frac{\partial}{\partial r}z = \frac{cr}{\sqrt{1-(1+k)c^2r^2}} + 4Ar^3 + 6Br^5 + 8Cr^7 + 10Dr^9 + \cdots \quad (22)$$

This first order differential value indicates a gradient of the lens surface.

Further, when the second order differential of the aspherical surface polynomial of Expression (11) by the distance r from the optical axis in the radial direction is calculated, the second order differential value is determined by Expression (23).

$$\frac{\partial^2}{\partial r^2}z = \frac{c}{[1-(1+k)c^2r^2]^{\frac{3}{2}}} + 12Ar^2 + 30Br^4 + 56Cr^6 + 90Dr^7 + \cdots \quad (23)$$

This second order differential value indicates a differential value of the gradient of the lens surface, namely the curvature in the radial direction, which has a relationship with power $\phi_r$ as expressed by Expression (24).

$$\phi_r = (N' - N) \cdot \left(\frac{\partial^2}{\partial r^2}z\right) \quad (24)$$

Here, N represents a refractive index of a medium on the object side of the lens surface and N' represents a refractive index of a medium on the image side of the lens surface.

In the imaging apparatus of this example, only the lens surface closest to the object side among lens surfaces in the imaging optical system is formed as the aspherical surface.

Figure 51A:
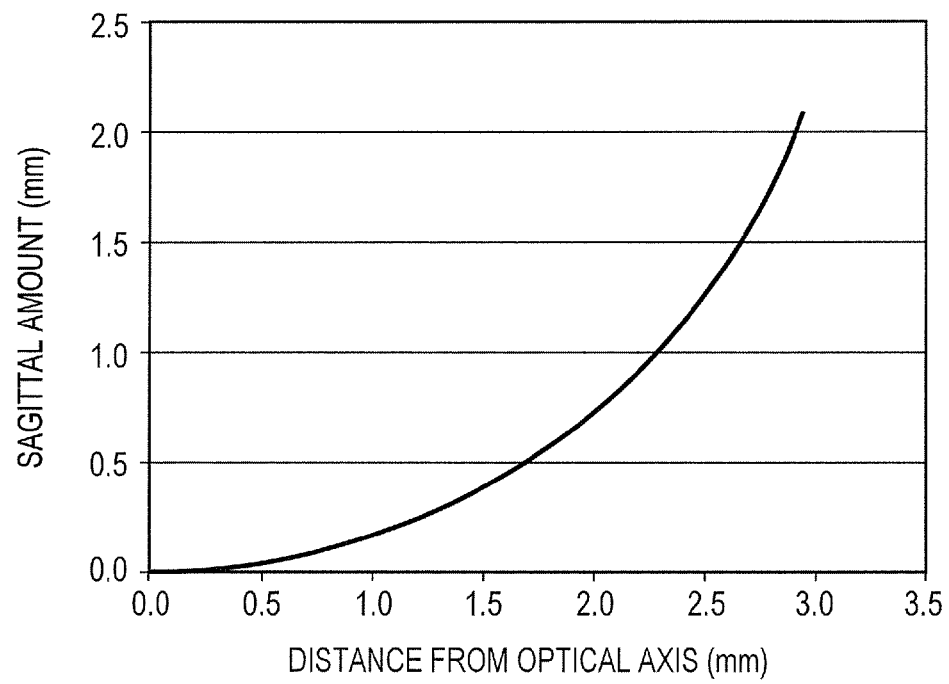
FIG. 51A is a diagram showing an aspherical shape of a lens surface closest to the object side in the imaging apparatus according to Example 12 of the present invention.
Figure 51B:
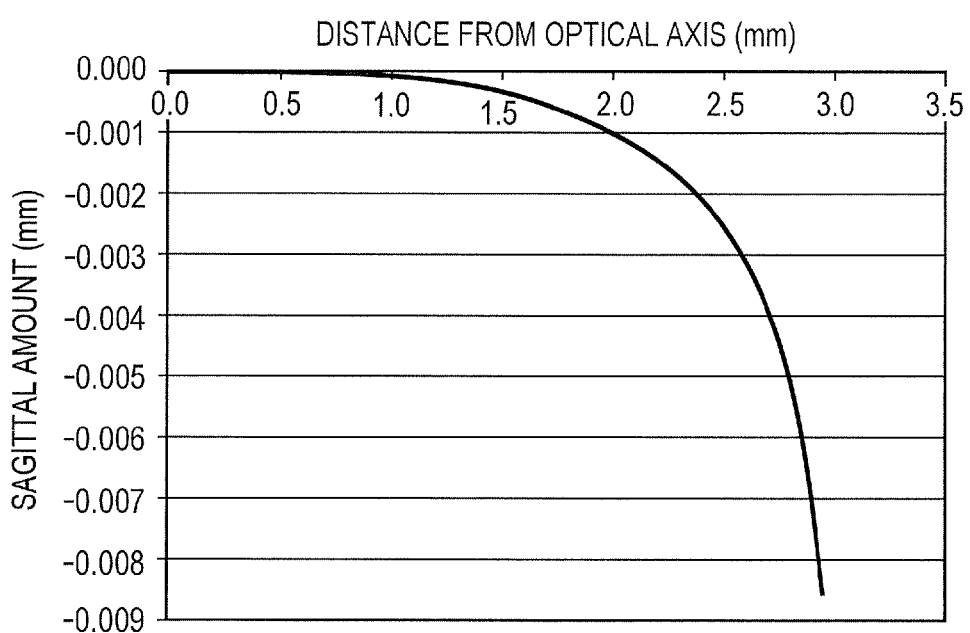
FIG. 51B is a diagram showing an aspherical amount of the lens surface closest to the object side in the imaging apparatus according to Example 12 of the present invention.
Figure 52A:
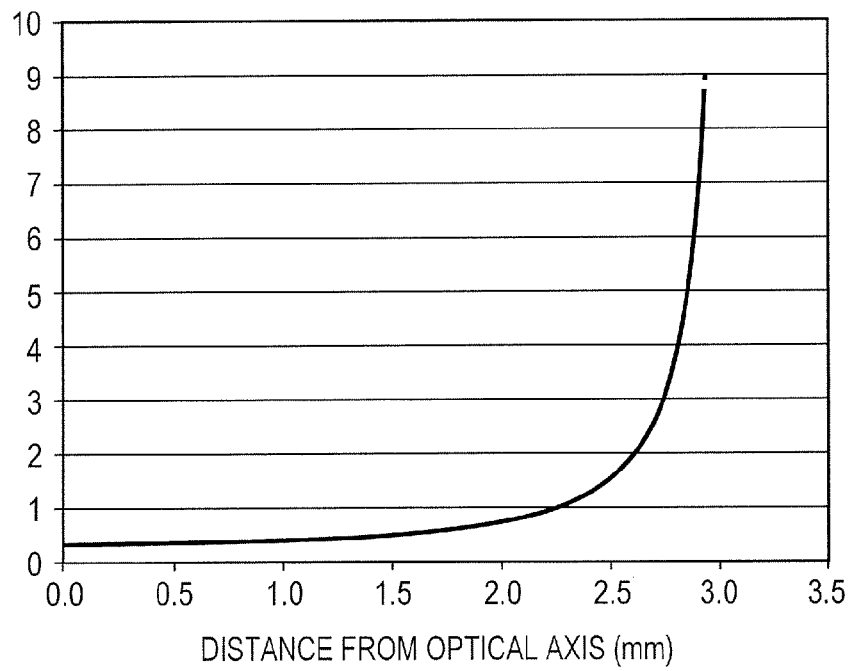
FIG. 52A is a diagram showing a second order differential value of an aspherical surface and a reference spherical surface of the lens surface closest to the object side in the imaging apparatus according to Example 12 of the present invention.
Figure 52B:
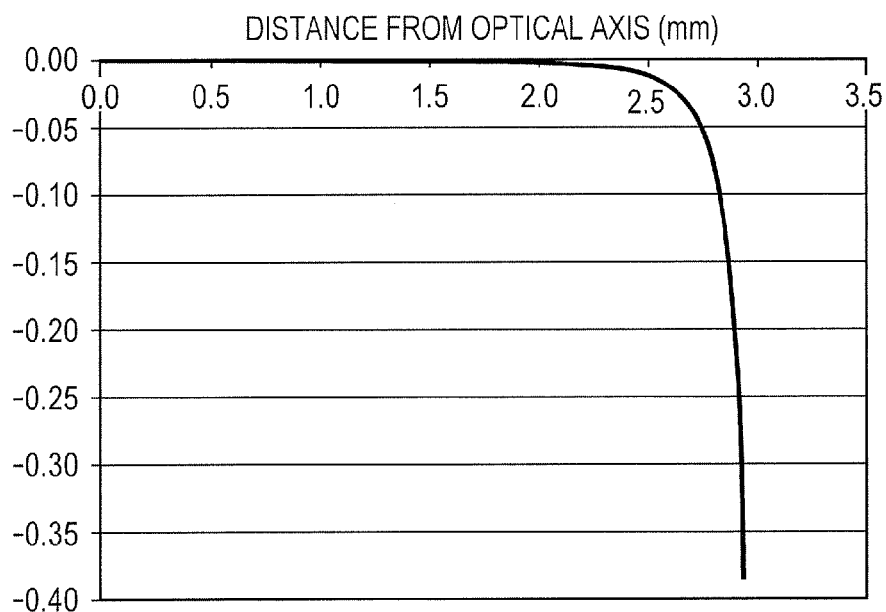
FIG. 52B is a diagram showing a second order differential value of an aspherical component of the lens surface closest to the object side in the imaging apparatus according to Example 12 of the present invention.

FIG. 51A shows an aspherical surface of the lens surface closest to the object side, and FIG. 51B shows an aspherical amount of the lens surface closest to the object side. In addition, FIG. 52A shows a second order differential value of the aspherical surface and the reference spherical surface, and FIG. 52B shows a second order differential value of the aspherical component.

As shown in FIG. 51A, the lens surface closest to the object side in this example is a lens surface having a sag amount increasing in the positive direction from the optical axis toward the periphery and a convex surface facing the object side.

Note that, the sag amount means a displacement amount to the optical axis direction, which indicates how much other positions on the lens surface is displaced to the optical axis direction with respect to the position on the optical axis in FIG. 51A. In addition, the reference spherical surface is a spherical surface having a radius of curvature R=3.1146 (mm) and a convex surface facing the object side.

FIG. 51B shows an aspherical amount. The aspherical amount means a sag amount $\Delta Z_{ASP}$ of the aspherical surface displaced from the reference curved surface to the optical axis direction, which is calculated by subtracting the sag amount of the spherical surface from the sag amount of the aspherical surface polynomial of Expression (11). Specifically, the aspherical amount is expressed by Expression (21).

As shown in FIG. 51B, in this example, the aspherical amount is displaced in the negative direction, and the aspherical surface is displaced from the reference spherical surface to the object side, namely to the outside of the imaging optical system.

Then, the aspherical amount of displacement of the imaging optical system to the outside is increased gradually as being away from the optical axis, and the largest aspherical amount is given in the periphery of the lens surface.

FIG. 52A shows a second order differential value of the aspherical surface by a solid line and a second order differential value of the reference spherical surface by a broken line.

Both the second order differential value of the aspherical surface and the second order differential value of the reference spherical surface are increased gradually in the positive direction as being away from the optical axis.

In addition, FIG. 52B shows the second order differential value of the aspherical component. This is obtained by subtracting the second order differential value of the reference spherical surface from the second order differential value of the aspherical surface.

The second order differential value of the aspherical component is increased gradually in the negative direction as being away from the optical axis.

In this way, the aspherical component having a negative second order differential value is given to the reference spherical surface having a positive second order differential value, and hence the second order differential value in the periphery of the lens surface is reduced to be smaller than that of the reference spherical surface.

Expression (24) indicates a relationship between the second order differential value and the power.

On the lens surface closest to the object side of the imaging optical system, the medium on the object side of the lens surface is air having N=1.0000, and the medium on the image side of the lens surface is optical glass having N'=1.87801. Therefore, (N'−N) has a positive value.

Therefore, the lens surface closest to the object side is formed as the lens surface shape having positive power on the optical axis which is gradually decreased as being away from the optical axis.

Thus, spherical aberration can be appropriately corrected.

Figure 53:
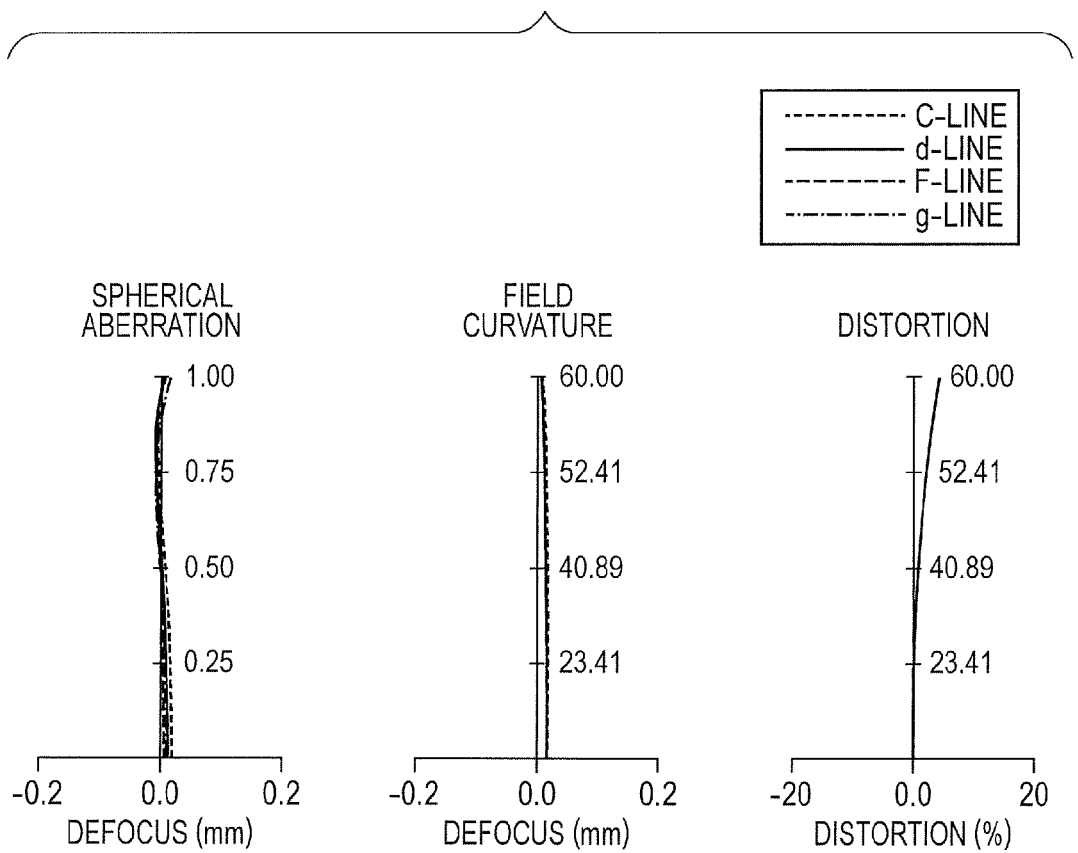
FIG. 53 is an axial aberration diagram of an imaging optical system according to Example 12 of the present invention.
Figure 54:
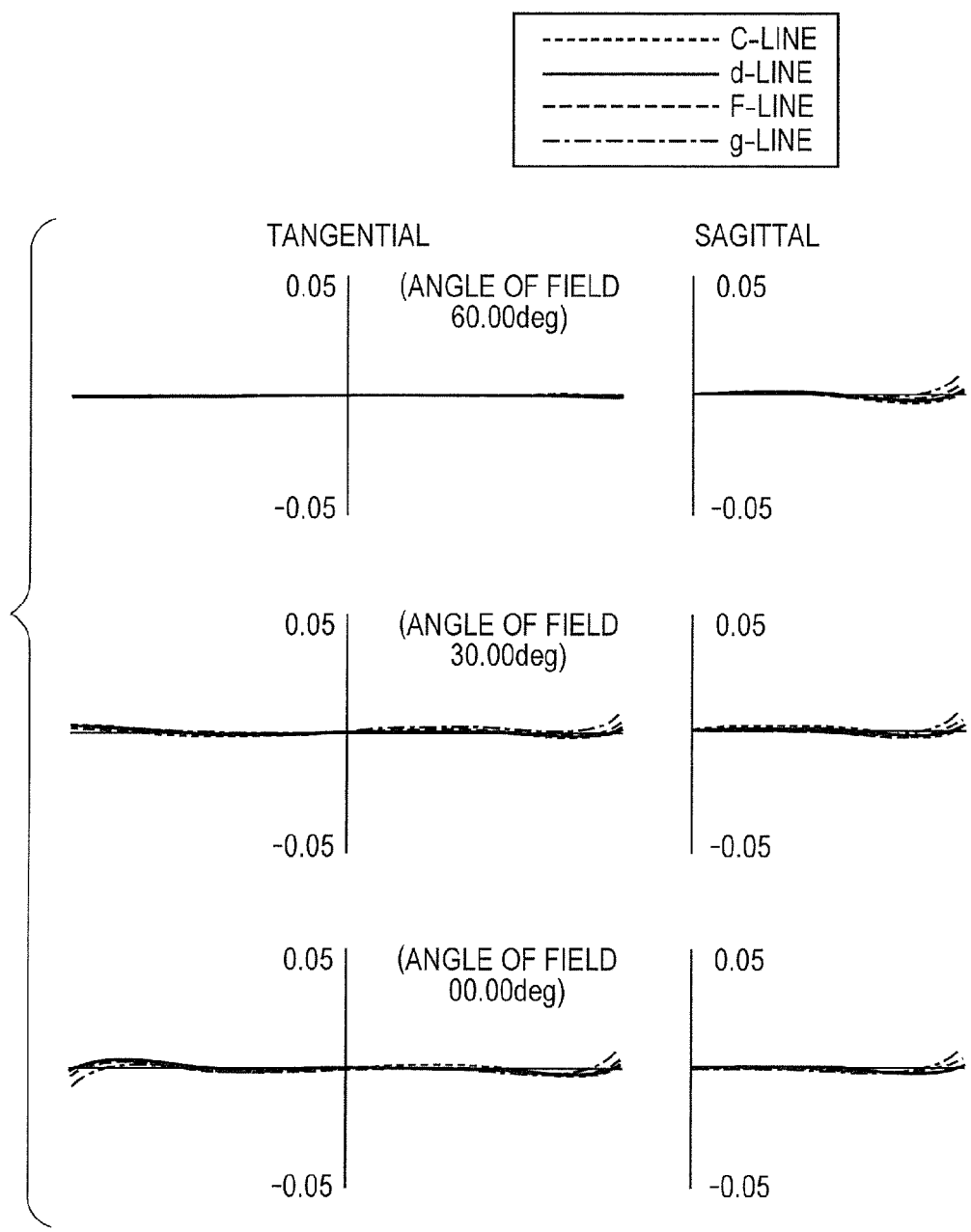
FIG. 54 is a lateral aberration diagram of the imaging optical system according to Example 12 of the present invention.

FIG. 53 illustrates an axial aberration diagram of the imaging optical system of this example, and FIG. 54 illustrates a lateral aberration diagram thereof.

As illustrated in FIG. 53, spherical aberration, axial chromatic aberration, astigmatism, field curvature, and chromatic spherical aberration are appropriately corrected. Here, the chromatic spherical aberration is defined as a difference between the spherical aberration amount of the reference wavelength (for example, d-line) and the spherical aberration amount of each wavelength (for example, C-line, F-line, g-line, or the like).

In particular, the light beam in the entire region from a low incident light beam height to a high incident light beam height can be condensed on the image plane, and hence spherical aberration can be very appropriately corrected.

In addition, axial chromatic aberration and chromatic spherical aberration are also very appropriately corrected so that high imaging performance is obtained.

As illustrated in FIG. 54, good performance is obtained in each field angle light beam, and coma, field curvature, and lateral chromatic aberration are appropriately corrected.

Table 47 shows the specifications of the imaging apparatus of this example.

TABLE 47

| Focal length of imaging optical system | f_sys | 3.600 (mm) |
| F value | F/# | 1.20 |
| Angle of field | 2ω | 120.0 (deg) |
| Entire length | L_sys | 6.229 (mm) |
| Distance from exit pupil to image plane | d_pup | 3.503 (mm) |

The imaging apparatus of this example has a small F value of F/1.2, a very wide angle of field of 120.0 (degrees), and a compact size with the entire length of 6.229 (mm), which is an example of the imaging apparatus in which brightness, high resolution, a very wide angle of field, and a compact size are realized at the same time.

Table 48 shows values of Expressions (1), (2), and (4) of the imaging apparatus of this example.

TABLE 48

| Conditional expression (1) | f_sys/d_pup | 1.03 |
| Conditional expression (2) | |R_img|/f_sys | 1.02 |
| Conditional expression (4) | |R_img|/d_pup | 1.05 |

The value of Expression (1) is 1.03 and satisfies the range of Expression (1). Thus, the optical system of the imaging optical system in the image side of the aperture stop can be close to a point symmetry structure, and hence coma, astigmatism, and lateral chromatic aberration can be appropriately corrected.

The value of Expression (2) is 1.02 and satisfies the range of Expression (2). Thus, field curvature and astigmatism can be appropriately corrected over a wide angle of field of 120.0 (degrees).

When Expressions (1) and (2) are satisfied, focus adjustment can be performed from infinity to a close distance only by changing the distance between the imaging optical system and the image plane without changing the image plane shape.

In addition, in the imaging apparatus of this embodiment, a radius of curvature of the image plane is set substantially equal to the distance from the exit pupil to the image plane of the imaging optical system.

The value of Expression (4) is 1.05 and satisfies the range of Expression (4).

Thus, the imaging optical system is close to a point symmetry structure, and hence coma, astigmatism, distortion, and lateral chromatic aberration are appropriately corrected. Further, focus adjustment can be performed while maintaining high resolution in a wide focus adjustment range from infinity to a close distance.

Next, an action of improving the peripheral darkening is described.

In the imaging optical system of the imaging apparatus of this example, the radius of curvature of the image plane is set substantially equal to the focal length of the imaging optical system so that the focal length can be substantially uniform over the full angle of field.

Thus, the peripheral light intensity ratio can be improved by the square of cos ω.

The largest half angle of field in this example is ω=60.0 (degrees) so that $\cos^2 \omega$ is 0.25 in contrast to $\cos^4 \omega = 0.0625$. Thus, peripheral light intensity can be improved by 4 times.

When Expression (2) is satisfied, it is possible to obtain a reasonable effect.

Further, in the imaging optical system of the imaging apparatus of this example, the radius of curvature of the image plane is set substantially equal to the distance from the exit pupil to the image plane of the imaging optical system, and hence the incident angle to the image plane can be set substantially orthogonal.

Thus, the peripheral light intensity ratio can be improved by the first power of cos ω.

The largest half angle of field in this example is ω=60.0 (degrees) so that $\cos^3 \omega$ is 0.125 in contrast to $\cos^4 \omega = 0.0625$. Thus, peripheral light intensity can be improved by 2 times.

When Expression (4) is satisfied, it is possible to obtain a reasonable effect.

When Expressions (2) and (4) are satisfied at the same time, the peripheral light intensity ratio can be improved by the third power of cos ω, and the peripheral light intensity can be increased to be 8 times the conventional value.

Thus, because the peripheral light intensity ratio of the imaging optical system having a wide angle of field can be significantly improved, it is possible to provide the imaging apparatus that can take a high quality image with high contrast and little noise over a wide angle of field.

As described above, using the effect of this embodiment, it is possible to realize the imaging apparatus having good imaging performance over a wide angle of field even at an F value smaller than F/2.0 with a compact structure.

In addition, the peripheral darkening can be significantly improved, and hence it is possible to realize the imaging optical system that is very bright over a wide angle of field.

Thus, because the exposure time can be significantly shortened, it is possible to provide the imaging apparatus that can take a high quality image in which blur due to shaking, image blur due to movement of object, and noise are appropriately reduced.

In addition, it is possible to provide an imaging optical system in which a defocused subject can be significantly blurred even with a compact structure.

Further, using the above-mentioned high performance imaging optical system with the simple structure, focus adjustment can be performed with little deterioration of imaging performance in a wide range from infinity to a close distance.

EXAMPLE 13

In Example 13, a structural example of an imaging apparatus having a form different from that of Example 12 is described.

Figure 55:
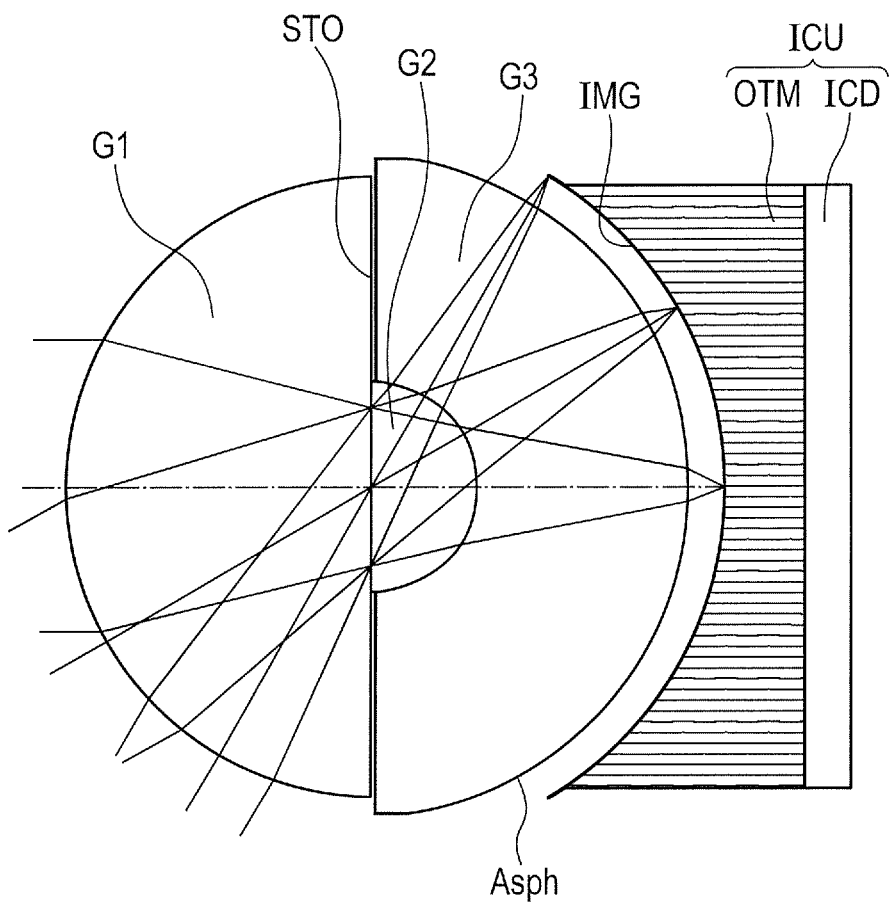
FIG. 55 is a diagram illustrating a structural example of an imaging apparatus according to Example 13 of the present invention.

An imaging optical system used in an imaging apparatus of this example includes three lenses G1, G2, and G3 and the aperture stop STO as illustrated in FIG. 55.

The imaging optical system includes, in order from the object side: a first lens G1 as a plano-convex lens having a concave surface facing the object side; a second lens G2 as a plano-convex lens having a convex surface facing the image side; and a third lens G3 as a meniscus lens having a convex surface facing the image side.

In FIG. 55, IMG represents the image plane.

As illustrated in FIG. 55, the image plane IMG of the imaging apparatus according to this example is the incident surface of the optical transmission unit OTM formed into a sphere shape, which is formed along the field curvature of the imaging optical system. Therefore, good image formation is realized over the entire region of the image plane IMG.

The optical transmission unit OTM of the imaging apparatus according to this example is an image fiber formed of bound optical fibers of a few micron pitch and has a role of transmitting an image formed on the image plane of the imaging optical system to the image sensor ICD.

The exit surface of the optical transmission unit OTM is formed to be a flat surface so as to be in intimate contact with the image sensor ICD for connection. Thus, an image sensor unit ICU is formed.

Table 49 shows a structure of the imaging apparatus of this example.

Surface number 1 is the incident surface of the first lens G1. Surface number 2 is the cemented surface between the exit surface of the first lens G1 and the incident surface of the second lens G2. The light blocking member is disposed in the non-effective part in the plane of the surface number 2 so as to constitute the aperture stop STO.

Surface number 3 is the cemented surface between the exit surface of the second lens G2 and the incident surface of the third lens G3. Surface number 4 is the exit surface of the third lens G3 having a rotation symmetry aspherical shape expressed by the polynomial of Expression (11).

Surface number 5 is the image plane IMG, which is the incident surface of the optical transmission unit OTM. Further, the exit surface of the optical transmission unit OTM (not shown) is connected to the imaging element ICD.

In Table 49, R represents a radius of curvature (mm), d represents a surface interval (mm), Nd represents a d-line refractive index, and vd represents an Abbe number. Note that, the surface with a mark "(a)" is an aspherical surface.

TABLE 49

Configuration table

| Surface number | R | d | Nd | vd |
|---|---|---|---|---|
| 1 | 3.1614 | 3.1553 | 1.89070 | 39.0 |
| 2 (STO) | Flat surface | 1.0594 | 1.89070 | 39.0 |
| 3 | −1.0655 | 2.2219 | 2.00170 | 21.8 |
| 4 | −2.9424(a) | 0.3520 | | |
| 5 (IMG) | −3.6656 | | | |

The aspherical surface coefficients of surface number 4 of the imaging apparatus of this example are shown in Table 50.

TABLE 50

Aspherical surface coefficients (Surface number 4)

| Parameter | Symbol | Value |
|---|---|---|
| Conic constant | K | −1.66411E+00 |
| Fourth order coefficient | A | 5.83546E−03 |
| Sixth order coefficient | B | −3.55248E−03 |
| Eighth order coefficient | C | 4.46561E−04 |
| Tenth order coefficient | D | −2.33467E−05 |

In the imaging apparatus of this example, the lens surface closest to the image side is formed to be an aspherical surface.

Figure 56A:
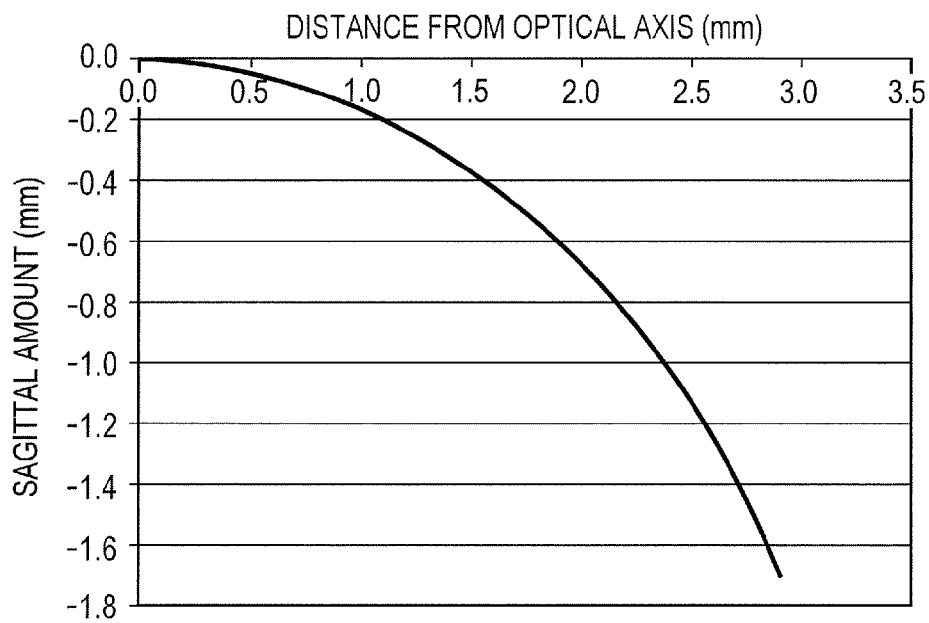
FIG. 56A is a diagram showing an aspherical shape of a lens surface closest to the image side in the imaging apparatus according to Example 13 of the present invention.
Figure 56B:
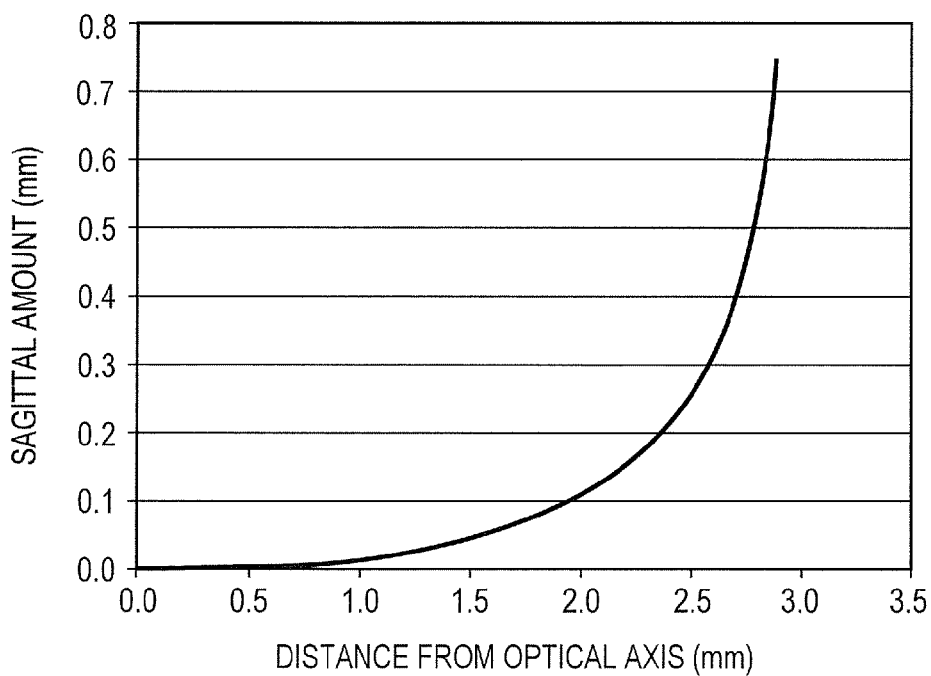
FIG. 56B is a diagram showing an aspherical amount of the lens surface closest to the image side of the imaging apparatus according to Example 13 of the present invention.
Figure 57A:
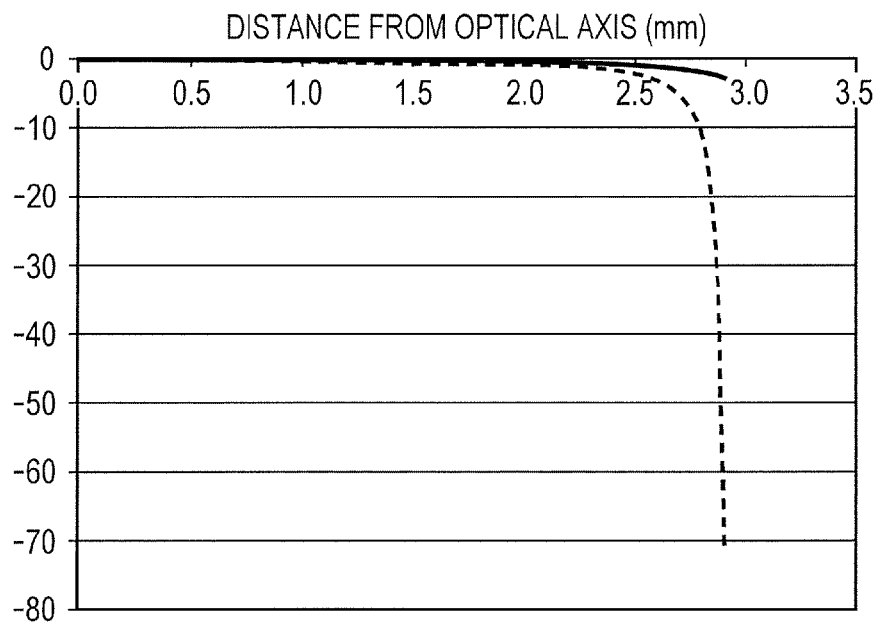
FIG. 57A is a diagram showing a second order differential value of an aspherical surface and a reference spherical surface of the lens surface closest to the image side in the imaging apparatus according to Example 13 of the present invention.
Figure 57B:
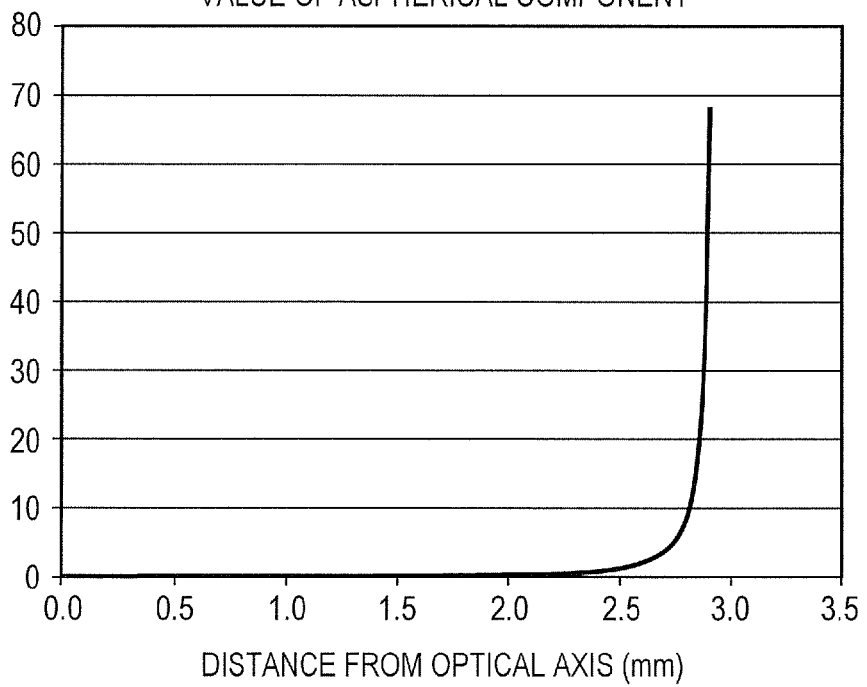
FIG. 57B is a diagram showing a second order differential value of an aspherical component of the lens surface closest to the image side in the imaging apparatus according to Example 13 of the present invention.

FIG. 56A illustrates an aspherical shape of the lens surface closest to the image side, and FIG. 56B illustrates an aspherical amount of the lens surface closest to the image side. In addition, FIG. 57A illustrates second order differential values of the aspherical surface and the reference spherical surface, and FIG. 57B illustrates the second order differential value of the aspherical component.

As illustrated in FIG. 56A, the lens surface closest to the image side in this example is a lens surface having a sag amount increasing in the negative direction from the optical axis toward the periphery, and is a convex surface facing the image side.

The reference spherical surface of this lens surface is a spherical surface having a convex surface facing the image side and a radius of curvature R=−2.9424 (mm).

FIG. 56B illustrates the aspherical amount.

As illustrated in FIG. 56B, in this example, the aspherical amount is displaced in the positive direction, and the aspherical surface is displaced from the reference spherical surface to the image side, namely to the outside of the imaging optical system.

Further, the aspherical amount of the imaging optical system displaced to the outside is gradually increased as being away from the optical axis so as to give the largest aspherical amount in the periphery of the lens surface.

FIG. 57A illustrates the second order differential value of the aspherical surface by a solid line and the second order differential value of the reference spherical surface by a broken line.

Both the second order differential value of the aspherical surface and the second order differential value of the reference spherical surface have negative values.

FIG. 57B illustrates the second order differential value of the aspherical component.

The second order differential value of the aspherical component is increased gradually in the positive direction as being away from the optical axis.

In this way, the aspherical component having a positive second order differential value is given to the reference spherical surface having a negative second order differential value. Thus, the second order differential value in the periphery of the lens surface is reduced to be smaller than that of the reference spherical surface. Expression (24) indicates a relationship between the second order differential value and the power.

On the lens surface closest to the image side in the imaging optical system, the medium on the object side of the lens surface is optical glass having N=2.00170, and the medium on the image side of the lens surface is air having N'=1.0000. Therefore, (N'−N) has a negative value.

Therefore, the lens surface closest to the image side has the lens surface shape having positive power on the optical axis which is gradually decreased as being away from the optical axis.

Thus, spherical aberration can be appropriately corrected.

In particular, when the lens surface closest to the image side has the aspherical surface having the aspherical amount displaced from the reference spherical surface to the outside of the imaging optical system in the periphery of the lens surface, spherical aberration of the field angle light beam in a wide field angle region can be appropriately corrected.

Figure 58:
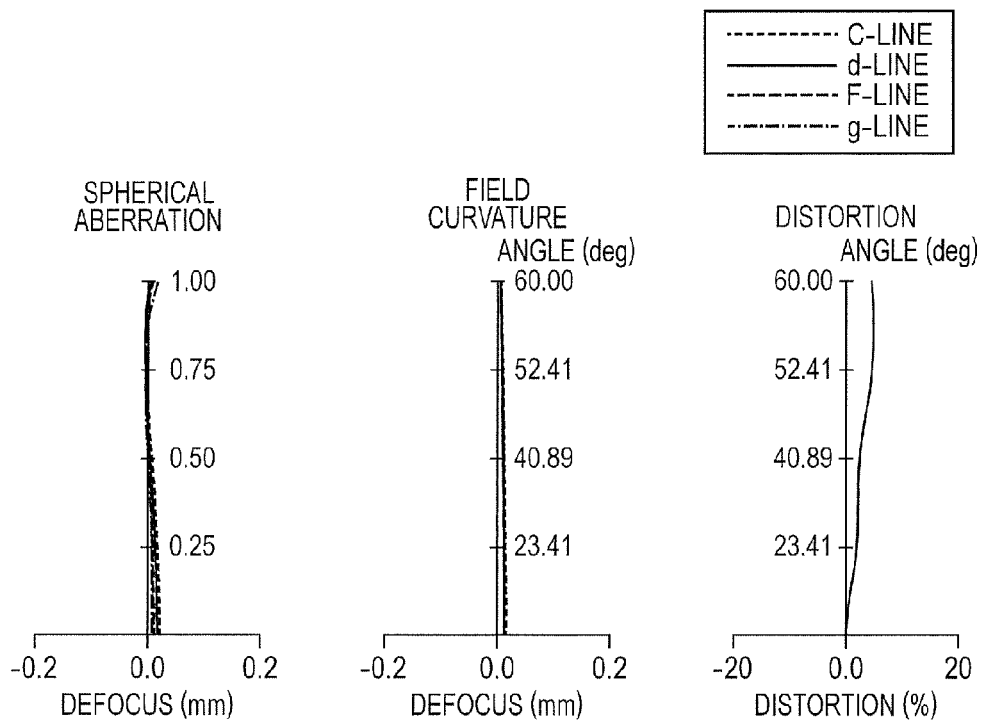
FIG. 58 is an axial aberration diagram of an imaging optical system according to Example 13 of the present invention.
Figure 59:
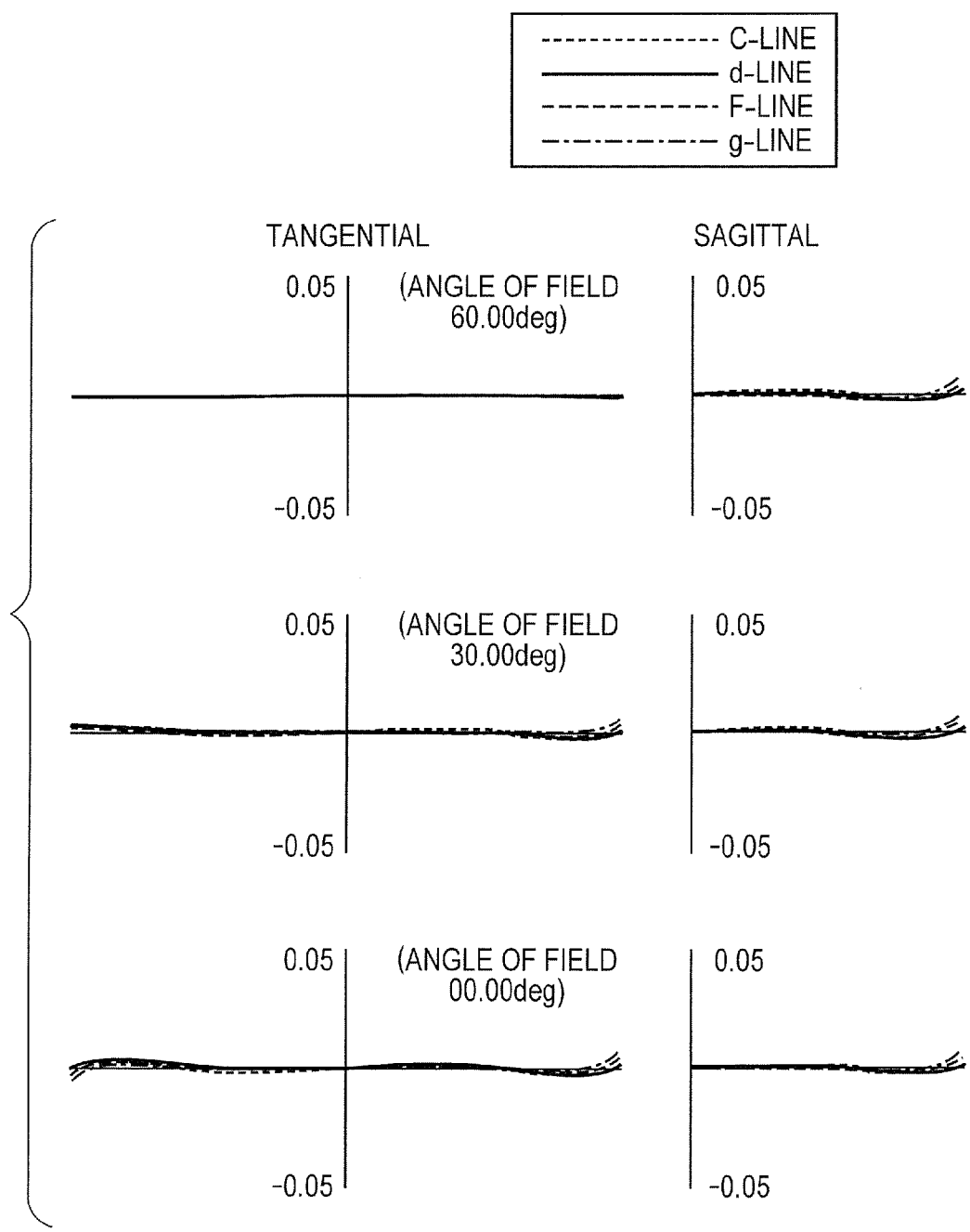
FIG. 59 is a lateral aberration diagram of the imaging optical system according to Example 13 of the present invention.

FIG. 58 illustrates an axial aberration diagram of the imaging optical system of this example, and FIG. 59 illustrates a lateral aberration diagram thereof. As illustrated in FIG. 58, spherical aberration, axial chromatic aberration, astigmatism, field curvature, and chromatic spherical aberration are appropriately corrected. In particular, the light beam in the entire region from a low incident light beam height to a high incident light beam height can be condensed on the image plane, and hence spherical aberration can be very appropriately corrected.

In addition, axial chromatic aberration and chromatic spherical aberration are also very appropriately corrected so that high imaging performance is obtained.

As illustrated in FIG. 59, good performance is obtained in each field angle light beam, and coma, field curvature, and lateral chromatic aberration are appropriately corrected.

Table 51 shows the specifications of the imaging apparatus of this example.

TABLE 51

| Focal length of imaging optical system | f_sys | 3.600 (mm) |
|---|---|---|
| F value | F/# | 1.20 |
| Angle of field | 2ω | 120.0 (deg) |
| Entire length | L_sys | 6.437 (mm) |
| Distance from exit pupil to image plane | d_pup | 4.062 (mm) |

The imaging apparatus of this example has a small F value of F/1.2, a very wide angle of field of 120.0 (degrees), and a compact size with the entire length of 6.437 (mm), which is an example of the imaging apparatus in which brightness, high resolution, a very wide angle of field, and a compact size are realized at the same time.

TABLE 52

| Conditional expression (1) | f_sys/d_pup | 0.89 |
|---|---|---|
| Conditional expression (2) | |R_img|/f_sys | 1.02 |
| Conditional expression (4) | |R_img|/d_pup | 0.90 |

Table 52 shows values of Expressions (1), (2), and (4) of the imaging apparatus of this example.

The value of Expression (1) is 0.89 and satisfies the range of Expression (1). Thus, the optical system of the imaging optical system from the aperture stop to the image side can be close to a point symmetry structure, and hence coma, astigmatism, distortion, and lateral chromatic aberration can be appropriately corrected.

The value of Expression (2) is 1.02 and satisfies the range of Expression (2). Thus, field curvature and astigmatism can be appropriately corrected over a wide angle of field of 120.0 (degrees).

When Expressions (1) and (2) are satisfied, focus adjustment can be performed from infinity to a close distance only by changing the distance between the imaging optical system and the image plane while not changing the shape of the image plane.

The value of Expression (4) is 0.90 and satisfies the range of Expression (4).

Thus, the imaging optical system is close to a point symmetry structure, and hence coma, astigmatism, distortion, and lateral chromatic aberration are appropriately corrected.

Further, focus adjustment can be performed while maintaining high resolution in a wide focus adjustment range from infinity to a close distance.

EXAMPLE 14

In Example 14, a structural example of an imaging apparatus having a form different from those of the above-mentioned examples is described.

Figure 60:
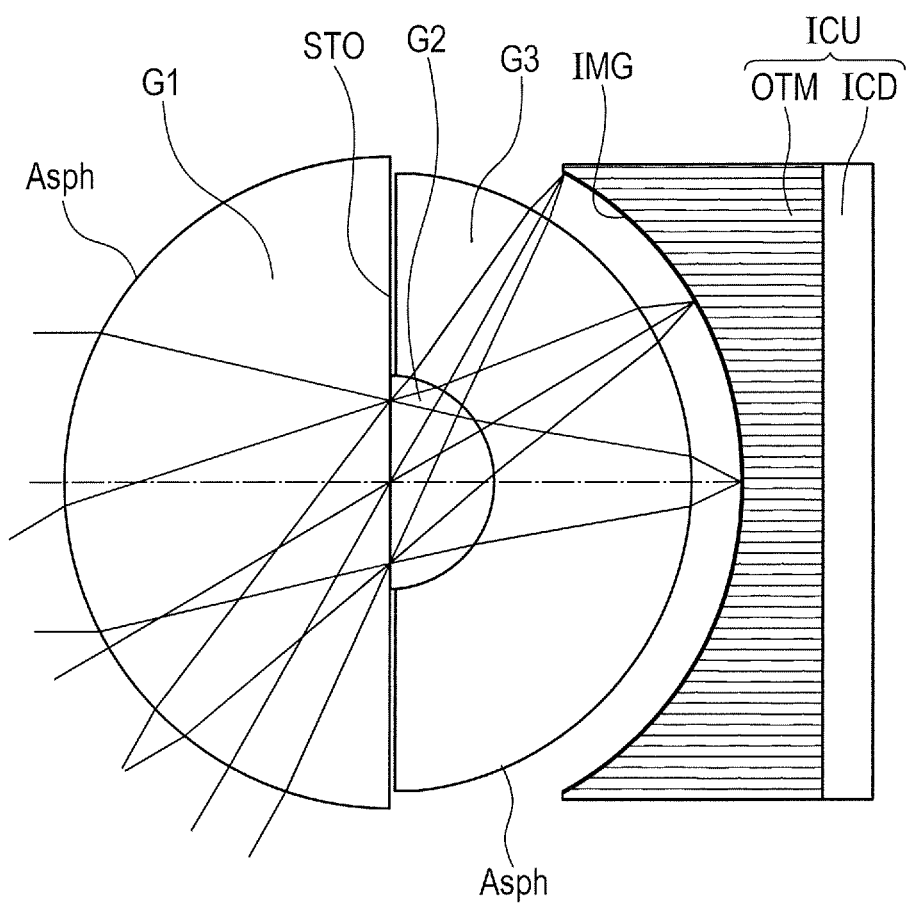
FIG. 60 is a diagram illustrating a structural example of an imaging apparatus according to Example 14 of the present invention.

An imaging optical system used in an imaging apparatus of this example includes three lenses G1, G2, and G3 and the aperture stop STO as illustrated in FIG. 60.

The imaging optical system includes, in order from the object side: a first lens G1 as a meniscus lens having a convex surface facing the object side; a second lens G2 as a plano-convex lens having a convex surface facing the image side; and a third lens G3 as a meniscus lens having a convex surface facing the image side.

In FIG. 60, IMG represents the image plane.

As illustrated in FIG. 60, the image plane IMG of the imaging apparatus according to this example is the incident surface of the optical transmission unit OTM formed into a sphere shape, which is formed along the field curvature of the imaging optical system. Therefore, good image formation is realized over the entire region of the image plane IMG.

The optical transmission unit OTM of the imaging apparatus according to this example is an image fiber formed of bound optical fibers of a few micron pitch and has a role of transmitting an image formed on the image plane of the imaging optical system to the image sensor ICD.

The exit surface of the optical transmission unit OTM is formed to be a flat surface so as to be in intimate contact with the image sensor ICD for connection. Thus, an image sensor ICD is constituted.

Table 53 shows a structure of the imaging apparatus of this example.

Surface number 1 is the incident surface of the first lens G1 having a rotation symmetry aspherical shape expressed by the polynomial of Expression (11).

Surface number 2 is the cemented surface between the exit surface of the first lens G1 and the incident surface of the second lens G2. The light blocking member is disposed in the non-effective part in the plane of the surface number 2 so as to constitute the aperture stop STO. Surface number 3 is the cemented surface between the exit surface of the second lens G2 and the incident surface of the third lens G3. Surface number 4 is the exit surface of the third lens G3 having a rotation symmetry aspherical shape expressed by the polynomial of Expression (11).

Surface number 5 is the image plane IMG, which is the incident surface of the optical transmission unit OTM. Further, the exit surface of the optical transmission unit OTM (not shown) is connected to the image sensor ICD.

In Table 53, R represents a radius of curvature (mm), d represents a surface interval (mm), Nd represents a d-line refractive index, and νd represents an Abbe number. Note that, the surface with a mark "(a)" is an aspherical surface.

TABLE 53

Configuration table

| Surface number | R | d | Nd | vd |
|---|---|---|---|---|
| 1 | 3.2643(a) | 3.2974 | 1.88202 | 37.2 |
| 2 (STO) | Flat surface | 1.0627 | 1.88202 | 37.2 |
| 3 | −1.0664 | 2.0109 | 2.00270 | 19.3 |
| 4 | −2.9174(a) | 0.5118 | | |
| 5 (IMG) | −3.5746 | | | |

Table 54A shows aspherical surface coefficients of surface number 1 in the imaging apparatus of this example, and Table 54B shows aspherical surface coefficients of surface number 4.

TABLE 54A

Aspherical surface coefficients (Surface number 1)

| Parameter | Symbol | Value |
|---|---|---|
| Conic constant | K | −2.67630E−03 |
| Fourth order coefficient | A | −1.66783E−04 |
| Sixth order coefficient | B | 5.41266E−05 |
| Eighth order coefficient | C | −7.27371E−06 |
| Tenth order coefficient | D | 3.44022E−07 |

TABLE 54B

Aspherical surface coefficient (Surface number 4)

| Parameter | Symbol | Value |
|---|---|---|
| Conic constant | K | −9.09146E−01 |
| Fourth order coefficient | A | −1.21019E−04 |
| Sixth order coefficient | B | −1.78470E−03 |
| Eighth order coefficient | C | 2.94879E−04 |
| Tenth order coefficient | D | −2.53496E−05 |

In the imaging apparatus of this example, the lens surface closest to the object side and the lens surface closest to the image side are formed as aspherical surfaces.

Figure 61A:
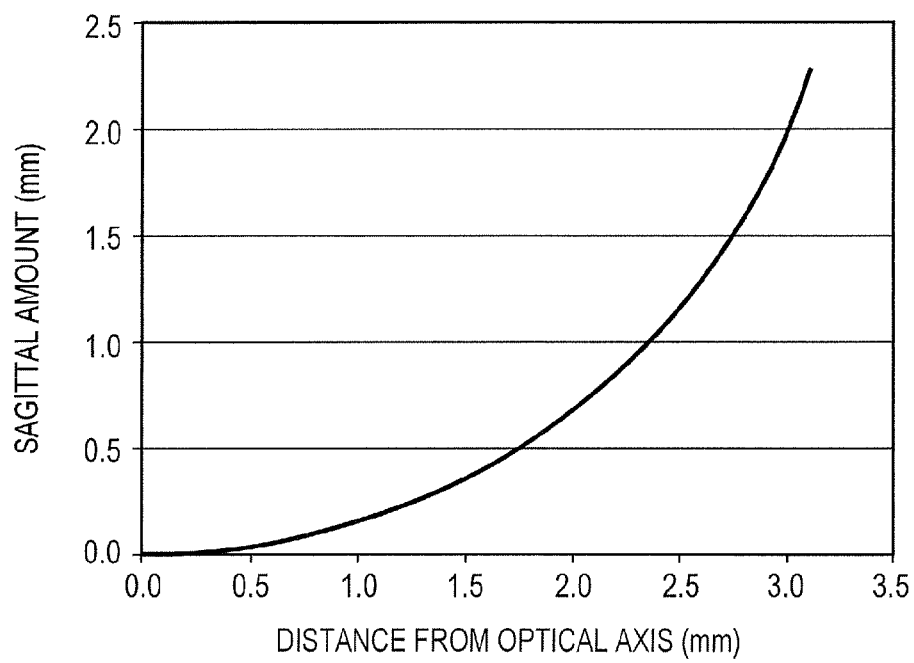
FIG. 61A is a diagram showing an aspherical shape of a lens surface closest to the object side of the imaging apparatus according to Example 14 of the present invention.
Figure 61B:
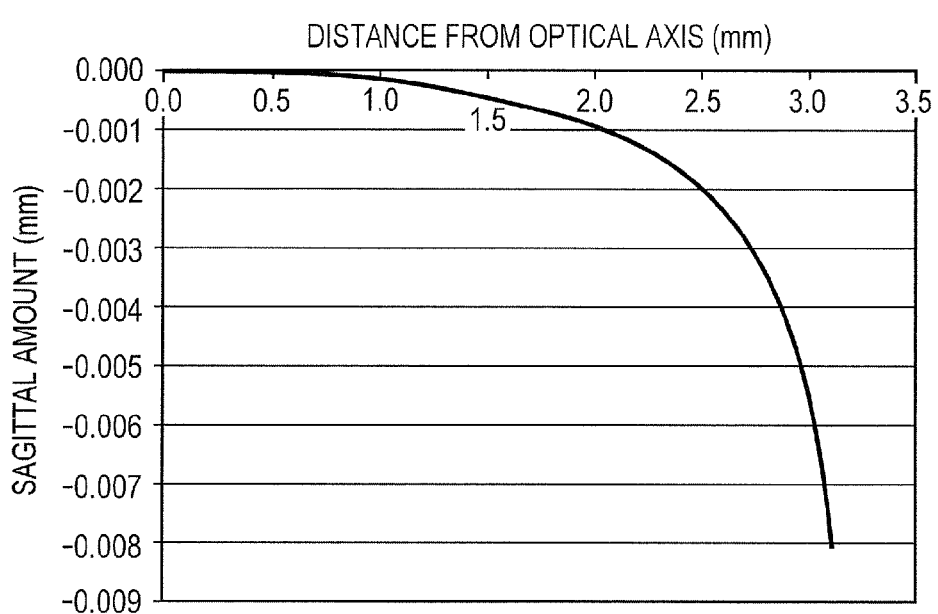
FIG. 61B is a diagram showing an aspherical amount of the lens surface closest to the object side of the imaging apparatus according to Example 14 of the present invention.
Figure 62A:
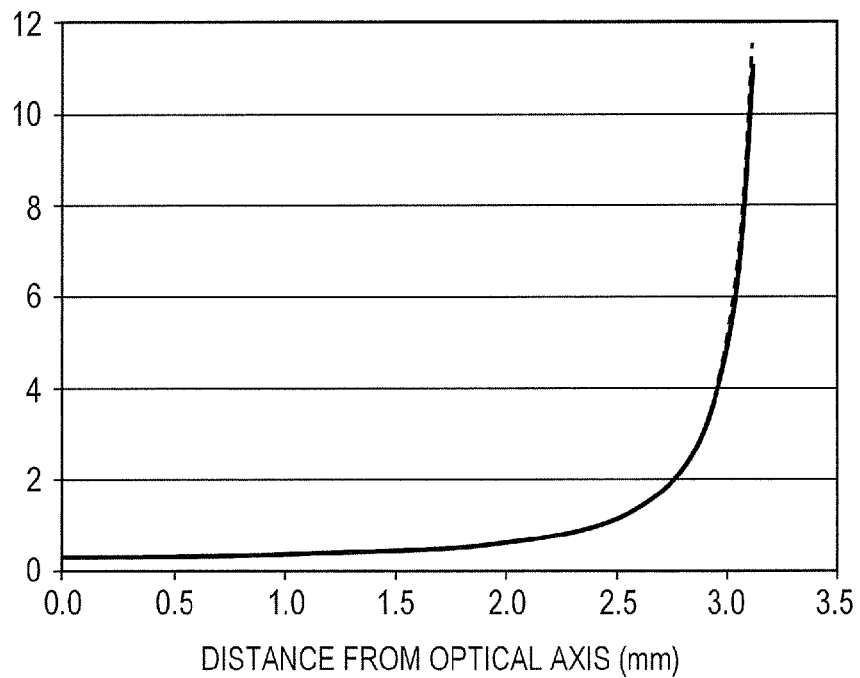
FIG. 62A is a diagram showing a second order differential value of an aspherical surface and a reference spherical surface of the lens surface closest to the object side of the imaging apparatus according to Example 14 of the present invention.
Figure 62B:
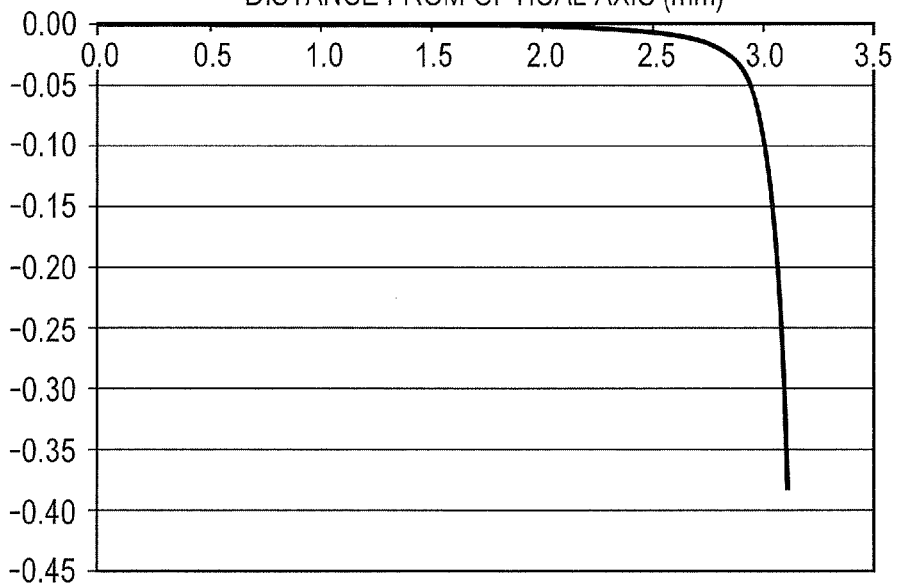
FIG. 62B is a diagram showing a second order differential value of an aspherical component of the lens surface closest to the object side of the imaging apparatus according to Example 14 of the present invention.

FIG. 61A shows an aspherical shape of the lens surface closest to the object side, and FIG. 61B shows an aspherical amount of the lens surface closest to the object side. In addition, FIG. 62A shows second order differential values of the aspherical surface and the reference spherical surface, and FIG. 62B shows the second order differential value of the aspherical component.

As shown in FIG. 61A, the lens surface closest to the object side in this example is a lens surface having a sag amount increasing in the positive direction from the optical axis toward the periphery, and a convex surface facing the object side.

The reference spherical surface of this lens surface is a spherical surface having a convex surface facing the object side and a radius of curvature R=3.2643 (mm).

FIG. 61B shows the aspherical amount.

As shown in FIG. 61B, in this example, the aspherical amount is displaced in the negative direction, and the aspherical surface is displaced from the reference spherical surface to the object side, namely to the outside of the imaging optical system.

Further, the aspherical amount of the imaging optical system displaced to the outside is gradually increased as being away from the optical axis so as to give the largest aspherical amount in the periphery of the lens surface.

FIG. 62A shows the second order differential value of the aspherical surface by a solid line and the second order differential value of the reference spherical surface by a broken line. Both the second order differential value of the aspherical surface and the second order differential value of the reference spherical surface have a positive value.

FIG. 62B shows the second order differential value of the aspherical component.

The second order differential value of the aspherical component is increased gradually in the negative direction as being away from the optical axis.

In this way, the aspherical component having a negative second order differential value is given to the reference spherical surface having a positive second order differential value. Thus, the second order differential value in the periphery of the lens surface is reduced to be smaller than that of the reference spherical surface.

Expression (24) indicates a relationship between the second order differential value and the power.

On the lens surface closest to the object side in the imaging optical system, the medium on the object side of the lens surface is air having N=1.0000, and the medium on the image side of the lens surface is optical glass having N'=1.88202. Therefore, (N'−N) has a positive value.

Therefore, the lens surface closest to the object side is formed as the lens surface shape having positive power on the optical axis which is gradually decreased as being away from the optical axis.

Thus, spherical aberration can be appropriately corrected.

In particular, when the lens surface closest to the object side is formed as the aspherical surface having the aspherical amount displaced from the reference spherical surface to the outside of the imaging optical system in the periphery of the lens surface, spherical aberration of the field angle light beam in axial light and the vicinity of the axis can be appropriately corrected.

Figure 63A:
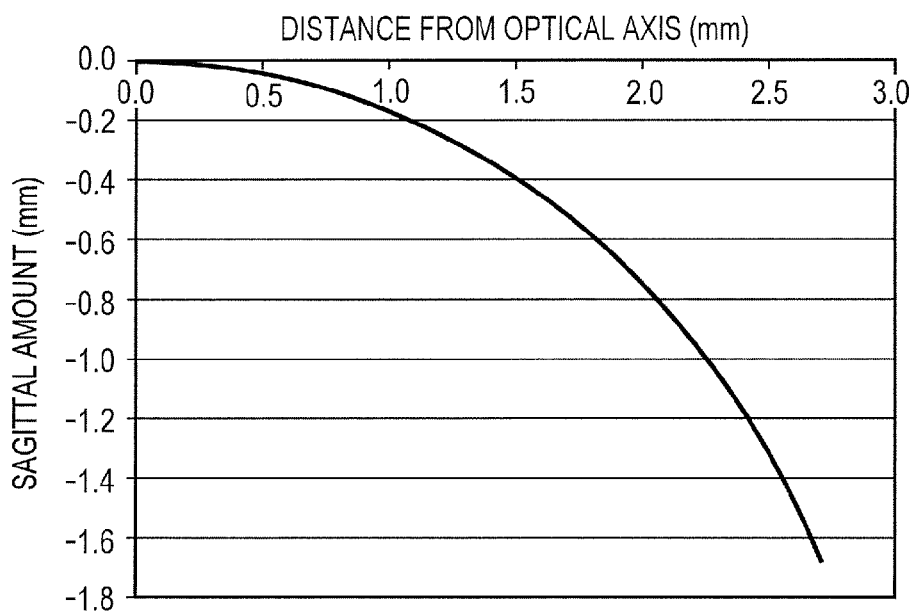
FIG. 63A is a diagram showing of an aspherical shape of a lens surface closest to the image side of the imaging apparatus according to Example 14 of the present invention.
Figure 63B:
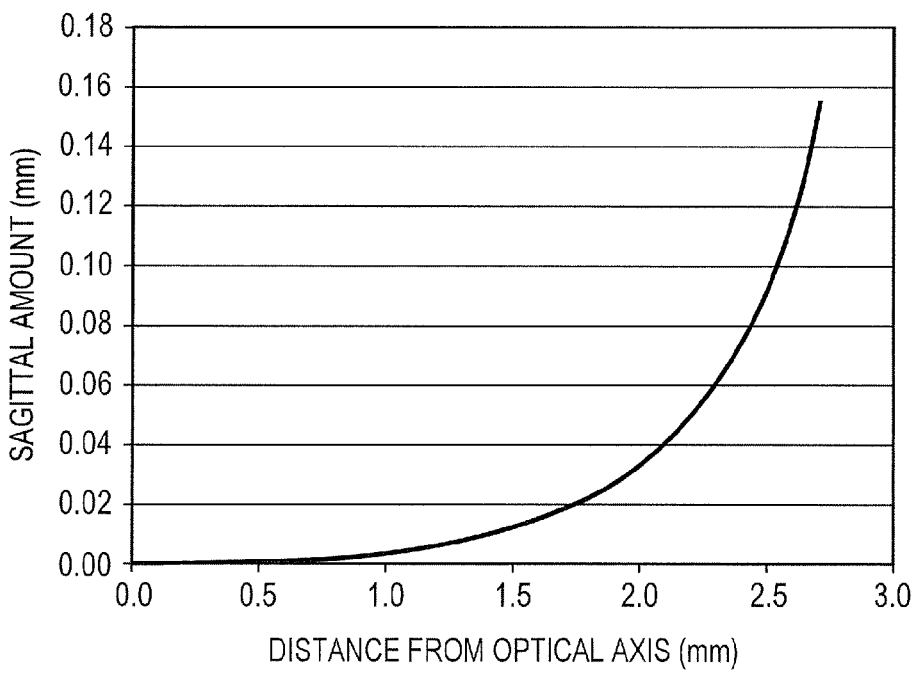
FIG. 63B is a diagram showing an aspherical amount of the lens surface closest to the image side of the imaging apparatus according to Example 14 of the present invention.
Figure 64A:
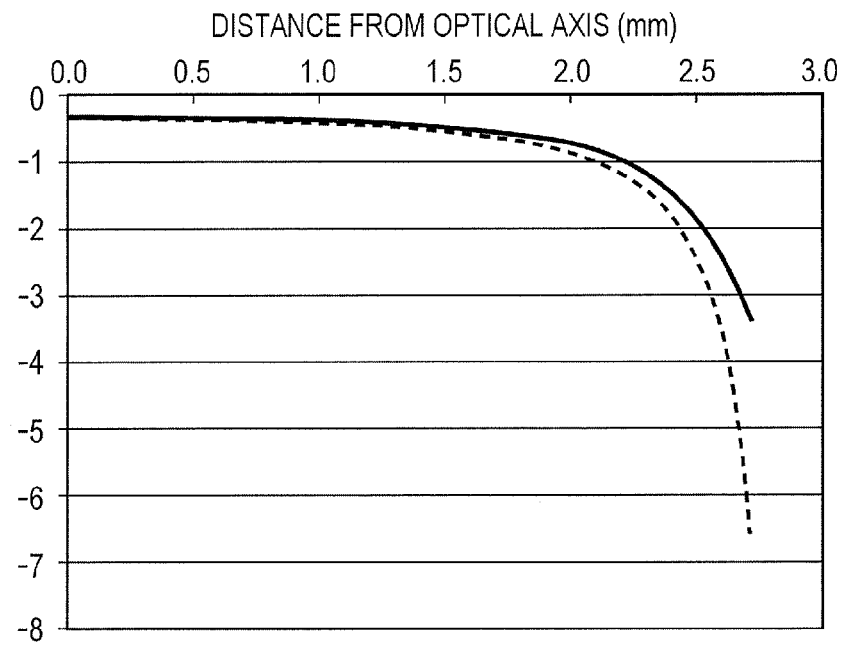
FIG. 64A is a diagram showing a second order differential value of an aspherical surface and a reference spherical surface of the lens surface closest to the image side of the imaging apparatus according to Example 14 of the present invention.
Figure 64B:
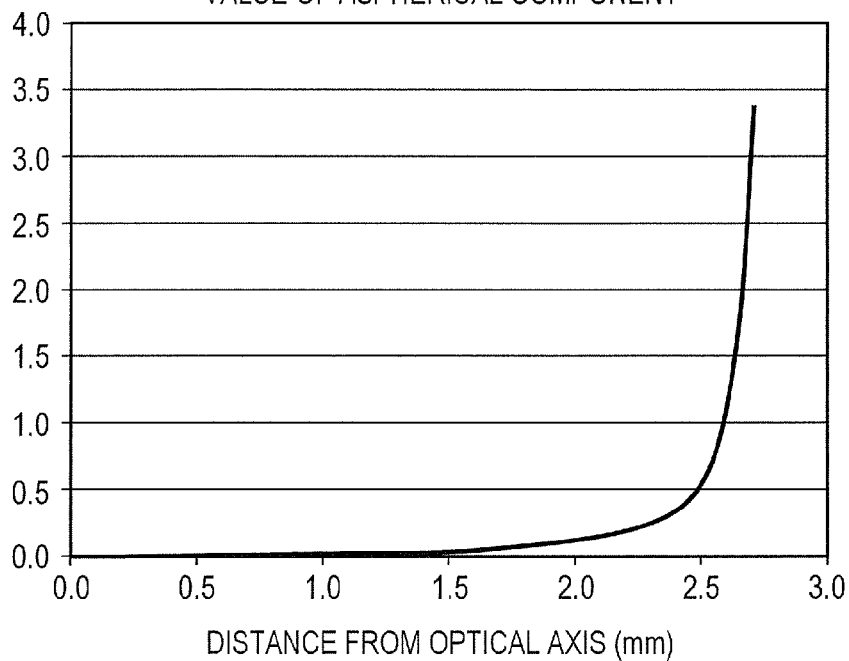
FIG. 64B is a diagram showing a second order differential value of an aspherical component of the lens surface closest to the image side of the imaging apparatus according to Example 14 of the present invention.

FIG. 63A shows an aspherical shape of the lens surface closest to the image side, and FIG. 63B shows an aspherical amount of the lens surface closest to the image side. In addition, FIG. 64A shows second order differential values of the aspherical surface and the reference spherical surface, and FIG. 64B shows the second order differential value of the aspherical component.

As shown in FIG. 63A, the lens surface closest to the image side in this example is a lens surface having a sag amount increasing in the negative direction as being away from the optical axis toward the periphery, and is a convex surface facing the image side.

The reference spherical surface of this lens surface is a spherical surface having a convex surface facing the image side and a radius of curvature R=−2.9174 (mm).

FIG. 63B shows the aspherical amount.

As shown in FIG. 63B, in this example, the aspherical amount is displaced in the positive direction, and the aspherical surface is displaced from the reference spherical surface to the image side, namely to the outside of the imaging optical system.

Further, the aspherical amount of the imaging optical system displaced to the outside is gradually increased as being away from the optical axis so as to give the largest aspherical amount in the periphery of the lens surface.

FIG. 64A shows the second order differential value of the aspherical surface by a solid line and the second order differential value of the reference spherical surface by a broken line. Both the second order differential value of the aspherical surface and the second order differential value of the reference spherical surface have a negative value.

FIG. 64B shows the second order differential value of the aspherical component.

The second order differential value of the aspherical component is increased gradually in the positive direction as being away from the optical axis.

In this way, the aspherical component having a positive second order differential value is given to the reference spherical surface having a negative second order differential value. Thus, the second order differential value in the periphery of the lens surface is reduced to be smaller than that of the reference spherical surface.

On the lens surface closest to the image side in the imaging optical system, the medium on the object side of the lens surface is optical glass having N=2.00270, and the medium on the image side of the lens surface is air having N'=1.0000. Therefore, (N'−N) has a negative value.

Therefore, the lens surface closest to the image side is formed as the lens surface shape having positive power on the optical axis which is gradually decreased as being away from the optical axis.

Thus, spherical aberration can be appropriately corrected.

In particular, when the lens surface closest to the image side is formed as the aspherical surface having the aspherical amount displaced from the reference spherical surface to the outside of the imaging optical system in the periphery of the lens surface, spherical aberration of the field angle light beam in a wide field angle region can be appropriately corrected.

Figure 65:
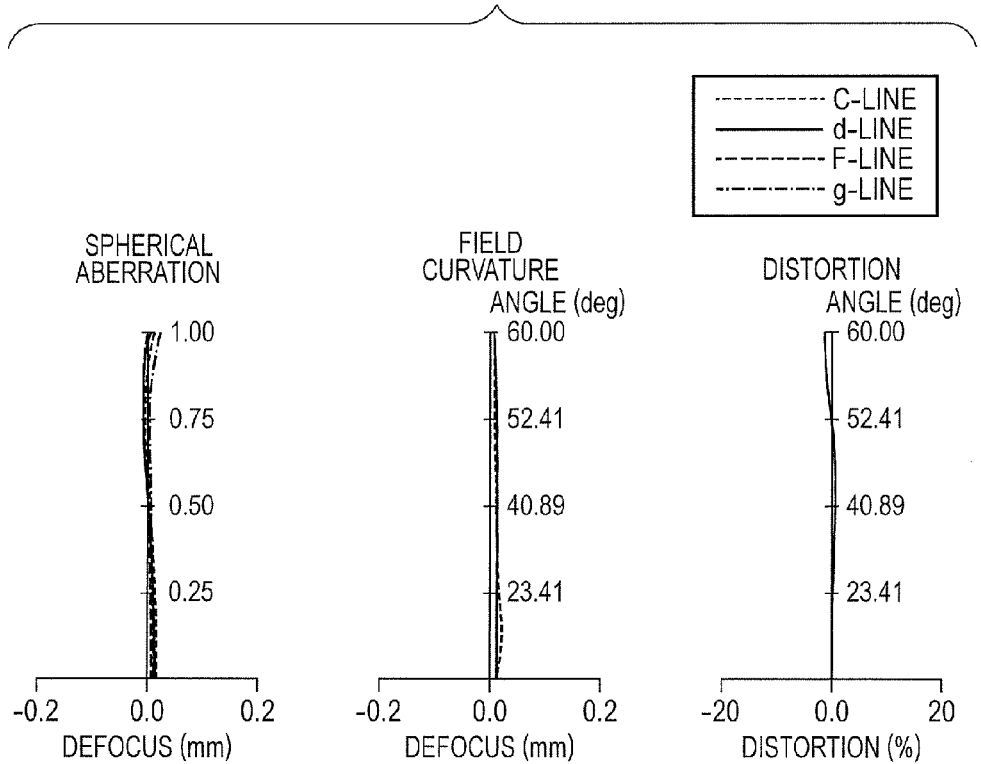
FIG. 65 is an axial aberration diagram of an imaging optical system according to Example 14 of the present invention.
Figure 66:
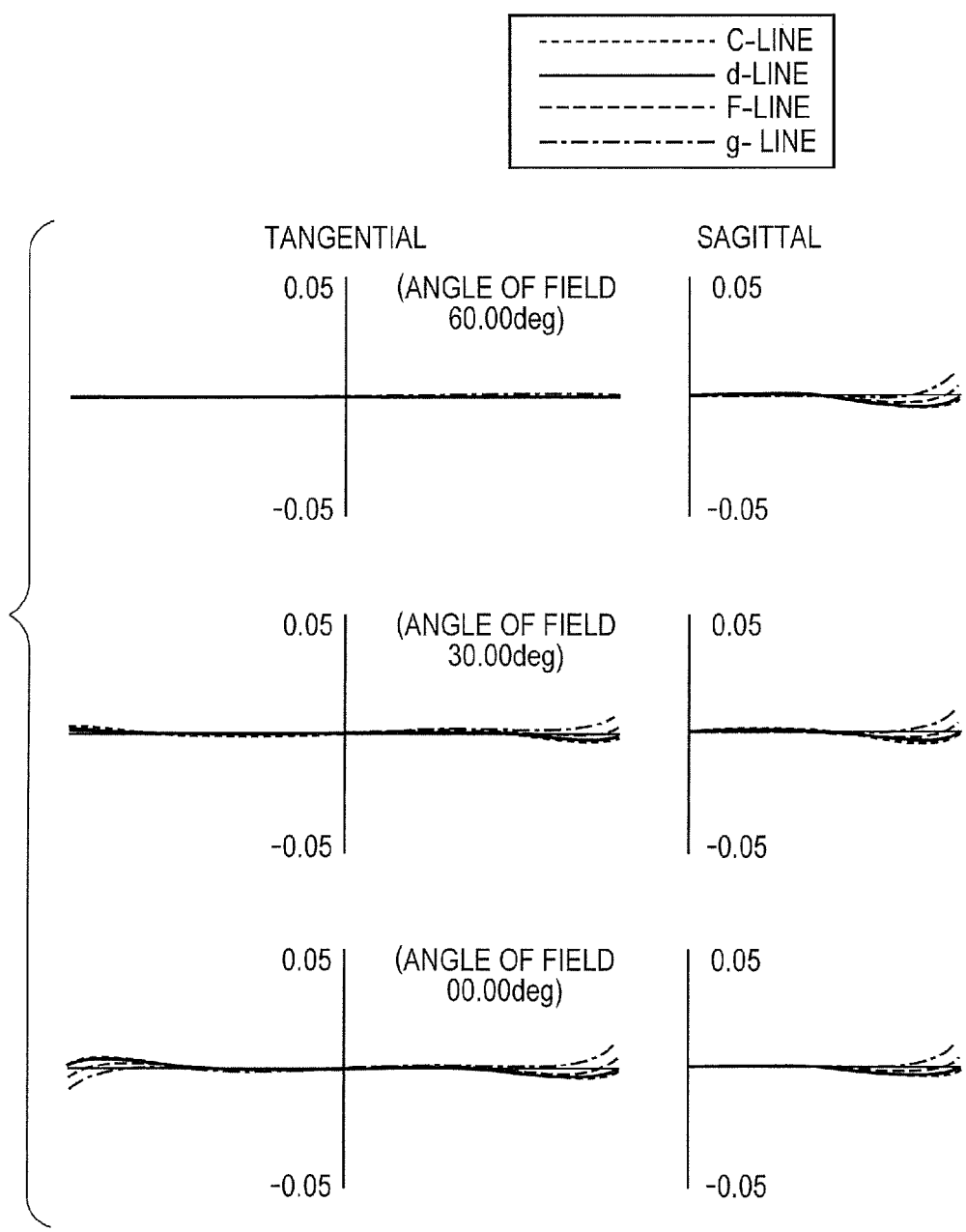
FIG. 66 is a lateral aberration diagram of the imaging optical system according to Example 14 of the present invention.

FIG. 65 illustrates an axial aberration diagram of the imaging optical system of this example, and FIG. 66 illustrates a lateral aberration diagram thereof.

As illustrated in FIG. 65, spherical aberration, axial chromatic aberration, astigmatism, field curvature, and chromatic spherical aberration are appropriately corrected. In particular, the light beam in the entire region from a low incident light beam height to a high incident light beam height can be condensed on the image plane, and hence spherical aberration can be very appropriately corrected.

In addition, axial chromatic aberration and chromatic spherical aberration are also very appropriately corrected so that high imaging performance is obtained.

As illustrated in FIG. 66, good performance is obtained in each field angle light beam, and coma, field curvature, and lateral chromatic aberration are appropriately corrected.

As in this example, both the lens surface closest to the object side and the lens surface closest to the image side are formed as the aspherical surface having the aspherical amount displaced from the reference spherical surface to the outside of the imaging optical system in the periphery of the lens surface. Thus, the spherical aberration can be corrected with high accuracy over a wide angle of field.

Table 55 shows the specifications of the imaging apparatus of this example.

TABLE 55

| Focal length of imaging optical system | f_sys | 3.600 (mm) |
| F value | F/# | 1.20 |
| Angle of field | 2ω | 120.0 (deg) |
| Entire length | L_sys | 6.371 (mm) |
| Distance from exit pupil to image plane | d_pup | 3.760 (mm) |

The imaging apparatus of this example has a small F value of F/1.2, a very wide angle of field of 120.0 (degrees), and a compact size with the entire length of 6.371 (mm), which is an example of the imaging apparatus in which brightness, high resolution, a very wide angle of field, and a compact size are realized at the same time. Table 56 shows values of Expressions (1), (2), and (4) of the imaging apparatus of this example.

TABLE 56

| Conditional expression (1) | f_sys/d_pup | 0.96 |
| Conditional expression (2) | |R_img|/f_sys | 0.99 |
| Conditional expression (4) | |R_img|/d_pup | 0.95 |

The value of Expression (1) is 0.96 and satisfies the range of Expression (1). Thus, the optical system of the imaging optical system in the image side of the aperture stop can be close to a point symmetry structure, and hence coma, astigmatism, distortion, and lateral chromatic aberration can be appropriately corrected.

The value of Expression (2) is 0.99 and satisfies the range of Expression (2). Thus, field curvature and astigmatism can be appropriately corrected over a wide angle of field of 120.0 (degrees).

The value of Expression (4) is 0.95 and satisfies the range of Expression (4).

Thus, the imaging optical system is close to a point symmetry structure, and hence coma, astigmatism, distortion, and lateral chromatic aberration are appropriately corrected.

Further, in the imaging apparatus of this example, the distance between the imaging optical system and the image plane is changed so as to perform focus adjustment.

Because Expression (4) is satisfied, focus adjustment can be performed while maintaining high resolution in a wide focus adjustment range from infinity to a close distance.

EXAMPLE 15

In Example 15, a structural example of an imaging apparatus having a form different from those of the above-mentioned examples is described.

Figure 67:
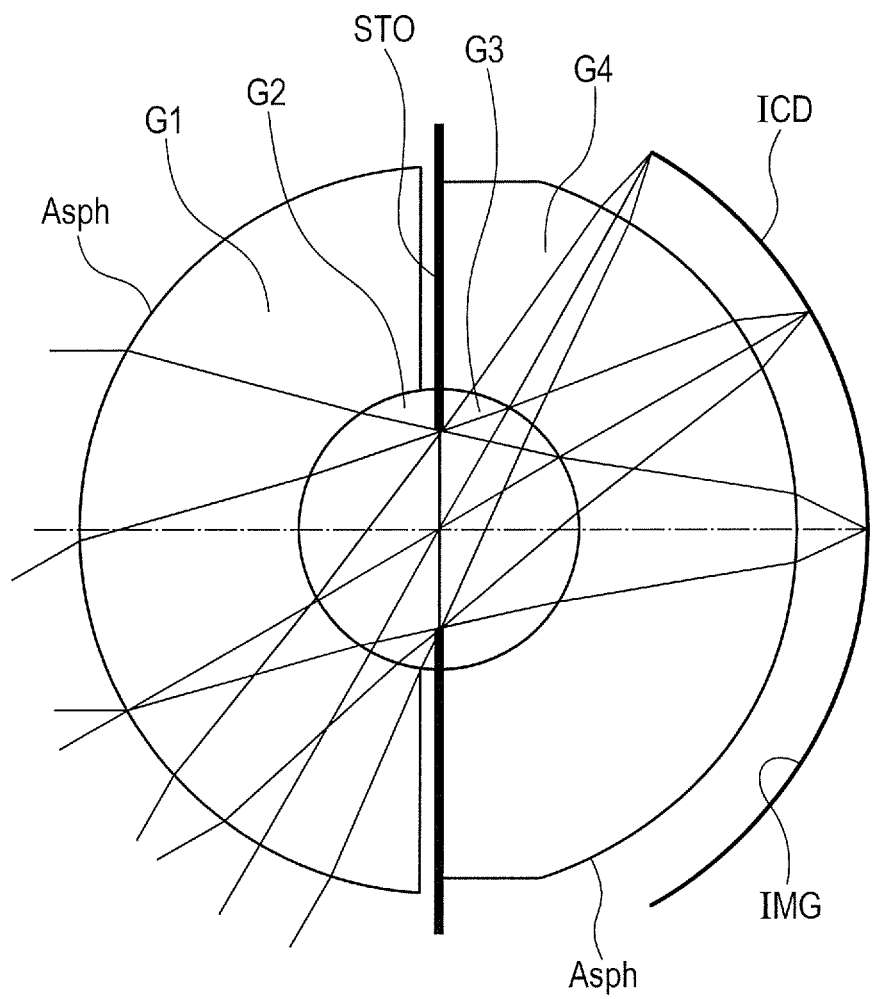
FIG. 67 is a diagram illustrating a structural example of an imaging apparatus according to Example 15 of the present invention.

The imaging optical system used in the imaging apparatus of this example includes four lenses G1, G2, G3, and G4 and the aperture stop STO as illustrated in FIG. 67.

The imaging optical system includes, in order from the object side: the first lens G1 as the meniscus lens having a convex surface facing the object side; the second lens G2 as the plano-convex lens having a convex surface facing the object side; the third lens G3 as the plano-convex lens having a convex surface facing the image side; and the fourth lens G4 as the meniscus lens having a convex surface facing the image side.

In FIG. 67, IMG represents the image plane.

As illustrated in FIG. 67, the image plane IMG of the imaging apparatus according to this example is the image sensor ICD formed into a sphere shape on a deformable substrate.

Table 57 shows a structure of the imaging apparatus of this example.

Surface number 1 is the incident surface of the first lens G1 having the rotation symmetry aspherical shape expressed by the polynomial of Expression (11).

Surface number 2 is the cemented surface between the exit surface of the first lens G1 and the incident surface of the second lens G2. Surface number 3 is the cemented surface between the exit surface of the second lens G2 and the incident surface of the third lens G3, and the light blocking member is disposed in the non-effective part in the plane of the surface number 3 so as to form the aperture stop STO.

Surface number 4 is the cemented surface between the exit surface of the third lens G3 and the incident surface of the fourth lens G4. Surface number 5 is the exit surface of the fourth lens G4 having a rotation symmetry aspherical shape expressed by the polynomial of Expression (11).

Surface number 6 is the image plane IMG, which is the incident surface of the curved image sensor.

In Table 57, R represents a radius of curvature (mm), d represents a surface interval (mm), Nd represents a d-line refractive index, and vd represents an Abbe number. Note that, the surface with a mark "(a)" is an aspherical surface.

TABLE 57

| Surface number | R | d | Nd | vd |
|---|---|---|---|---|
| 1 | 3.0198(a) | 1.8417 | 2.00060 | 25.5 |
| 2 | 1.1768 | 1.1768 | 1.87801 | 38.5 |
| 3 (STO) | Flat surface | 1.1759 | 1.87801 | 38.5 |
| 4 | −1.1759 | 1.8491 | 2.00060 | 25.5 |
| 5 | −2.9057(a) | 0.5912 | | |
| 6 (IMG) | −3.6217 | | | |

Table 58A shows aspherical surface coefficients of surface number 1 and Table 58B shows aspherical surface coefficients of surface number 5 in the imaging apparatus of this example.

TABLE 58A

Aspherical surface coefficient (Surface number 1)

| Parameter | Symbol | Value |
|---|---|---|
| Conic constant | K | −1.53715E−03 |
| Fourth order coefficient | A | −1.50377E−04 |
| Sixth order coefficient | B | 6.34809E−05 |
| Eighth order coefficient | C | −1.00126E−05 |
| Tenth order coefficient | D | 5.64238E−07 |

TABLE 58B

Aspherical surface coefficient (Surface number 5)

| Parameter | Symbol | Value |
|---|---|---|
| Conic constant | K | −1.07977E−01 |
| Fourth order coefficient | A | 2.66867E−03 |
| Sixth order coefficient | B | −6.82422E−04 |
| Eighth order coefficient | C | 1.11698E−04 |
| Tenth order coefficient | D | −7.68079E−06 |

In the imaging apparatus of this example, the lens surface closest to the object side and the lens surface closest to the image side are formed as aspherical surfaces.

Figure 68A:
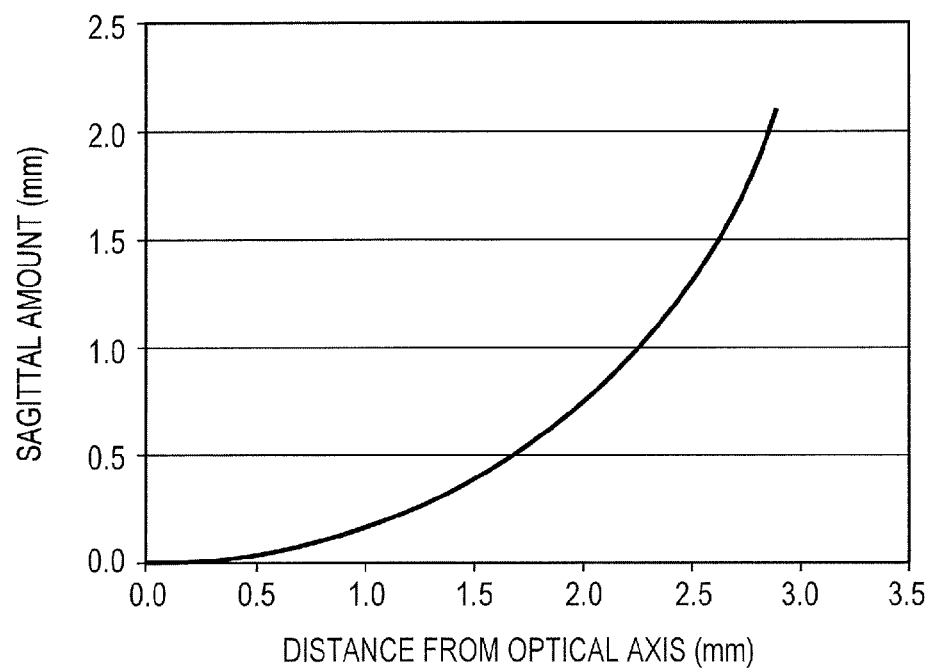
FIG. 68A is a diagram showing an aspherical shape of a lens surface closest to the object side of the imaging apparatus according to Example 15 of the present invention.
Figure 68B:
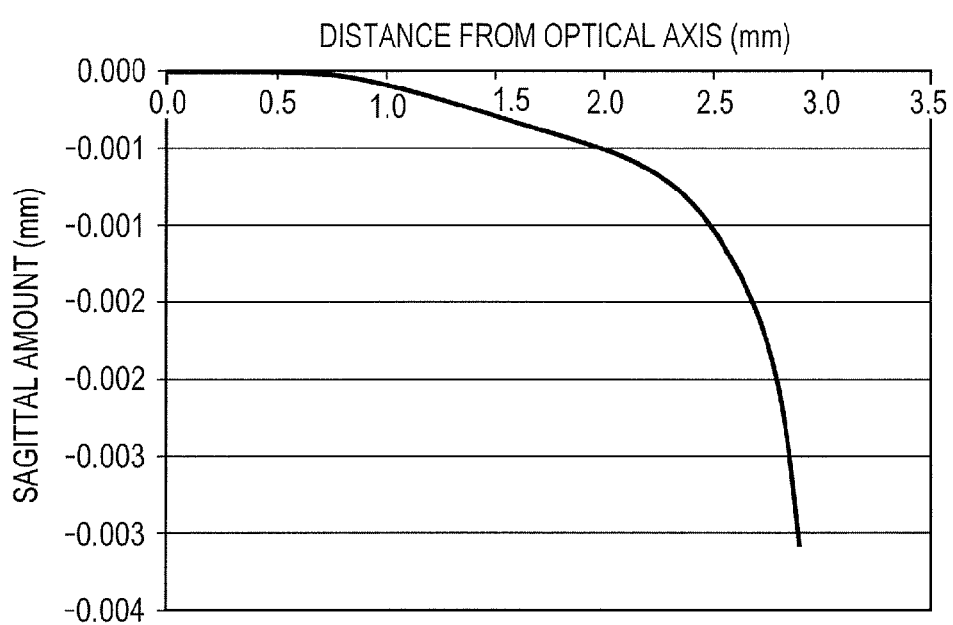
FIG. 68B is a diagram showing an aspherical amount of the lens surface closest to the object side of the imaging apparatus according to Example 15 of the present invention.
Figure 69A:
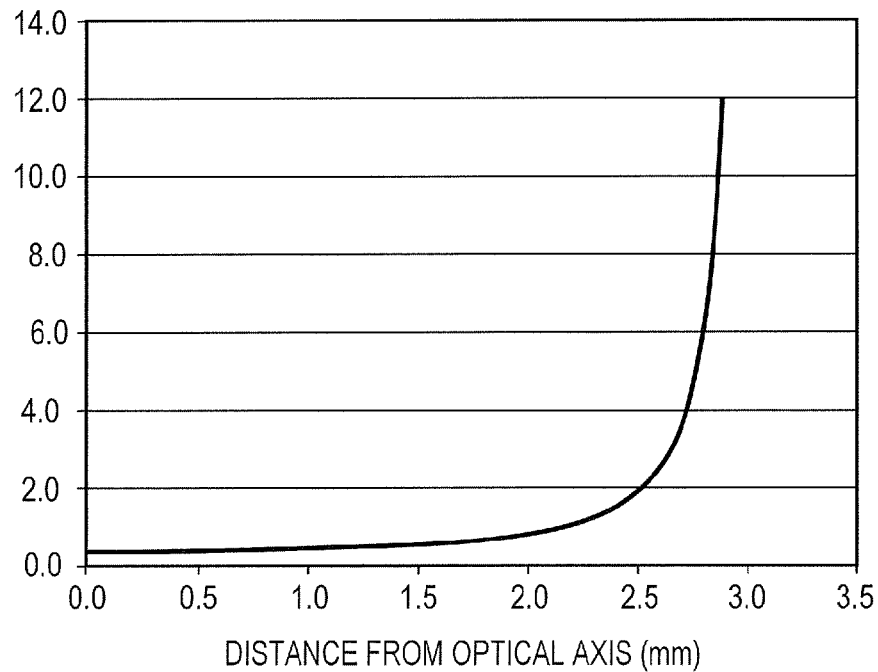
FIG. 69A is a diagram showing a second order differential value of an aspherical surface and a reference spherical surface of the lens surface closest to the object side of the imaging apparatus according to Example 15 of the present invention.
Figure 69B:
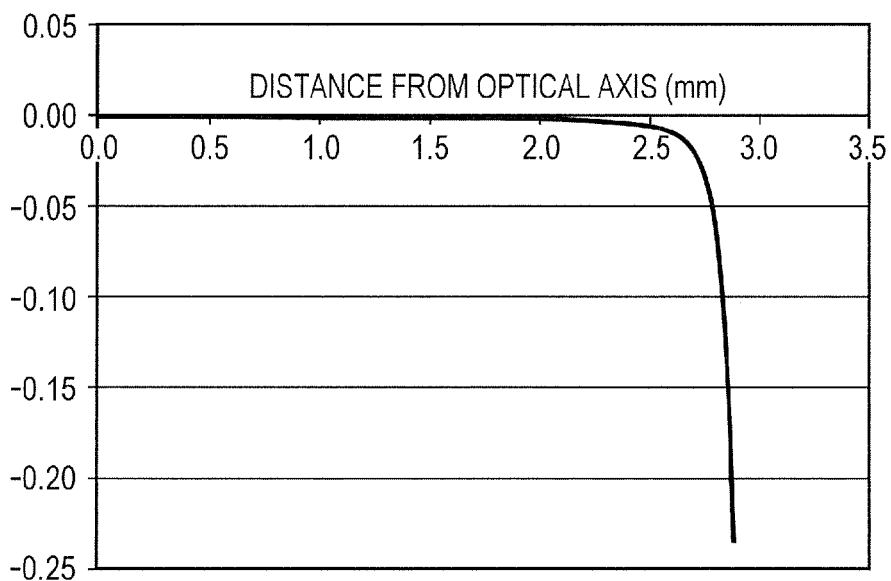
FIG. 69B is a diagram showing a second order differential value of an aspherical component of the lens surface closest to the object side of the imaging apparatus according to Example 15 of the present invention.

FIG. 68A shows an aspherical shape of the lens surface closest to the object side, and FIG. 68B shows an aspherical amount of the lens surface closest to the object side. In addition, FIG. 69A shows second order differential values of the aspherical surface and the reference spherical surface, and FIG. 69B shows the second order differential value of the aspherical component.

As shown in FIG. 68A, the lens surface closest to the object side in this example is a lens surface having a sag amount increasing in the positive direction from the optical axis toward the periphery, and is a convex surface facing the object side.

The reference spherical surface of this lens surface is a spherical surface having a convex surface facing the object side and a radius of curvature R=3.0198 (mm).

FIG. 68B shows the aspherical amount.

As shown in FIG. 68B, in this example, the aspherical amount is displaced in the negative direction, and the aspherical surface is displaced from the reference spherical surface to the object side, namely to the outside of the object pickup optical system.

Further, the aspherical amount displaced to the outside of the imaging optical system is gradually increased as being away from the optical axis so as to give the largest aspherical amount in the periphery of the lens surface.

FIG. 69A shows the second order differential value of the aspherical surface by a solid line and the second order differential value of the reference spherical surface by a broken line. Both the second order differential value of the aspherical surface and the second order differential value of the reference spherical surface have a positive value.

FIG. 69B shows the second order differential value of the aspherical component.

The second order differential value of the aspherical component is increased gradually in the negative direction as being away from the optical axis.

In this way, the aspherical component having a negative second order differential value is given to the reference spherical surface having a positive second order differential value. Thus, the second order differential value in the periphery of the lens surface is reduced to be smaller than that of the reference spherical surface.

Expression (24) indicates a relationship between the second order differential value and the power.

On the lens surface closest to the object side in the imaging optical system, the medium on the object side of the lens surface is air having N=1.0000, and the medium on the image side of the lens surface is optical glass having N'=2.00060. Therefore, (N'−N) has a positive value.

Therefore, the lens surface closest to the object side is formed as the lens surface shape having positive power on the optical axis which is gradually decreased as being away from the optical axis.

Thus, spherical aberration can be appropriately corrected.

In particular, when the lens surface closest to the object side is formed as the aspherical surface having the aspherical amount displaced from the reference spherical surface to the outside of the imaging optical system in the periphery of the lens surface, spherical aberration of the field angle light beam in axial light and a vicinity of the axis can be appropriately corrected.

Figure 70A:
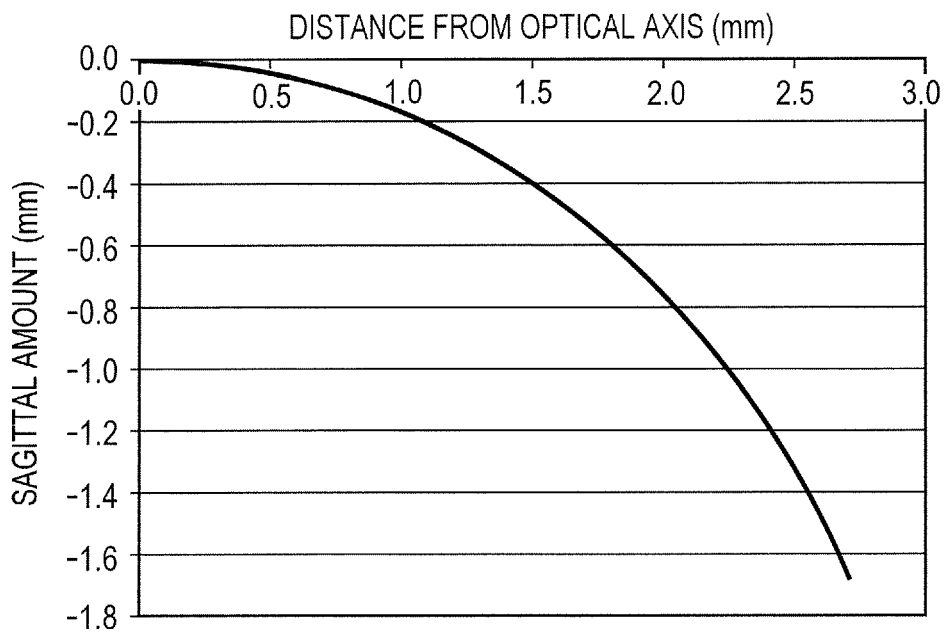
FIG. 70A is a diagram showing an aspherical shape of a lens surface closest to the image side of the imaging apparatus according to Example 15 of the present invention.
Figure 70B:
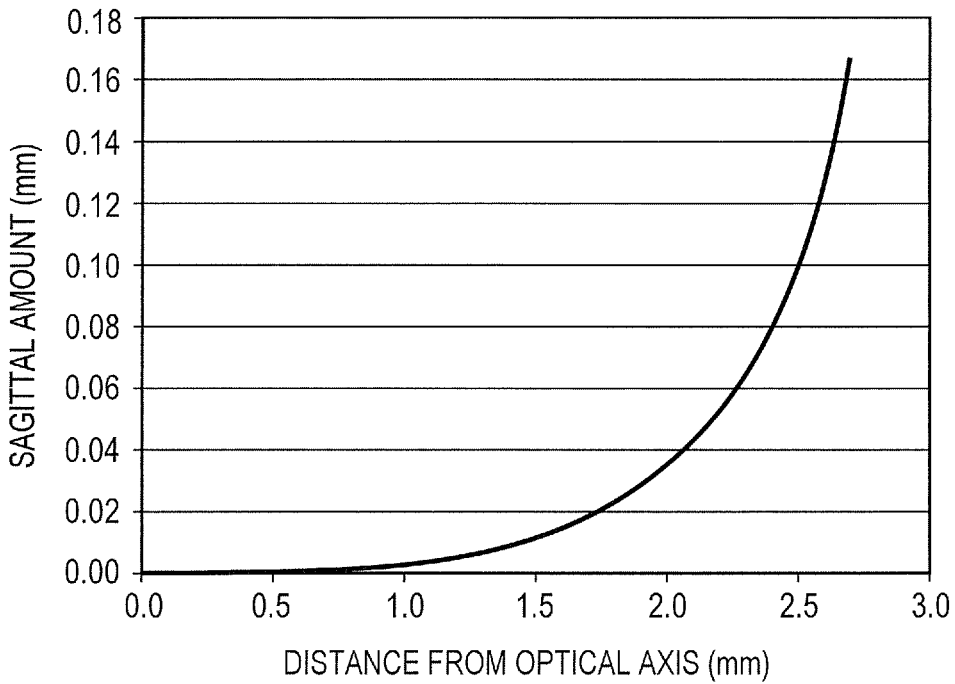
FIG. 70B is a diagram showing an aspherical amount of the lens surface closest to the image side of the imaging apparatus according to Example 15 of the present invention.

FIG. 70A shows an aspherical shape of the lens surface closest to the image side, and FIG. 70B shows an aspherical amount of the lens surface closest to the image side.

Figure 71A:
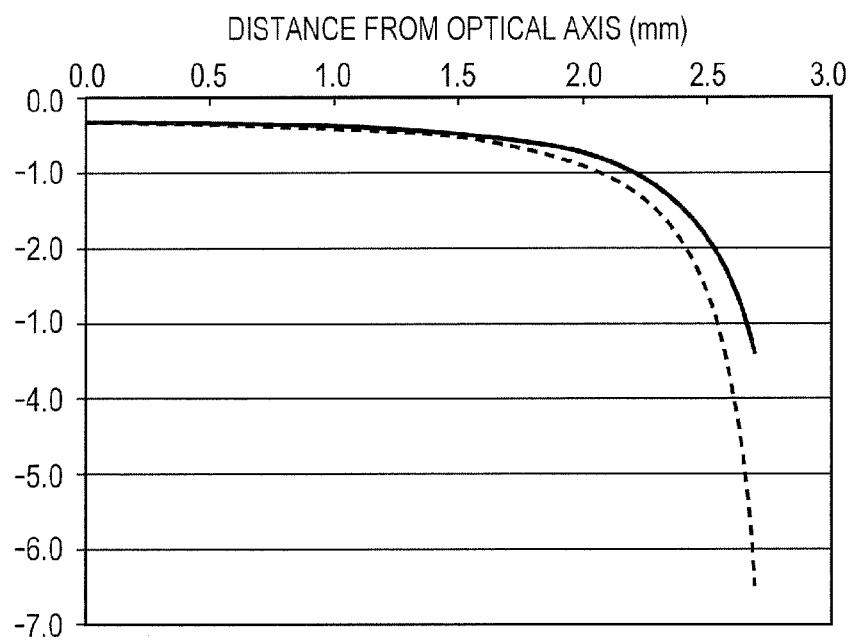
FIG. 71A is a diagram showing a second order differential value of an aspherical surface and a reference spherical surface of the lens surface closest to the image side of the imaging apparatus according to Example 15 of the present invention.
Figure 71B:
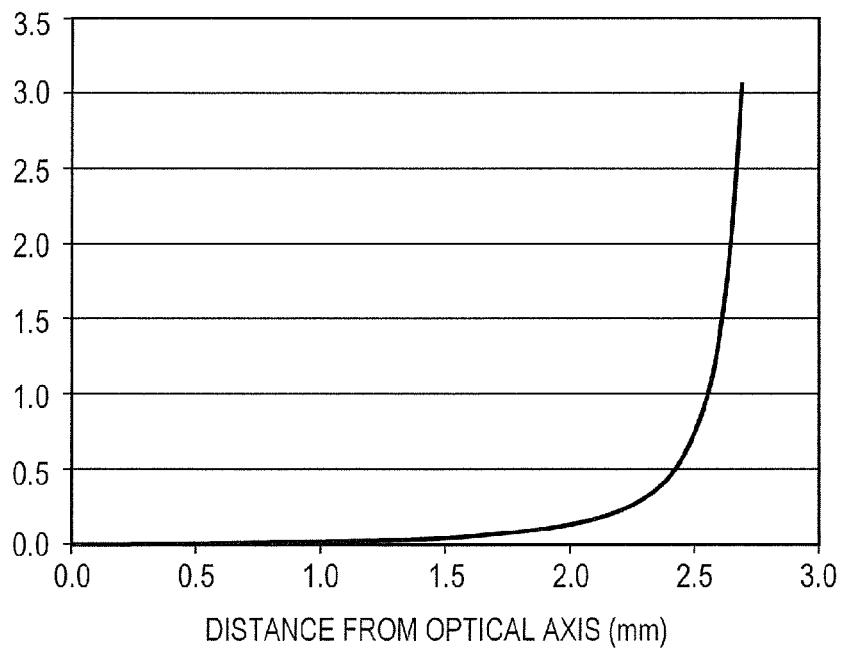
FIG. 71B is a diagram showing a second order differential value of an aspherical component of the lens surface closest to the image side of the imaging apparatus according to Example 15 of the present invention.

In addition, FIG. 71A shows second order differential values of the aspherical surface and the reference spherical surface, and FIG. 71B shows the second order differential value of the aspherical component.

As shown in FIG. 70A, the lens surface closest to the image side in this example is a lens surface having a sag amount increasing in the negative direction from the optical axis toward the periphery, and is a convex surface facing the image side.

The reference spherical surface of this lens surface is a spherical surface having a convex surface facing the image side and a radius of curvature R=−2.9057 (mm).

FIG. 70B shows the aspherical amount.

As shown in FIG. 70B, in this example, the aspherical amount is displaced in the positive direction, and the aspherical surface is displaced from the reference spherical surface to the image side, namely to the outside of the imaging optical system.

Further, the aspherical amount displaced to the outside of the imaging optical system is gradually increased as being away from the optical axis so as to give the largest aspherical amount in the periphery of the lens surface.

FIG. 71A shows the second order differential value of the aspherical surface by a solid line and the second order differential value of the reference spherical surface by a broken line. Both the second order differential value of the aspherical surface and the second order differential value of the reference spherical surface have a negative value.

FIG. 71B shows the second order differential value of the aspherical component.

The second order differential value of the aspherical component is increased gradually in the positive direction as being away from the optical axis.

In this way, the aspherical component having a positive second order differential value is given to the reference spherical surface having a negative second order differential value. Thus, the second order differential value in the periphery of the lens surface is reduced to be smaller than that of the reference spherical surface.

On the lens surface closest to the image side in the imaging optical system, the medium on the object side of the lens surface is optical glass having N=2.00060, and the medium on the image side of the lens surface is air having N'=1.0000. Therefore, (N'-N) has a negative value.

Therefore, the lens surface closest to the image side is formed as the lens surface shape having positive power on the optical axis which is gradually decreased as being away from the optical axis.

Thus, spherical aberration can be appropriately corrected.

In particular, when the lens surface closest to the image side is formed as the aspherical surface having the aspherical amount displaced from the reference spherical surface to the outside of the imaging optical system in the periphery of the lens surface, spherical aberration of the field angle light beam in a wide field angle region can be appropriately corrected.

Figure 73:
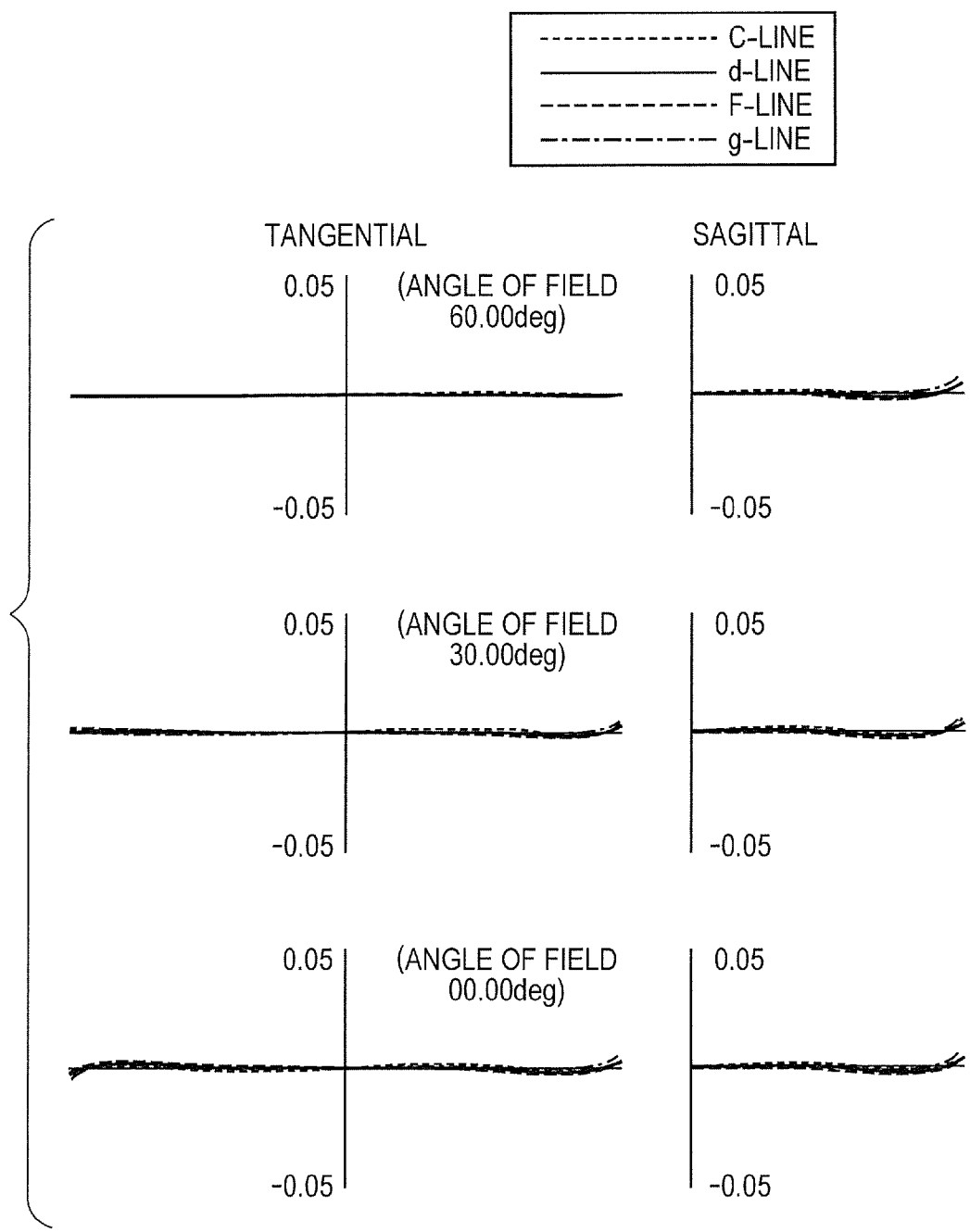
FIG. 73 is a lateral aberration diagram of the imaging optical system according to Example 15 of the present invention.

FIG. 72 illustrates an axial aberration diagram of the imaging optical system of this example, and FIG. 73 illustrates a lateral aberration diagram thereof.

As illustrated in FIG. 72, spherical aberration, axial chromatic aberration, astigmatism, field curvature, and chromatic spherical aberration are very appropriately corrected. In particular, the light beam in the entire region from a low incident light beam height to a high incident light beam height can be condensed on the image plane, and hence spherical aberration can be very appropriately corrected.

In addition, axial chromatic aberration and chromatic spherical aberration are also very appropriately corrected so that high imaging performance is obtained.

As illustrated in FIG. 73, good performance is obtained in each field angle light beam, and coma, field curvature, and lateral chromatic aberration are very appropriately corrected.

As in this example, both the lens surface closest to the object side and the lens surface closest to the image side are formed as the aspherical surfaces to which the aspherical amount displaced from the reference spherical surface to the outside of the imaging optical system in the periphery of the lens surface is given. Thus, the spherical aberration can be corrected with high accuracy over a wide angle of field.

Table 59 shows the specifications of the imaging apparatus of this example.

TABLE 59

| Focal length of imaging optical system | f_sys | 3.600 (mm) |
|---|---|---|
| F value | F/# | 1.20 |
| Angle of field | 2ω | 120.0 (deg) |

TABLE 59-continued

| Entire length | L_sys | 6.044 (mm) |
|---|---|---|
| Distance from exit pupil to image plane | d_pup | 3.616 (mm) |

The imaging apparatus of this example has a small F value of F/1.2, a very wide angle of field of 120.0 (degrees), and a compact size with the entire length of 6.044 (mm), which is an example of the imaging apparatus in which brightness, high resolution, a very wide angle of field, and a compact size are realized at the same time. Table 60 shows values of Expressions (1), (2), and (4) of the imaging apparatus of this example.

TABLE 60

| Conditional expression (1) | f_sys/d_pup | 0.96 |
|---|---|---|
| Conditional expression (2) | |R_img|/f_sys | 1.01 |
| Conditional expression (4) | |R_img|/d_pup | 0.97 |

The value of Expression (1) is 0.96 and satisfies the range of Expression (1). Thus, the optical system of the imaging optical system in the image side of the aperture stop can be close to a point symmetry structure, and hence coma, astigmatism, distortion, and lateral chromatic aberration can be appropriately corrected.

The value of Expression (2) is 1.01 and satisfies the range of Expression (2). Thus, field curvature and astigmatism can be appropriately corrected over a wide angle of field of 120.0 (degrees).

The value of Expression (4) is 0.97 and satisfies the range of Expression (4).

Thus, the imaging optical system is close to a point symmetry structure, and hence coma, astigmatism, and lateral chromatic aberration are appropriately corrected.

Further, in the imaging apparatus of this example, the distance between the imaging optical system and the image plane is changed so as to perform focus adjustment. Because Expression (4) is satisfied, focus adjustment can be performed while maintaining high resolution in a wide focus adjustment range from infinity to a close distance.

Example 16

In Example 16, a structural example of an imaging apparatus having a form different from those of the above-mentioned examples is described.

Figure 74:
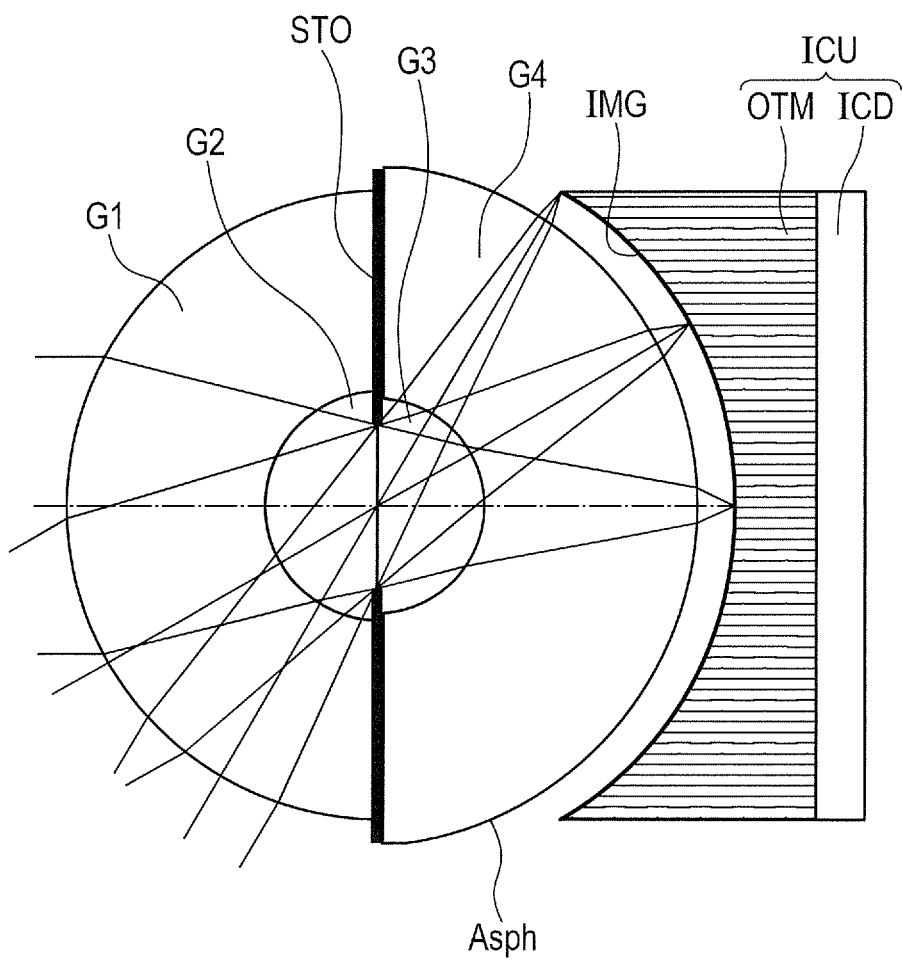
FIG. 74 is a diagram illustrating of a structural example of an imaging apparatus according to Example 16 of the present invention.

An imaging optical system used in an imaging apparatus of this example includes four lenses G1, G2, G3, and G4 and the aperture stop STO as illustrated in FIG. 74.

The imaging optical system includes, in order from the object side: the first lens G1 as the meniscus lens having a convex surface facing the object side; the second lens G2 as the plano-convex lens having a convex surface facing the object side; the third lens G3 as the plano-convex lens having a convex surface facing the image side; and the fourth lens G4 as the meniscus lens having a convex surface facing the image side.

In addition, similarly to Example 12, the imaging unit ICU including the optical transmission unit OTM and the flat surface image sensor ICD is used.

In this example, only the lens surface closest to the image side in the imaging optical system is formed as the aspherical surface.

Table 61 shows a structure of the imaging apparatus of this example.

In Table 61, R represents a radius of curvature (mm), d represents a surface interval (mm), Nd represents a d-line refractive index, and νd represents an Abbe number. Note that, the surface with a mark "(a)" is an aspherical surface.

TABLE 61

Configuration table

| Surface number | R | d | Nd | νd |
|---|---|---|---|---|
| 1 | 3.1612 | 2.0028 | 1.92286 | 21.3 |
| 2 | 1.1490 | 1.1490 | 1.89800 | 34.0 |
| 3 (STO) | Flat surface | 1.0577 | 1.89800 | 34.0 |
| 4 | −1.0843 | 2.1748 | 2.00060 | 25.5 |
| 5 | −3.0745(a) | 0.3873 | | |
| 6 (IMG) | −3.6937 | | | |

The aspherical surface coefficients of surface number 5 of the imaging apparatus of this example are shown in Table 62.

TABLE 62

Aspherical surface coefficients (Surface number 5)

| Parameter | Symbol | Value |
|---|---|---|
| Conic constant | K | −2.76669E−01 |
| Fourth order coefficient | A | 7.28040E−03 |
| Sixth order coefficient | B | −1.87130E−03 |
| Eighth order coefficient | C | 2.18939E−04 |
| Tenth order coefficient | D | −1.07514E−05 |

Figure 75A:
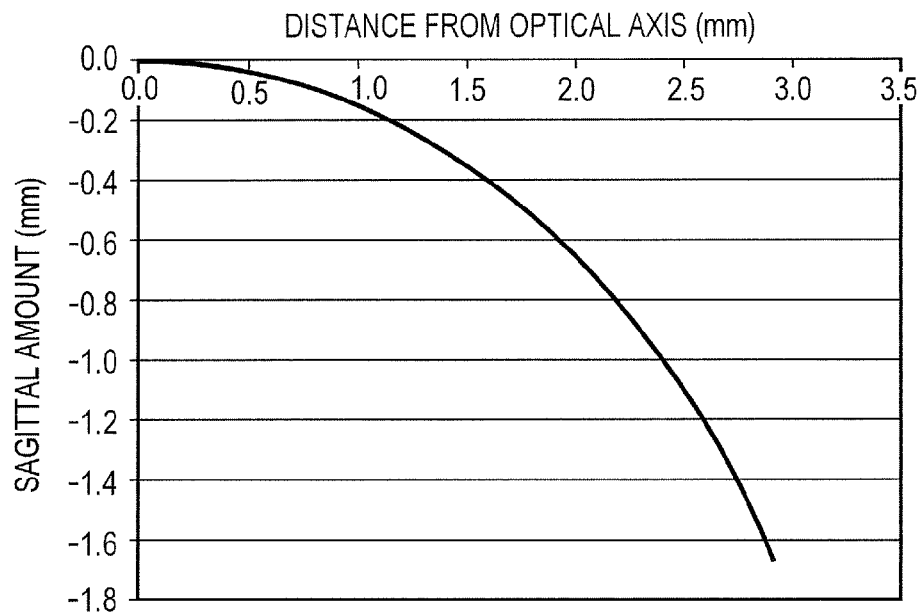
FIG. 75A is a diagram showing an aspherical shape of a lens surface closest to the image side of the imaging apparatus according to Example 16 of the present invention.
Figure 75B:
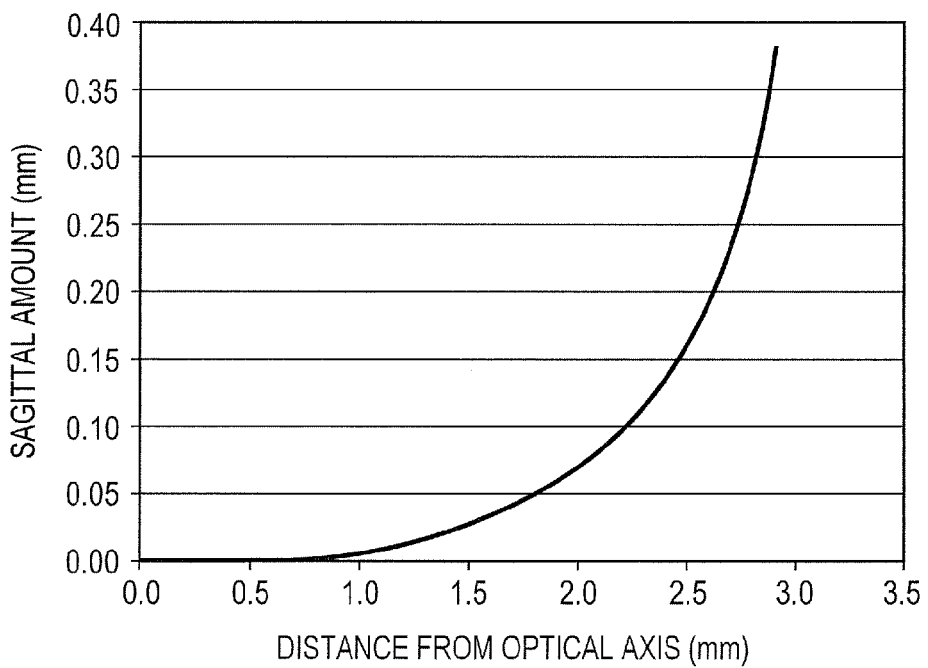
FIG. 75B is a diagram showing of an aspherical amount of the lens surface closest to the image side of the imaging apparatus according to Example 16 of the present invention.
Figure 76A:
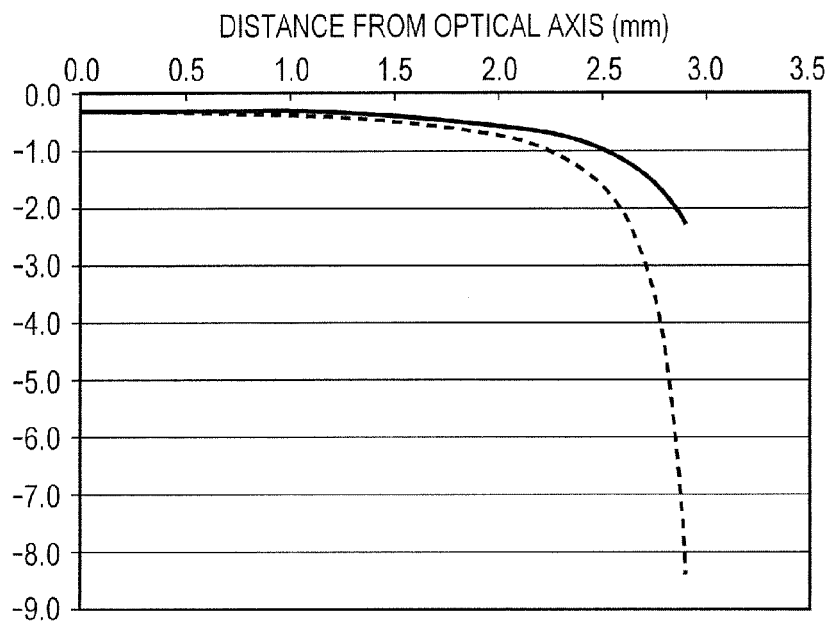
FIG. 76A is a diagram showing a second order differential value of an aspherical surface and a reference spherical surface of the lens surface closest to the image side of the imaging apparatus according to Example 16 of the present invention.
Figure 76B:
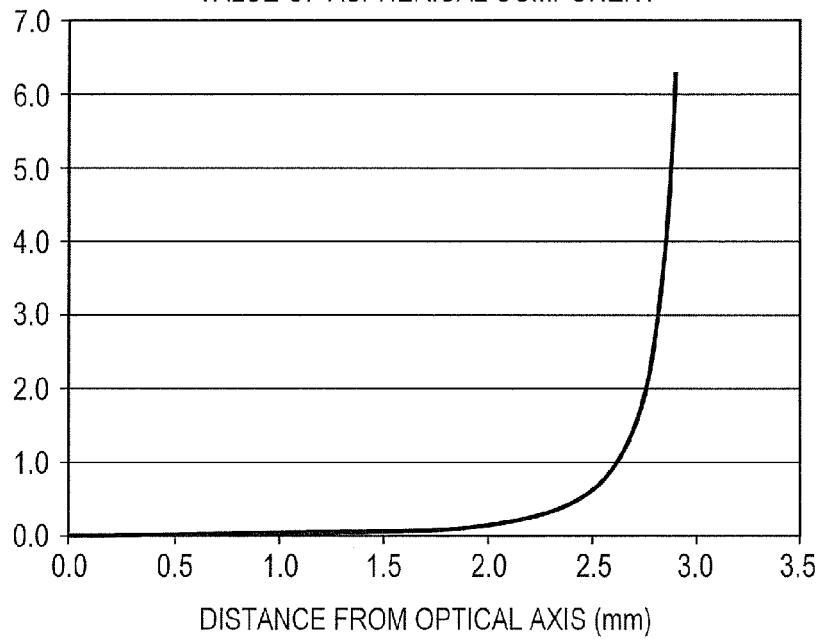
FIG. 76B is a diagram showing a second order differential value of an aspherical component of the lens surface closest to the image side of, the imaging apparatus according to Example 16 of the present invention.

FIG. 75A shows an aspherical shape of the lens surface closest to the image side, and FIG. 75B shows an aspherical amount. FIG. 76A shows second order differential values of the aspherical surface and the reference spherical surface, and FIG. 76B shows the second order differential value of the aspherical component.

As shown in FIG. 75A, the lens surface closest to the image side (surface number 5) of this example is a lens surface having a sag amount increasing in the negative direction from the optical axis to the periphery and is a lens surface having a convex surface facing the image side. This lens surface has the reference spherical surface that is a spherical surface having a radius of curvature R=−3.0745 (mm).

In addition, as shown in FIG. 75B, the aspherical amount is displaced in the positive direction, and the aspherical surface is displaced from the reference spherical surface to the image side, namely to the outside of the imaging optical system. Then, the aspherical amount displaced to the outside of the imaging optical system is gradually increased as being away from the optical axis, and the largest aspherical amount is given in the periphery of the lens surface.

FIG. 76A shows the second order differential value of the aspherical surface by a solid line and the second order differential value of the reference spherical surface by a broken line. Both the second order differential value of the aspherical surface and the second order differential value of the reference spherical surface are negative. FIG. 76B shows the second order differential value of the aspherical component.

The second order differential value of the aspherical component is gradually increased in the positive direction as being away from the optical axis.

In this way, by giving the aspherical surface having a negative second order differential value of the reference spherical surface and a positive second order differential value of the aspherical component, the second order differential value in the periphery of the lens surface is reduced to be smaller than that of the reference spherical surface.

In other words, the reference spherical surface has positive power while the aspherical component has negative power, and power of the lens surface is gradually reduced from the optical axis toward the periphery of the lens surface.

Thus, because spherical aberration in the field angle light beam can be appropriately corrected, it is possible to provide the imaging apparatus having good imaging performance over a wide angle of field.

In particular, in a wide field angle imaging optical system in which a peripheral light ray (upper ray) of the field angle light beam of the largest angle of field passes through the lens surface closest to the object side below the optical axis in the imaging optical system, the effect of this embodiment is sufficiently exerted.

Table 63 shows the specifications of the imaging apparatus of this example.

TABLE 63

| Focal length of imaging optical system | f_sys | 3.600 (mm) |
|---|---|---|
| F value | F/# | 1.20 |
| Angle of field | 2ω | 120.0 (deg) |
| Entire length | L_sys | 6.384 (mm) |
| Distance from exit pupil to image plane | d_pup | 3.620 (mm) |

The imaging apparatus of this example has a small F value of F/1.2, a very wide angle of field of 120.0 (degrees), and a compact size with the entire length of 6.384 (mm), which is an example of the imaging apparatus in which brightness, high resolution, a very wide angle of field, and a compact size are realized at the same time.

Table 64 shows values of Expressions (1), (2), and (4) of the imaging apparatus of this example.

TABLE 64

| Conditional expression (1) | f_sys/d_pup | 0.95 |
|---|---|---|
| Conditional expression (2) | |R_img|/f_sys | 1.03 |
| Conditional expression (4) | |R_img|/d_pup | 0.97 |

The value of Expression (1) is 0.95 and satisfies the range of Expression (1). Thus, the optical system of the imaging optical system in the image side of the aperture stop can be close to a point symmetry structure, and hence coma, astigmatism, distortion, and lateral chromatic aberration can be appropriately corrected.

The value of Expression (2) is 1.03 and satisfies the range of Expression (2). Thus, field curvature and astigmatism can be appropriately corrected over a wide angle of field of 120.0 (degrees).

The value of Expression (4) is 0.97 and satisfies the range of Expression (4).

Thus, the imaging optical system is close to a point symmetry structure, and hence coma, astigmatism, distortion, and lateral chromatic aberration are appropriately corrected.

Figure 78:
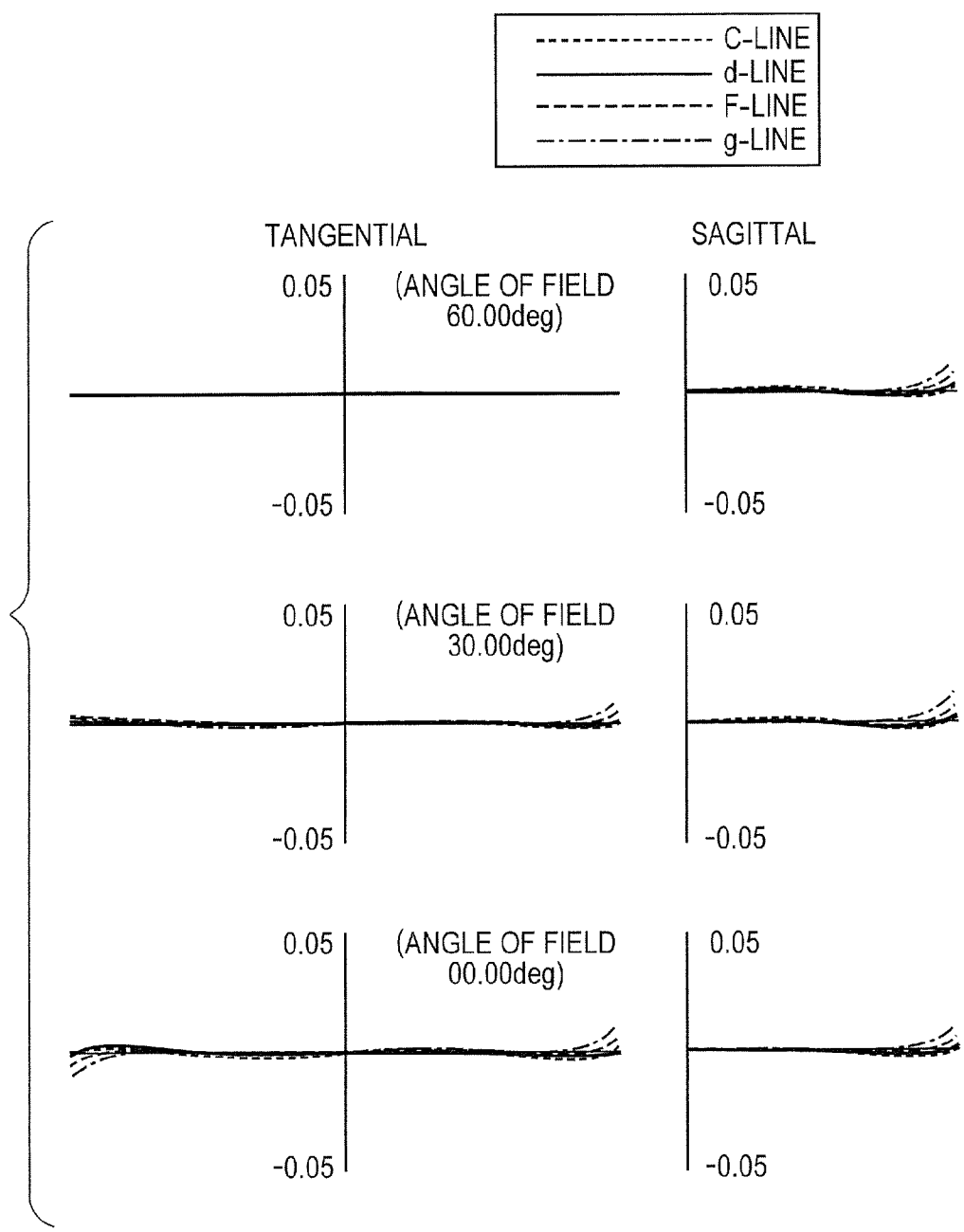
FIG. 78 is a lateral aberration diagram of the imaging optical system according to Example 16 of the present invention.

FIG. 77 illustrates an axial aberration diagram of the imaging optical system of this example, and FIG. 78 illustrates a lateral aberration diagram thereof.

Further, in the imaging apparatus of this example, the distance between the imaging optical system and the image plane is changed so as to perform focus adjustment.

Because Expression (4) is satisfied, focus adjustment can be performed while maintaining high resolution in a wide focus adjustment range from infinity to a close distance.

Example 17

In Example 17, a structural example of an imaging apparatus having a form different from those of the above-mentioned examples is described.

Figure 79:
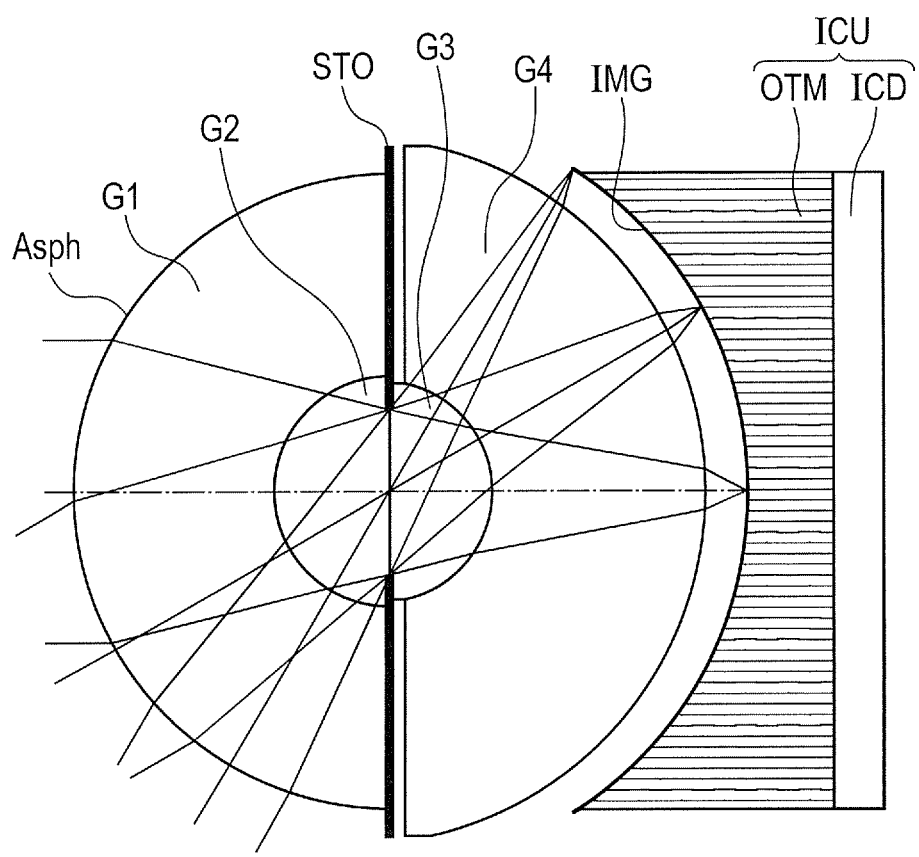
FIG. 79 is a diagram illustrating a structural example of an imaging apparatus according to Example 17 of the present invention.

The imaging optical system used in the imaging apparatus of this example includes four lenses G1, G2, G3, and G4 and the aperture stop STO as illustrated in FIG. 79.

The imaging optical system includes, in order from the object side: the first lens G1 as the meniscus lens having a convex surface facing the object side; the second lens G2 as the plano-convex lens having a convex surface facing the object side; the third lens G3 as the plano-convex lens having a convex surface facing the image side; and the fourth lens G4 as the meniscus lens having a convex surface facing the image side.

In addition, similarly to Example 12, the imaging unit ICU including the optical transmission unit OTM and the flat surface image sensor ICD is used.

In this example, only the lens surface closest to the object side in the imaging optical system is formed as the aspherical surface.

Table 65 shows a structure of the imaging apparatus of this example.

In Table 65, R represents a radius of curvature (mm), d represents a surface interval (mm), Nd represents a d-line refractive index, and vd represents an Abbe number. Note that, the surface with a mark "(a)" is an aspherical surface.

TABLE 65

Configuration table

| Surface number | R | d | Nd | vd |
|---|---|---|---|---|
| 1 | 3.1360(a) | 1.9841 | 1.92286 | 21.3 |
| 2 | 1.1395 | 1.1395 | 1.89800 | 34.0 |
| 3 (STO) | Flat surface | 1.0379 | 1.89800 | 34.0 |
| 4 | −1.0959 | 2.1193 | 2.00060 | 25.5 |
| 5 | −3.4770 | 0.4145 | | |
| 6 (IMG) | −3.7474 | | | |

The aspherical surface coefficients of surface number 1 of the imaging apparatus of this example are shown in Table 66.

TABLE 66

Aspherical surface coefficients (Surface number 1)

| Parameter | Symbol | Value |
|---|---|---|
| Conic constant | K | −6.25796E−03 |
| Fourth order coefficient | A | −1.74593E−04 |
| Sixth order coefficient | B | 5.66974E−05 |
| Eighth order coefficient | C | −8.24266E−06 |
| Tenth order coefficient | D | 4.34369E−07 |

Figure 80A:
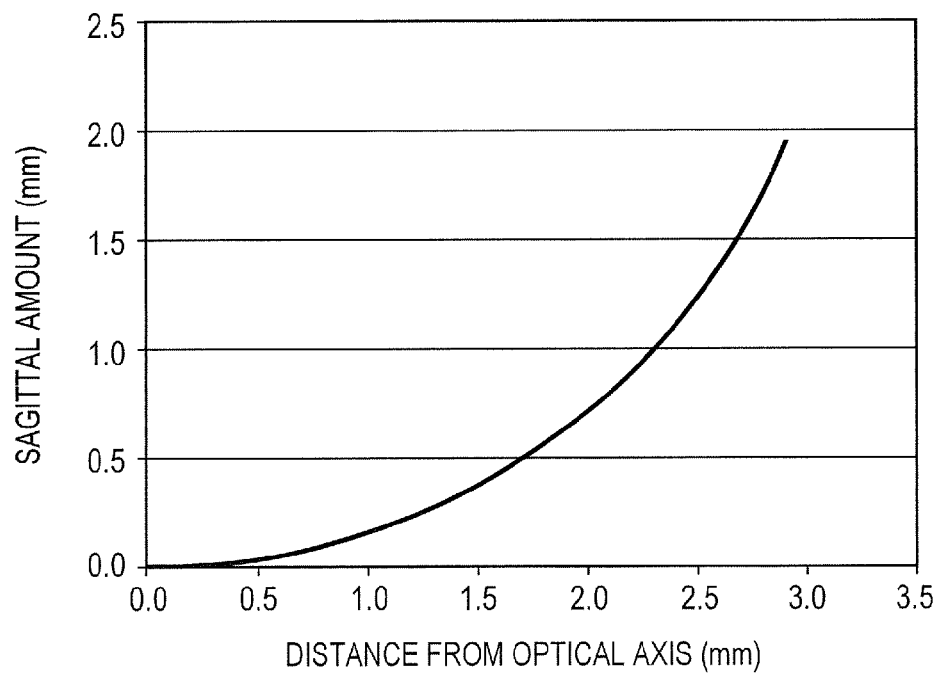
FIG. 80A is a diagram showing a second order differential value of an aspherical surface and a reference spherical surface of a lens surface closest to the object side of the imaging apparatus according to Example 17 of the present invention.
Figure 80B:
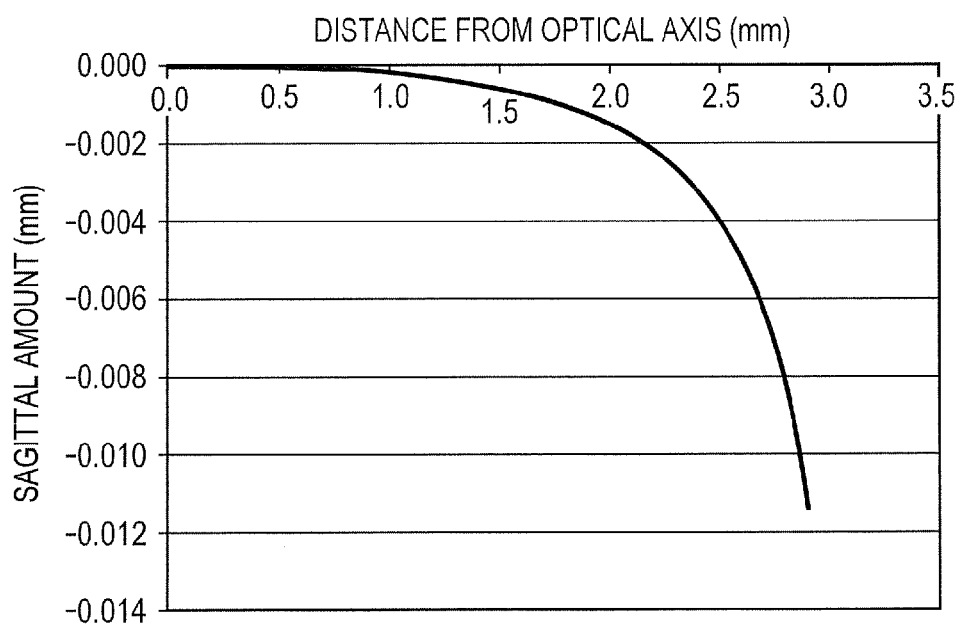
FIG. 80B is a diagram showing a second order differential value of an aspherical component of the lens surface closest to the object side of the imaging apparatus according to Example 17 of the present invention.
Figure 81A:
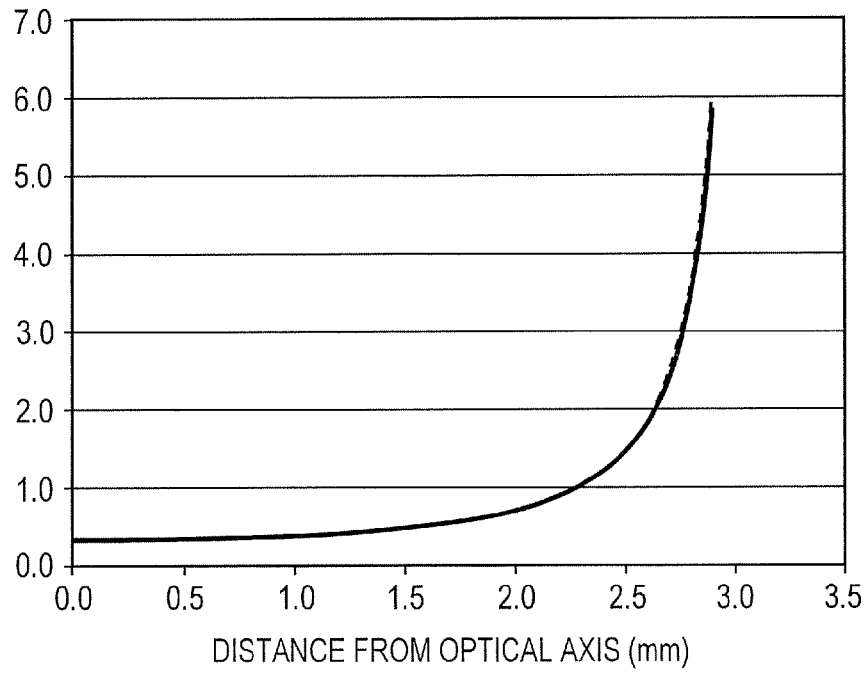
FIG. 81A is a diagram showing a second order differential value of the aspherical surface and the reference spherical surface of the lens surface closest to the object side of the imaging apparatus according to Example 17 of the present invention.
Figure 81B:
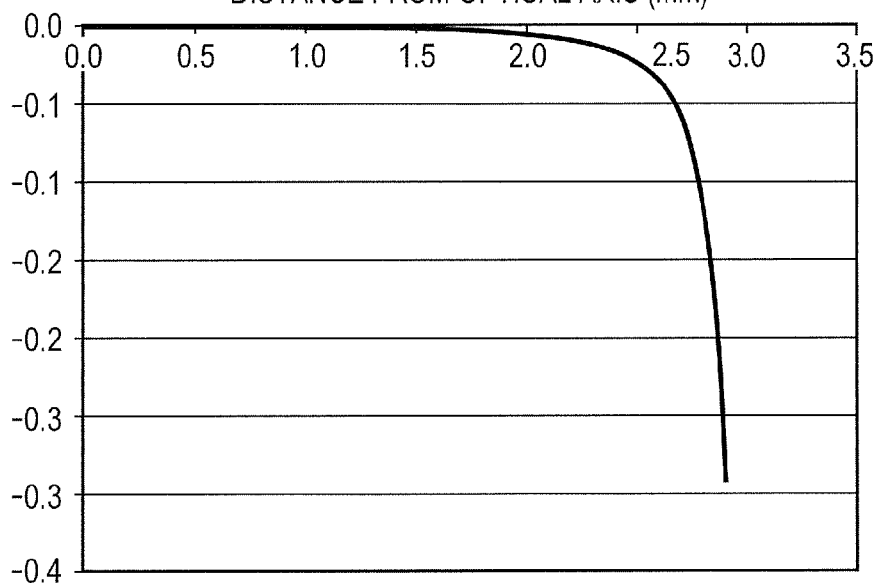
FIG. 81B is a diagram showing a second order differential value of the aspherical component of the lens surface closest to the object side of the imaging apparatus according to Example 17 of the present invention.

FIG. 80A shows an aspherical shape of the lens surface closest to the object side, and FIG. 80B shows an aspherical amount. FIG. 81A shows second order differential values of the aspherical surface and the reference spherical surface, and FIG. 81B shows the second order differential value of the aspherical component.

As shown in FIG. 80A, the lens surface closest to the object side (surface number 1) of this example is a lens surface having a sag amount increasing in the positive direction from the optical axis toward the periphery and is a lens surface having a convex surface facing the object side. This lens surface has the reference spherical surface that is a spherical surface having a radius of curvature R=−3.1360 (mm).

As shown in FIG. 80B, the aspherical amount is displaced in the negative direction, and the aspherical surface is displaced from the reference spherical surface to the object side, namely to the outside of the imaging optical system.

Then, the aspherical amount displaced to the outside of the imaging optical system is gradually increased as being away from the optical axis, and the largest aspherical amount is given in the periphery of the lens surface.

FIG. 81A shows the second order differential value of the aspherical surface by a solid line and the second order differential value of the reference spherical surface by a broken line. Both the second order differential value of the aspherical surface and the second order differential value of the reference spherical surface are positive.

FIG. 81B shows the second order differential value of the aspherical component.

The second order differential value of the aspherical component is gradually increased in the negative direction as being away from the optical axis.

In this way, by giving the aspherical surface having a positive second order differential value of the reference spherical surface and a negative second order differential value of the aspherical component, the second order differential value in the periphery of the lens surface is reduced to be smaller than that of the reference spherical surface.

In other words, the reference spherical surface has positive power while the aspherical component has negative power, and power of the lens surface is gradually reduced from the optical axis toward the periphery of the lens surface.

Thus, because spherical aberration in the axial light can be appropriately corrected, it is possible to provide the imaging apparatus having good imaging performance.

Table 67 shows the specifications of the imaging apparatus of this example.

TABLE 67

| Focal length of imaging optical system | f_sys | 3.600 (mm) |
|---|---|---|
| F value | F/# | 1.20 |
| Angle of field | 2ω | 120.0 (deg) |
| Entire length | L_sys | 6.281 (mm) |
| Distance from exit pupil to image plane | d_pup | 3.572 (mm) |

The imaging apparatus of this example has a small F value of F/1.2, a very wide angle of field of 120.0 (degrees), and a compact size with the entire length of 6.281 (mm), which is an example of the imaging apparatus in which brightness, high resolution, a very wide angle of field, and a compact size are realized at the same time.

Table 68 shows values of Expressions (1), (2), and (4) of the imaging apparatus of this example.

TABLE 68

| Conditional expression (1) | f_sys/d_pup | 1.09 |
|---|---|---|
| Conditional expression (2) | |R_img|/f_sys | 1.04 |
| Conditional expression (4) | |R_img|/d_pup | 1.13 |

The value of Expression (1) is 1.09 and satisfies the range of Expression (1). Thus, the optical system of the imaging optical system in the image side of the aperture stop can be close to a point symmetry structure, and hence coma, astigmatism, distortion, and lateral chromatic aberration can be appropriately corrected.

The value of Expression (2) is 1.04 and satisfies the range of Expression (2). Thus, field curvature and astigmatism can be appropriately corrected over a wide angle of field of 120.0 (degrees).

The value of Expression (4) is 1.13 and satisfies the range of Expression (4).

Thus, the imaging optical system is close to a point symmetry structure, and hence coma, astigmatism, distortion, and lateral chromatic aberration are appropriately corrected.

Figure 82:
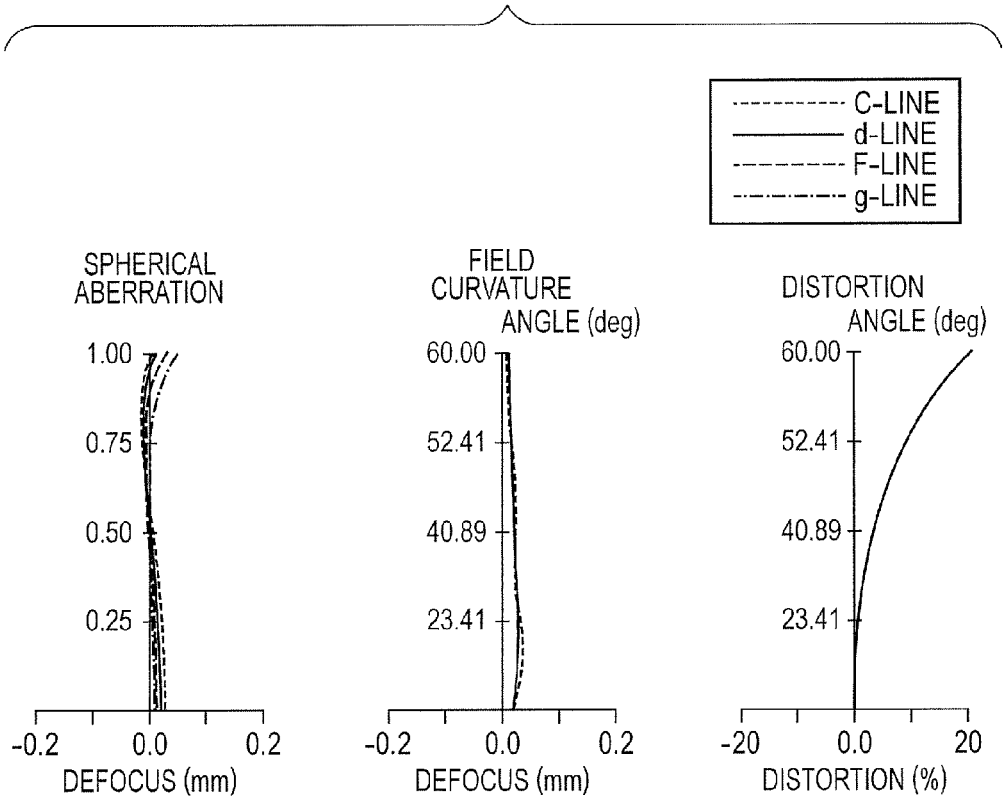
FIG. 82 is an axial aberration diagram of an imaging optical system according to Example 17 of the present invention.
Figure 83:
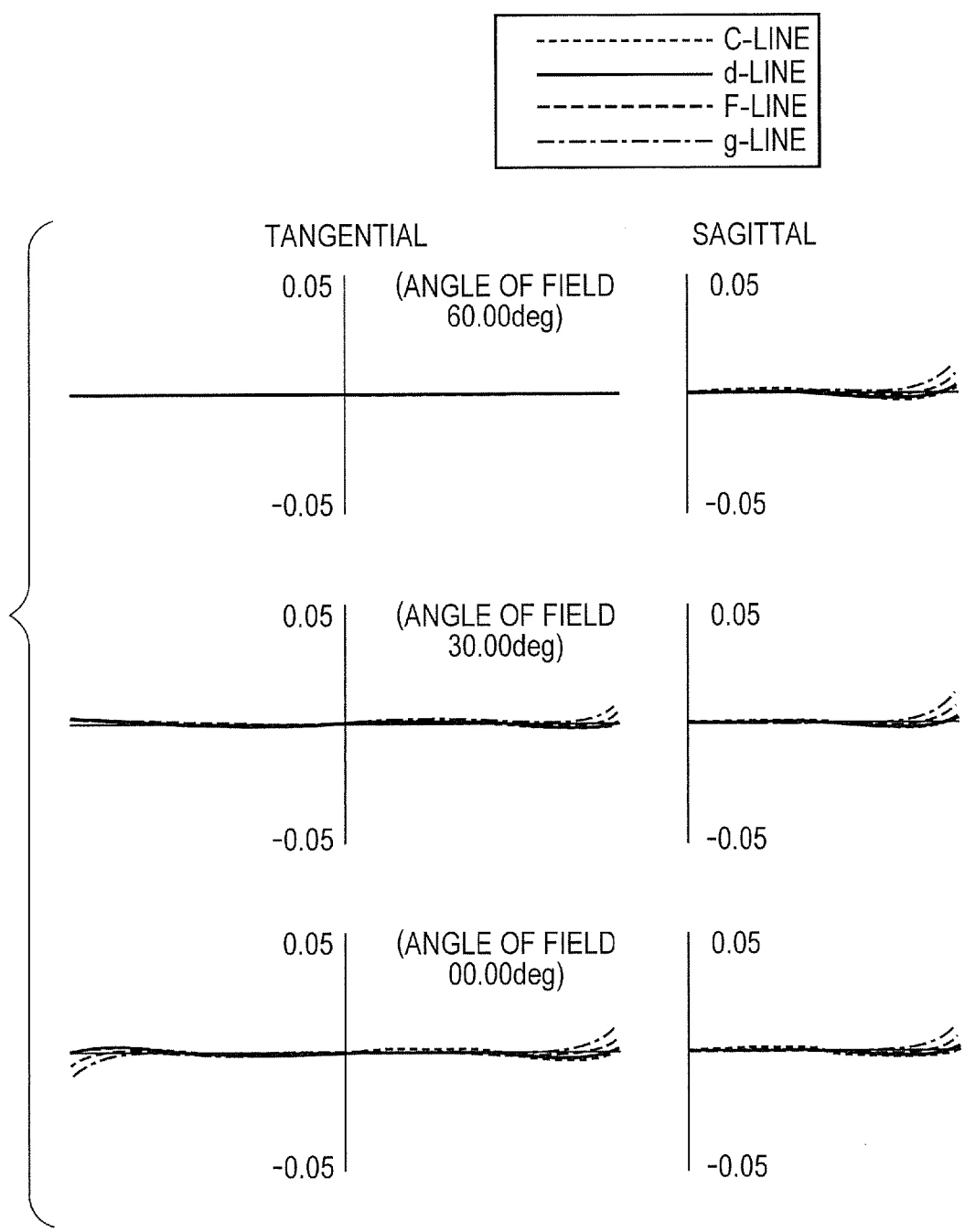
FIG. 83 is a lateral aberration diagram of the imaging optical system according to Example 17 of the present invention.

FIG. 82 illustrates an axial aberration diagram of the imaging optical system of this example, and FIG. 83 illustrates a lateral aberration diagram thereof.

Further, in the imaging apparatus of this example, the distance between the imaging optical system and the image plane is changed so as to perform focus adjustment. Because Expression (4) is satisfied, focus adjustment can be performed while maintaining high resolution in a wide focus adjustment range from infinity to a close distance.

The present invention including the examples described above can be applied to a product using the imaging apparatus such as a digital camera, a digital video camera, a cell phone camera, and a monitoring camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. Japanese Patent Applications No. 2012-081540, filed Mar. 30, 2012, No. 2012-081495, filed Mar. 30, 2012, No. 2012-081584, filed Mar. 30, 2012, and No. 2012-081634, filed Mar. 30, 2012 which are hereby incorporated by reference herein in their entirety.

What is claimed is:

1. An imaging apparatus, comprising:
an imaging optical system; and
an image surface which is disposed on an image side of the imaging optical system and is curved so that a concave surface thereof faces an object side of the imaging optical system,
wherein the imaging optical system includes (a) an aperture stop, (b) a first optical system disposed on an object side of the aperture stop, and (c) a second optical system disposed on an image side of the aperture stop,
wherein the first optical system and the second optical system have different positive power,
wherein the second optical system includes (a) a meniscus lens having a convex surface facing the image side of the imaging optical system and (b) a lens disposed between the aperture stop and the meniscus lens and having a convex surface facing the image side of the imaging optical system, and
wherein the following conditional expressions are satisfied:

$Na > Nb$ $0.8 \leq f_{sys}/d_{pup} \leq 1.5$ $0.8 \leq |R_{img}|/f_{sys} \leq 1.5$ where
Na represents a refractive index of the meniscus lens,
Nb represents a refractive index of the lens disposed between the aperture stop and the meniscus lens,
$f_{sys}$ represents a focal length of the imaging optical system,
$d_{pup}$ represents a distance from an exit pupil of the imaging optical system to the image surface, and
$R_{img}$ represents a radius of curvature of the image surface.

2. An imaging apparatus, comprising:
an imaging optical system including a plurality of lenses; and
an image surface which is disposed on an image side of the imaging optical system and is curved so that a concave surface thereof faces an object side of the imaging optical system,
wherein the imaging optical system includes (a) an aperture stop and (b) a wave front control element disposed between (1) a lens closest to the aperture stop on an object side of the aperture stop and (2) a lens that is a lens closest to the aperture stop on an image side of aperture stop, and
wherein the following conditional expressions are satisfied:

$0.8 \leq f_{sys}/d_{pup} \leq 1.5$ $0.8 \leq |R_{img}|/f_{sys} \leq 1.5$ where
$f_{sys}$ represents a focal length of the imaging optical system,
$d_{pup}$ represents a distance from an exit pupil of the imaging optical system to the image surface, and
$R_{img}$ represents a radius of curvature of the image surface.

3. An imaging apparatus, comprising:
an imaging optical system including a plurality of lenses; and
an image surface which is disposed on an image side of the imaging optical system and is curved so that a concave surface thereof faces an object side of the imaging optical system,
wherein the imaging optical system includes (a) a first lens and a second lens that are adjacent lenses, and (b) an aperture stop disposed between the first lens and the second lens, wherein the first lens is disposed on an object side of the aperture stop, and wherein the second lens is disposed on an image side of the aperture stop,
a surface on an aperture stop side of the first lens is a concave surface;
a surface on an aperture stop side of the second lens is a convex surface, and
wherein the following conditional expressions are satisfied:

$0.8 \leq f_{sys}/d_{pup} \leq 1.5$ $0.8 \leq |R_{img}|/f_{sys} \leq 1.5$ where
$f_{sys}$ represents a focal length of the imaging optical system,
$d_{pup}$ represents a distance from an exit pupil of the imaging optical system to the image surface, and
$R_{img}$ represents a radius of curvature of the image surface.

4. An imaging apparatus, comprising:
an imaging optical system including a plurality of lenses; and
an image surface which is disposed on an image side of the imaging optical system and is curved so that a concave surface thereof faces an object side of the imaging optical system, wherein the imaging optical system includes an aperture stop, wherein at least one of a lens surface closest to the object side and a lens surface closest to the image side in the imaging optical system is an aspherical surface, wherein a reference spherical surface of the at least one of the lens surfaces has positive power, wherein an aspherical component of the at least one of the lens surfaces has a negative power, and wherein the following conditional expressions are satisfied:

$0.8 \leq f_{sys}/d_{pup} \leq 1.5$ $0.8 \leq |R_{img}|/f_{sys} \leq 1.5$ where $f_{sys}$ represents a focal length of the imaging optical system, $d_{pup}$ represents a distance from an exit pupil of the imaging optical system to the image surface, and $R_{img}$ represents a radius of curvature of the image surface.

5. An imaging apparatus according to claim 1, wherein the imaging optical system further includes a wave front control element disposed between (a) a lens that is a lens closest to the aperture stop on the object side of the aperture stop and (b) a lens that is a lens closest to the aperture stop on the image side of the aperture stop.

6. An imaging apparatus according to claim 1, wherein the imaging optical system includes a first lens and a second lens that are adjacent lenses, wherein the aperture stop is disposed between the first lens and the second lens so that the first lens is disposed on the object side of the aperture stop and the second lens is disposed on the image side of the aperture stop, wherein the first lens has a concave surface shape on an aperture stop side of the first lens, and wherein the second lens has a convex surface shape on an aperture stop side of the second lens.

7. An imaging apparatus according to claim 1, wherein at least one of a lens surface closest to the object side and a lens surface closest to the image side in the imaging optical system is an aspherical surface.

8. An imaging apparatus according to claim 1, wherein the following expression is satisfied:

$0 < \phi_{fro} < \phi beh$ where $\phi_{fro}$ represents power of the first optical system, and $\phi_{beh}$ represents power of the second optical system.

9. An imaging apparatus according to claim 1, wherein the following expression is satisfied:

$\phi_{beh}/\phi_{fro} \geq 1.1$ where $\phi_{fro}$ represents power of the first optical system, and $\phi_{beh}$ represents power of the second optical system.

10. An imaging apparatus according to claim 1, wherein the following expression is satisfied:

$vd_{mostimg} < vd_{mostobj}$ where $vd_{mostimg}$ represents an Abbe number of a lens closest to the image side in the imaging optical system, and $vd_{mostobj}$ represents an Abbe number of a lens closest to the object side in the imaging optical system.

11. An imaging apparatus according to claim 1, wherein (a) a difference between an Abbe number of a lens in the imaging optical system that is a lens closest to the image side in the imaging optical system and an Abbe number of a lens adjacent to the lens closest to the image side in the imaging optical system is larger than (b) a difference between an Abbe number of a lens in the imaging optical system that is a lens closest to the object side in the imaging optical system and an Abbe number of a lens adjacent to the lens closest to the object side in the imaging optical system.

12. An imaging apparatus according to claim 1, wherein the following expression is satisfied:

$1.850000 \leq Nd \leq 2.300000$, wherein Nd represents a refractive index of at least one of (a) a lens in the imaging optical system that is a lens closest to the object side in the imaging optical system and (b) a lens in the imaging optical system that is a lens closest to the image side in the imaging optical system.

13. An imaging apparatus according to claim 1, wherein the image surface comprises one of La1 an incident surface of an image sensor and (b) an incident surface of an optical transmission unit for transmitting light to the image sensor.

14. An imaging apparatus according to claim 2, wherein a curvature center of a lens surface closest to the image side in the imaging optical system is disposed on the object side of the aperture stop.

15. An imaging apparatus according to claim 2, wherein the following expression is satisfied:

$0.7 \leq d_{pup}/d_{ape} \leq 0.95$ wherein $d_{ape}$ represents a distance from the aperture stop to the image surface.

16. An imaging apparatus according to claim 2, wherein the wave front control element gives a phase distribution for delaying a phase on a periphery with respect to an optical axis.

17. An imaging apparatus according to claim 2, wherein power due to a phase difference given by the wave front control element is larger in a negative direction in a periphery than on an optical axis of the wave front control element.

18. An imaging apparatus according to claim 2, wherein the wave front control element comprises a phase difference plate, a diffractive optical element, a phase modulation type spatial light modulator, or a liquid crystal element.

19. An imaging apparatus according to claim 3, wherein a space between the first lens and the second lens is filled with a fluid medium, wherein the concave surface of the first lens comes into contact with the fluid medium, and wherein the convex surface of the second lens comes into contact with the fluid medium.

20. An imaging apparatus according to claim 3, wherein a radius of curvature of the concave surface of the first lens is longer than a distance from the concave surface to the aperture stop.

21. An imaging apparatus according to claim 3, wherein a radius of curvature of the concave surface of the first lens is shorter than a radius of curvature of the convex surface of the second lens.

22. An imaging apparatus according to claim 3, wherein the following expression is satisfied:

$$-5 \leq \frac{\phi_r}{\phi_f} \leq -1$$

where φf represents power of the concave surface of the first lens, and φr represents power of the convex surface of the second lens.

23. An imaging apparatus according to claim 3, wherein a distance from the aperture stop to the convex surface of the second lens is shorter than a distance from the aperture stop to the concave surface of the first lens.

24. An imaging apparatus according to claim 3, wherein the concave surface of the first lens is an aspherical surface in which a periphery of the aspherical surface is displaced from a reference spherical surface to the image side.

25. An imaging apparatus according to claim 3, wherein the convex surface of the second lens is an aspherical surface in which a periphery of the aspherical surface is displaced from a reference spherical surface to the object side.

26. An imaging apparatus according to claim 4, wherein the at least one of the lens surfaces is an aspherical surface in which a periphery of the aspherical surface is displaced from a reference spherical surface to an outside of the imaging optical system.

27. An imaging apparatus according to claim 4, wherein the at least one of the lens surfaces is an aspherical surface in which an aspherical amount increases as a distance from an optical axis increases.

28. An imaging apparatus according to claim 4, wherein the negative power of the aspherical component increases as a distance from an optical axis increases.

29. An imaging apparatus according to claim 4, wherein the lens surface closest to the object side and the lens surface closest to the image side in the imaging optical system are aspherical surfaces in which peripheries of the aspherical surfaces are displaced from reference spherical surfaces to an outside of the imaging optical system.

30. An imaging apparatus according to claim 19, wherein the fluid medium is a liquid.

* * * * *